(12) United States Patent
Yamada et al.

(10) Patent No.: US 7,336,419 B2
(45) Date of Patent: Feb. 26, 2008

(54) ZOOM LENS, STILL IMAGE CAMERA COMPRISING THE ZOOM LENS, AND VIDEO CAMERA COMPRISING THE ZOOM LENS

(75) Inventors: Katsu Yamada, Matsubara (JP); Shusuke Ono, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 180 days.

(21) Appl. No.: 11/067,432

(22) Filed: Feb. 22, 2005

(65) Prior Publication Data
US 2005/0195482 A1    Sep. 8, 2005

Related U.S. Application Data

(63) Continuation-in-part of application No. 09/701,754, filed as application No. PCT/JP99/02910 on May 31, 1999, now abandoned.

(30) Foreign Application Priority Data

Jun. 1, 1998  (JP) ................. 10-151361
Oct. 23, 1998 (JP) ................. 10-302109
Apr. 15, 1999 (JP) ................. 11-108482

(51) Int. Cl.
   *G02B 27/64* (2006.01)
(52) U.S. Cl. ................ 359/557; 359/554; 359/362
(58) Field of Classification Search ............... 359/557
   See application file for complete search history.

(56) References Cited

U.S. PATENT DOCUMENTS

| | | |
|---|---|---|
| 4,818,083 A | 4/1989 | Mihara |
| 5,056,900 A | 10/1991 | Mukaiya et al. |
| 5,313,331 A | 5/1994 | Mihara |
| 5,579,171 A | 11/1996 | Suzuki et al. |
| 5,583,697 A | 12/1996 | Mukaiya |
| 5,585,966 A | 12/1996 | Suzuki |
| 5,638,210 A | 6/1997 | Sato et al. |
| 5,719,708 A | 2/1998 | Nagaoka |
| 5,978,152 A | 11/1999 | Okayama et al. |
| 6,178,049 B1 | 1/2001 | Mukaiya et al. |

(Continued)

FOREIGN PATENT DOCUMENTS

JP    6-265827    9/1994

(Continued)

*Primary Examiner*—Joshua L Pritchett
(74) *Attorney, Agent, or Firm*—Hamre, Schumann, Mueller & Larson, P.C.

(57) ABSTRACT

Provided from the object side are a first lens group (11) having a positive refracting power and fixed to the image plane, a second lens group (12) having a negative refracting power and a magnification varying action exhibited when moving along the optical axis, a third lens group (13) fixed to the image plane and having a positive refracting power, and a fourth lens group (14) movable along the optical axis so as to maintain the image plane moving with the movements of the second lens group (12) and of the object in a fixed position from a reference plane. Hence the movement of the image due to camera shake is corrected by moving the whole third lens group (13) vertically to the optical axis. The size is reduced and the aberrations are small because the whole groups whose optical performance is united are decentered.

26 Claims, 94 Drawing Sheets

U.S. PATENT DOCUMENTS

| | | |
|---|---|---|
| 6,226,130 B1 | 5/2001 | Mukaiya et al. |
| 6,353,505 B1 | 3/2002 | Yoneyama |
| 6,542,312 B1 | 4/2003 | Okayama et al. |
| 6,606,194 B2 | 8/2003 | Hamano et al. |
| 6,741,399 B2 | 5/2004 | Ori |
| 2002/0024732 A1 | 2/2002 | Hamano et al. |

FOREIGN PATENT DOCUMENTS

| | | |
|---|---|---|
| JP | 6-308388 | 11/1994 |
| JP | 7-128619 | 5/1995 |
| JP | 7-199124 | 8/1995 |
| JP | 8-29737 | 2/1996 |
| JP | 8-160300 | 6/1996 |
| JP | 9-15497 | 1/1997 |
| JP | 9-281391 | 10/1997 |
| JP | 9-281392 | 10/1997 |
| JP | 9-281393 | 10/1997 |
| JP | 9-288236 | 11/1997 |
| JP | 9-304698 | 11/1997 |
| JP | 10-260356 | 9/1998 |

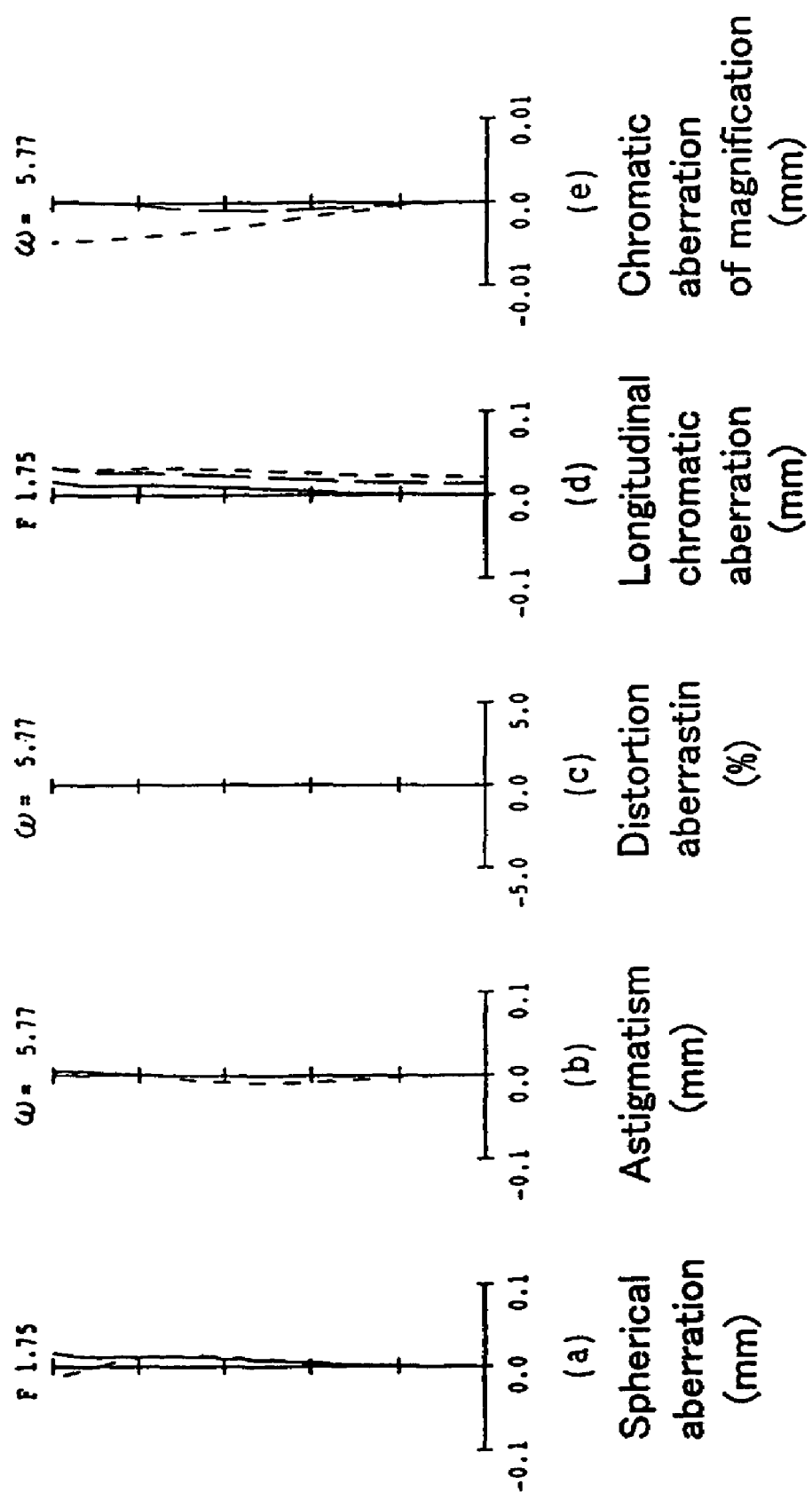
F I G. 3

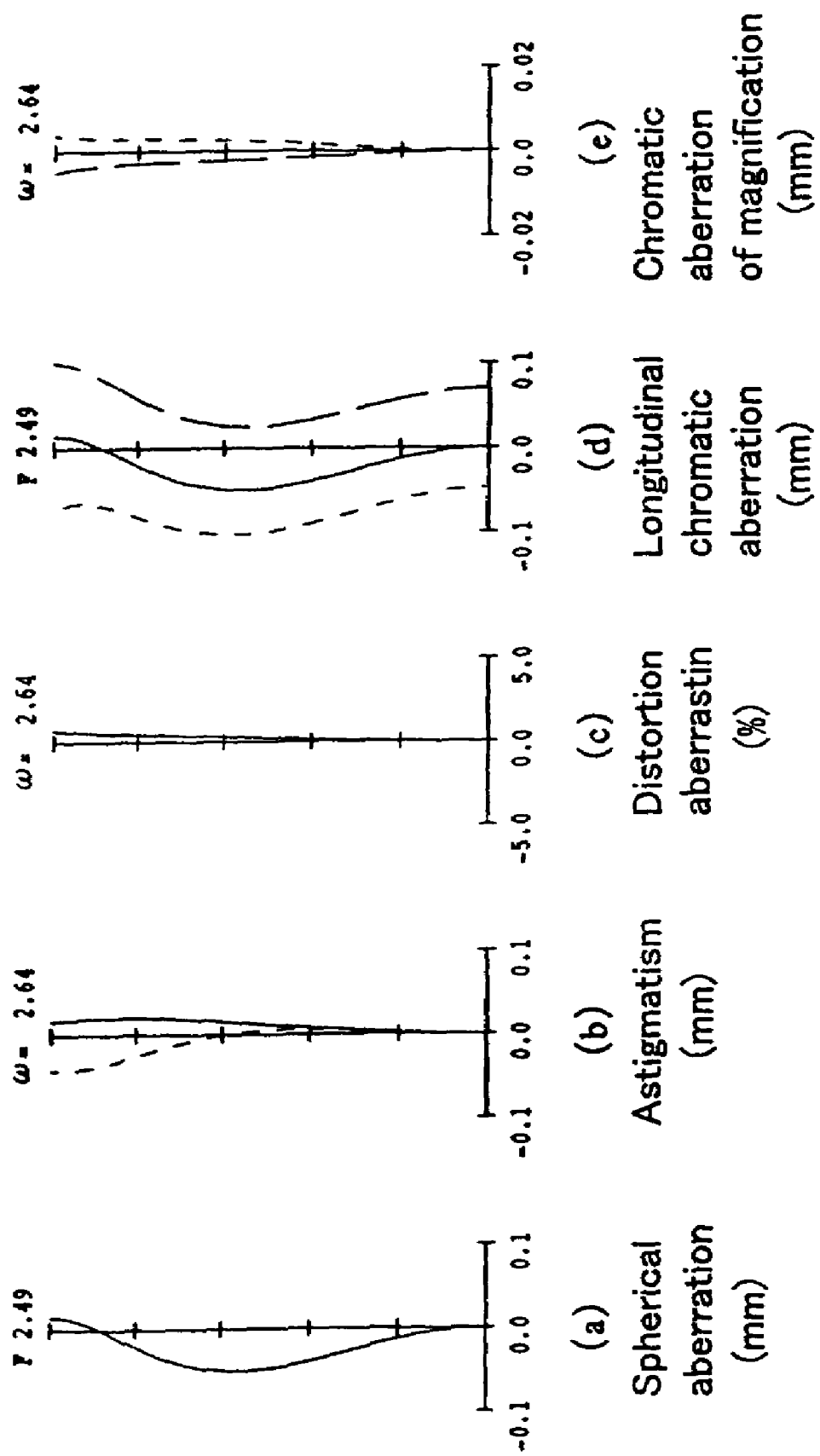
F I G. 27

(a)

(b)

(c)

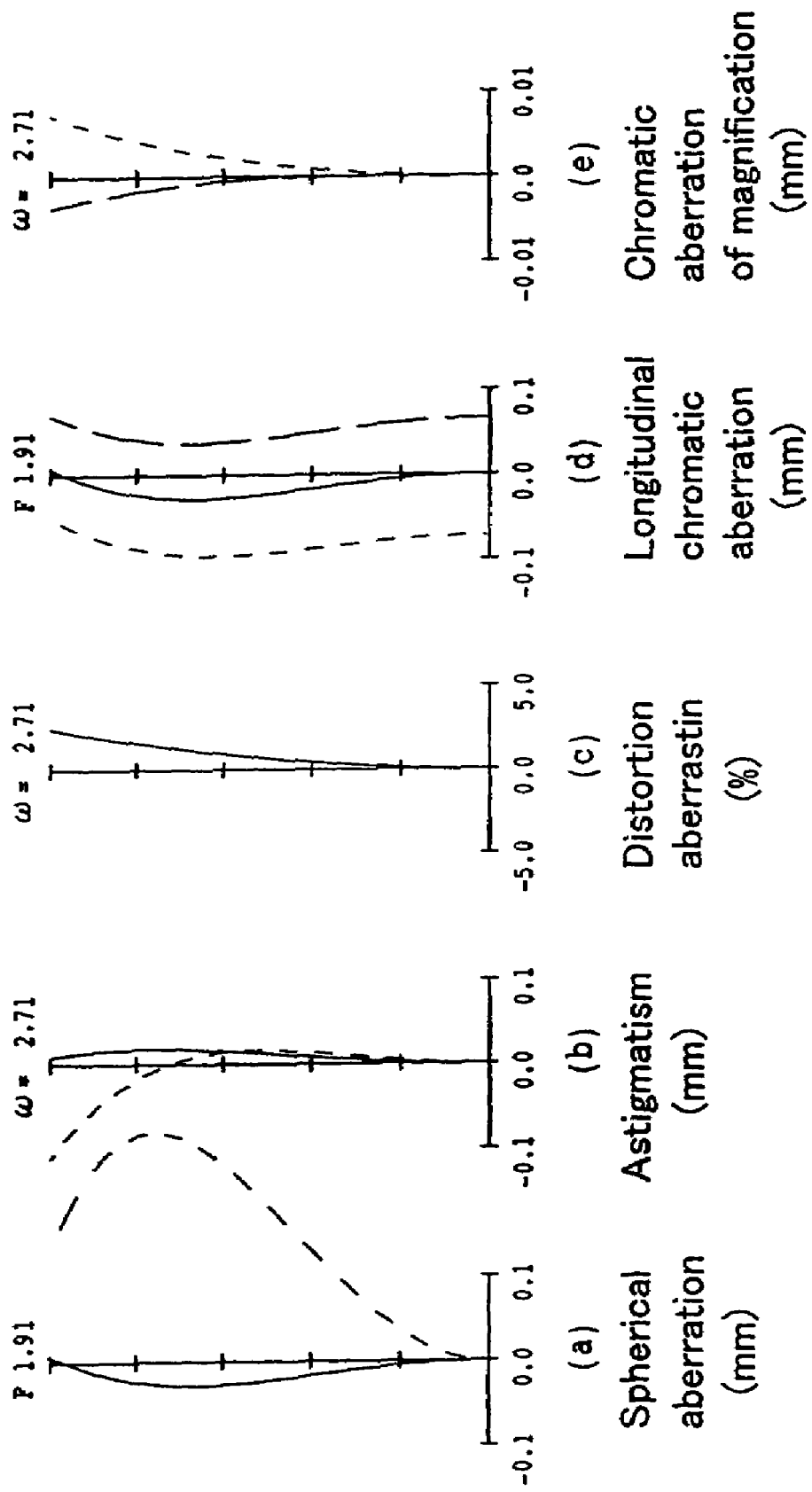
F I G. 52

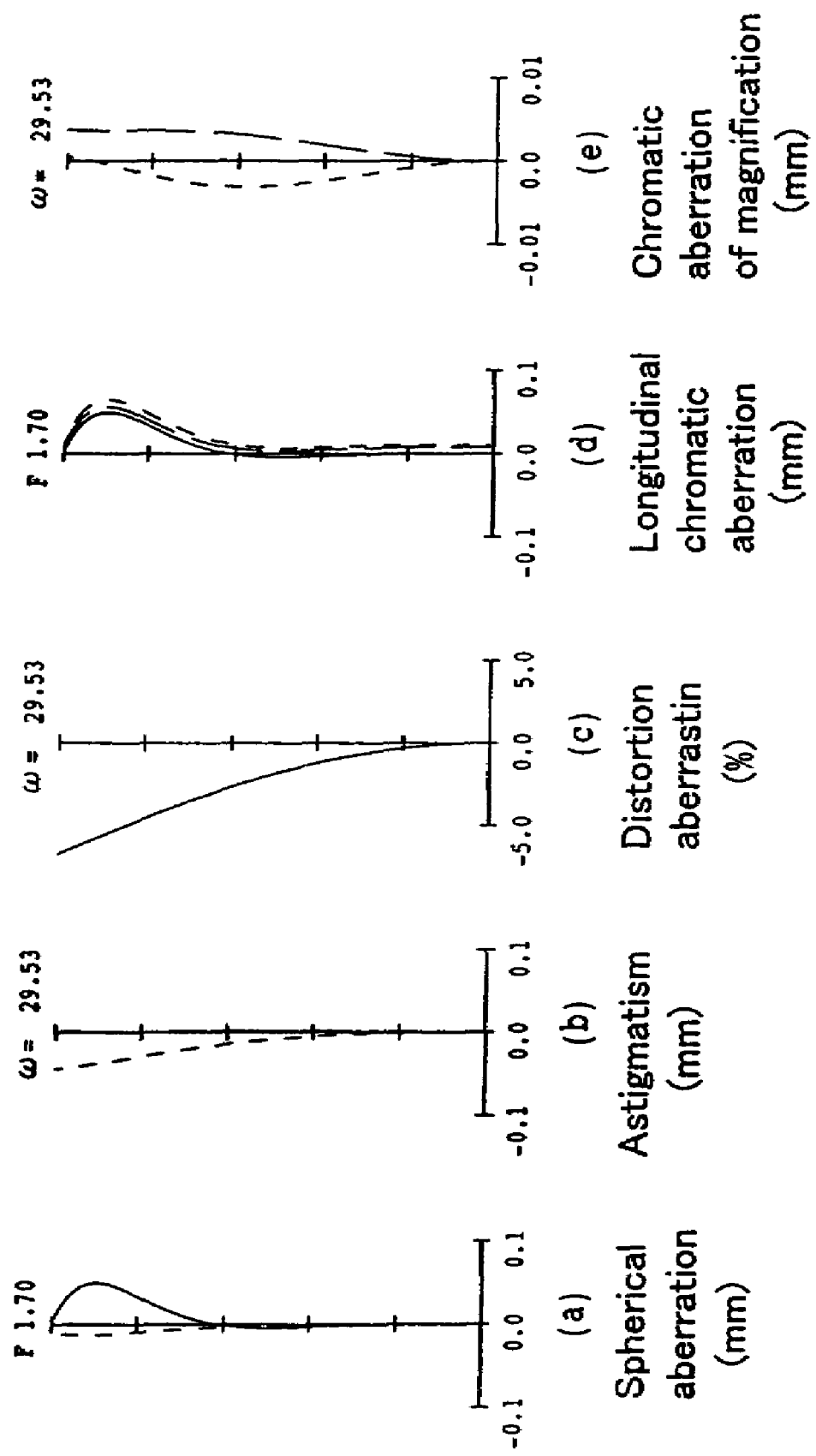
F I G. 53

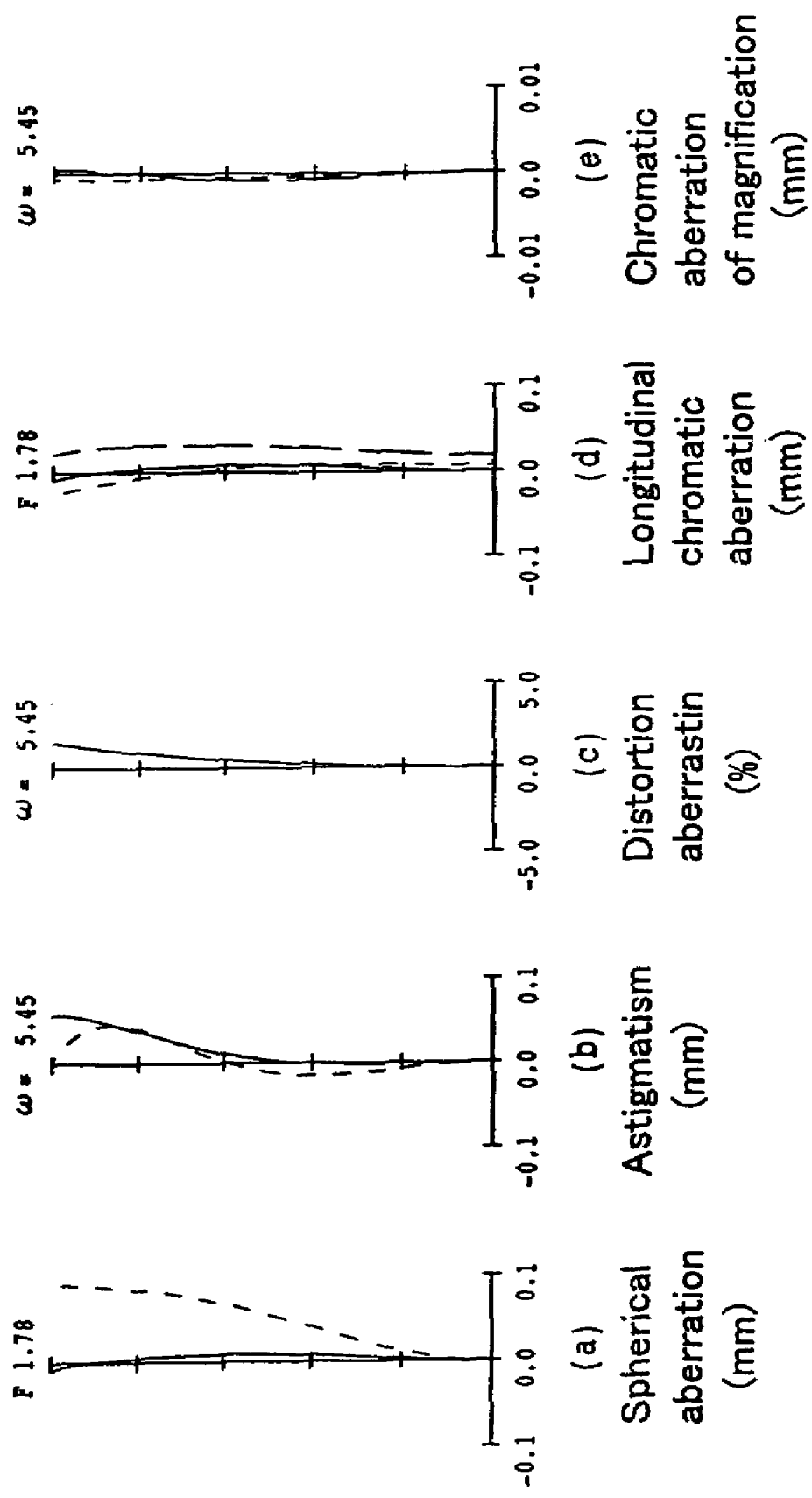
F I G. 59

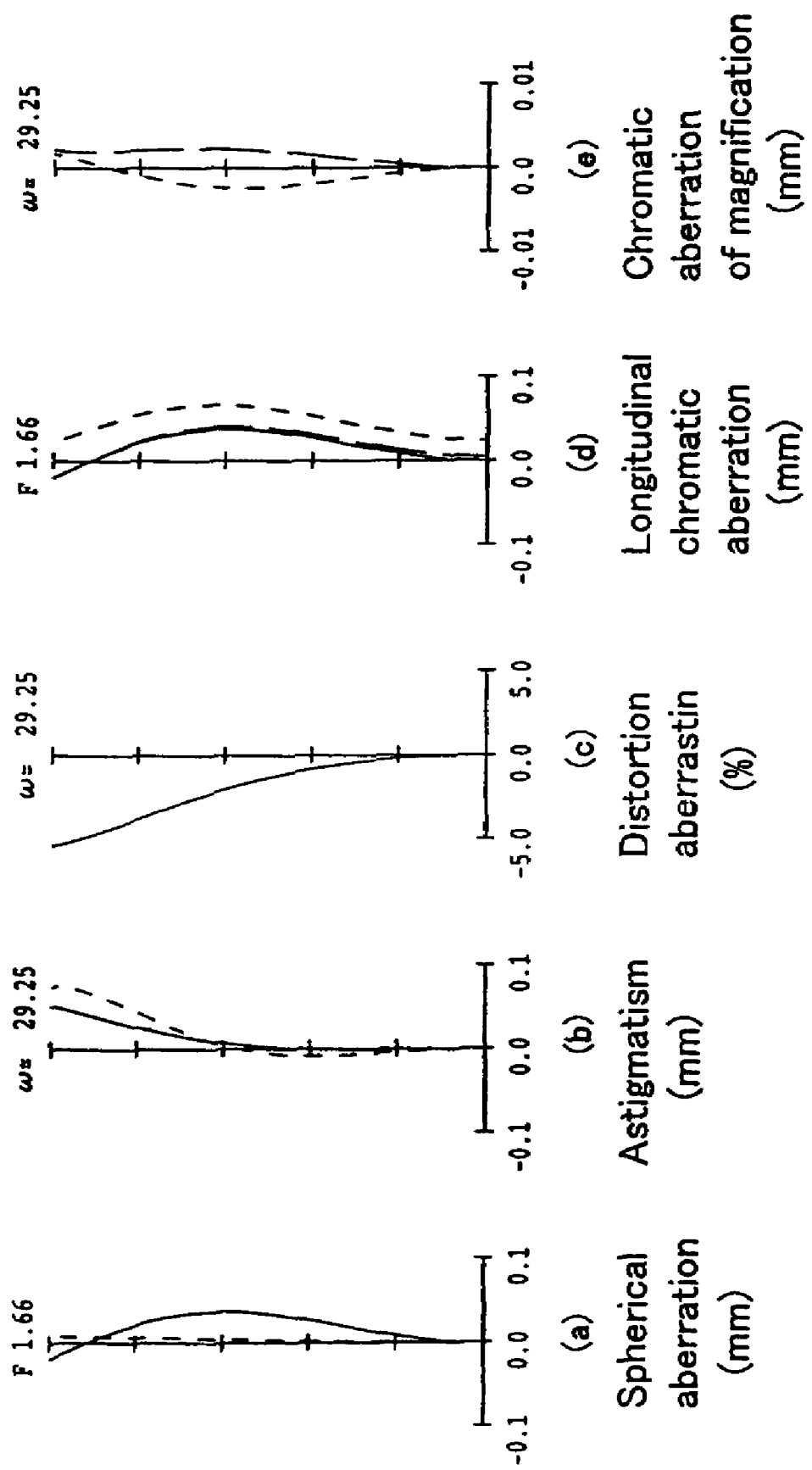
F I G. 67

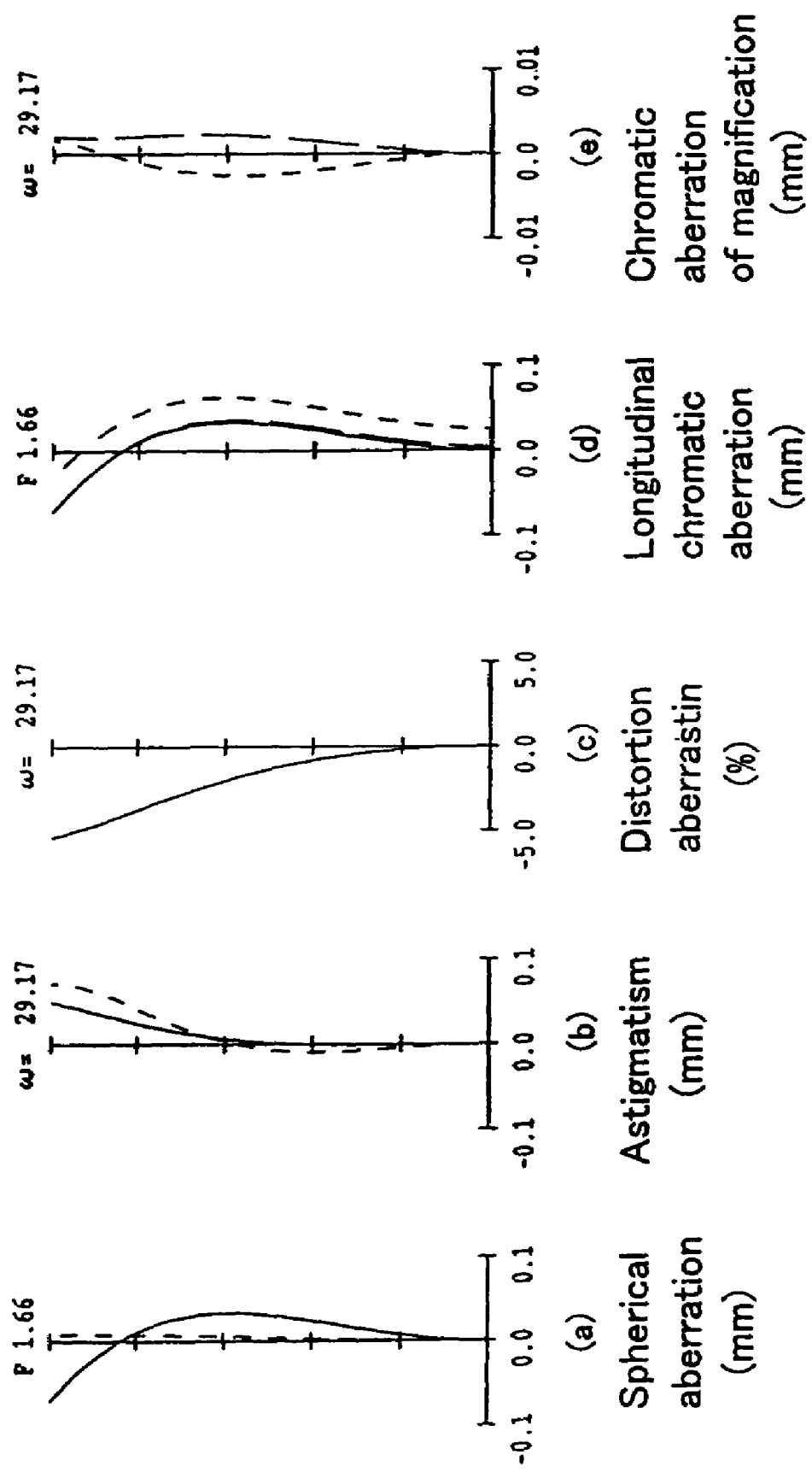
F I G. 71

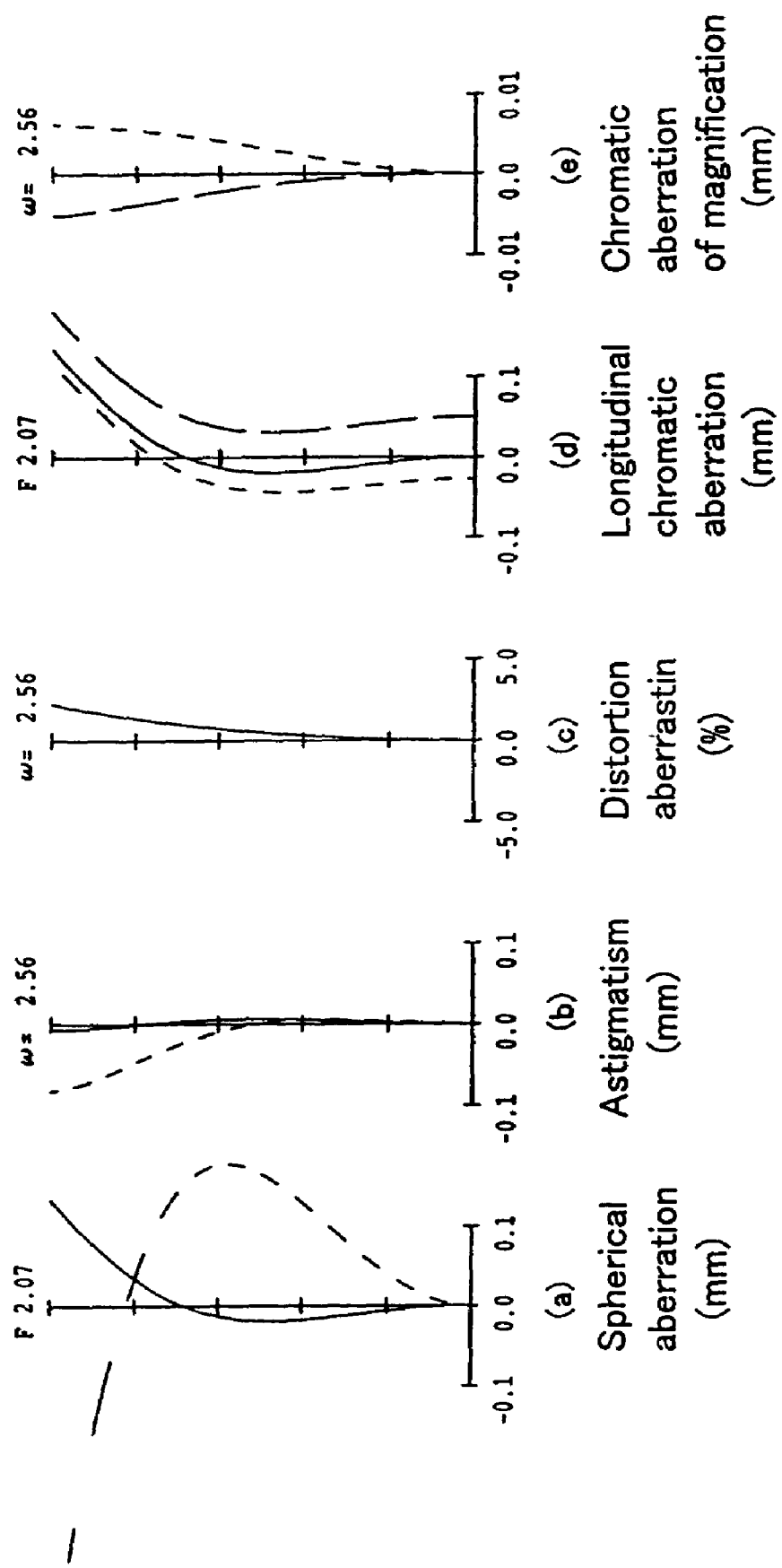
F I G. 81

ZOOM LENS, STILL IMAGE CAMERA COMPRISING THE ZOOM LENS, AND VIDEO CAMERA COMPRISING THE ZOOM LENS

This application is a Continuation-in-Part of U.S. patent application Ser. No. 09/701,754 filed Dec. 1, 2000, now abandoned which is a National Stage of PCT/JP99/02910 filed May 31, 1999, and which applications are incorporated herein by reference.

TECHNICAL FIELD

The present invention relates to a zoom lens used for a video camera or the like, and the zoom lens has a function optically to correct image movement caused by camera shake, vibration or the like.

BACKGROUND ART

Motion picture cameras such as video cameras have been required to have a function to prevent vibration caused by camera shake, and various types of vibration-proof optical systems have been disclosed. For example, a zoom lens disclosed in JP-A-8-29737 includes an optical system consisting of two parts attached in front of the zoom lens in order to correct camera shake, where either of the parts is moved vertically to an optical axis in order to correct movement of images caused by camera shake.

A zoom lens disclosed in JP-A-7-128619 comprises four groups, where a part of the third lens group comprising plural lenses is moved vertically to the optical axis in order to correct the movement of images caused by camera shake.

However, the zoom lens disclosed in JP-A-8-29737 has an increased lens diameter for an optical system to correct camera shake for the purpose of attaching the optical system in front of the zoom lens. Accordingly, the entire component is upsized and a load on a driving system will be heavier. As a result, the zoom lens is unfavorable in view of downsizing, weight-reduction and power-saving.

The zoom lens disclosed in JP-A-7-128619 corrects image movement caused by camera shake by moving a part of the third lens group vertically to the optical axis while the same lens group is fixed with respect to the image plane. This type of zoom lens is more favorable than a zoom lens of front-attachment type in view of downsizing, but a load on the actuator will be heavier since the lens group for correcting camera shake is composed of three lenses.

Since an optical system for correcting camera shake is attached in front of the zoom lens disclosed in JP-A-8-29737, the lens diameter of the optical system will be increased, and the entire component will be upsized. So a load on the driving system will be heavier, and thus, this zoom lens is unfavorable in view of downsizing, weight reduction and power-saving.

The latter zoom lens in JP-A-7-128619 is advantageous in downsizing and weight reduction when compared to a type comprising an optical system for correcting camera shake in front of the zoom lens, since a third lens group is fixed with respect to the image plane and a part thereof is moved vertically with respect to the optical axis. However, the zoom lens has a problem of deterioration in aberration, especially for chromatic aberration, when shifting lenses, since a part of the third lens group is moved.

DISCLOSURE OF INVENTION

A purpose of the present invention is to resolve the above mentioned problems in conventional zoom lenses by providing a small and compact zoom lens with less deterioration in the aberration performance and also a video camera using the same.

For this purpose, a first zoom lens of the present invention comprises a first lens group having a positive refracting power and being fixed with respect to an image plane, a second lens group having a negative refracting power and varying power by moving along an optical axis, a third lens group having a positive refracting power and being fixed with respect to the image plane, and a fourth lens group having a positive refracting power and moving along an optical axis so as to keep the image plane varied by a shift of the second lens group and an object at a predetermined position from a reference surface, and the first to the fourth lens group are disposed from the object in this order. The present invention is characterized in that the entire third lens group is moved vertically with respect to the optical axis so as to correct movement of an image during camera shake.

Accordingly, the zoom lens can be downsized when compared to a type of zoom lens comprising an optical system for correcting camera shake attached in front of the lens. Furthermore, since the entire group having a united optical performance is decentered, deterioration in the aberration can be decreased when compared to a zoom lens in which only a part in the groups are moved.

In the first zoom lens mentioned above, preferably the third group is composed of one lens. Accordingly, a load on the driving system will be decreased when correcting camera shake, and power consumption can be saved.

Preferably the third lens group is composed of two lenses: a positive lens and a negative lens. Accordingly, the aberration when correcting camera shake can be corrected more efficiently, and deterioration of image quality can be decreased even when correcting camera shake.

Preferably the third lens group is composed of three lenses comprising at least one positive lens and at least one negative lens. The third lens group is required to have a strong positive power to decrease the full length in order to obtain a small zoom lens. In this preferable embodiment, aberration occurring at this time can be corrected with the three lenses.

It is also preferable that the third lens group includes a positive lens, and a cemented lens of a positive lens and a negative lens. Accordingly, tolerance when assembling a group of correcting lenses can be eased.

Preferably the third lens group is composed of at least one aspherical surface. Accordingly, aberration when correcting camera shake can be corrected with further efficiency, and thus, performance when moving the lenses can be improved.

Preferably the fourth lens group comprises at least one aspherical surface. Accordingly, aberration when correcting camera shake can be corrected as well as when a stationary state with further efficiency.

Preferably, the shifting amount Y of the third lens group at a focal length f of an entire system when correcting camera shake, the shifting amount Yt of the third lens group at a telephoto end, and the focal length ft of the telephoto end satisfy the following conditional expressions.

$Yt > Y$; and $(Y/Yt)/(f/ft) < 1.5$

Accordingly, deterioration in the optical performance can be prevented when camera shake occurs.

Preferably, a focal length f3 of the third lens group and a focal length fw of an entire system at a wide-angle end satisfy the following conditional expression.

$$2.0 < f3/fw < 4.0$$

Accordingly, the shifting amount when correcting camera shake can be decreased and the zoom lens can be shortened as a whole, and thus, a small zoom lens can be provided.

Preferably, a surface on the object side of a lens disposed closest to the object side in the third lens group is aspherical, and a local radius of curvature R10 in the vicinity of an optical axis and a local radius of curvature R11 in an outer peripheral portion satisfy the following conditional expression.

$$1.05 < R11/R10 < 2.5$$

Accordingly, spherical aberration can be corrected satisfactorily.

Preferably, a surface on the object side of a lens disposed closest to the object side in the fourth lens group is aspherical, and a local radius of curvature R20 in the vicinity of an optical axis and a local radius of curvature R21 in an outer peripheral portion satisfy the following conditional expression.

$$1.05 < R21/R20 < 2.0$$

Accordingly, coma-aberration on the upper flux of the off-axis ray can be corrected favorably.

Next, a first video camera of the present invention is characterized in that it includes the above-mentioned first zoom lens. Accordingly, the video camera has a function to correct camera shake and can be downsized and weight-reduced.

Next, a second zoom lens of the present invention comprises a first lens group having a positive refracting power and being fixed with respect to an image plane; a second lens group having a negative refracting power and varying power by moving along an optical axis; a third lens group fixed with respect to the image plane; a fourth lens group fixed with respect to the image plane; and a fifth lens group having a positive refracting power and moving along an optical axis so as to keep the image plane varied by a shift of the second lens group and an object at a predetermined position from a reference surface. In this zoom lens, the first to the fifth lens groups are disposed from the object side in this order. The third lens group and the fourth lens group compose a combination of a lens group having a positive refracting power and a lens group having a negative refracting power, and either the third or fourth lens group is moved vertically with respect to the optical axis so as to correct movement of the image during camera shake.

In such a zoom lens, camera shake is corrected by moving lenses with smaller diameter. Therefore, this type of zoom lens is favorable in downsizing when compared to a zoom lens comprising an optical system for correcting camera shake attached in front of the lens. Moreover, since the aberration performance for each lens group can be adjusted, the aberration performance will deteriorate less when correcting camera shake.

In the second zoom lens, preferably either the third or fourth lens group that is moved is vertically with respect to the optical axis so as to correct movement of the image during camera shake is composed of two lenses: one positive lens and one negative lens.

It is also preferable that the third lens group has a positive refracting power and the fourth lens group has a negative refracting power, and the third lens group is moved vertically with respect to the optical axis so as to correct movement of the image during camera shake. In such a zoom lens, long back focus can be secured easily since the fourth lens group includes lenses having a negative refracting power. This is suitable for an optical system of a video camera using three imaging devices, which requires a long back focus.

Preferably, the fourth lens group is composed of two lenses separated from each other: one positive lens and one negative lens.

Preferably, the fourth lens group is composed of two cemented lenses: one positive lens and one negative lens.

Preferably, the third lens group has a negative refracting power and the fourth lens group has a positive refracting power, and the fourth lens group is moved vertically with respect to the optical axis so as to correct movement of the image during camera shake. Since the fourth lens group includes lenses having a positive refracting power in such a zoom lens, light entering the fifth lens group can be lowered and the lens diameter also can be reduced. Therefore, a load on a focusing actuator can be lighter.

Preferably, the third lens group and the fourth lens group are composed two lenses respectively, and Abbe's number v31 of one lens of the third group, Abbe's number v32 of the remaining lens of the third group, Abbe's number v41 of one lens of the fourth group and Abbe's number v42 of the remaining lens of the fourth group satisfy the following conditional expressions.

$$|v31 - v32| > 25$$

$$|v41 - v42| > 25$$

Since such a zoom lens can provide a sufficient achromatic effect, deterioration in magnification chromatic aberration can be decreased even when shifting the lenses.

Preferably, either the third or fourth lens group that is moved vertically with respect to the optical axis in order to correct movement of an image during camera shake is composed of two lenses: one lens having a positive refracting power and one lens having a negative refracting power being disposed separately from the object side in this order, and the lenses have sag amounts equal on the object side and on the image side.

Preferably, either the third or fourth lens group that group is moved vertically with respect to the optical axis in order to correct movement of an image during camera shake is composed of three lenses comprising at least one positive lens and at least one negative lens. In a small zoom lens, the third lens group is required to have a strong positive power to decrease the whole length. Aberrations occurring at this time can be corrected by using three lenses in this embodiment.

Preferably, either the third or fourth lens group that is moved vertically with respect to the optical axis in order to correct movement of an image during camera shake is composed of one lens. Accordingly, a load on the driving system will be lighter when correcting camera shake and power consumption can be decreased.

Preferably, either the third or fourth lens group that is moved vertically with respect to the optical axis in order to correct movement of an image during camera shake comprises at least one aspherical surface. Such a zoom lens can have improved performance during lens shifting.

Preferably, either the third or fourth lens group that is moved vertically with respect to the optical axis in order to correct movement of an image during camera shake comprises a convex lens having an aspherical surface when viewed from the object side, and a local radius of curvature rS1 for a diameter occupying 10% of lens effective diameter and a local radius of curvature rS9 for a diameter occupying 90% of lens effective diameter satisfy the following conditional expression.

$$0.01 < rS1/rS9 < 2.00$$

Such a zoom lens can provide sufficient aberration performance.

Preferably, a focal length f3 of the third lens group and a focal length f34 of a composite focal length of the third and fourth lens groups satisfy the following conditional expression.

$$0.40 < |f3/f34| < 0.85$$

Since such a zoom lens can control the power of the correcting lenses, deterioration in the aberration performance can be prevented and moreover, degree of lens movement when correcting camera shake can be controlled. Therefore, the lens can be made smaller, and this is favorable for downsizing.

Preferably, a focal length fw of an entire system at the wide-angle end and a distance BF between the final surface of the lens and the image plane in the air satisfy the following conditional expression.

$$2.0 < BF < fw < 5.0$$

Accordingly, a zoom lens with a long back focus can be provided. Preferably, a focal length fw of an entire system at the wide-angle end, focal length fi (i=1-5) of the i-th lens group, and a composite focal length f34 of the third and fourth lens groups satisfy the following expressions.

$$5.0 < f1/fw < 8.0$$

$$0.5 < |f2|/fw < 1.6$$

$$4.0 < |f34|/fw < 9.5$$

$$2.0 < f5/fw < 5.0$$

Accordingly, a small zoom lens can be provided.

It is also preferable that the shifting amount Y of the third lens group at a focal length f of an entire system when correcting camera shake, the shifting amount Yt of the third lens group at a telephoto end and a focal length ft of the telephoto end satisfy the following conditional expressions.

$$Yt > Y; \text{ and}$$

$$(Y/Yt)/(f/ft) < 1.5$$

Accordingly, overcorrection and also deterioration in the optical performance can be prevented.

Next, a second video camera of the present invention is characterized in that it comprises the second zoom lens. Accordingly, a small video camera with high-performance and a function to correct camera shake is obtainable.

BRIEF DESCRIPTION OF THE DRAWINGS

FIG. 3 illustrates various aberrations at a standard position in the first embodiment according to the present invention.

FIG. 27 illustrates various aberrations at a telephoto end in the sixth embodiment according to the present invention.

FIG. 52 illustrates various aberrations at a telephoto end of the second example in the eleventh embodiment according to the present invention.

FIG. 53 illustrates various aberrations at a wide-angle end of a third example in the eleventh embodiment according to the present invention.

FIG. 59 illustrates various aberrations at a standard position in the twelfth embodiment according to the present invention.

FIG. 67 illustrates various aberrations at a wide-angle end in the fifteenth embodiment according to the present invention.

FIG. 71 illustrates various aberrations at a wide-angle end in the sixteenth embodiment according to the present invention.

FIG. 81 illustrates various aberrations at a telephoto end in the eighteenth embodiment according to the present invention.

BEST MODE FOR CARRYING OUT THE INVENTION

Hereinafter, the present invention will be described by way of illustrative embodiments.

First Embodiment

Figure 1:
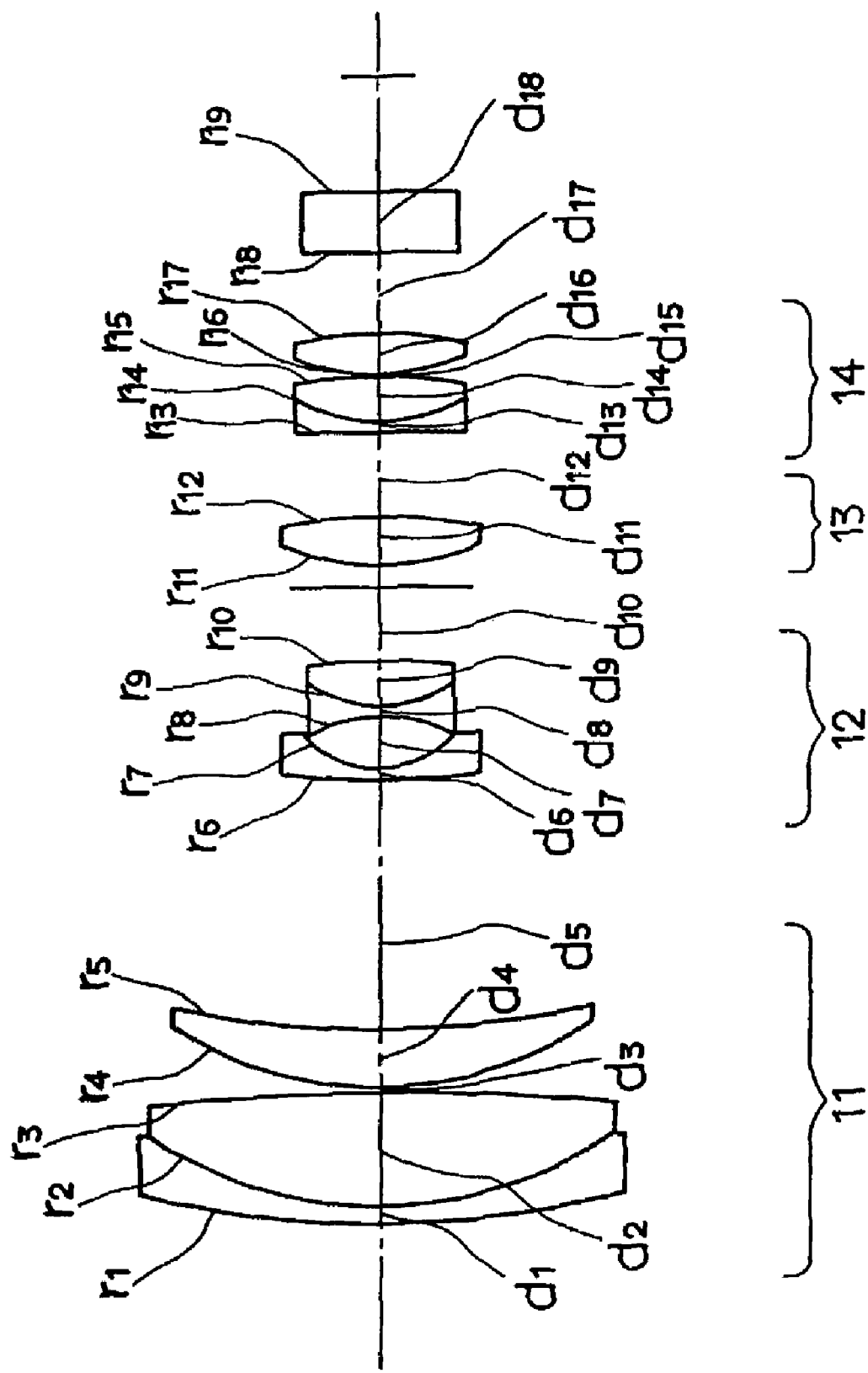
FIG. 1 is a view showing the arrangement of a zoom lens in a first embodiment according to the present invention.

FIG. 1 is a view showing the arrangement of a zoom lens in a first embodiment according to the present invention. As shown in FIG. 1, a zoom lens has a structure in which a first lens group 11, a second lens group 12, a third lens group 13, and a fourth lens group 14 are disposed from an object side (left side in FIG. 1) to an image plane side (right side in FIG. 1) in this order.

The first lens group 11 has a positive refracting power, and is fixed with respect to the image plane in varying power and focusing. The second lens group 12 has a negative refracting power and varies power by moving along an optical axis. The third lens group 13 is composed of a single lens having a positive refracting power and is fixed with respect to the image plane in varying power and focusing.

When camera shake occurs, shake of an image is corrected by moving the third lens group 13 in a direction vertical to the optical axis. Since camera shake is corrected in this way by moving a lens with smaller diameter, a small and lightweight video camera can be provided. Furthermore, power consumption also can be reduced since a load on the driving system becomes lighter.

The fourth lens group 14 has a positive refracting power, moves along an optical axis so as to keep the image plane varied by the shift of the second lens group 12 and the object at a predetermined position from a reference surface, thereby moving an image and adjusting the focus thereof at the same time in accordance with variable power. Since aberration of camera shake can be corrected more efficiently by providing at least one aspherical surface to the lens of the third group 13, performance in shifting the lenses can be improved.

Specific examples of zoom lenses according to this embodiment are shown in the following Table 1. In Table 1, r is a radius of curvature of a lens (mm), d is a thickness of a lens or air distance (mm) between lenses, n is a refractive index of each lens with respect to a d-line, and ν is an Abbe's number of each lens with respect to the d-line. These also apply to Tables 4, 7, 10, 13, 19, 25, 31, 37, 43, 46, 49, 52, 55, 58, 61, 64, 67, 70, 73, and 76.

TABLE 1

| Group | Surface | r | d | n | ν |
|---|---|---|---|---|---|
| 1 | 1 | 59.253 | 1.20 | 1.80518 | 25.4 |
|   | 2 | 25.011 | 7.30 | 1.60311 | 60.7 |
|   | 3 | −142.977 | 0.20 | | |
|   | 4 | 21.743 | 3.95 | 1.69680 | 55.6 |
|   | 5 | 60.993 | Variable | | |
| 2 | 6 | 58.338 | 0.70 | 1.78500 | 43.7 |
|   | 7 | 6.000 | 3.39 | | |
|   | 8 | −8.642 | 0.80 | 1.66547 | 55.2 |
|   | 9 | 8.000 | 2.60 | 1.80518 | 25.5 |
|   | 10 | −85.700 | Variable | | |
| 3 | 11 | 13.702 | 3.00 | 1.51450 | 63.1 |
|   | 12 | −43.933 | Variable | | |
| 4 | 13 | 137.583 | 0.80 | 1.84666 | 23.9 |
|   | 14 | 10.422 | 2.80 | 1.60602 | 57.4 |
|   | 15 | −46.478 | 0.16 | | |
|   | 16 | 13.885 | 2.60 | 1.56883 | 56.0 |
|   | 17 | −24.865 | Variable | | |
| 6 | 18 | ∞ | 4.00 | 1.51633 | 64.1 |
|   | 19 | ∞ | — | | |

Table 2 shows aspherical coefficients in the examples of Table 1. In Table 2, K is a conic constant, and D, E, F, G are aspherical coefficients. These also apply to Tables 5, 8, 11, 14, 26, 32, 38, 44, 47, 50, 53, 56, 59, 62, 65, 68, 71, 74, and 77.

TABLE 2

| Surface | 8 | 11 | 12 | 17 |
|---|---|---|---|---|
| K | $2.44209 \times 10^{-1}$ | $-2.94965 \times 10^{-2}$ | $-7.06772 \times 10$ | $5.00685$ |
| D | $9.09600 \times 10^{-5}$ | $-8.84486 \times 10^{-5}$ | $-8.47419 \times 10^{-5}$ | $8.59675 \times 10^{-5}$ |
| E | $3.54726 \times 10^{-6}$ | $-2.01845 \times 10^{-7}$ | $1.51914 \times 10^{-6}$ | $3.78258 \times 10^{-7}$ |
| F | $-6.27173 \times 10^{-7}$ | $1.11591 \times 10^{-8}$ | $-3.20919 \times 10^{-8}$ | $4.82992 \times 10^{-10}$ |
| G | $1.82732 \times 10^{-8}$ | $-1.53242 \times 10^{-10}$ | $-1.00434 \times 10^{-9}$ | $1.52605 \times 10^{-10}$ |

The following Table 3 shows an air distance (mm) that is varied by zooming in the case where an object is positioned 2 m away from the tip end of the lens. The standard position is where the third lens group 13 is placed most closely to the fourth lens group 14. In Table 3, f(mm), F/NO, and ω(°) represent a focal length, an F number, and an incident half-angle of view at a wide-angle end, a standard position, and a telephoto end of the zoom lens. These also apply to Tables 6, 9, 12, 15, 26, 45, 48, 51, 54, 57, 60, 63, 66, 69, 72, 75, and 78.

TABLE 3

| | Wide-angle end | Standard position | Telephoto end |
|---|---|---|---|
| f | 4.018 | 23.629 | 64.517 |
| F/NO | 1.462 | 1.750 | 2.145 |
| 2ω | 65.578 | 11.544 | 4.354 |
| d5 | 0.500 | 16.120 | 20.600 |
| d10 | 22.043 | 5.523 | 1.943 |
| d14 | 9.733 | 5.467 | 9.131 |
| d19 | 1.009 | 5.275 | 1.611 |

Figure 2:
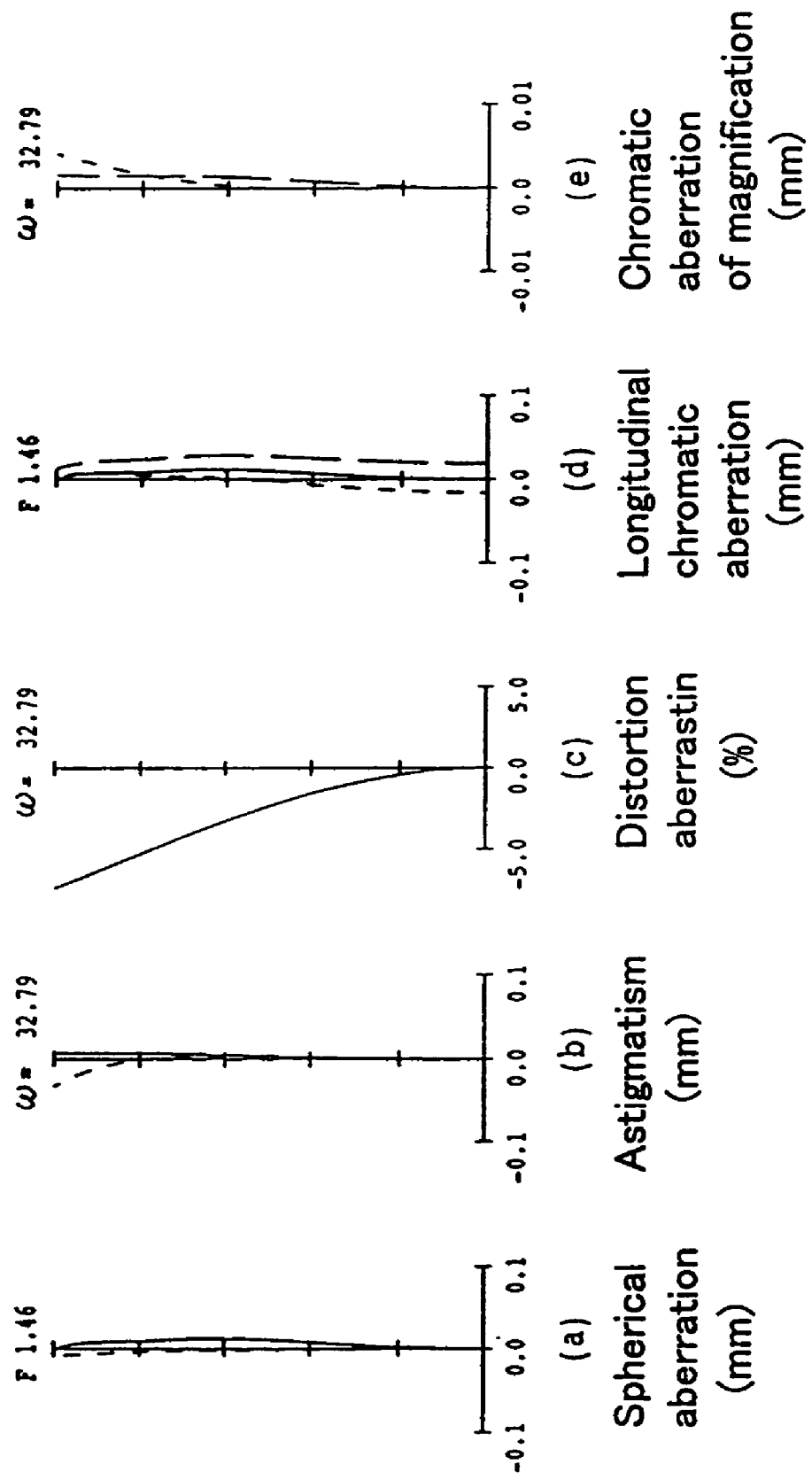
FIG. 2 illustrates various aberrations at a wide-angle end in the first embodiment according to the present invention.
Figure 4:
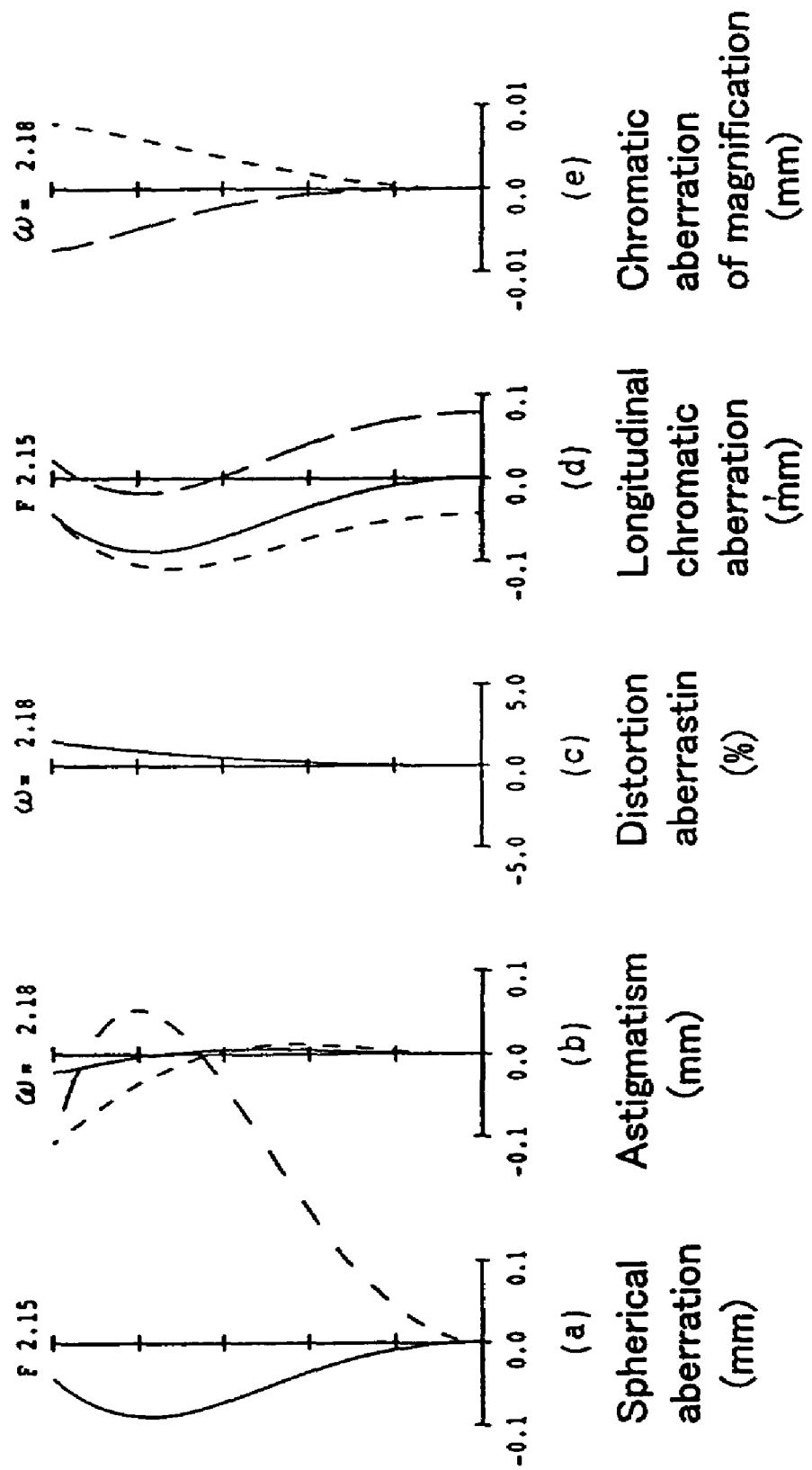
FIG. 4 illustrates various aberrations at a telephoto end in the first embodiment according to the present invention.

FIGS. 2 to 4 show various aberrations at the wide-angle end (FIG. 2), the standard position (FIG. 3), and the telephoto end (FIG. 4) of the zoom lens shown in Table 1. In each figure, (a) shows a spherical aberration, where a solid line represents values with respect to the d-line and a broken line represents sine condition; (b) shows astigmatism, where a solid line represents a curvature of a sagittal image plane, and a broken line represents a curvature of a meridional image plane; (c) shows a distortion aberration; (d) shows a longitudinal chromatic aberration, where a solid line represents values with respect to the d-line, a short broken line represents values with respect to an F-line, and a long broken line represents values with respect to a C-line; and (e) shows a chromatic aberration of magnification, where a short broken line represents values with respect to the F-line, and a long broken line represents values with respect to the C-line. This also applies to FIGS. 6 to 8, FIGS. 10 to 12, FIGS. 14 to 16, FIGS. 18 to 20, FIGS. 21 to 23, FIGS. 25 to 27, FIGS. 30 to 32, FIGS. 35 to 37, FIGS. 40 to 42, FIGS. 47 to 49, FIGS. 53 to 55, FIGS. 58 to 60, FIGS. 62 to 64, FIGS. 67 to 69, FIGS. 71 to 73, FIGS. 75 to 77, FIGS. 79 to 81, FIGS. 84 to 86, FIGS. 87 to 89, and FIGS. 91 to 93.

As is understood from FIGS. 2 to 4, the zoom lens in the present example exhibits satisfactory aberration performance.

The following expressions (1) and (2) relate to the shifting amount of the correcting lens (the third lens group 13).

$$Yt > Y \quad (1)$$

$$(Y/Yt)/(f/ft) < 1.5 \quad (2)$$

In the expressions (1) and (2), Y represents the shifting amount of the correcting lens (the third lens group 13) at the focal length f of the entire system when correcting camera shake; Yt represents the shifting amount of the correcting lens (the third lens group 13) at the telephoto end; and ft represents a focal length at the telephoto end.

For a zoom lens, a correcting lens moves further as the zoom ratio is great when the correction angle is constant in the whole zooming region. On the other hand, the correcting lens moves less when the zooming ratio is small. That is, when the shift of the lens exceeds the upper limit defined in the expressions (1) and (2), overcorrection occurs and the optical performance will deteriorate greatly. In conclusion, by satisfying the expressions (1) and (2), a zoom lens having a function to correct camera shake, where the aberration performance deteriorate less even during camera shake, can be obtained. This applies also to the following embodiments.

The aspherical shape of the third lens group 13 is defined by the following equation (A), which applies also to the following embodiments 2-5.

$$SAG = \frac{H^2/R}{1 + \sqrt{1 - (1 + K)(H/R)^2}} + D \cdot H^4 + E \cdot H^6 + F \cdot H^8 + G \cdot H^{10} \quad (A)$$

Figure 5:
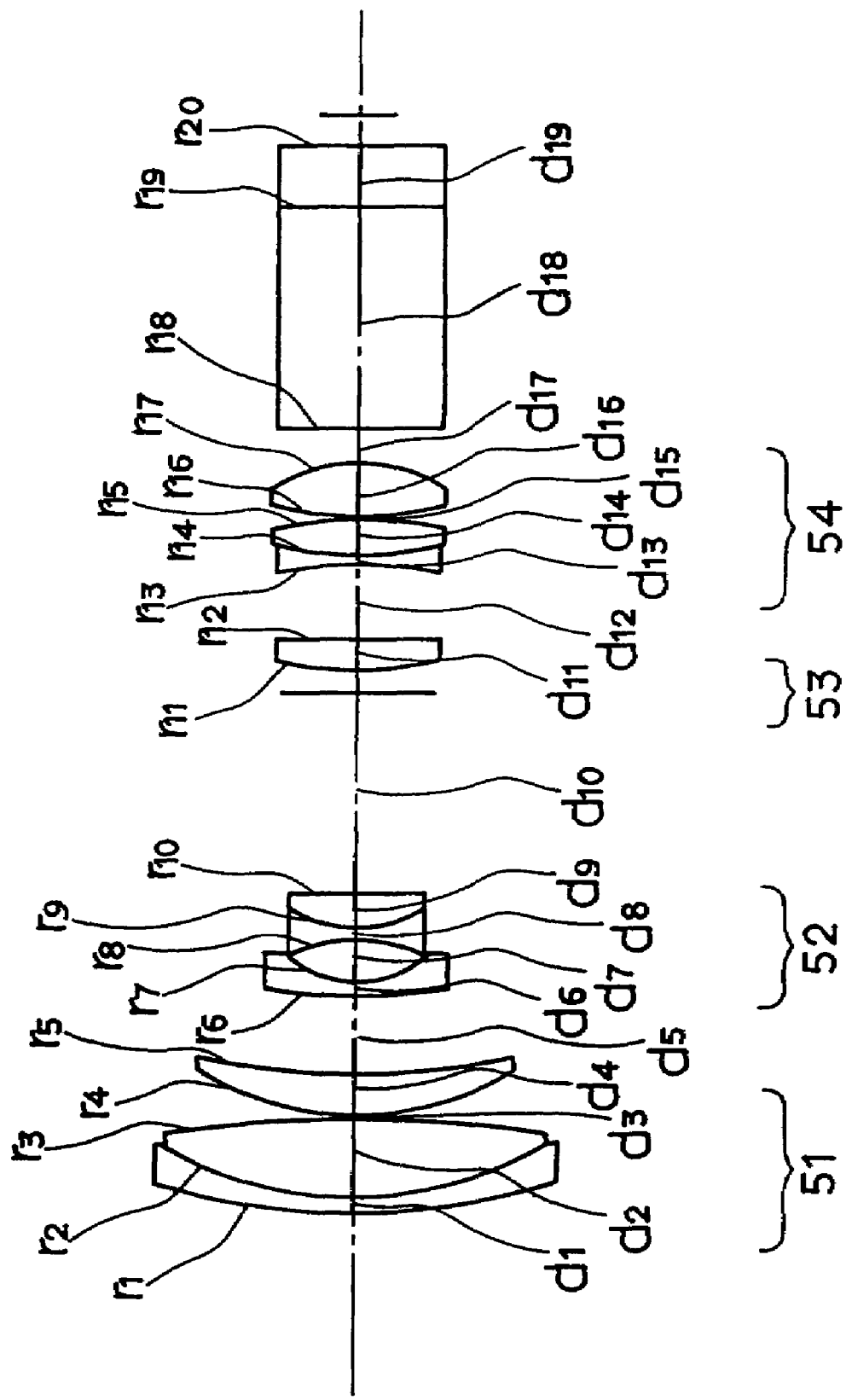
FIG. 5 is a view showing the arrangement of a zoom lens in a second embodiment according to the present invention.

SAG: a distance from the apex on the aspherical surface to a point on the same aspherical surface having a height H from the optical axis
H: a height from an optical axis
R is a radius of curvature at the apex on the aspherical surface
K: a conical constant
D, E, F, G: aspherical coefficients Second Embodiment FIG. 5 is a view showing the arrangement of a zoom lens in a second embodiment according to the present invention. As shown in FIG. 5, a zoom lens has a structure in which a first lens group 51, a second lens group 52, a third lens group 53, and a fourth lens group 54 are disposed from an object side (left side in FIG. 5) to an image plane side (right side in FIG. 5) in this order. Basic structure and operations are the same as the first embodiment. Specific examples of zoom lenses according to this embodiment are shown in the following Table 4.

TABLE 4

| Group | Surface | r | d | n | ν |
|---|---|---|---|---|---|
| 1 | 1 | 41.544 | 0.90 | 1.80518 | 25.4 |
| | 2 | 21.097 | 5.00 | 1.58913 | 61.2 |
| | 3 | −95.428 | 0.20 | | |
| | 4 | 17.473 | 2.70 | 1.60311 | 60.7 |
| | 5 | 42.181 | Variable | | |
| 2 | 6 | 41.372 | 0.65 | 1.77250 | 49.6 |
| | 7 | 5.857 | 2.89 | | |

TABLE 4-continued

| Group | Surface | r | d | n | v |
|---|---|---|---|---|---|
| | 8 | −7.776 | 0.85 | 1.66547 | 55.2 |
| | 9 | 8.195 | 2.05 | 1.84666 | 23.9 |
| | 10 | 340.000 | Variable | | |
| 3 | 11 | 17.024 | 2.00 | 1.68619 | 34.2 |
| | 12 | −400.000 | Variable | | |
| 4 | 13 | −27.898 | 0.65 | 1.84666 | 23.9 |
| | 14 | 18.114 | 2.35 | 1.51450 | 63.1 |
| | 15 | −18.114 | 0.10 | | |
| | 16 | 18.601 | 3.40 | 1.51450 | 63.1 |
| | 17 | −9.892 | Variable | | |
| 5 | 18 | ∞ | 14.00 | 1.58913 | 61.0 |
| 6 | 19 | ∞ | 3.90 | 1.51633 | 64.1 |
| | 20 | ∞ | — | | |

Table 5 shows aspherical coefficients in the examples of Table 4.

TABLE 5

| Surface | 8 | 11 | 12 | 15 |
|---|---|---|---|---|
| K | $-1.10251 \times 10^{-1}$ | $8.93500 \times 10^{-2}$ | $0.00000$ | $-3.79663 \times 10^{-1}$ |
| D | $-7.40852 \times 10^{-5}$ | $8.17245 \times 10^{-5}$ | $1.30862 \times 10^{-5}$ | $2.87398 \times 10^{-4}$ |
| E | $2.84234 \times 10^{-5}$ | $-4.29821 \times 10^{-6}$ | $-4.69807 \times 10^{-6}$ | $2.61848 \times 10^{-6}$ |
| F | $-4.64719 \times 10^{-6}$ | $3.44381 \times 10^{-7}$ | $2.94604 \times 10^{-7}$ | $1.24341 \times 10^{-7}$ |
| G | $2.04967 \times 10^{-7}$ | $-1.18101 \times 10^{-8}$ | $-9.69640 \times 10^{-9}$ | $-1.73992 \times 10^{-9}$ |

The following Table 6 shows an air distance (mm) that is varied by zooming in the case where an object is positioned 2 m away from the tip end of the lens.

TABLE 6

| | Wide-angle end | Standard position | Telephoto end |
|---|---|---|---|
| f | 4.165 | 24.690 | 49.101 |
| F/NO | 1.674 | 2.070 | 2.373 |
| 2ω | 59.818 | 10.314 | 5.244 |
| d5 | 0.700 | 13.501 | 16.690 |
| d10 | 18.493 | 5.692 | 2.503 |
| d14 | 5.806 | 1.925 | 4.680 |
| d19 | 1.009 | 4.890 | 2.135 |

Figure 6:
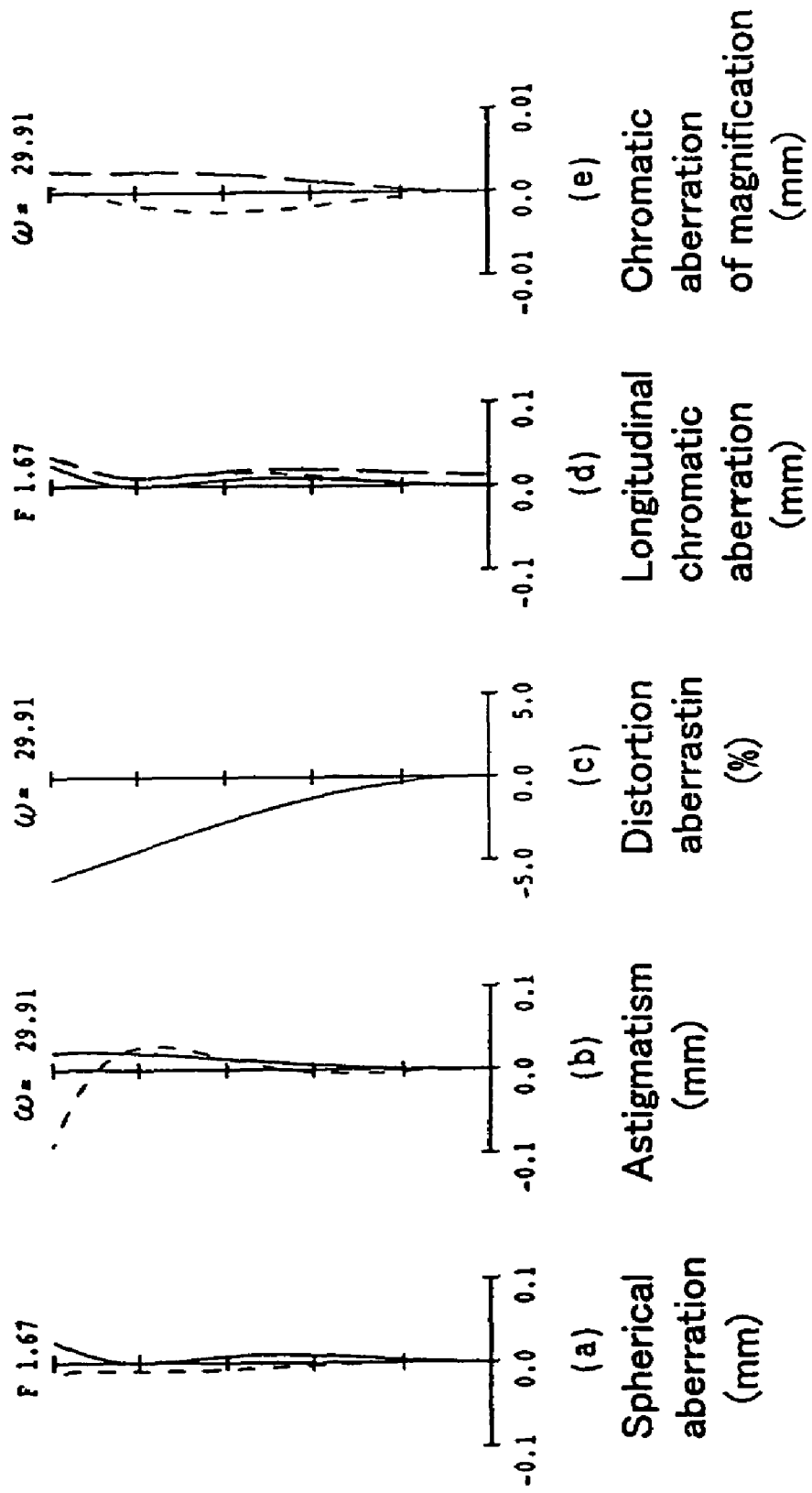
FIG. 6 illustrates various aberrations at a wide-angle end in the second embodiment according to the present invention.
Figure 7:
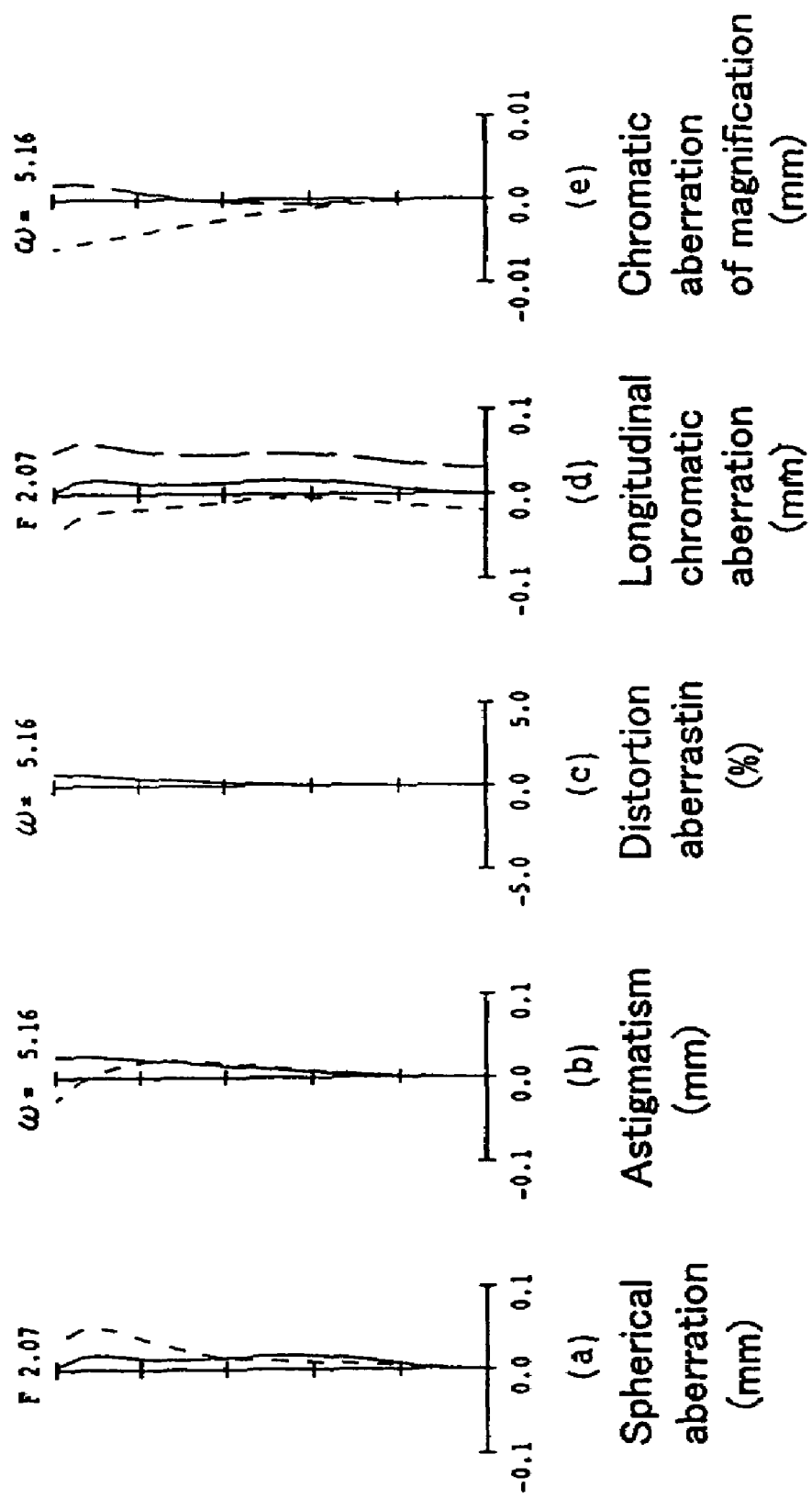
FIG. 7 illustrates various aberrations at a standard position in the second embodiment according to the present invention.
Figure 8:
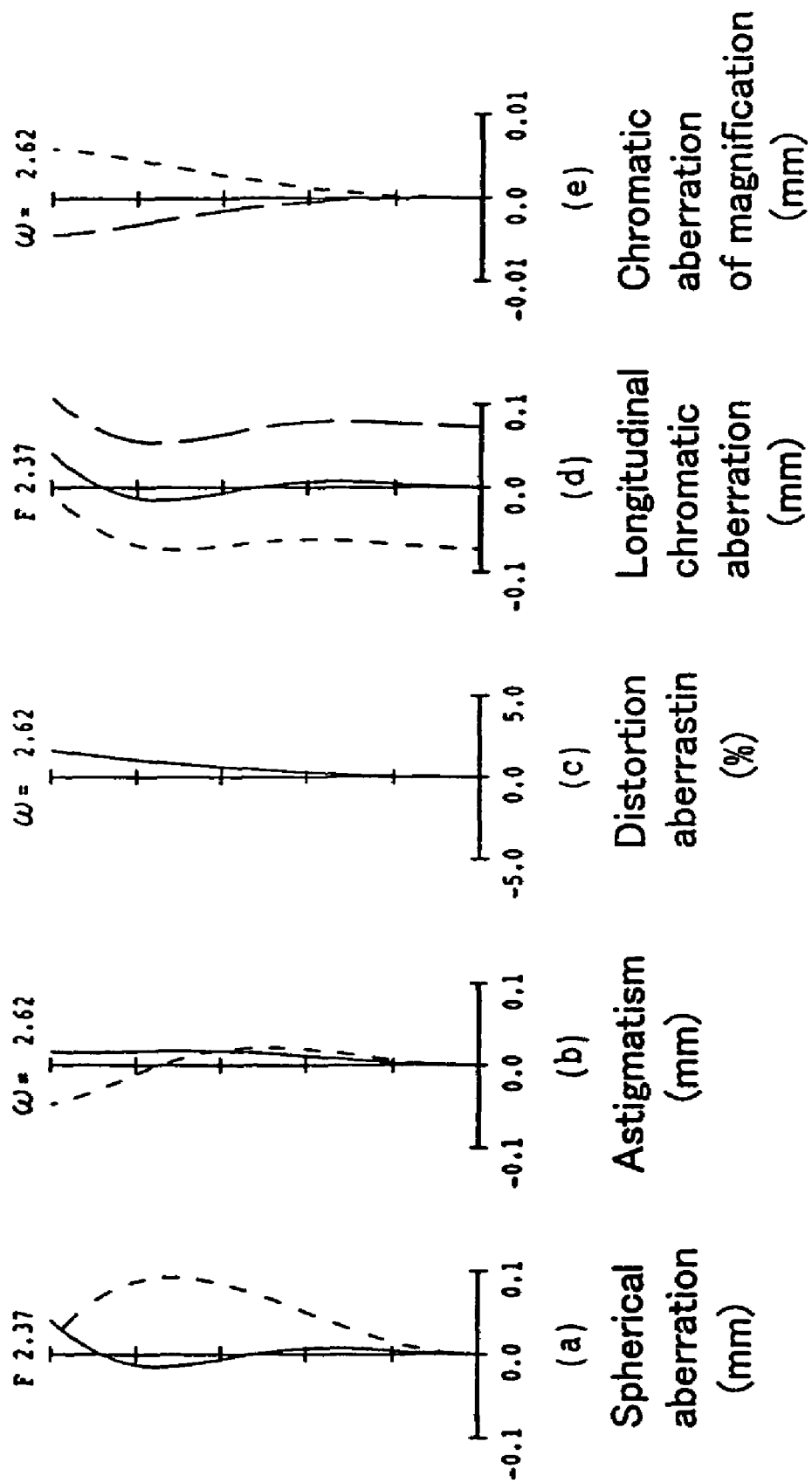
FIG. 8 illustrates various aberrations at a telephoto end in the second embodiment according to the present invention.

FIGS. 6 to 8 show various aberrations at the wide-angle end (FIG. 6), the standard position (FIG. 7), and the telephoto end (FIG. 8) of the zoom lens shown in Table 4. As is understood from FIGS. 6 to 8, the zoom lens in the present example exhibits satisfactory aberration performance.

By satisfying the expressions (1) and (2), a zoom lens having a function to correct camera shake can be obtained, and the aberration performance deteriorate less during camera shake.

Third Embodiment

Figure 9:
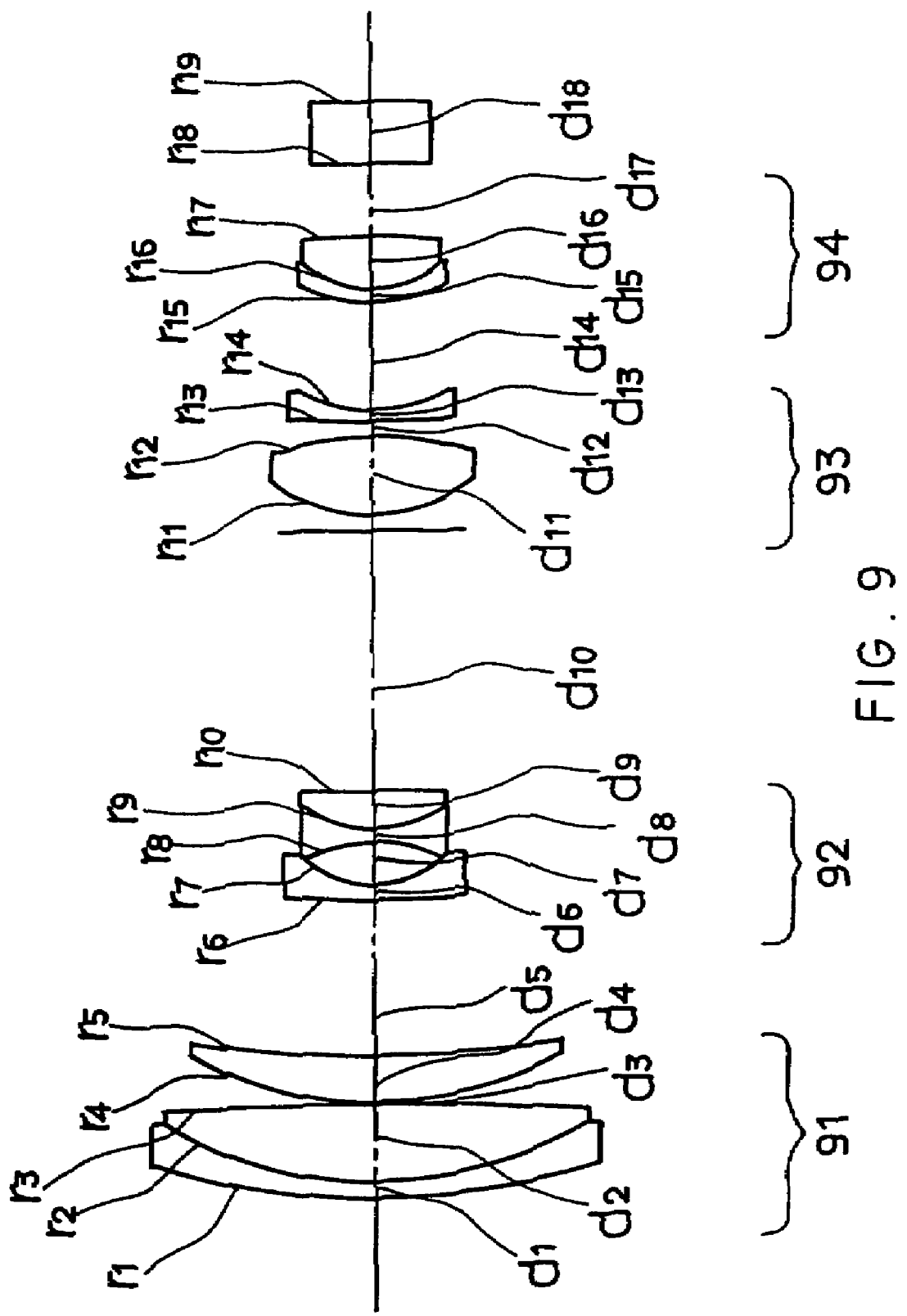
FIG. 9 is a view showing the arrangement of a zoom lens in a third embodiment according to the present invention.

FIG. 9 is a view showing the arrangement of a zoom lens in a third embodiment according to the present invention. As shown in FIG. 9, a zoom lens has a structure in which a first lens group 91, a second lens group 92, a third lens group 93, and a fourth lens group 94 are disposed from an object side (left side in FIG. 9) to an image plane side (right side in FIG. 9) in this order. The first lens group 91 has a positive refracting power and is fixed with respect to the image plane in varying power and focusing.

The second lens group 92 has a negative refracting power and varies power by moving along the optical axis. The third lens group 93 is composed of two lenses: one lens having a positive refracting power and one lens having a negative refracting power, and it is fixed with respect to the image plane in varying power and focusing. When camera shake occurs, shake of an image is corrected by moving the whole third lens group 93 in a direction vertical to the optical axis.

As mentioned above, by increasing the number of movable lenses, high optical performance can be maintained when the lenses are moved. Since a whole lens group of a united optical performance is decentered, deterioration in aberration can be decreased when compared to a type of zoom lens where a part of lenses in a group is moved.

The fourth lens group 94 has a positive refracting power, and it moves along an optical axis so as to keep the image plane varied by a shift of the second lens group 92 and an object at a predetermined position from a reference surface, thereby moving an image and adjusting the focus thereof at the same time in accordance with variable power.

Since the aberration can be corrected during camera shake with greater efficiency by applying at least one aspherical surface to the lenses of the third group 93, performance during the move of the lenses can be improved.

Specific examples of zoom lenses according to this embodiment are shown in the following Table 7.

TABLE 7

| Group | Surf | r | d | n | v |
|---|---|---|---|---|---|
| 1 | 1 | 48.617 | 0.90 | 1.80518 | 25.4 |
| | 2 | 24.708 | 4.90 | 1.60311 | 60.7 |
| | 3 | −355.522 | 0.15 | | |
| | 4 | 24.085 | 2.90 | 1.60311 | 60.7 |
| | 5 | 74.515 | Variable | | |
| 2 | 6 | 73.357 | 0.70 | 1.78500 | 43.7 |
| | 7 | 5.318 | 3.22 | | |
| | 8 | −10.237 | 0.80 | 1.60602 | 57.5 |
| | 9 | 7.306 | 2.40 | 1.80518 | 25.4 |
| | 10 | −350.000 | Variable | | |
| 3 | 11 | 7.997 | 4.45 | 1.60602 | 57.5 |
| | 12 | −17.026 | 0.60 | | |
| | 13 | 57.521 | 0.70 | 1.80518 | 25.4 |
| | 14 | 8.270 | Variable | | |
| 4 | 15 | 11.387 | 0.70 | 1.68613 | 34.2 |
| | 16 | 6.389 | 2.60 | 1.60602 | 57.5 |
| | 17 | −41.310 | Variable | | |
| 5 | 18 | ∞ | 3.25 | 1.51633 | 64.0 |
| | 19 | ∞ | — | | |

Table 8 shows aspherical coefficients in the examples of Table 7.

TABLE 8

| Surface | 8 | 11 | 12 | 17 |
|---|---|---|---|---|
| K | −8.18660 | −3.87371 × 10$^{-1}$ | 7.80366 × 10$^{-1}$ | −7.55214 × 10$^{+1}$ |
| D | −9.06079 × 10$^{-4}$ | −1.20009 × 10$^{-4}$ | 2.87007 × 10$^{-4}$ | −9.87827 × 10$^{-5}$ |
| E | 2.88719 × 10$^{-5}$ | 3.93781 × 10$^{-7}$ | −5.40973 × 10$^{-7}$ | 3.54330 × 10$^{-6}$ |
| F | −7.10067 × 10$^{-7}$ | 0.00000 | 0.00000 | 0.00000 |

The following Table 9 shows an air distance (mm) that is varied by zooming in the case where an object is positioned 2 m away from the tip end of the lens.

TABLE 9

|  | Wide-angle end | Standard position | Telephoto-end |
|---|---|---|---|
| f | 3.827 | 38.626 | 91.142 |
| F/NO | 1.677 | 2.509 | 3.407 |
| 2ω | 64.762 | 6.542 | 2.912 |
| d5 | 0.5000 | 21.9344 | 26.2500 |
| d10 | 27.8000 | 6.3655 | 2.0500 |
| d14 | 10.1301 | 2.6424 | 9.3301 |
| d17 | 5.0072 | 12.4949 | 5.8072 |

Figure 10:
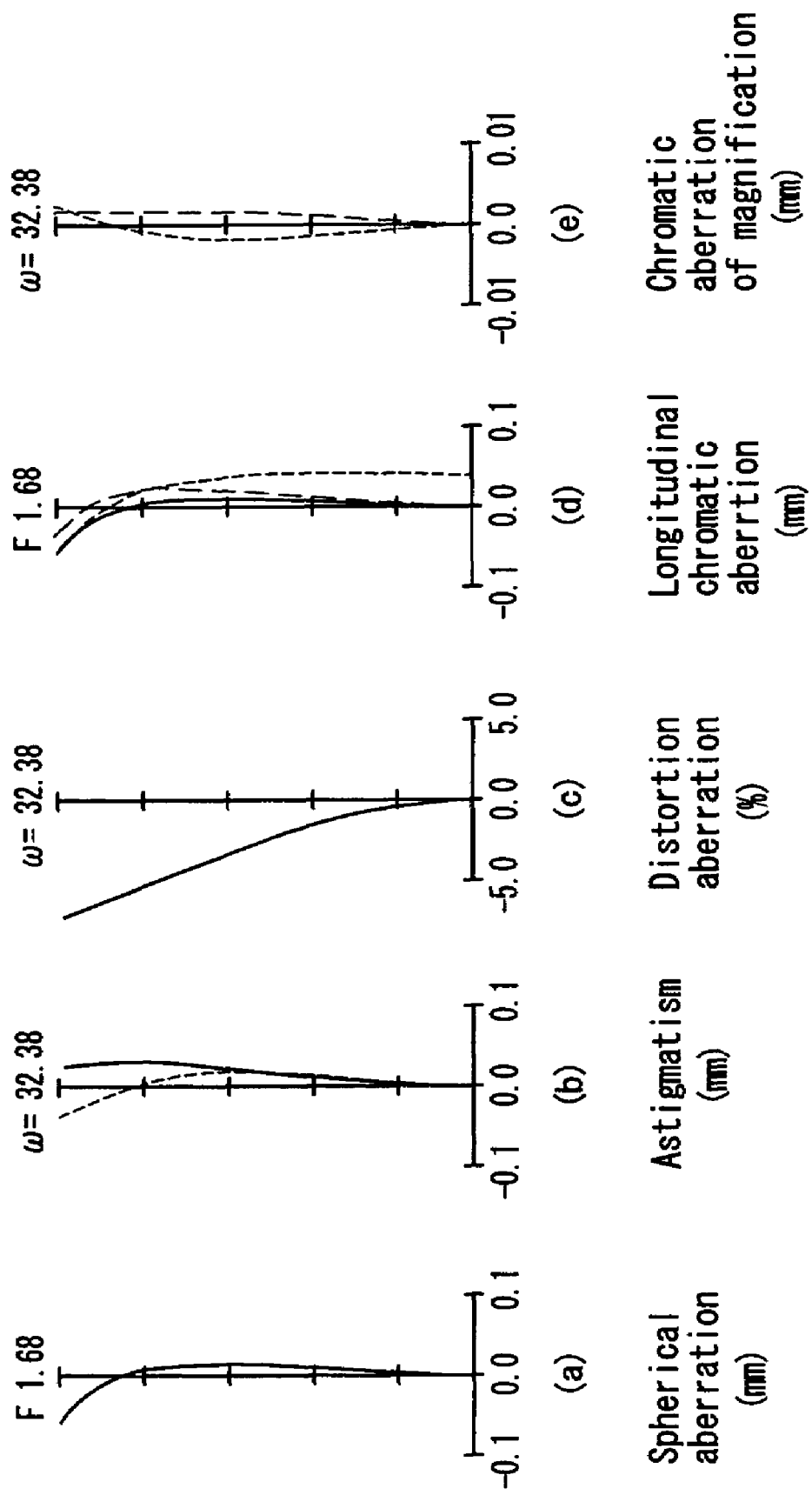
FIG. 10 illustrates various aberrations at a wide-angle end in the third embodiment according to the present invention.
Figure 11:
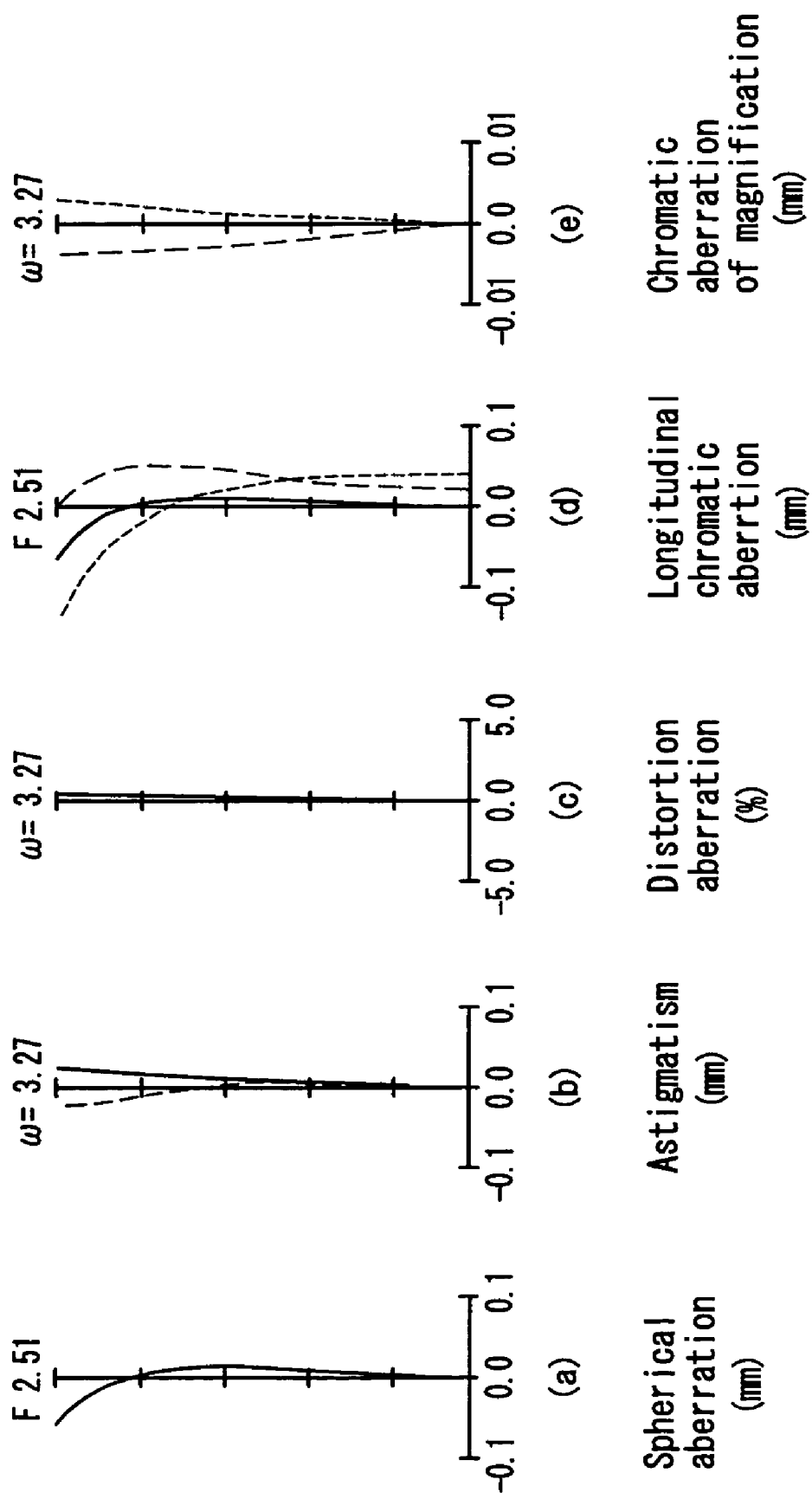
FIG. 11 illustrates various aberrations at a standard position in the third embodiment according to the present invention.
Figure 12:
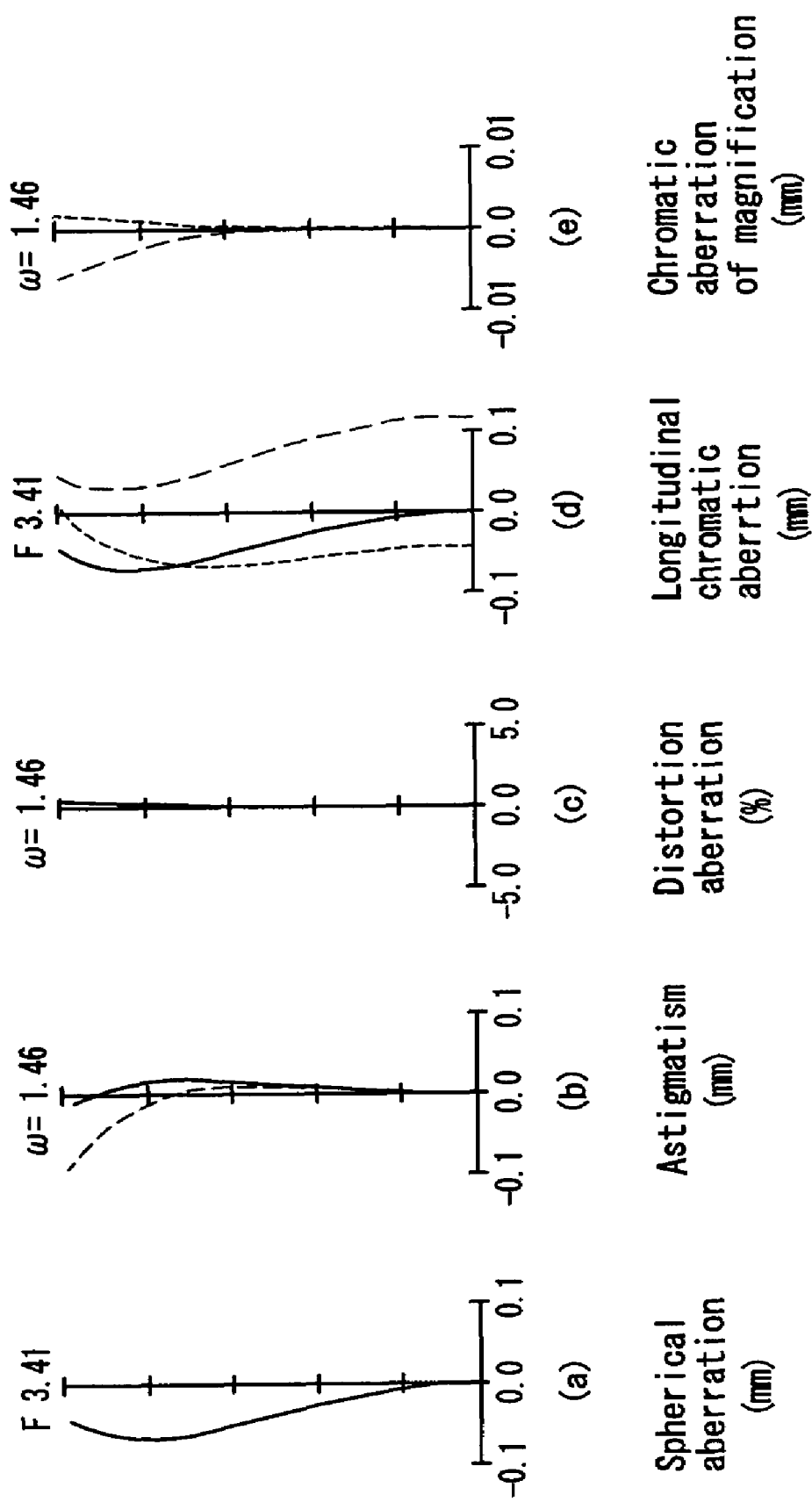
FIG. 12 illustrates various aberrations at a telephoto end in the third embodiment according to the present invention.

FIGS. 10 to 12 show various aberrations at the wide-angle end (FIG. 10), the standard position (FIG. 11), and the telephoto end (FIG. 12) of the zoom lens shown in Table 7. As is understood from FIGS. 10 to 12, the zoom lens in the present example exhibits satisfactory aberration performance.

By satisfying the expressions (1) and (2), a zoom lens having a function to correct camera shake can be obtained, and the aberration performance deteriorates less during camera shake.

Fourth Embodiment

Figure 13:
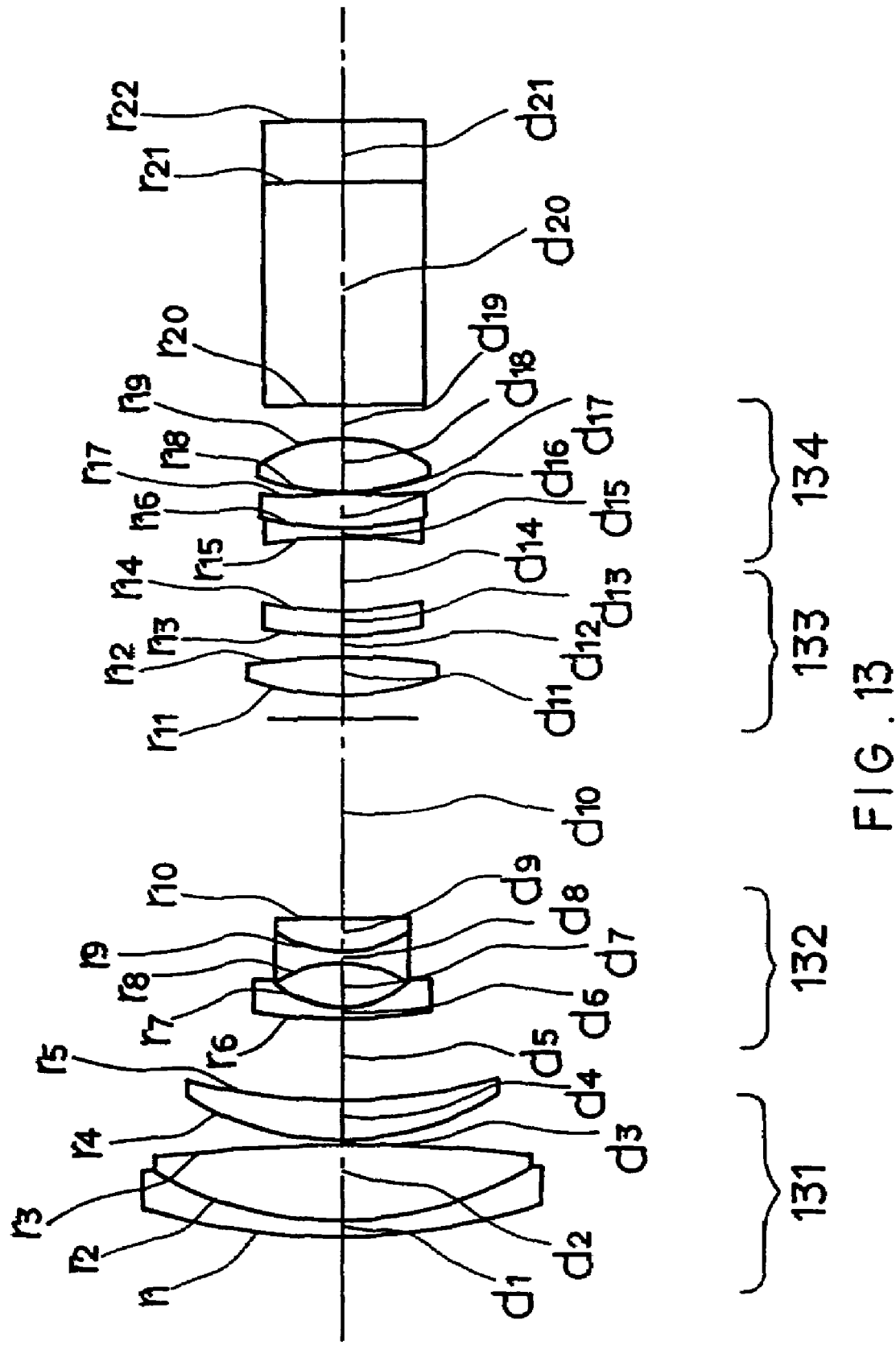
FIG. 13 is a view showing the arrangement of a zoom lens in a fourth embodiment according to the present invention.

FIG. 13 is a view showing the arrangement of a zoom lens in a fourth embodiment according to the present invention. As shown in FIG. 13, a zoom lens has a structure in which a first lens group 131, a second lens group 132, a third lens group 133, and a fourth lens group 134 are disposed from an object side (left side in FIG. 13) to an image plane side (right side in FIG. 13) in this order.

The first lens group 131 has a positive refracting power and is fixed with respect to the image plane even in varying power and focusing. The second lens group 132 has a negative refracting power and varies power by moving along the optical axis. The third lens group 133 is composed of two lenses: one lens having a positive refracting power and one lens having a negative refracting power, and it is fixed with respect to the image plane in varying power and focusing.

When camera shake occurs, shake of the image is corrected by moving the whole third lens group 133 in a direction vertical to the optical axis. As mentioned above, by increasing the number of movable lenses, high optical performance can be maintained when the lenses are moved.

Since the third lens group 133 in this embodiment is composed of two lenses: one lens having a positive refracting power and one lens having a negative refracting power, aberration can be corrected more efficiently when correcting camera shake, and deterioration in the image quality can be decreased when correcting camera shake.

The fourth lens group 134 has a positive refracting power, moves along an optical axis so as to keep the image plane varied by a shift of the second lens group 132 and an object at a predetermined position from a reference surface, thereby moving an image and adjusting the focus thereof at the same time in accordance with variable power. Since the aberration can be corrected when correcting camera shake further efficiently by applying at least one aspherical surface to the lenses of the third group 133, performance can be improved when the lenses are moved.

Specific examples of zoom lenses according to this embodiment are shown in the following Table 10.

TABLE 10

| Group | Surface | r | d | n | ν |
|---|---|---|---|---|---|
| 1 | 1 | 41.544 | 0.90 | 1.80518 | 25.4 |
|  | 2 | 21.097 | 5.00 | 1.58913 | 61.2 |
|  | 3 | −95.428 | 0.20 |  |  |
|  | 4 | 17.473 | 2.70 | 1.60311 | 60.7 |
|  | 5 | 42.181 | Variable |  |  |
| 2 | 6 | 41.372 | 0.65 | 1.77250 | 49.6 |
|  | 7 | 5.857 | 2.89 |  |  |
|  | 8 | −7.776 | 0.85 | 1.66547 | 55.2 |
|  | 9 | 8.195 | 2.05 | 1.84666 | 23.9 |
|  | 10 | 340.000 | Variable |  |  |
| 3 | 11 | 14.743 | 2.45 | 1.51450 | 63.1 |
|  | 12 | −45.960 | 1.50 |  |  |
|  | 13 | 33.378 | 1.50 | 1.66547 | 55.2 |
|  | 14 | 19.936 | Variable |  |  |
| 4 | 15 | −41.230 | 0.65 | 1.84666 | 23.9 |
|  | 16 | 22.061 | 2.20 | 1.51450 | 63.1 |
|  | 17 | −38.993 | 0.10 |  |  |
|  | 18 | 14.246 | 3.40 | 1.51450 | 63.1 |
|  | 19 | −9.338 | Variable |  |  |
| 5 | 20 | ∞ | 14.00 | 1.58913 | 61.0 |
| 6 | 22 | ∞ | 3.90 | 1.51633 | 64.1 |
|  | 23 | ∞ | — |  |  |

Table 11 shows aspherical coefficients in the Examples of Table 10.

TABLE 11

| Surface | 8 | 11 | 12 | 17 |
|---|---|---|---|---|
| K | −1.10251 × 10$^{-1}$ | 0.00000 | 0.00000 | −3.79663 × 10$^{-1}$ |
| D | −7.40852 × 10$^{-5}$ | −1.56773 × 10$^{-5}$ | 9.91198 × 10$^{-5}$ | 4.04267 × 10$^{-4}$ |
| E | 2.84234 × 10$^{-5}$ | 2.64330 × 10$^{-6}$ | 4.19737 × 10$^{-6}$ | 3.44573 × 10$^{-6}$ |
| F | −4.64719 × 10$^{-6}$ | −2.20686 × 10$^{-7}$ | 2.48747 × 10$^{-8}$ | 1.86356 × 10$^{-7}$ |
| G | 2.04967 × 10$^{-7}$ | 5.27090 × 10$^{-10}$ | 1.70900 × 10$^{-9}$ | −2.73441 × 10$^{-9}$ |

The following Table 12 shows an air distance (mm) that is varied by zooming in the case where an object is positioned 2 m away from the tip end of the lens.

TABLE 12

|  | Wide-angle end | Standard position | Telephoto end |
|---|---|---|---|
| f | 4.129 | 24.191 | 49.099 |
| F/NO | 1.681 | 2.070 | 2.334 |
| 2ω | 60.356 | 10.536 | 5.287 |
| d5 | 0.700 | 13.501 | 16.690 |
| d10 | 16.993 | 4.192 | 1.003 |
| d14 | 5.806 | 1.925 | 4.680 |
| d19 | 1.009 | 4.890 | 2.135 |

Figure 14:
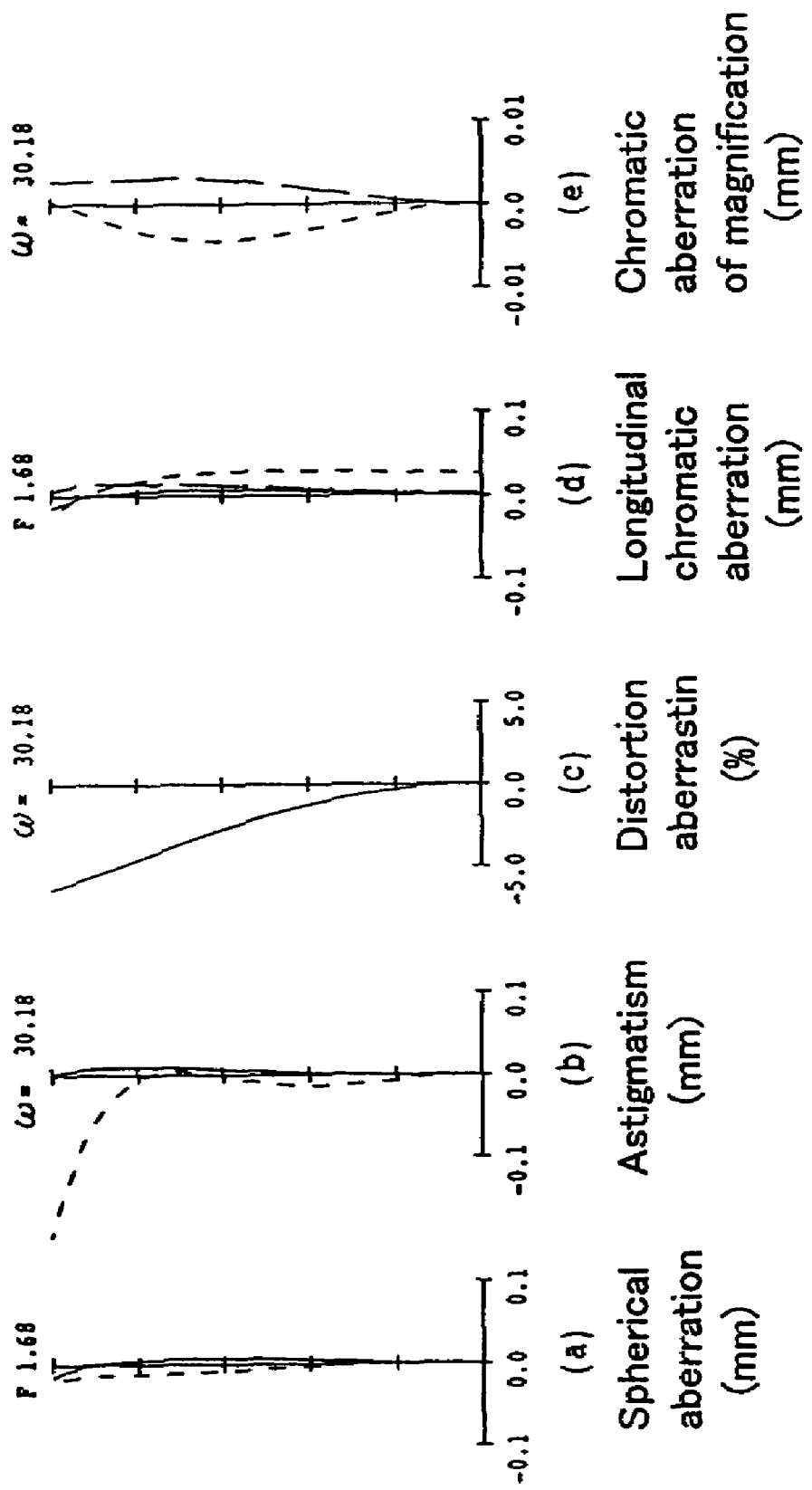
FIG. 14 illustrates various aberrations at a wide-angle end in the fourth embodiment according to the present invention.
Figure 15:
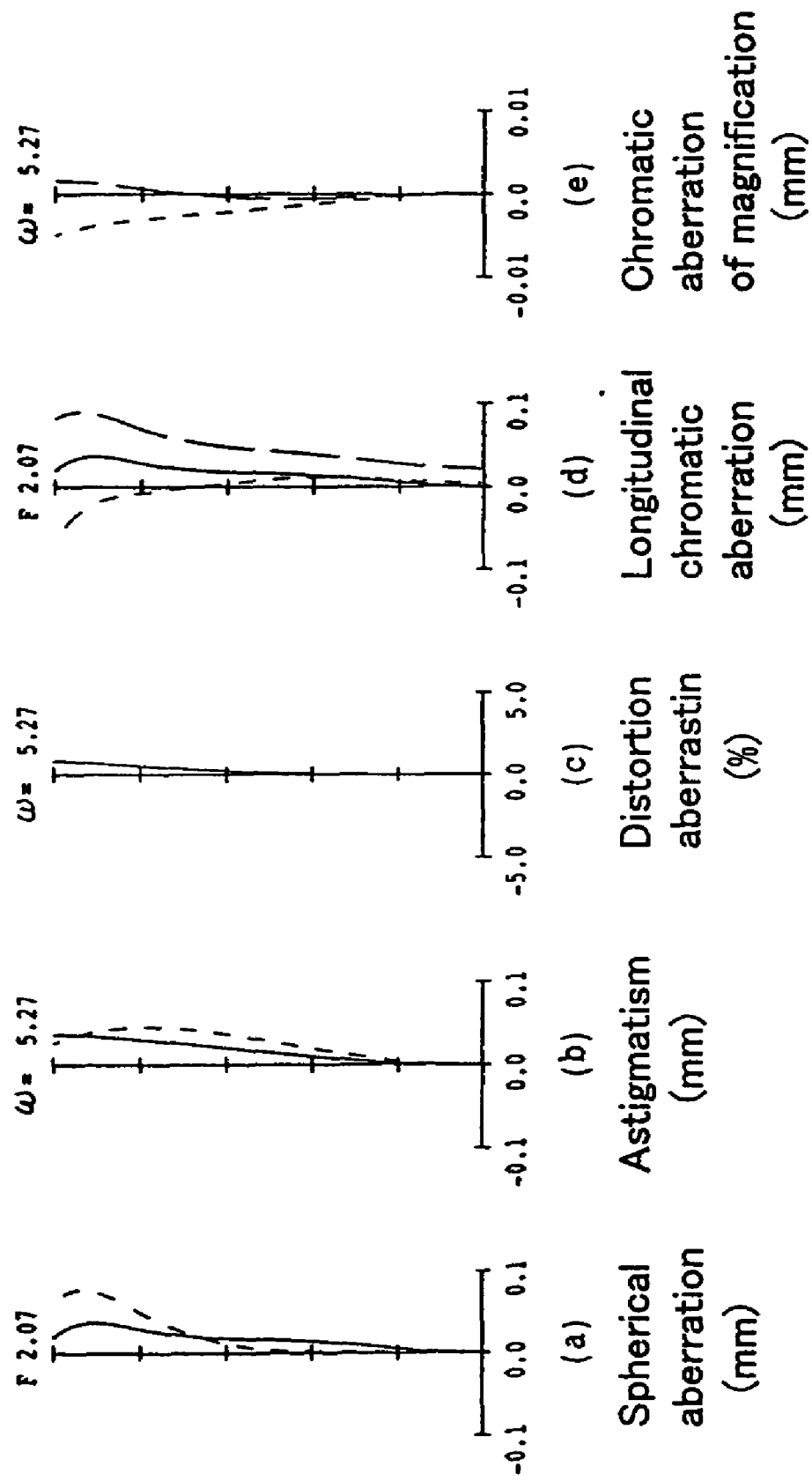
FIG. 15 illustrates various aberrations at a standard position in the fourth embodiment according to the present invention.
Figure 16:
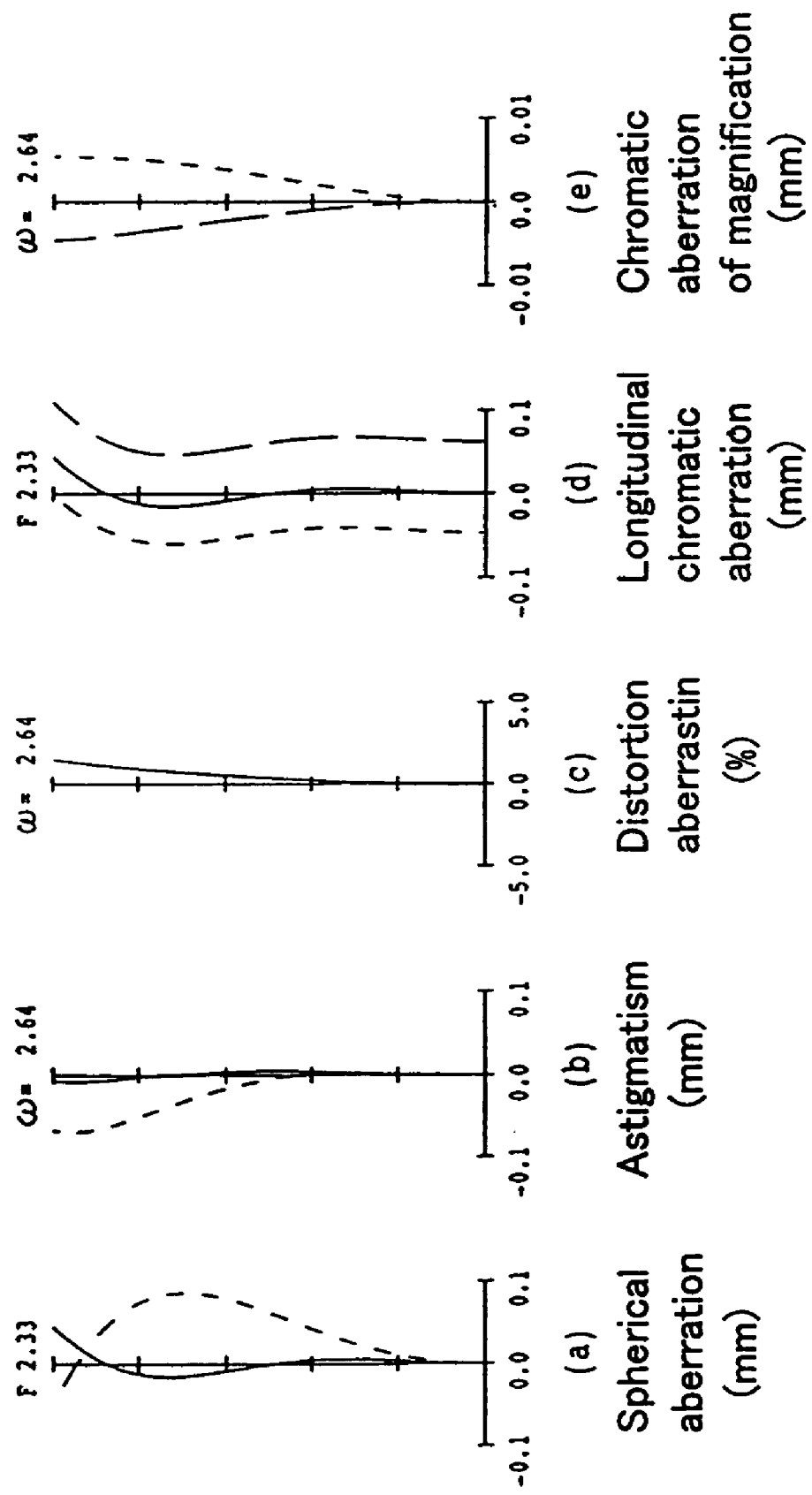
FIG. 16 illustrates various aberrations at a telephoto end in the fourth embodiment according to the present invention.

FIGS. 14 to 16 show various aberrations at the wide-angle end (FIG. 14), the standard position (FIG. 15), and the telephoto end (FIG. 16) of the zoom lens shown in Table 10. As is shown in FIGS. 14 to 16, the zoom lens in the present embodiment exhibits satisfactory aberration performance.

By satisfying the expressions (1) and (2), a zoom lens having a function to correct camera shake can be obtained, in which the aberration performance deteriorates less during camera shake.

Fifth Embodiment

Figure 17:
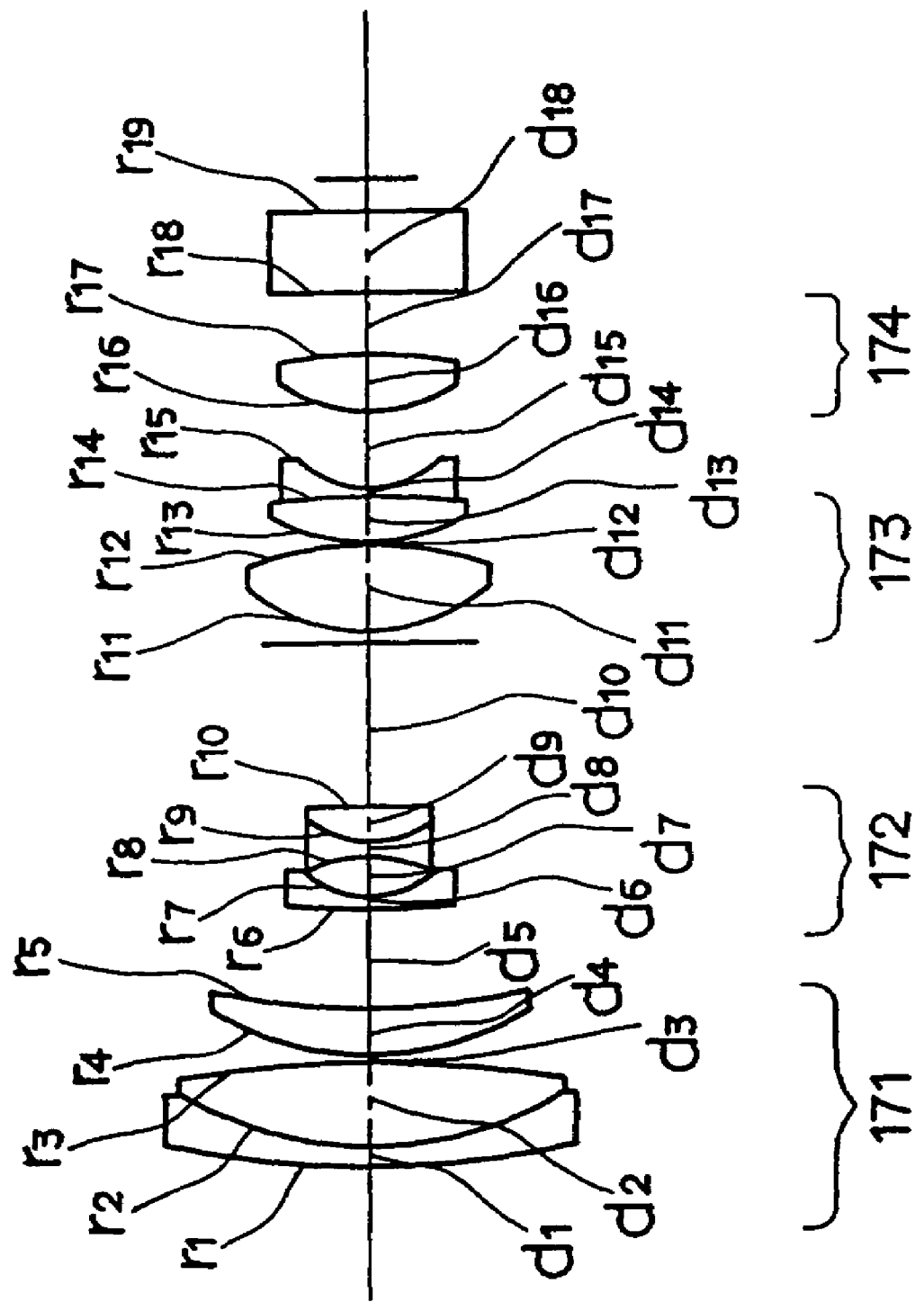
FIG. 17 is a view showing the arrangement of a zoom lens in a fifth embodiment according to the present invention.

FIG. 17 is a view showing the arrangement of a zoom lens in a fifth embodiment according to the present invention. As shown in FIG. 17, a zoom lens has a structure in which a first lens group 171, a second lens group 172, a third lens group 173, and a fourth lens group 174 are disposed from an object side (left side in FIG. 17) to an image plane side (right side in FIG. 17) in this order.

The first lens group 171 has a positive refracting power and is fixed with respect to the image plane even in varying power and focusing. The second lens group 172 has a negative refracting power and varies power by moving along the optical axis.

The third lens group 173 is composed of three lenses including at least one lens having a positive refracting power and at least one lens having a negative refracting power, and the group is fixed with respect to the image plane in varying power and focusing.

When camera shake occurs, shake of the image is corrected by moving the whole third lens group 173 in a direction vertical to the optical axis. For a small zoom lens, the third lens group 173 is required to have a strong positive refracting power to shorten the whole length, and this will cause aberration.

However, since the zoom lens in this embodiment has a third lens group 173 composed of three lenses, aberration occurring in the third lens group 173 is suppressed and high optical performance is maintained when the lenses are moved.

The fourth lens group 174 has a positive refracting power, and moves along an optical axis so as to keep the image plane varied by a shift of the second lens group 172 and an object at a predetermined position from a reference surface, thereby moving an image and adjusting the focus thereof at the same time in accordance with variable power.

Since the aberration can be corrected during camera shake with more efficiency by applying at least one aspherical surface to the lenses of the third group 173, performance can be improved when the lenses are moved.

Specific examples of zoom lenses according to this embodiment are shown in the following Table 13.

TABLE 13

| Group | Surface | r | d | n | ν |
|---|---|---|---|---|---|
| 1 | 1 | 48.280 | 0.90 | 1.80518 | 25.4 |
|  | 2 | 17.748 | 4.53 | 1.60311 | 60.7 |
|  | 3 | −67.680 | 0.20 |  |  |
|  | 4 | 14.615 | 2.67 | 1.69680 | 55.6 |
|  | 5 | 42.483 | Variable |  |  |
| 2 | 6 | 42.483 | 0.60 | 1.77250 | 49.6 |
|  | 7 | 4.842 | 2.15 |  |  |
|  | 8 | −6.478 | 0.80 | 1.66547 | 55.2 |
|  | 9 | 5.874 | 1.80 | 1.80518 | 25.5 |
|  | 10 | −323.142 | Variable |  |  |
| 3 | 11 | 7.889 | 4.55 | 1.66547 | 55.2 |
|  | 12 | −14.939 | 0.10 |  |  |
|  | 13 | 9.748 | 2.40 | 1.51633 | 64.1 |
|  | 14 | −104.180 | 0.60 | 1.84666 | 23.9 |
|  | 15 | 5.767 | Variable |  |  |
| 4 | 16 | 7.481 | 2.87 | 1.51450 | 63.1 |
|  | 17 | −31.976 | Variable |  |  |
| 5 | 18 | ∞ | 4.30 | 1.51633 | 64.1 |
|  | 19 | ∞ | — |  |  |

Table 14 shows aspherical coefficients in the Examples of Table 13.

TABLE 14

| Surface | 8 | 11 | 12 | 16 |
|---|---|---|---|---|
| K | −1.30349 | −7.99910 | −6.269020 | −1.99544 × $10^{-2}$ |
| D | −6.01825 × $10^{-4}$ | −1.39502 × $10^{-4}$ | −4.75872 × $10^{-6}$ | −2.07422 × $10^{-5}$ |
| E | −2.10812 × $10^{-5}$ | 2.02487 × $10^{-7}$ | 1.65237 × $10^{-7}$ | −6.99987 × $10^{-6}$ |
| F | 0.00000 | 0.00000 | 0.00000 | 0.00000 |
| G | 0.00000 | 0.00000 | 0.00000 | 0.00000 |

The following Table 15 shows an air distance (mm) that is varied by zooming in the case where an object is positioned 2 m away from the tip end of the lens.

TABLE 15

|  | Wide-angle end | Standard position | Telephoto end |
|---|---|---|---|
| f | 4.827 | 21.634 | 46.275 |
| F/NO | 1.461 | 2.197 | 2.851 |
| 2ω | 59.897 | 12.728 | 6.609 |
| d5 | 0.700 | 9.569 | 12.450 |
| d10 | 13.383 | 4.514 | 1.633 |
| d14 | 6.113 | 1.859 | 6.193 |
| d19 | 1.000 | 5.254 | 0.920 |

Figure 18:
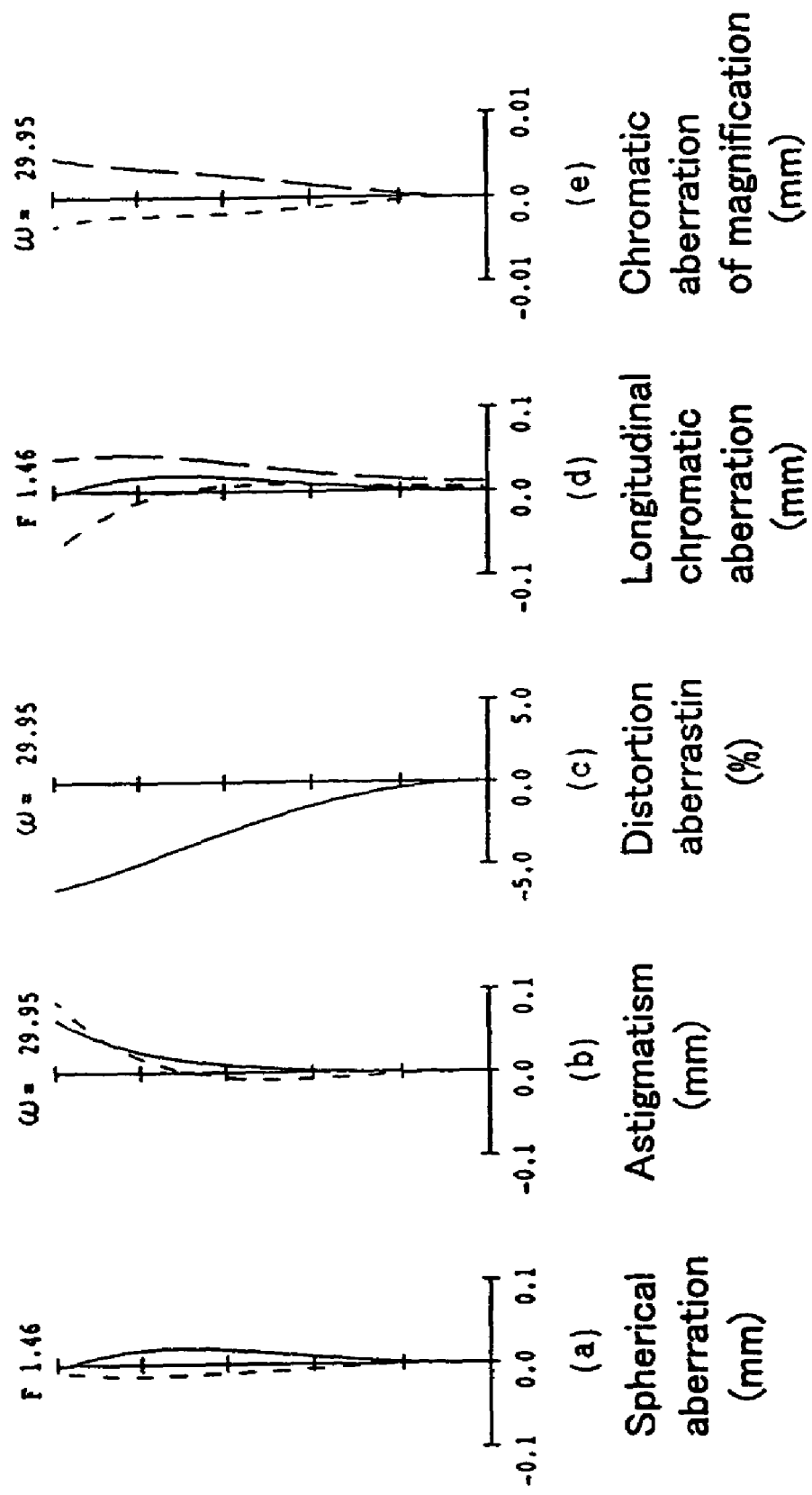
FIG. 18 illustrates various aberrations at a wide-angle end in the fifth embodiment according to the present invention.
Figure 19:
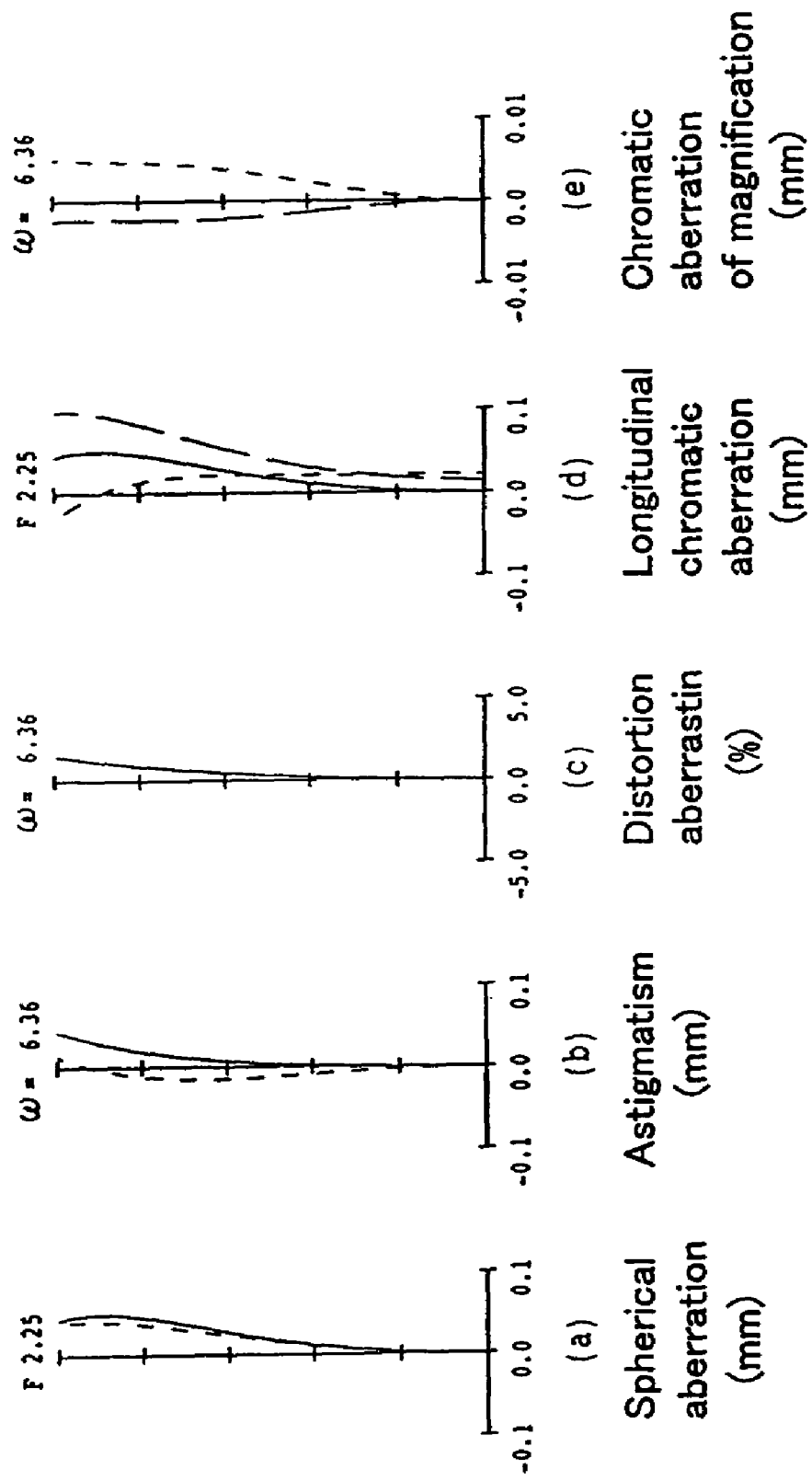
FIG. 19 illustrates various aberrations at a standard position in the fifth embodiment according to the present invention.
Figure 20:
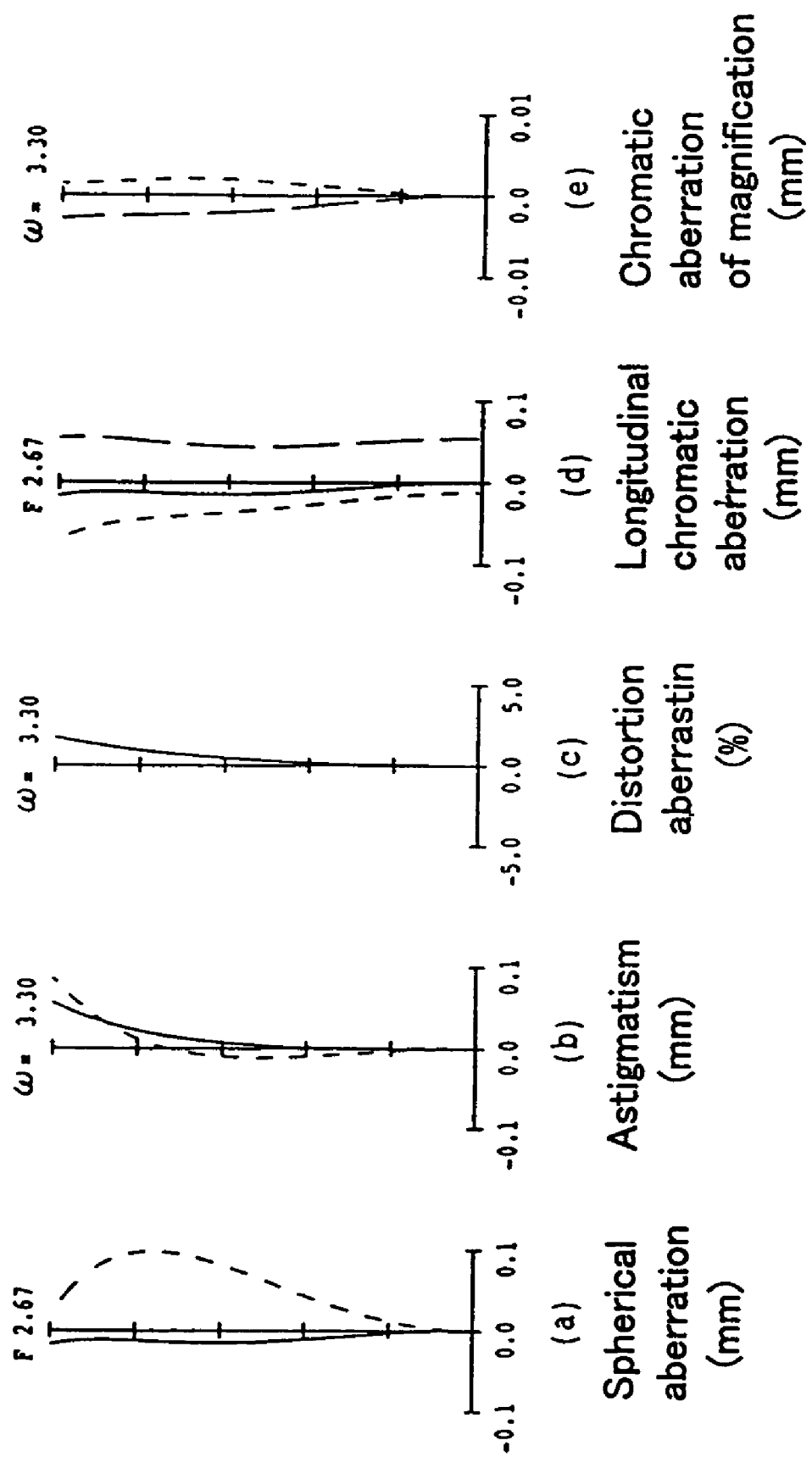
FIG. 20 illustrates various aberrations at a telephoto end in the fifth embodiment according to the present invention.

FIGS. 18 to 20 show various aberrations at the wide-angle end (FIG. 18), the standard position (FIG. 19), and the telephoto end (FIG. 20) of the zoom lens shown in Table 13. As is shown in FIGS. 18 to 20, the zoom lens in the present example exhibits satisfactory aberration performance.

By satisfying the expressions (1) and (2), a zoom lens having a function to correct camera shake can be obtained, and the aberration performance deteriorates less during camera shake.

Specific examples of zoom lenses according to this embodiment, in addition to the above-mentioned lenses, are shown in the following Table 16.

TABLE 16

| Group | Surface | r | d | n | ν |
|---|---|---|---|---|---|
| 1 | 1 | 31.758 | 0.90 | 1.80518 | 25.5 |
|   | 2 | 15.951 | 4.50 | 1.58913 | 61.2 |
|   | 3 | −135.286 | 0.15 |   |   |
|   | 4 | 14.102 | 3.00 | 1.58913 | 61.2 |
|   | 5 | 45.000 | Variable |   |   |
| 2 | 6 | 45.000 | 0.50 | 1.77250 | 49.6 |
|   | 7 | 4.188 | 2.36 |   |   |
|   | 8 | −6.630 | 0.70 | 1.60602 | 57.8 |
|   | 9 | 5.382 | 1.75 | 1.80518 | 25.5 |
|   | 10 | 88.671 | Variable |   |   |
| 3 | 11 | 6.731 | 3.50 | 1.60602 | 57.8 |
|   | 12 | −11.394 | 0.50 |   |   |
|   | 13 | 12.785 | 1.70 | 1.51633 | 64.1 |
|   | 14 | −350.000 | 0.50 | 1.84666 | 23.9 |
|   | 15 | 5.875 | Variable |   |   |
| 4 | 16 | 7.945 | 1.95 | 1.51450 | 63.1 |
|   | 17 | −28.581 | Variable |   |   |
| 5 | 18 | ∞ | 3.70 | 1.51633 | 64.1 |
|   | 19 | ∞ | — |   |   |

Table 17 shows aspherical coefficients in the Examples of Table 16.

TABLE 17

| Surface | 8 | 11 | 12 | 16 |
|---|---|---|---|---|
| K | −3.79187 | −1.49571 | −5.54316 | −2.04960 |
| D | $-1.52553 \times 10^{-3}$ | $6.24513 \times 10^{-5}$ | $9.21711 \times 10^{-6}$ | $3.68450 \times 10^{-4}$ |
| E | $-4.26600 \times 10^{-6}$ | $-3.45653 \times 10^{-6}$ | $-4.27080 \times 10^{-6}$ | $-8.68455 \times 10^{-6}$ |
| F | $-1.29623 \times 10^{-6}$ | $1.02115 \times 10^{-7}$ | $1.47247 \times 10^{-7}$ | $-2.70755 \times 10^{-9}$ |

The following Table 18 shows an air distance (mm) that is varied by zooming in the case where an object is positioned 2 m away from the tip end of the lens.

TABLE 18

|   | Wide-angle end | Standard position | Telephoto end |
|---|---|---|---|
| f | 4.355 | 23.581 | 48.637 |
| F/NO | 1.857 | 2.101 | 2.485 |
| 2ω | 57.157 | 10.756 | 5.259 |
| d5 | 0.500 | 10.347 | 12.880 |
| d10 | 14.442 | 4.595 | 2.062 |
| d14 | 7.262 | 2.386 | 5.951 |
| d19 | 1.011 | 5.888 | 2.323 |

Figure 21:
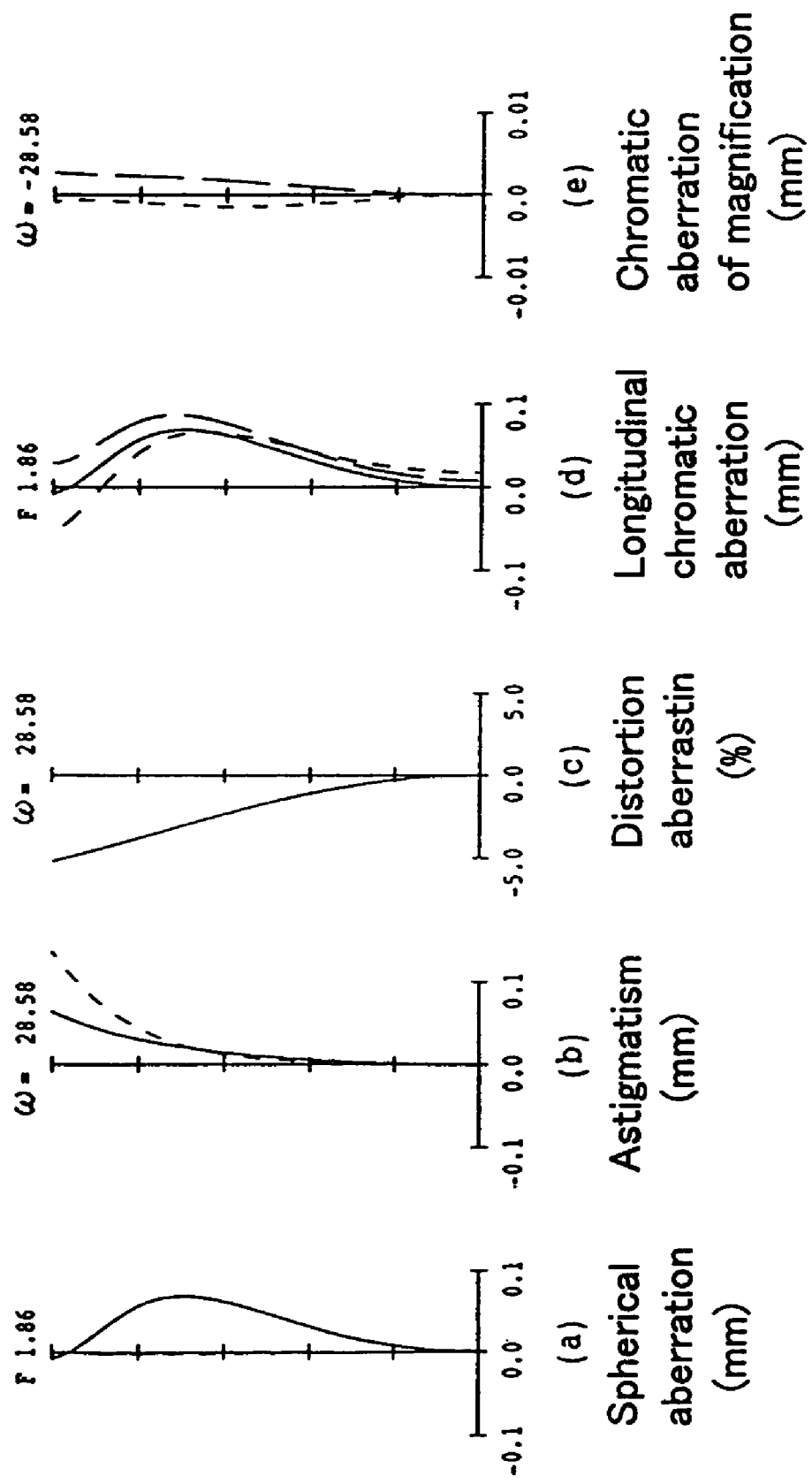
FIG. 21 illustrates various aberrations at a wide-angle end of a second example in the fifth embodiment according to the present invention.
Figure 22:
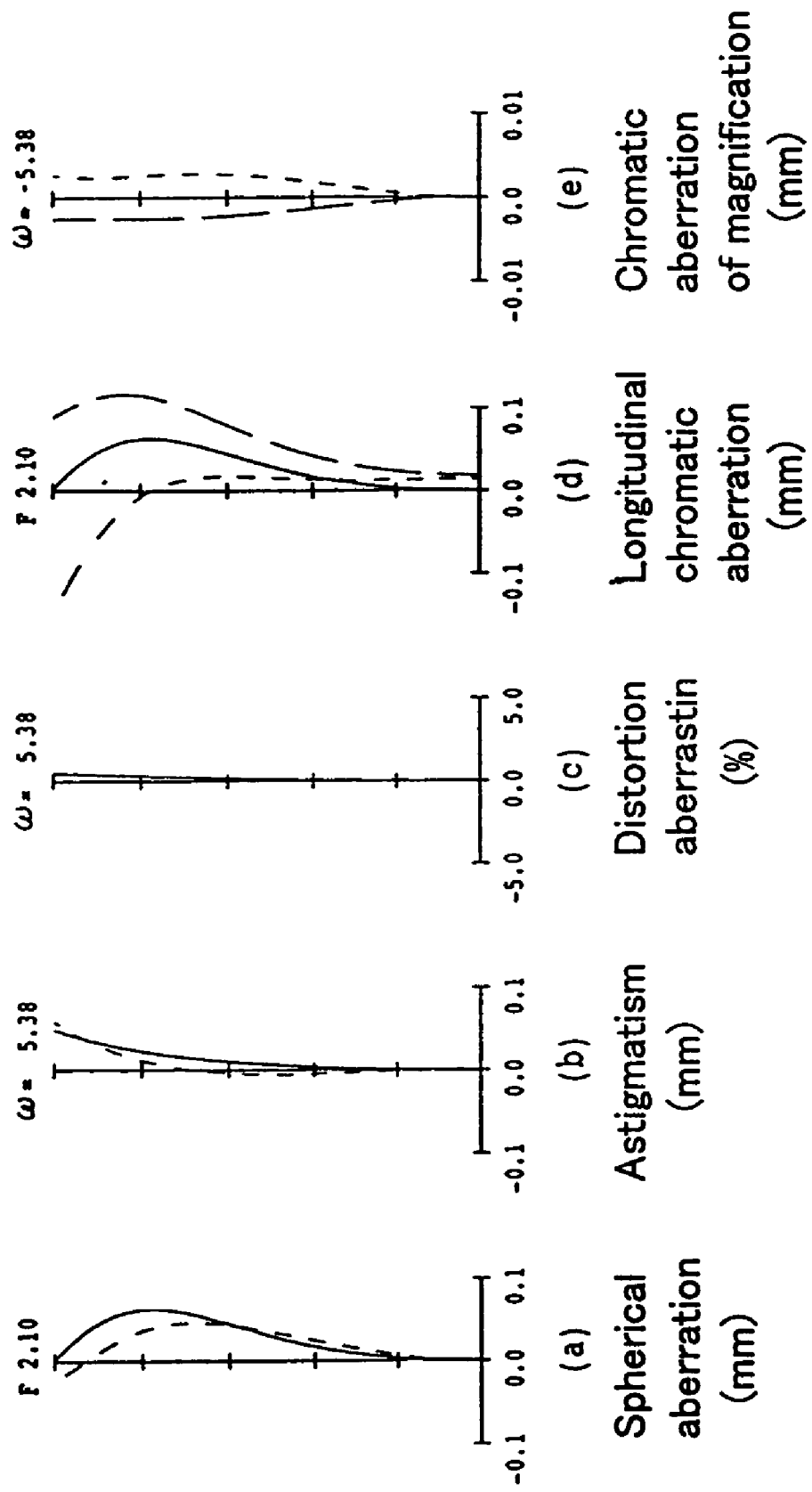
FIG. 22 illustrates various aberrations at a standard position of the second example in the fifth embodiment according to the present invention.
Figure 23:
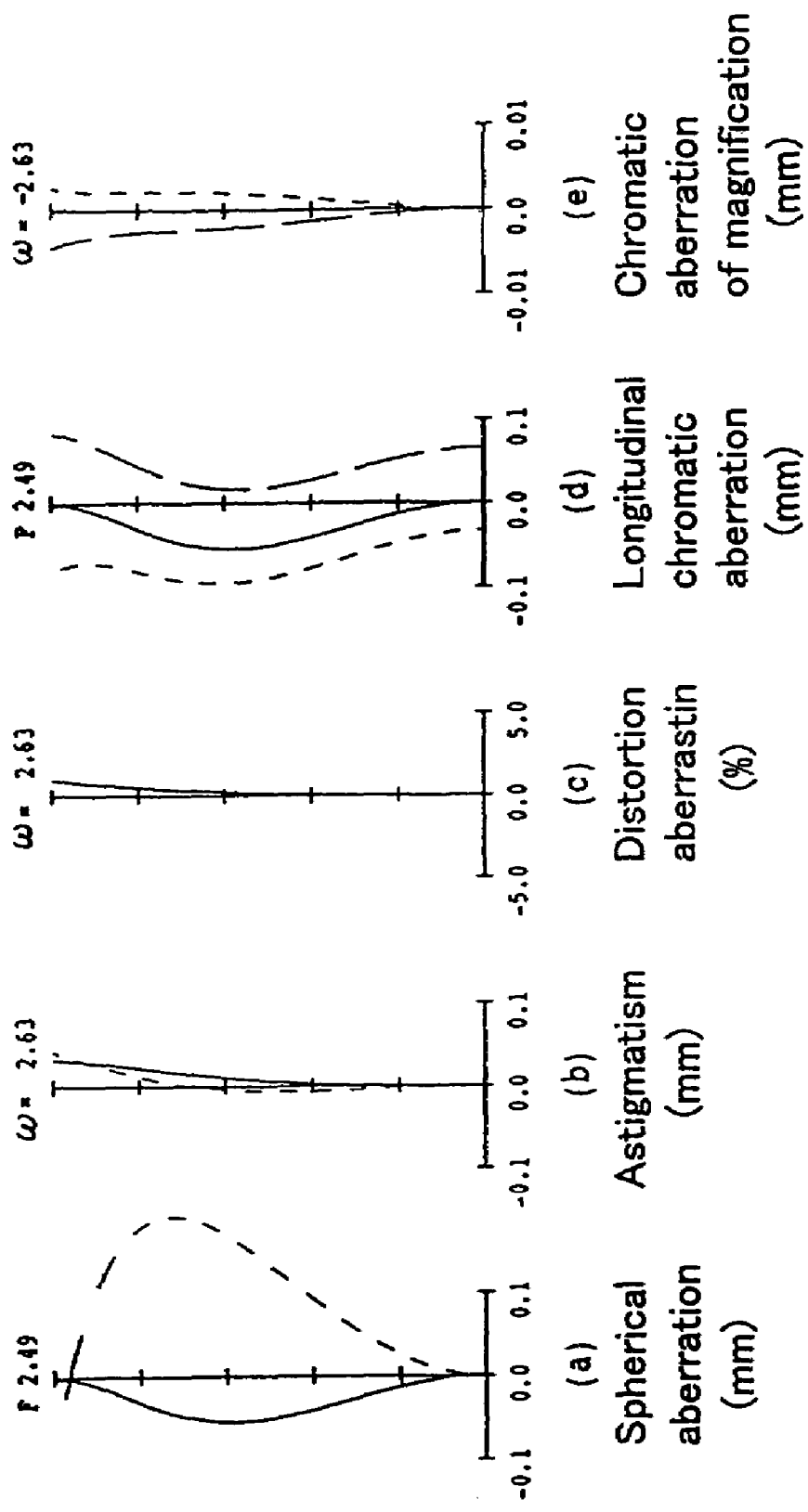
FIG. 23 illustrates various aberrations at a telephoto end of the second example in the fifth embodiment according to the present invention.

FIGS. 21 to 23 show various aberrations at the wide-angle end (FIG. 21), the standard position (FIG. 22), and the telephoto end (FIG. 23) of the zoom lens shown in Table 16. As is understood from FIGS. 21 to 23, the zoom lens in the present example exhibits satisfactory aberration performance.

By satisfying the expressions (1) and (2), a zoom lens having a function to correct camera shake can be obtained, and the aberration performance deteriorates less during camera shake.

The first to fifth embodiments relate to zoom lenses. By using these zoom lenses, video cameras having a function to correct camera shake can be provided, and such video cameras can be downsized and lightweight.

Sixth Embodiment

Figure 24:
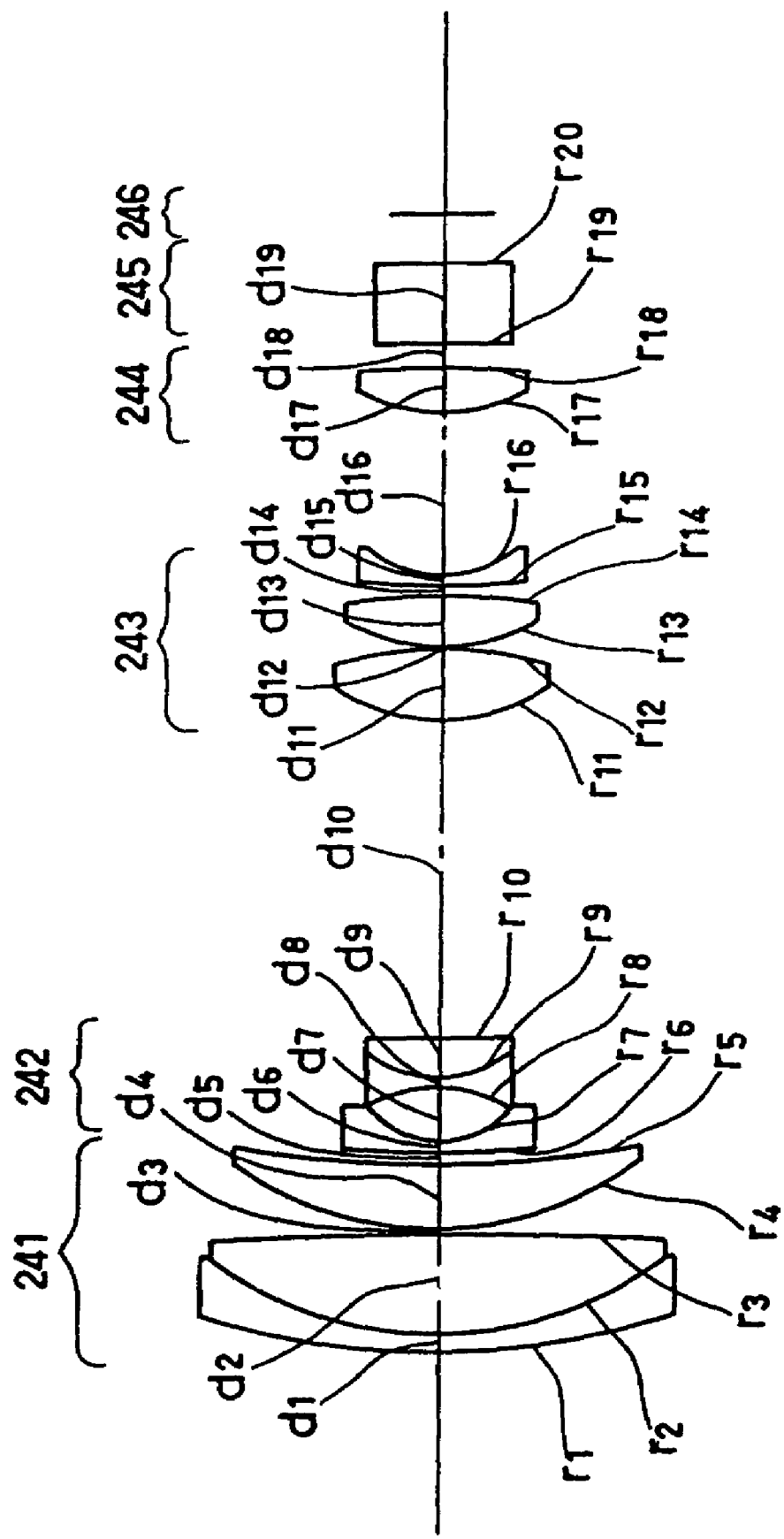
FIG. 24 is a view showing the arrangement of a zoom lens in a sixth embodiment according to the present invention.

FIG. 24 is a view showing the arrangement of a zoom lens in a sixth embodiment according to the present invention. As shown in FIG. 24, a zoom lens has a structure in which a first lens group 241, a second lens group 242, a third lens group 243, a fourth lens group 244, and a plate 245 equivalent to an optical low-pass filter and a face plate of a CCD are disposed from an object side to an image plane side in this order.

The first lens group 241 has a positive refracting power, and is fixed with respect to the image plane 246 in varying power and focusing. The second lens group 242 has a negative refracting power as a whole and varies power by moving along an optical axis. The third lens group 243 is composed of three lenses: a positive lens, a positive lens, and a negative lens disposed from the object side in this order, and is fixed with respect to the image plane 246 in varying power and focusing. The fourth lens group 244 is composed of one positive lens. The fourth lens group 244 moves along an optical axis so as to move an image and adjust the focus thereof at the same time in accordance with variable power.

When camera shake occurs, shake of an image is corrected by moving the third lens group 243 vertically with respect to the optical axis direction. Since the third lens group 243 is smaller in lens diameter than the first lens group 241, correction by moving the third lens group 243 will cause less load for the driving system, and electric power also can be saved. By satisfying the expressions (1) and (2), a zoom lens having a function to correct camera shake, where the aberration performance deteriorates less during camera shake, can be obtained.

The following expression (3) relates to a shift of a third lens group.

$$2.0 < f3/fw < 4.0 \quad (3)$$

In the above expression (3), f3 represents a focal length of the third lens group and fw represents a focal length of the entire system at a wide-angle end.

When the value falls below the lower limit, the aberration will be difficult to correct in a stationary state or when correcting camera shake even if the third lens group is composed of three lenses. When the value exceeds the upper limit, the shifting amount is increased when correcting camera shake and the zoom lens barrel becomes large in diameter. Moreover, the entire length is increased and the zoom lens cannot be downsized. By satisfying the expression (3), the shifting amount when correcting camera shake can be decreased and the whole length of the zoom lens can be shortened, and thus, a small zoom lens can be provided.

Furthermore, by applying at least one aspherical surface to the third lens group as a shift lens group and also to the fourth lens group having focusing action, aberration can be corrected when correcting camera shake as well as in the stationary state.

The following expression (4) relates to an aspherical shape of the object side of a lens of the third lens group, when the lens is disposed closest to the object.

$$1.05 < R11/R10 < 2.5 \quad (4)$$

In the expression (4), R10 represents a local radius of curvature in the vicinity of the optical axis, and R11 represents a local radius of curvature in an outer peripheral portion.

The expression (4) defines a range to correct the spherical aberration satisfactorily. A negative spherical aberration occurs when the value falls below the lower limit, while positive spherical aberration occurs as a result of overcorrection when the value exceeds the upper limit.

The following expression (5) relates to an aspherical shape of a lens of the fourth lens group when viewed from the object side.

$$1.05 < R21 < R20 < 2.0 \quad (5)$$

R20 represents a local radius of curvature in the vicinity of the optical axis, and R21 represents a local radius of curvature in an outer peripheral portion.

The expression (5) defines a range to satisfactorily correct a coma aberration of an upper flux of an off-axis ray. An internal coma occurs when the value falls below the lower limit, while an external coma occurs when the value exceeds the upper limit.

Specific examples of zoom lenses according to this embodiment are shown in the following Table 19.

TABLE 19

| Group | Surface | r | d | n | v |
|---|---|---|---|---|---|
| 1 | 1 | 31.089 | 0.90 | 1.80518 | 25.4 |
|   | 2 | 15.820 | 4.50 | 1.58913 | 61.2 |
|   | 3 | −171.154 | 0.15 | | |
|   | 4 | 14.460 | 3.00 | 1.60311 | 60.7 |
|   | 5 | 48.740 | Variable | | |
| 2 | 6 | 48.740 | 0.50 | 1.77250 | 49.6 |
|   | 7 | 4.206 | 2.34 | | |
|   | 8 | −8.647 | 0.55 | 1.60602 | 57.4 |
|   | 9 | 5.292 | 1.75 | 1.80518 | 25.4 |
|   | 10 | 88.671 | Variable | | |
| 3 | 11 | 7.268 | 3.25 | 1.51450 | 63.1 |
|   | 12 | −14.052 | 0.10 | | |
|   | 13 | 9.072 | 2.20 | 1.51895 | 57.3 |
|   | 14 | −37.099 | 0.50 | | |
|   | 15 | 60.905 | 0.50 | 1.84666 | 25.4 |
|   | 16 | 5.422 | Variable | | |
| 4 | 17 | 7.232 | 2.00 | 1.51450 | 63.1 |
|   | 18 | −42.485 | Variable | | |
| 5 | 19 | ∞ | 3.70 | 1.51633 | 64.1 |
|   | 20 | ∞ | — | | |

The aspherical shape is defined by the following equation (B). (This also applies to examples 7 to 9.)

$$SAG = \frac{H^2/R}{1+\sqrt{1-(1+K)(H/R^2)}} + D \cdot H^4 + E \cdot H^6 + F \cdot H^8 \quad (B)$$

SAG: a distance from the apex on the aspherical surface to a point on the same aspherical surface having a height H from the optical axis
H: a height from an optical axis
R: a radius of curvature at the apex on the aspherical surface
K: a conical constant
D, E, F: aspherical coefficients The following Table 20 shows aspherical shapes of the zoom lens in the the present example.

TABLE 20

| Surface | 8 | 11 | 12 | 17 |
|---|---|---|---|---|
| K | −3.46709 | −1.57334 | −4.56016 | −1.39803 |
| D | $-1.36790 \times 10^{-3}$ | $-6.68922 \times 10^{-5}$ | $1.39115 \times 10^{-5}$ | $1.90786 \times 10^{-4}$ |
| E | $-1.82278 \times 10^{-5}$ | $-1.31623 \times 10^{-6}$ | $-1.82005 \times 10^{-6}$ | $9.90799 \times 10^{-6}$ |
| F | $-5.96614 \times 10^{-7}$ | $8.53637 \times 10^{-8}$ | $1.00886 \times 10^{-7}$ | $-6.93646 \times 10^{-7}$ |

The following Table 21 shows an air distance (mm) that is varied by zooming in the case where an object is positioned 2 m away from the tip end of the lens. A standard position represents a position where the third lens group 243 is disposed the closest to the fourth lens group 244. The Table 21 indicates also a shifting amount Y of the third lens group at a correction of 0.5 degrees.

TABLE 21

|  | Wide-angle end | Standard position | Telephoto end |
|---|---|---|---|
| f | 4.350 | 23.464 | 48.623 |
| F/NO | 1.873 | 2.096 | 2.490 |
| ω | 28.770 | 5.415 | 2.638 |
| d5 | 0.500 | 10.344 | 12.893 |
| d10 | 14.442 | 4.597 | 2.049 |
| d16 | 7.262 | 2.393 | 5.880 |
| d18 | 1.012 | 5.880 | 2.393 |
| Y | 0.034 | 0.197 | 0.392 |
| Expression (2) | 0.972 | 1.041 | 1.000 |

As shown in FIG. 21, the a shift of the third lens group in this embodiment satisfies the expressions (1) and (2), and thus, it realizes optical performance with less deterioration when compared to a stationary state.

Furthermore, in the zoom lens of the present example, a focal length f3 of the third lens group satisfies the expression (3) and a small zoom lens is provided.

TABLE 22

| Fw | f3 | Expression (3) (f3/fw) |
|---|---|---|
| 4.350 | 11.311 | 2.60 |

In this embodiment, the third lens group has a lens at the side closest to the object, and the both surfaces of the lens are aspherical. Especially, the local radius of curvature R10 in the vicinity of the object-side surface and the local radius of curvature R11 in an outer peripheral portion have values shown in the following Table 23, and satisfy the expression (4). As a result, the embodiment realizes excellent aberration performance not only in the stationary state but when correcting camera shake, and especially, the embodiment realizes a spherical aberration that is satisfactorily corrected.

TABLE 23

| R10 | R11 | Expression (4) (R11/R10) |
|---|---|---|
| 7.268 | 13.516 | 1.86 |

Furthermore, the lens of the fourth lens group has an aspherical surface when viewed from the object side, a local radius of curvature R20 in the vicinity of an optical axis and a local radius of curvature R11 in an outer peripheral portion with the values shown in Table 24. Moreover, when the expression (5) is satisfied, excellent aberration performance is realized not only in its stationary state but when correcting camera shake. Especially, a satisfactory coma aberration is realized.

TABLE 24

| R20 | R21 | Expression (5) (R21/R20) |
|---|---|---|
| 7.232 | 10.112 | 1.40 |

Figure 25:
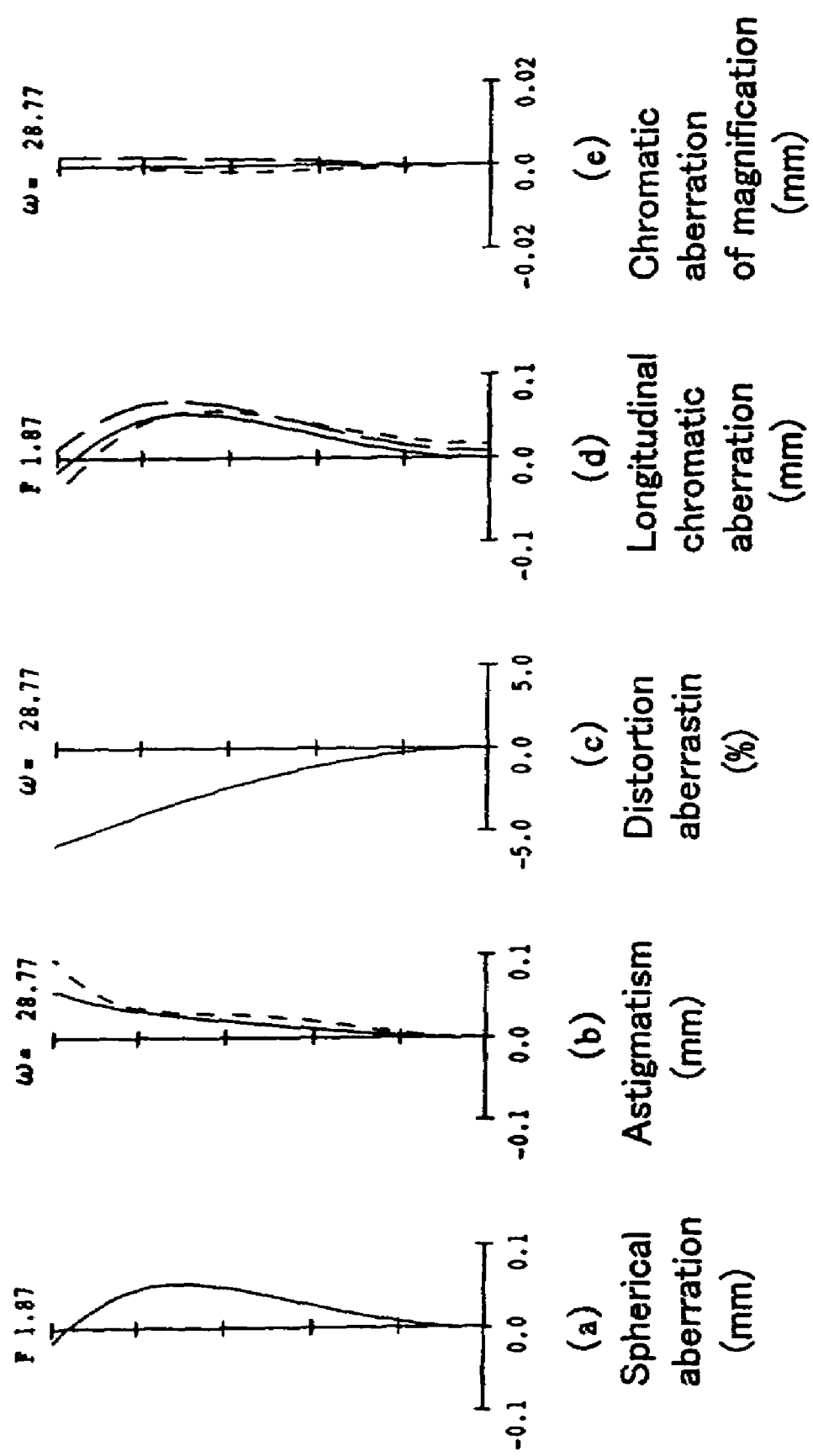
FIG. 25 illustrates various aberrations at a wide-angle end in the sixth embodiment according to the present invention.
Figure 26:
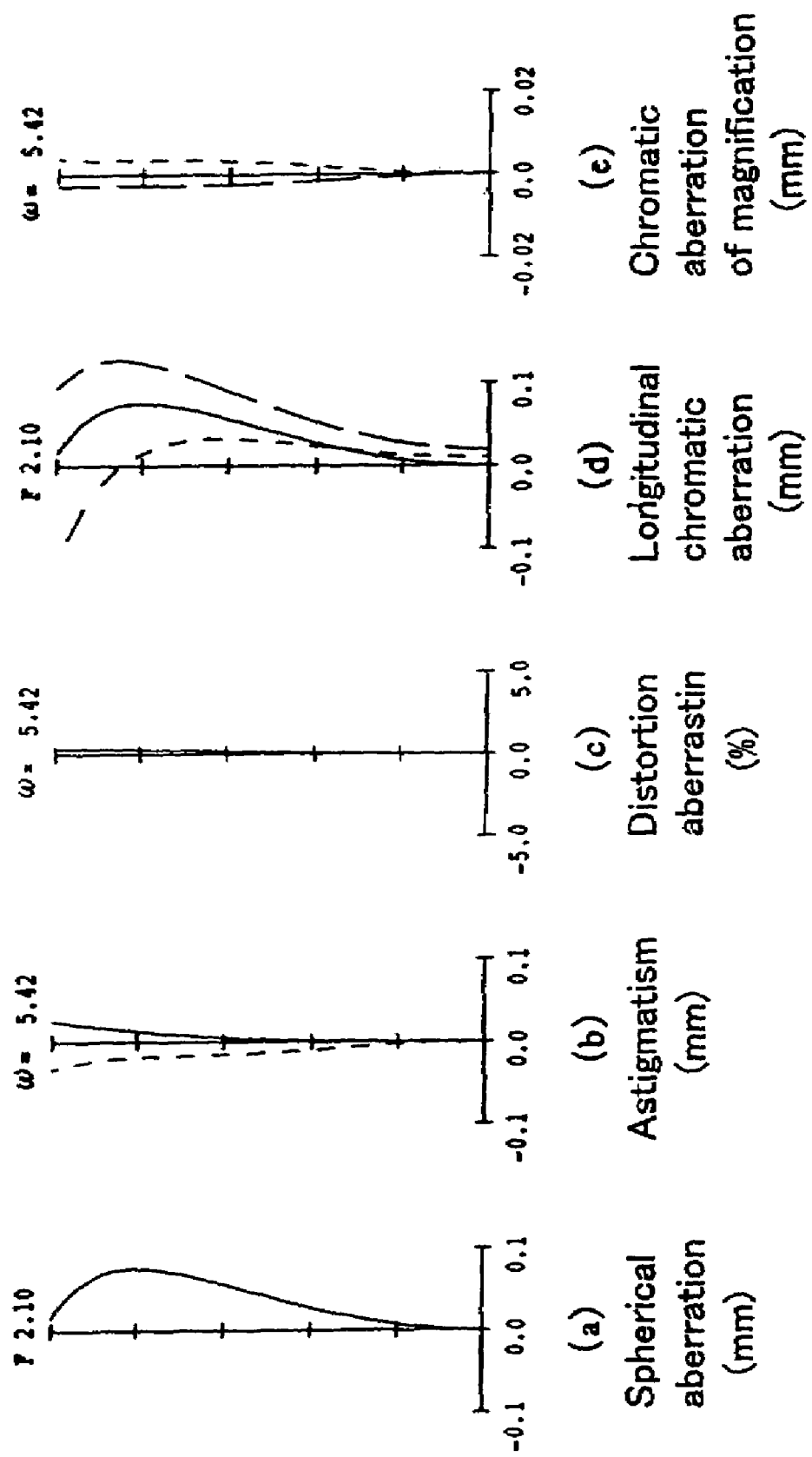
FIG. 26 illustrates various aberrations at a standard position in the sixth embodiment according to the present invention.

FIGS. 25 to 27 show various aberrations at the wide-angle end, the standard position, and the telephoto end of the zoom lens shown in Table 19.

Figure 28:
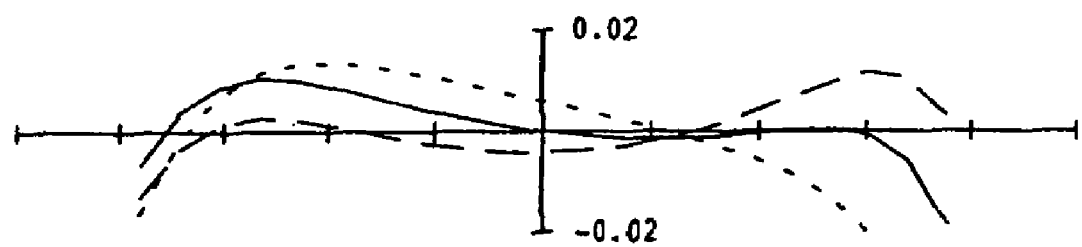
FIG. 28 illustrates various aberrations at a telephoto end in the sixth embodiment according to the present invention at a correction of 0.5 degrees.
Figure 28:
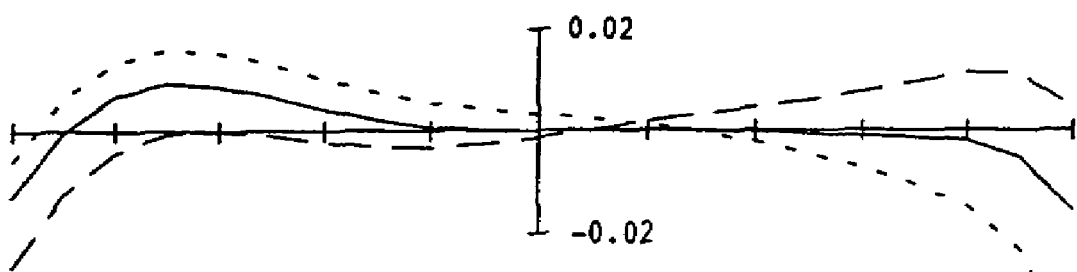
Figure 28:
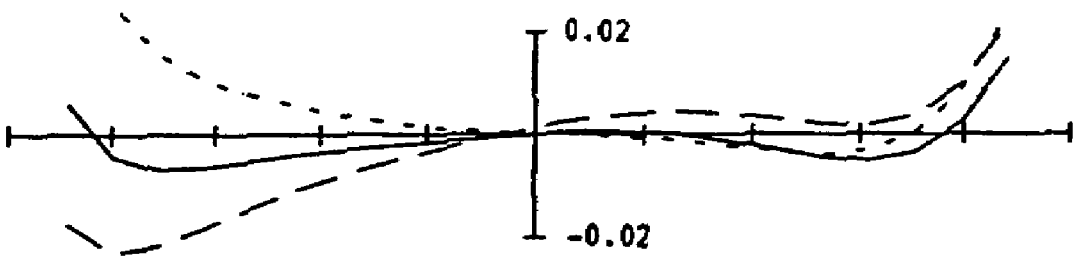

FIG. 28 shows aberrations at a telephoto end at a correction of 0.5 degrees. FIGS. 28(a), 28(b) and 28(c) show lateral aberrations at a relative angle of view of 0.75, along the axis, and at a relative angle of view of −0.75. A solid line, the dotted line and the wave line represent values with respect to the d-line, F-line and C-line (this applies to the following FIGS. 33, 38, and 43). As indicated in FIGS. 25-28, a zoom lens according to this embodiment provides a satisfactory aberration performance.

Seventh Embodiment

Figure 29:
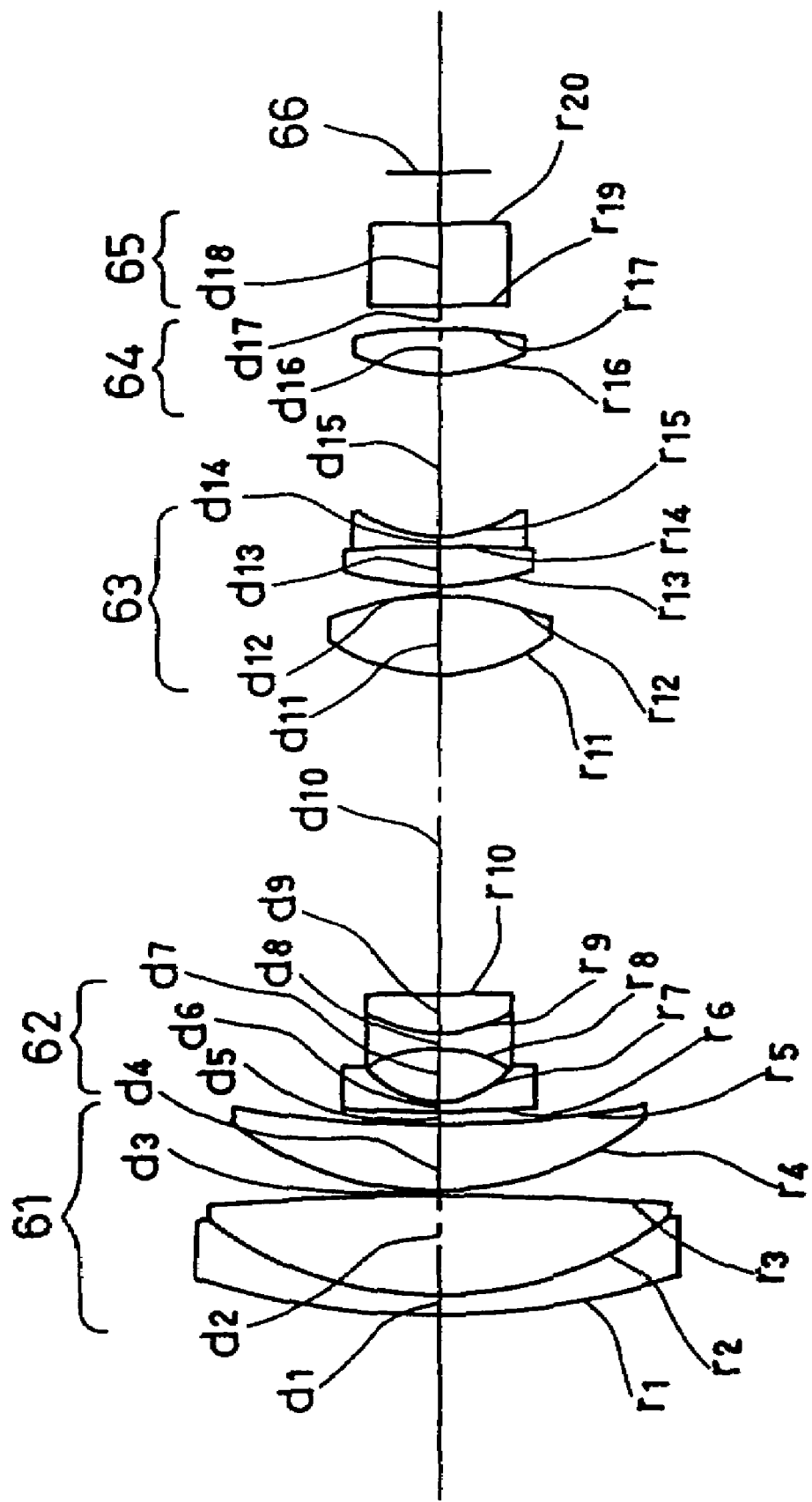
FIG. 29 is a view showing the arrangement of a zoom lens in a seventh embodiment according to the present invention.

FIG. 29 is a view showing the arrangement of a zoom lens in a seventh embodiment according to the present invention.

As shown in FIG. 29, a zoom lens has a structure in which a first lens group 61, a second lens group 62, a third lens group 63, a fourth lens group 64, and a plate 65 equivalent to an optical low-pass filter and a face plate of a CCD are disposed from an object side to an image plane side in this order.

The first lens group 61 has a positive refracting power, and is fixed with respect to the image plane 66 in varying power and focusing. The second lens group 62 has a negative refracting power and varies power by moving along an optical axis. The third lens group 63 is composed of three lenses: a positive lens, a positive lens, and a negative lens disposed from the object side in this order, and two of the lenses at the image plane side compose a cemented lens of a positive lens and a negative lens. The third lens group 63 is fixed with respect to the image plane 66 in varying power and focusing. The fourth lens group 64 is composed of one positive lens. The fourth lens group 64 moves along an optical axis so as to move an image and adjust the focus thereof at the same time in accordance with variable power.

When camera shake occurs, shake of an image is corrected by moving the third lens group 63 vertically with respect to the optical axis direction. Since the third lens group 63 is smaller in lens diameter than the first lens group 61, correction by moving the third lens group 63 will cause less load for the driving system, and electric power also can be saved. It is preferable that the expressions (1) to (5) are satisfied as in the sixth embodiment.

Specific examples of zoom lenses according to this embodiment are shown in the following Table 25.

TABLE 25

| Group | Surface | r | d | n | ν |
|---|---|---|---|---|---|
| 1 | 1 | 31.758 | 0.90 | 1.80518 | 25.4 |
|  | 2 | 15.951 | 4.50 | 1.58913 | 61.2 |
|  | 3 | −135.286 | 0.15 |  |  |
|  | 4 | 14.102 | 3.00 | 1.58913 | 61.2 |
|  | 5 | 45.000 | Variable |  |  |
| 2 | 6 | 45.000 | 0.50 | 1.77250 | 49.6 |
|  | 7 | 4.188 | 2.36 |  |  |
|  | 8 | −6.630 | 0.70 | 1.60602 | 57.4 |
|  | 9 | 5.382 | 1.75 | 1.80518 | 25.4 |
|  | 10 | 88.671 | Variable |  |  |
| 3 | 11 | 6.731 | 3.50 | 1.60602 | 57.4 |
|  | 12 | −11.394 | 0.50 |  |  |
|  | 13 | 12.785 | 1.70 | 1.51633 | 54.1 |
|  | 14 | −350.000 | 0.50 | 1.84666 | 25.4 |
|  | 15 | 5.875 | Variable |  |  |
| 4 | 16 | 7.945 | 1.95 | 1.51450 | 63.1 |
|  | 17 | −28.581 | Variable |  |  |
| 5 | 18 | ∞ | 3.70 | 1.51633 | 64.1 |
|  | 19 | ∞ | — |  |  |

The following Table 26 shows aspherical shapes of the zoom lens in the present example.

TABLE 26

| Surface | 8 | 11 | 12 | 16 |
|---|---|---|---|---|
| K | −3.79187 | −1.49571 | −5.54316 | −2.04960 |
| D | $-1.52553 \times 10^{-3}$ | $6.24513 \times 10^{-5}$ | $9.21711 \times 10^{-6}$ | $3.68450 \times 10^{-4}$ |
| E | $-4.26600 \times 10^{-6}$ | $-3.45653 \times 10^{-6}$ | $-4.27080 \times 10^{-6}$ | $-8.68455 \times 10^{-6}$ |
| F | $-1.29623 \times 10^{-6}$ | $1.02115 \times 10^{-7}$ | $1.47247 \times 10^{-7}$ | $-2.70755 \times 10^{-9}$ |

The following Table 27 shows zooming distance and shifting amount.

TABLE 27

|  | Wide-angle end | Standard position | Telephoto end |
|---|---|---|---|
| f | 4.355 | 23.464 | 48.623 |
| F/NO | 1.857 | 2.096 | 2.490 |
| ω | 28.579 | 5.415 | 2.638 |
| d5 | 0.500 | 10.344 | 12.893 |
| d10 | 14.415 | 4.597 | 2.049 |
| d15 | 7.262 | 2.393 | 5.880 |
| d17 | 1.012 | 5.880 | 2.393 |
| Y | 0.034 | 0.195 | 0.392 |
| Expression (2) | 0.970 | 1.027 | 1.000 |

As shown in Table 27, a shift of the third lens group satisfies the expressions (1) and (2), and it achieves optical performance with less deterioration when compared to a stationary state.

As shown in the following Table 28, the focal length f3 of the third lens group satisfies the expression (3), and thus, a small zoom lens is realized.

TABLE 28

| fw | f3 | Expression (3) (f3/fw) |
|---|---|---|
| 4.350 | 11.317 | 2.60 |

In this embodiment, a lens of the third group, which is positioned closest to the object, has aspherical surfaces on both sides. Especially, the local radius of curvature R10 in the vicinity of the object side and the local radius of curvature R11 in an outer peripheral portion have values shown in the following Table 29, and satisfy the expression (4). As a result, the embodiment achieves excellent aberration performance not only in a stationary state but when correcting camera shake, and especially, aspherical aberration is corrected satisfactorily.

TABLE 29

| R10 | R11 | Expression (4) (R11/R10) |
|---|---|---|
| 6.731 | 12.417 | 1.85 |

Furthermore, the object-side surface of a lens of the fourth group is aspherical, a local radius of curvature R20 in the vicinity of an optical axis and a local radius of curvature R11 in an outer peripheral portion have the values shown in Table 30. Moreover, the expression (5) satisfied, excellent aberration performance is realized not only in its stationary state but at correcting. Especially a satisfactory coma aberration is realized.

TABLE 30

| R20 | R21 | Expression (5) (R21/R20) |
|---|---|---|
| 7.945 | 11.021 | 1.39 |

Figure 30:
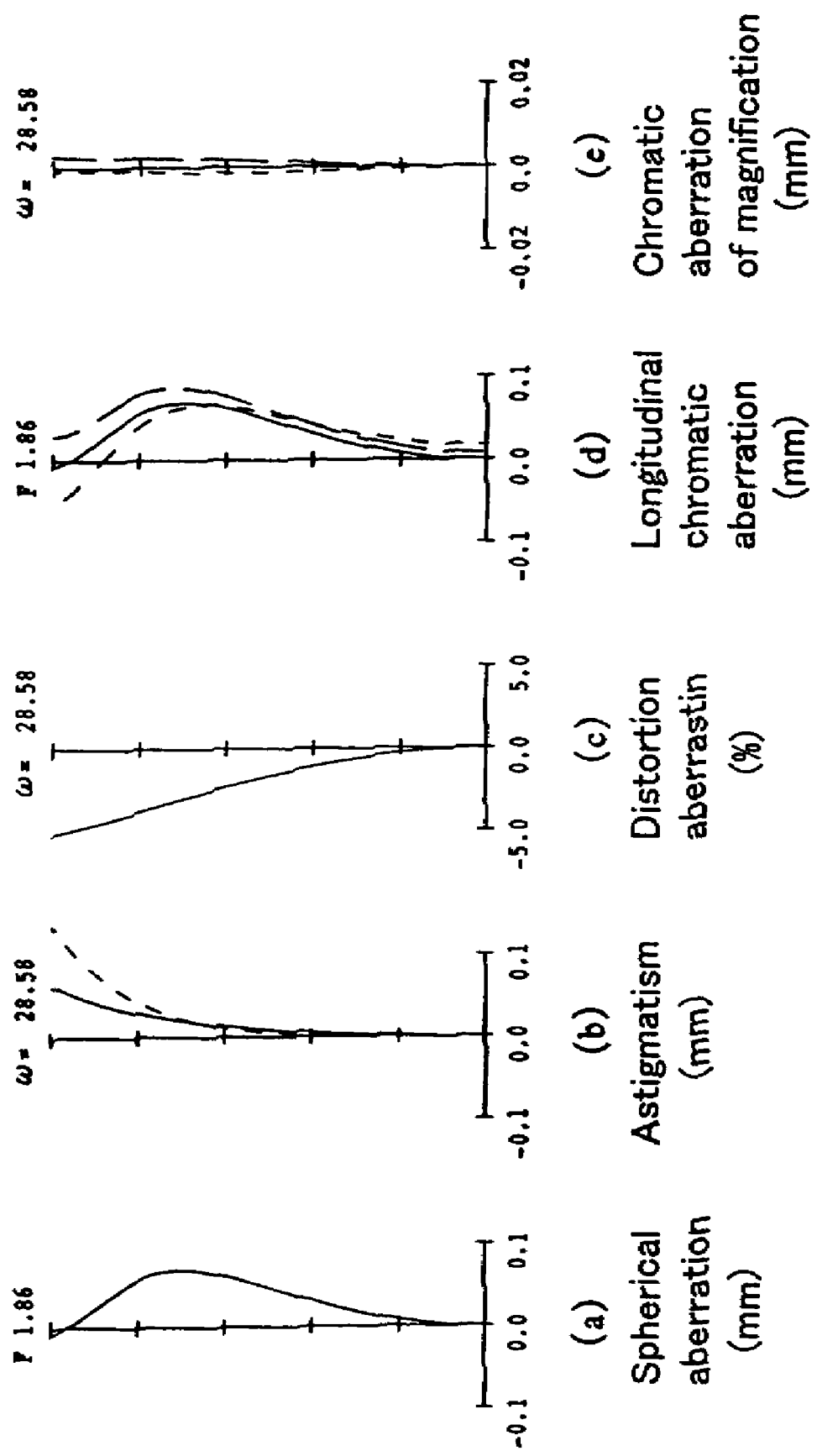
FIG. 30 illustrates various aberrations at a wide-angle end in the seventh embodiment according to the present invention.
Figure 31:
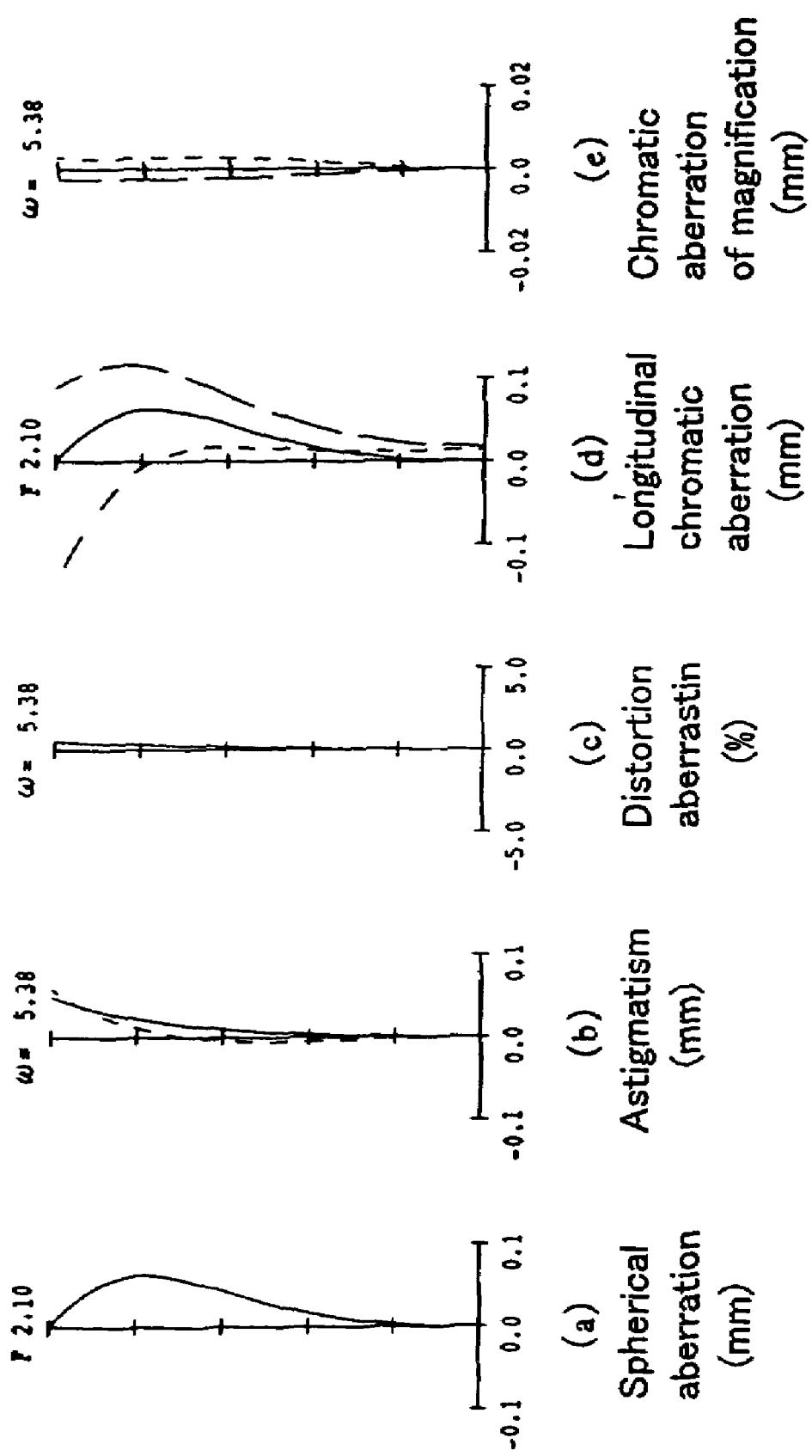
FIG. 31 illustrates various aberrations at a standard position in the seventh embodiment according to the present invention.
Figure 32:
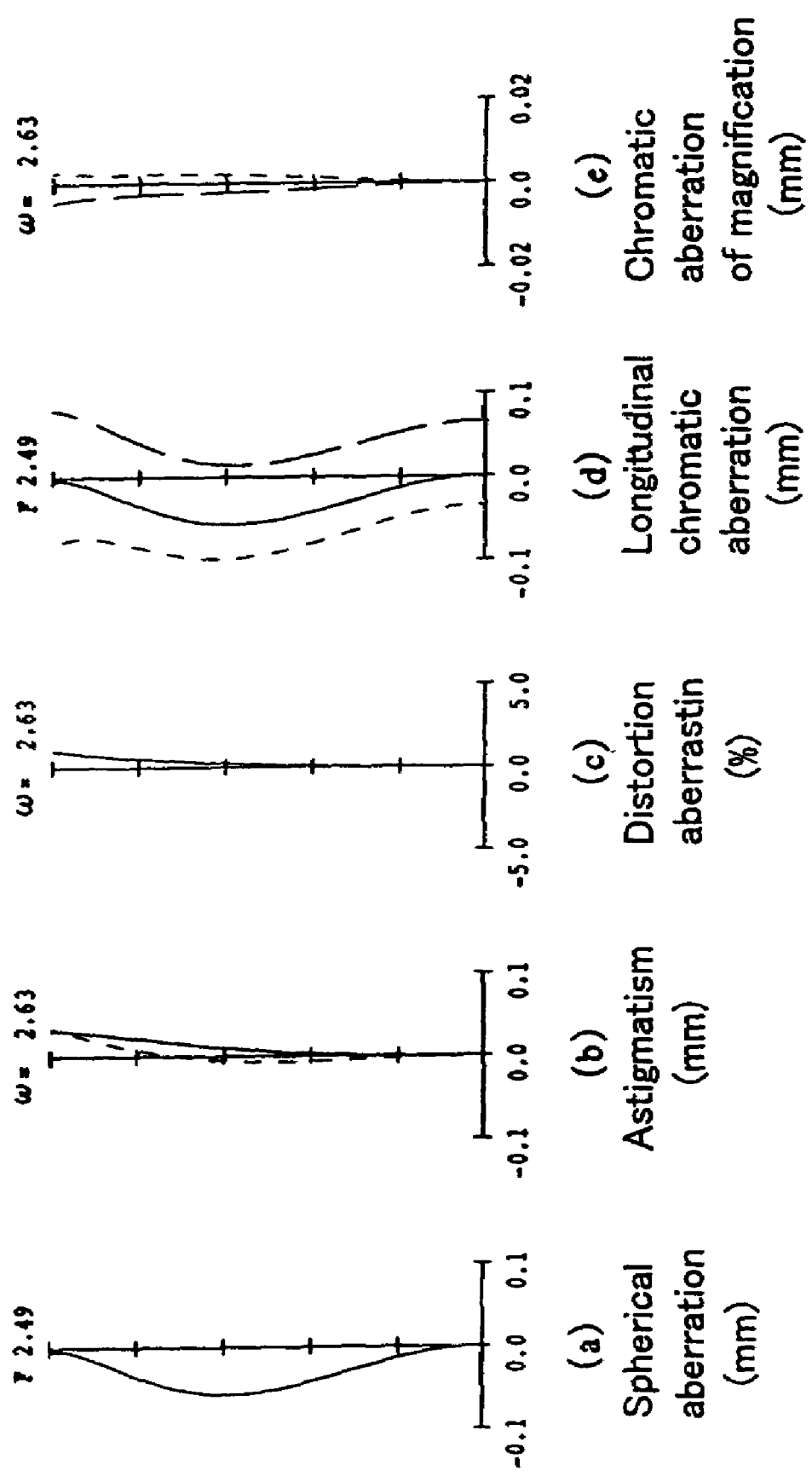
FIG. 32 illustrates various aberrations at a telephoto end in the seventh embodiment according to the present invention.
Figure 33:
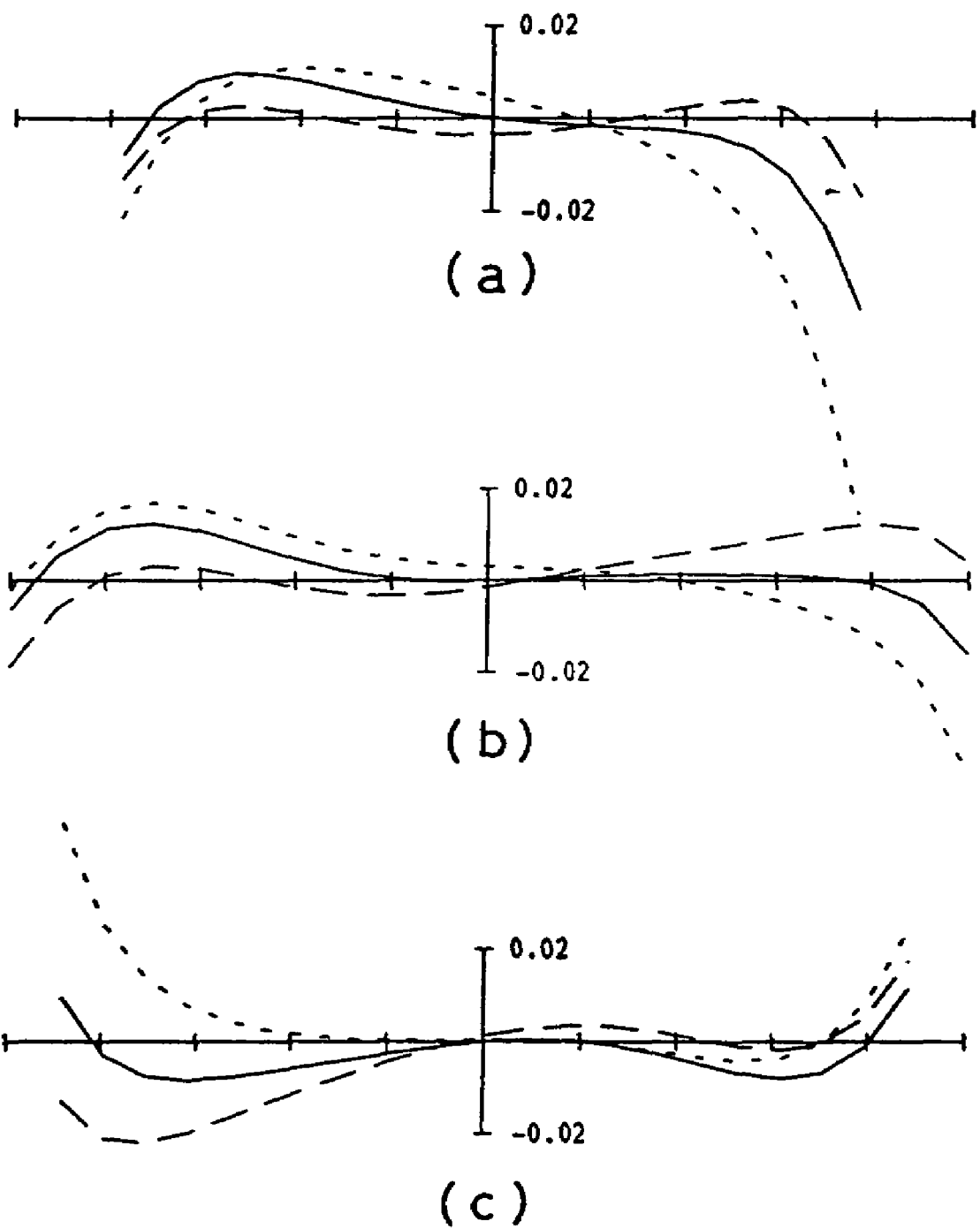
FIG. 33 illustrates various aberrations at a telephoto end in the seventh embodiment according to the present invention at a correction of 0.5 degrees.

FIGS. 30 to 32 show various aberrations at the wide-angle end, the standard position, and the telephoto end of the zoom lens shown in Table 25. FIG. 33 shows an aberration at a telephoto end at a correction of 0.5 degrees. As indicated in FIGS. 30-33, a zoom lens according to this embodiment provides a satisfactory aberration performance.

Eighth Embodiment

Figure 34:
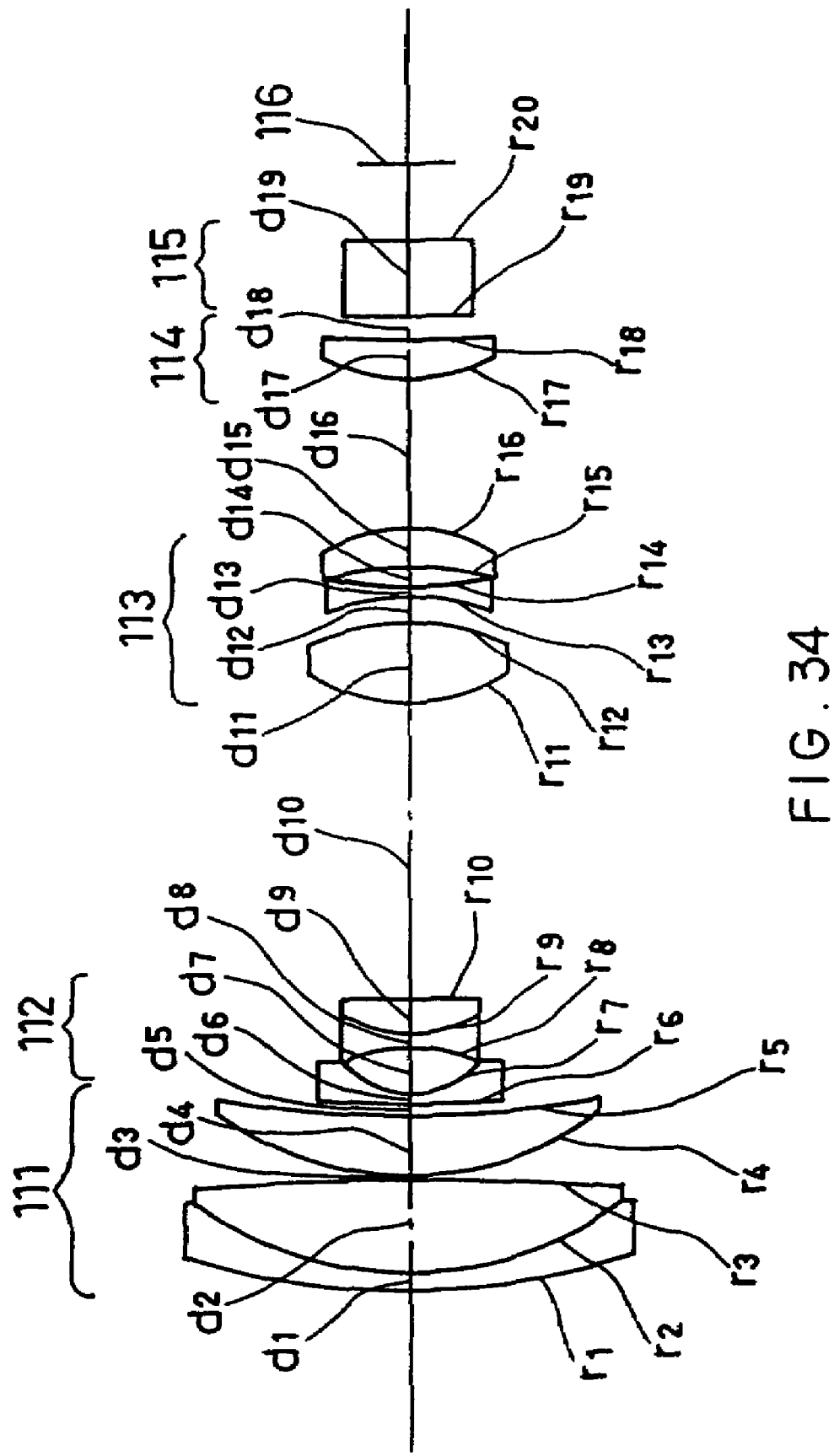
FIG. 34 is a view showing the arrangement of a zoom lens in a eighth embodiment according to the present invention.

FIG. 34 is a view showing the arrangement of a zoom lens in an eighth embodiment according to the present invention. As shown in FIG. 34, a zoom lens has a structure in which a first lens group 111, a second lens group 112, a third lens group 113, a fourth lens group 114, and a plate 115 equivalent to an optical low-pass filter and a face plate of a CCD are disposed from an object side to an image plane side in this order.

The first lens group 111 has a positive refracting power, and is fixed with respect to the image plane 116 in varying power and focusing. The second lens group 112 has a negative refracting power and varies power by moving along an optical axis.

The third lens group 113 is composed of three lenses: a positive lens, a negative lens, and a positive lens disposed from the object side in this order, and is fixed with respect to the image plane 306 in varying power and focusing. The fourth lens group 114 is composed of one positive lens, and moves along an optical axis so as to move an image and adjust the focus thereof at the same time in accordance with variable power.

When camera shake occurs, shake of an image is corrected by moving the third lens group 113 vertically with respect to the optical axis direction. Since the third lens group 113 is smaller in lens diameter than the first lens group 111, correction by moving the third lens group 113 will cause less load for the driving system, and electric power also can be saved. It is preferable that the expressions (1) to (5) are satisfied as in the sixth embodiment.

Specific examples of zoom lenses according to this embodiment are shown in the following Table 31. The first and second lens groups in these embodiments are the same as shown in Table 19.

TABLE 31

| Group | Surface | r | d | n | ν |
|---|---|---|---|---|---|
| 3 | 11 | 6.854 | 3.95 | 1.51450 | 63.1 |
|   | 12 | −7.934 | 1.20 |  |  |
|   | 13 | −10.797 | 0.50 | 1.78472 | 25.7 |
|   | 14 | 16.985 | 0.86 |  |  |
|   | 15 | −21.096 | 2.00 | 1.51895 | 57.3 |
|   | 16 | −6.963 | Variable |  |  |
| 4 | 17 | 9.141 | 1.90 | 1.51450 | 63.1 |
|   | 18 | 335.606 | Variable |  |  |
| 5 | 19 | ∞ | 3.70 | 1.51633 | 64.1 |
|   | 20 | ∞ | — |  |  |

The following Table 32 shows aspherical shapes of the zoom lens in the present example.

TABLE 32

| Surface | 8 | 11 | 12 | 17 |
|---|---|---|---|---|
| K | −3.46709 | −1.99011 | −3.12036 | −1.04888 |
| D | $-1.36790 \times 10^{-3}$ | $2.73697 \times 10^{-4}$ | $2.30462 \times 10^{-5}$ | $1.27223 \times 10^{-4}$ |
| E | $-1.82278 \times 10^{-5}$ | $-2.65163 \times 10^{-6}$ | $1.73552 \times 10^{-6}$ | $-1.69913 \times 10^{-7}$ |
| F | $-5.96614 \times 10^{-7}$ | $2.37367 \times 10^{-7}$ | $1.42772 \times 10^{-7}$ | $-4.55207 \times 10^{-8}$ |

The following Table 33 shows zooming distance and shifting amount.

TABLE 33

|  | Wide-angle end | Standard position | Telephoto end |
|---|---|---|---|
| f | 4.246 | 21.577 | 47.769 |
| F/NO | 1.859 | 2.003 | 2.426 |
| ω | 29.455 | 5.923 | 2.694 |
| d5 | 0.500 | 10.344 | 12.893 |
| d10 | 14.442 | 4.597 | 2.049 |
| d15 | 7.261 | 2.300 | 5.779 |

TABLE 33-continued

|  | Wide-angle end | Standard position | Telephoto end |
|---|---|---|---|
| d17 | 1.013 | 5.973 | 2.495 |
| Y | 0.031 | 0.161 | 0.347 |
| Expression (2) | 1.012 | 1.027 | 1.000 |

As shown in Table 33, a shift of the third lens group satisfies the expressions (1) and (2), and it provides an optical performance with less deterioration when compared to a stationary state.

As shown in the following Table 34, the focal length f3 of the third lens group satisfies the expression (3), and achieves a small zoom lens.

TABLE 34

| fw | F3 | Expression (3) (f3/fw) |
|---|---|---|
| 4.246 | 13.079 | 3.08 |

In this example, a lens of the third group, which is positioned closest to the object, has aspherical surfaces on both sides. Especially, the local radius of curvature R10 in the vicinity of the object-side and the local radius of curvature R11 in an outer peripheral portion have values shown in the following Table 35, and satisfy the expression (4). As a result, the embodiment realizes excellent aberration performance not only in a stationary state but when correcting camera shake, and especially, aspherical aberration is corrected satisfactorily.

TABLE 35

| R10 | R11 | Expression (4) (R11/R10) |
|---|---|---|
| 6.854 | 8.352 | 1.22 |

Furthermore, the object-side surface of a lens of the fourth group is aspherical, a local radius of curvature R20 in the vicinity of an optical axis and a local radius of curvature R11 in an outer peripheral portion have the values shown in Table 36. Moreover, the expression (5) is satisfied, excellent aberration performance is realized not only in its stationary state but when correcting camera shake. Especially a satisfactory coma aberration is achieved.

TABLE 36

| R20 | R21 | Expression (5) (R21/R20) |
|---|---|---|
| 9.141 | 10.416 | 1.14 |

Figure 35:
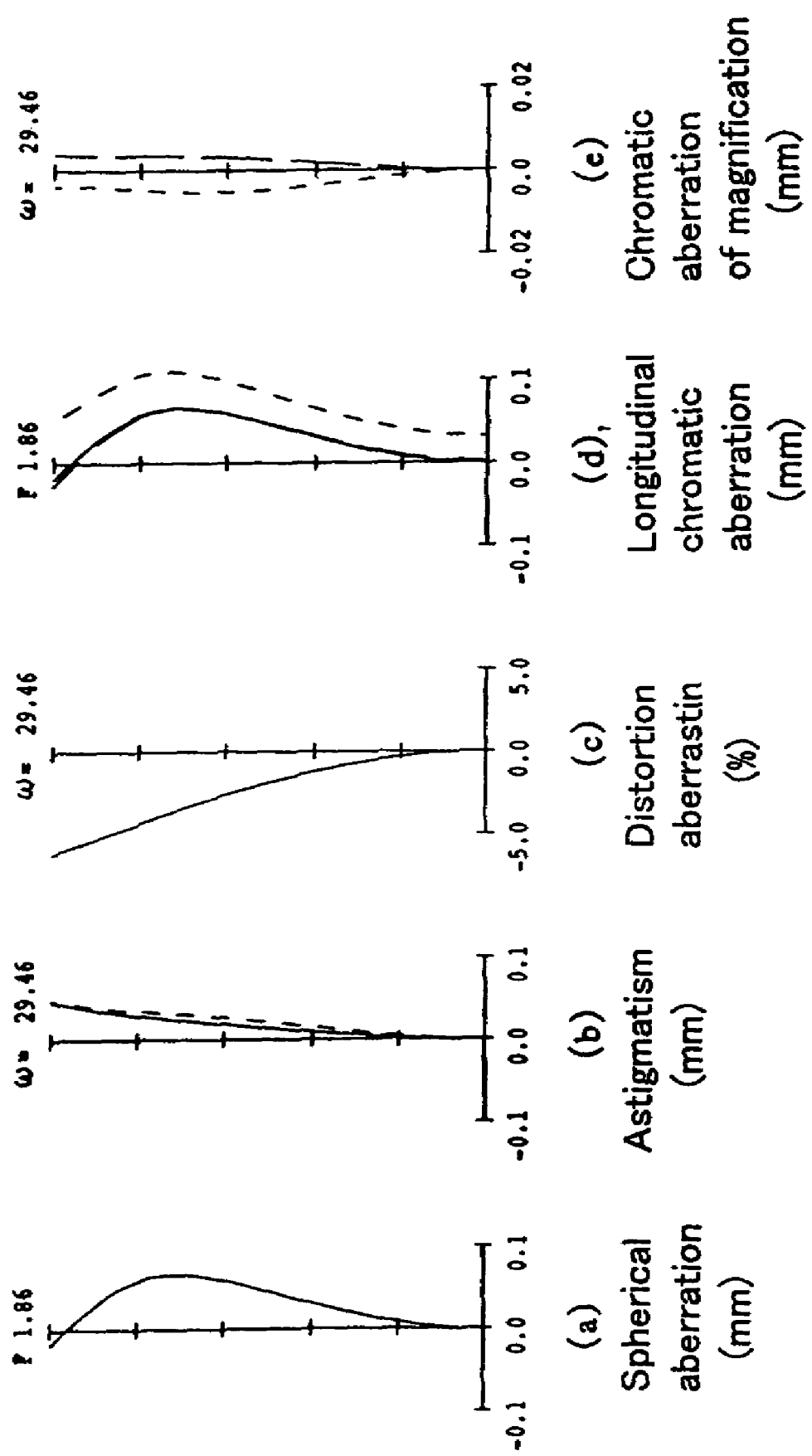
FIG. 35 illustrates various aberrations at a wide-angle end in the eighth embodiment according to the present invention.
Figure 36:
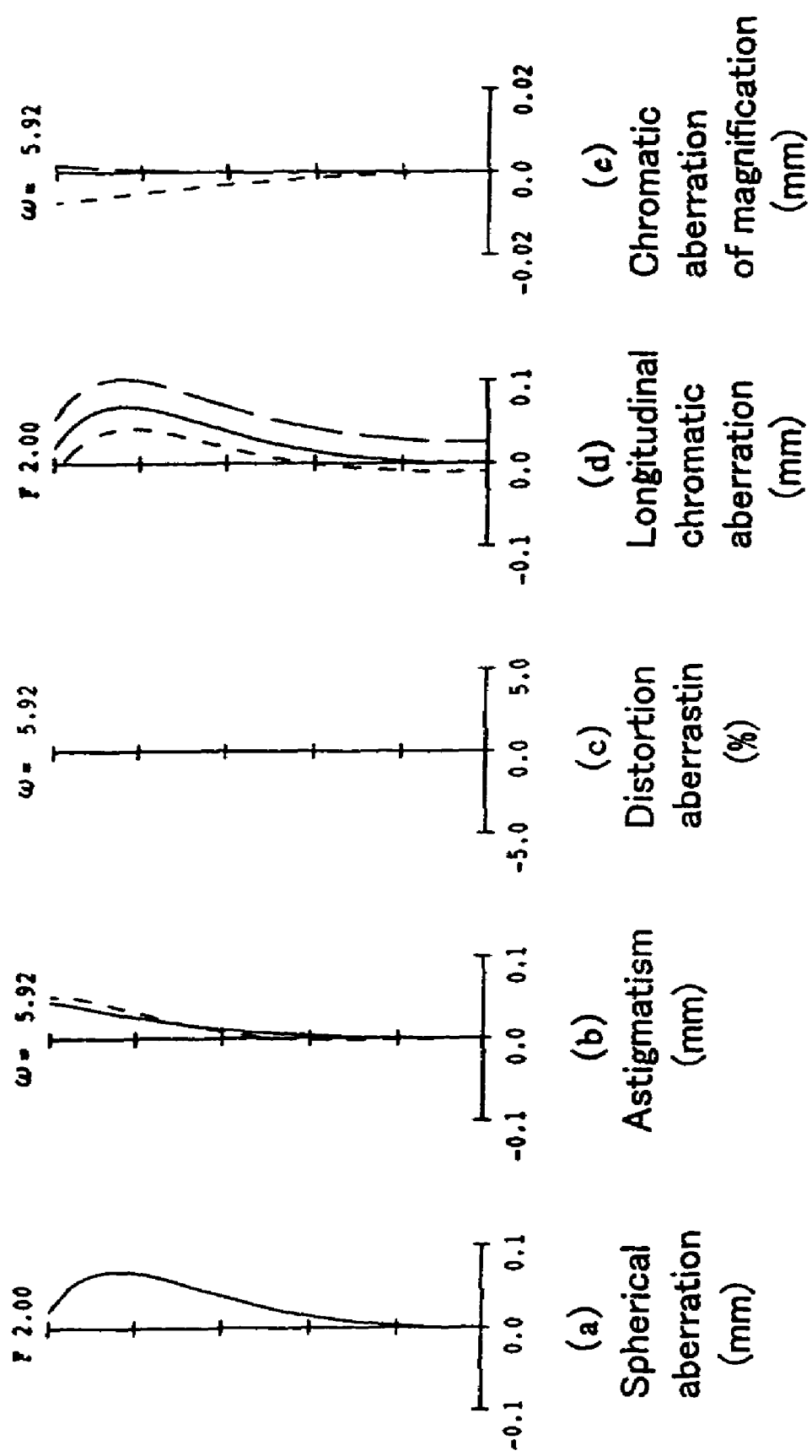
FIG. 36 illustrates various aberrations at a standard position in the eighth embodiment according to the present invention.
Figure 37:
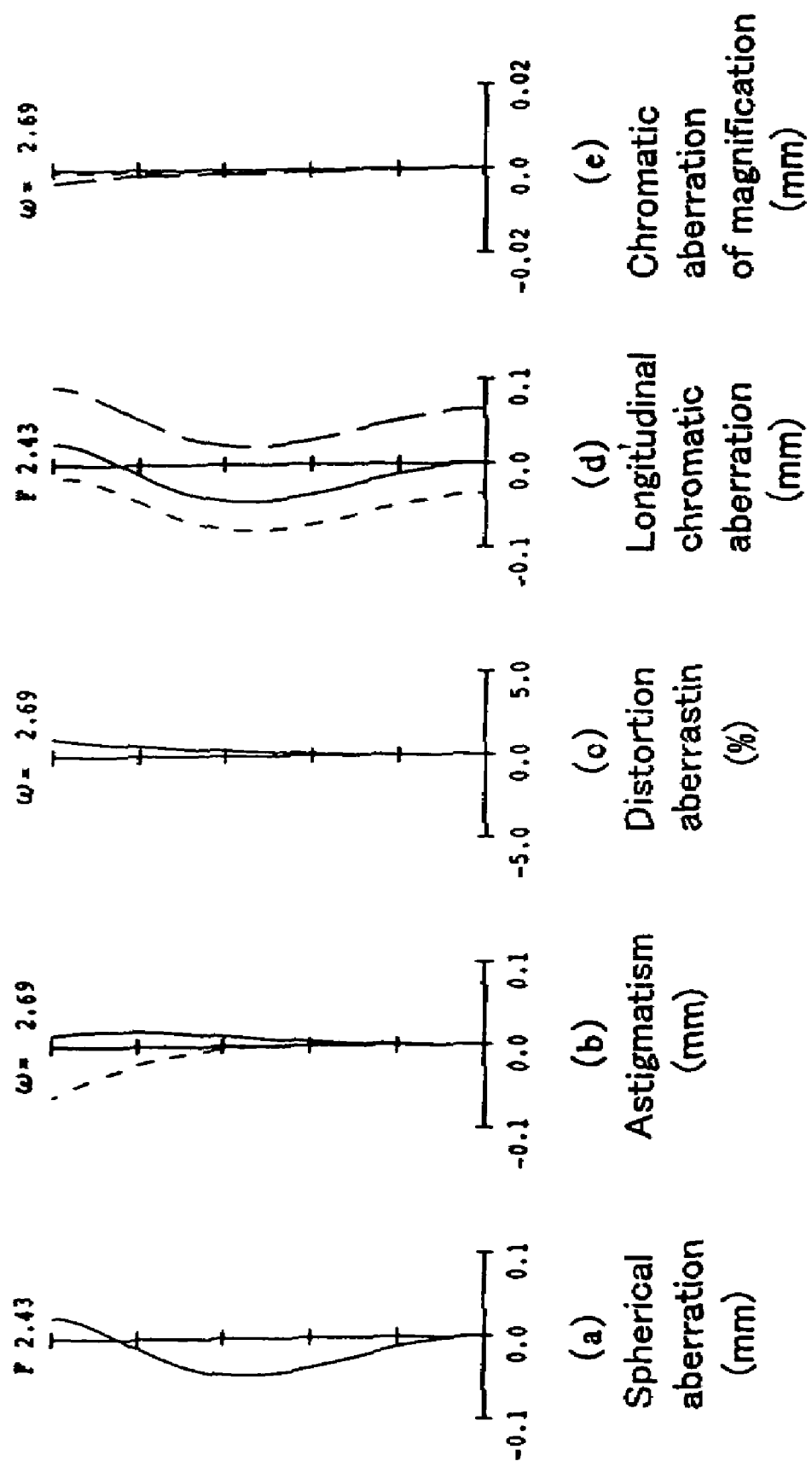
FIG. 37 illustrates various aberrations at a telephoto end in the eighth embodiment according to the present invention.
Figure 38:
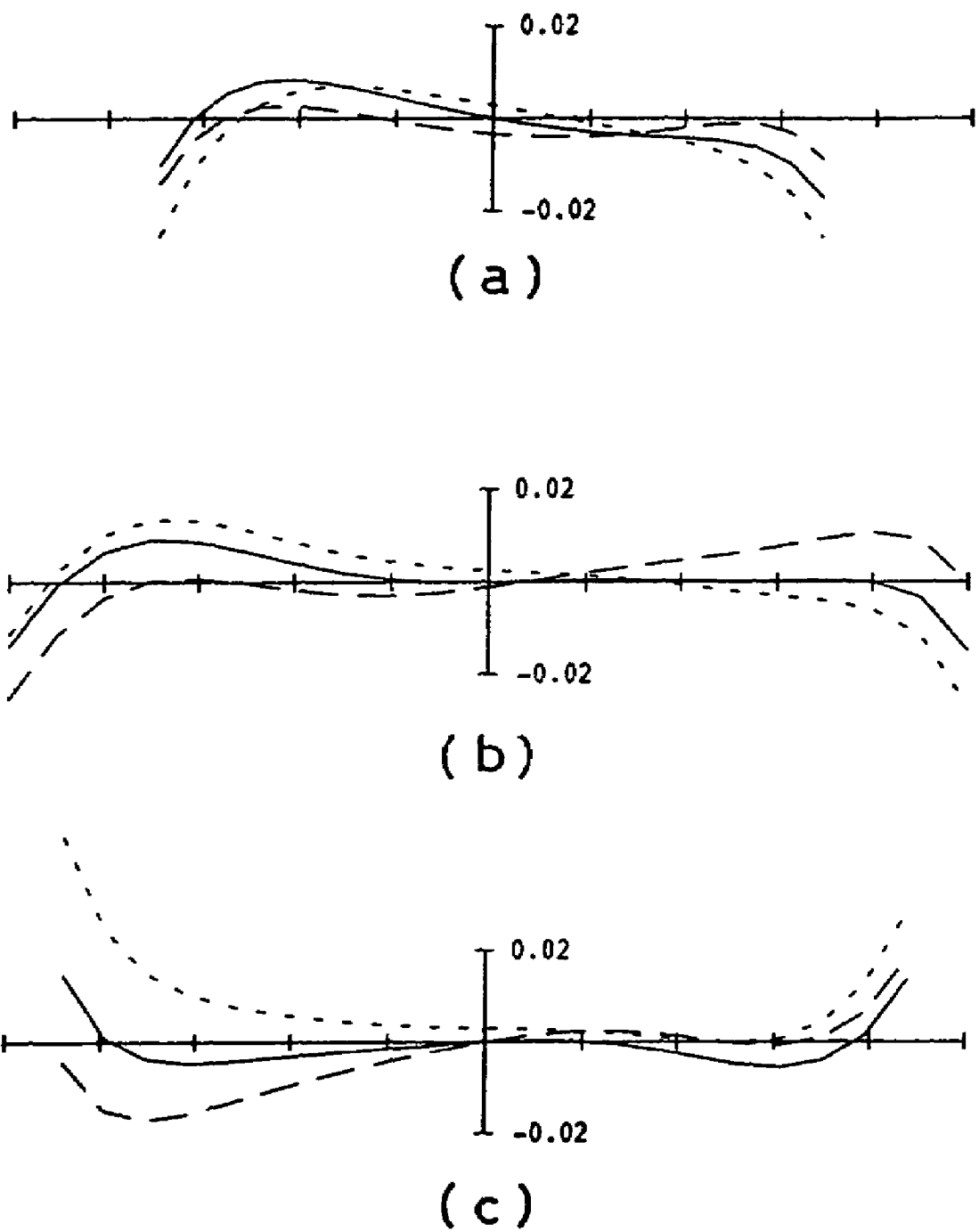
FIG. 38 illustrates various aberrations at a telephoto end in the eighth embodiment according to the present invention at a correction of 0.5 degrees.

FIGS. 35 to 37 show various aberrations at the wide-angle end, the standard position, and the telephoto end of the zoom lens shown in Table 31. FIG. 38 shows an aberration at a telephoto end at a correction of 0.5 degrees. As indicated in FIGS. 35-38, a zoom lens according to this embodiment provides a satisfactory aberration performance.

Ninth Embodiment

Figure 39:
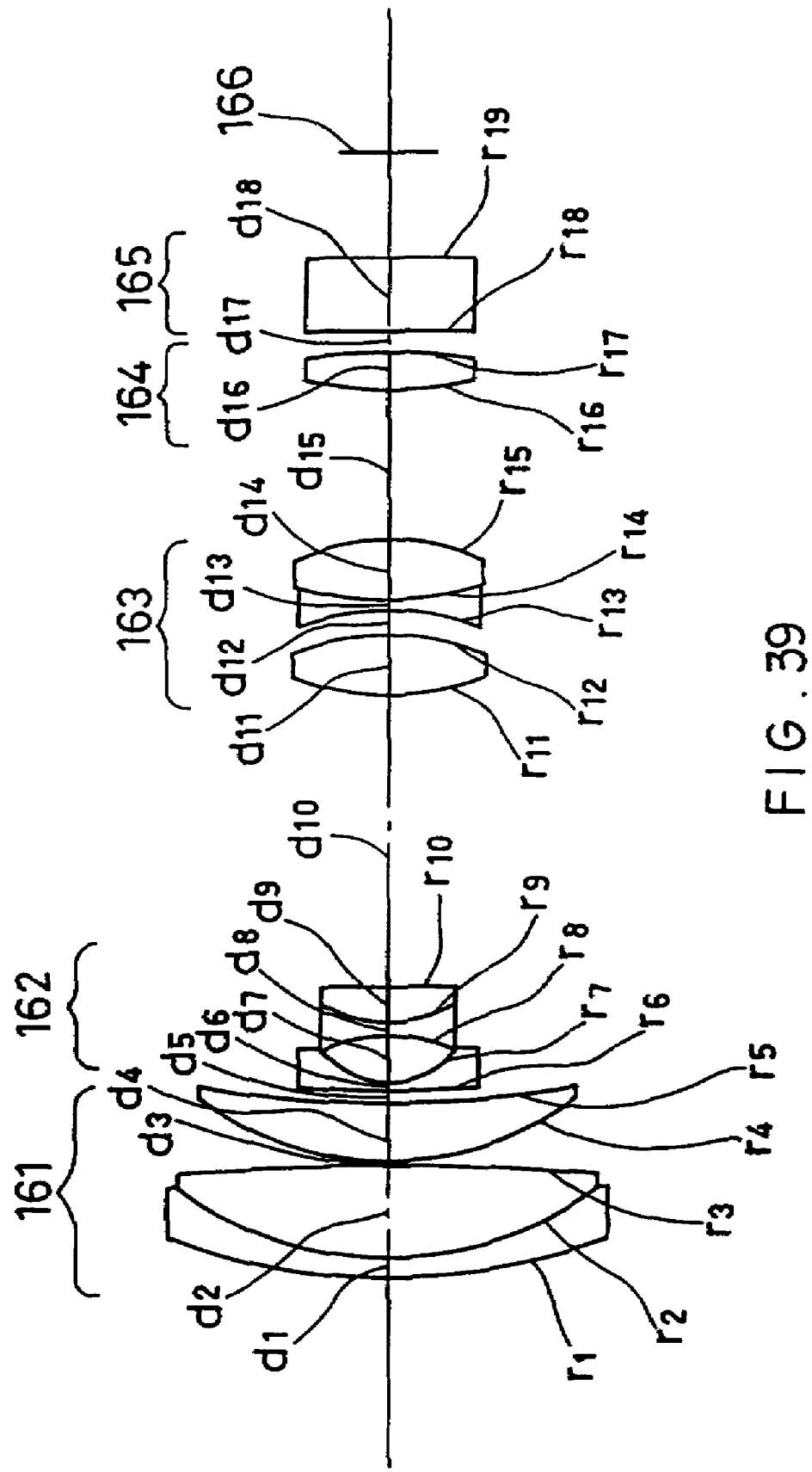
FIG. 39 is a view showing the arrangement of a zoom lens in a ninth embodiment according to the present invention.

FIG. 39 is a view showing the arrangement of a zoom lens in a ninth embodiment according to the present invention. As shown in FIG. 39, a zoom lens has a structure in which a first lens group 161, a second lens group 162, a third lens group 163, a fourth lens group 164, and a plate 165 equivalent to an optical low-pass filter and a face plate of a CCD are disposed from an object side to an image plane side in this order.

The first lens group 161 has a positive refracting power, and is fixed with respect to the image plane 166 in varying power and focusing. The second lens group 162 has a negative refracting power and varies power by moving along an optical axis. The third lens group 163 is composed of three lenses: a positive lens, a negative lens, and a positive lens disposed from the object side in this order, and two of the lenses at the image plane side compose a cemented lens of a negative lens and a positive lens.

The third lens group 163 is fixed with respect to the image plane 166 in varying power and focusing. The fourth lens group 164 is composed of one positive lens. The fourth lens group 164 moves along an optical axis so as to move an image and adjust the focus thereof at the same time in accordance with variable power.

When camera shake occurs, shake of an image is corrected by moving the third lens group 163 vertically with respect to the optical axis direction. Since the third lens group 163 is smaller in lens diameter than the first lens group 161, correction by moving the third lens group 163 will cause less load for the driving system, and electric power also can be saved.

It is preferable that the expressions (1) to (5) are satisfied as in the sixth to eighth embodiments.

Specific examples of zoom lenses according to this embodiment are shown in the following Table 37. The first and second lens groups in this embodiment are the same as shown in Table 19.

TABLE 37

| Group | Surface | r | d | n | ν |
|---|---|---|---|---|---|
| 3 | 11 | 9.762 | 3.00 | 1.51450 | 63.1 |
|  | 12 | −11.531 | 1.20 |  |  |
|  | 13 | 13.057 | 0.50 | 1.75520 | 27.5 |
|  | 14 | −8.967 | 3.10 | 1.53358 | 51.6 |
|  | 15 | −6.963 | Variable |  |  |
| 4 | 16 | 15.087 | 1.80 | 1.51450 | 63.1 |
|  | 17 | −51.013 | Variable |  |  |
| 5 | 18 | ∞ | 3.70 | 1.51633 | 64.1 |
|  | 19 | ∞ | — |  |  |

The following Table 38 shows aspherical coefficients of the zoom lens in the present example.

TABLE 38

| Surface | 8 | 11 | 12 | 17 |
|---|---|---|---|---|
| K | −3.46709 | −3.79890 | −1.61290 | −2.22934 |
| D | $-1.36790 \times 10^{-3}$ | $1.01179 \times 10^{-4}$ | $4.06410 \times 10^{-5}$ | $-1.33735 \times 10^{-5}$ |

TABLE 38-continued

| Surface | 8 | 11 | 12 | 17 |
|---|---|---|---|---|
| E | $-1.82278 \times 10^{-5}$ | $-6.62306 \times 10^{-7}$ | $8.30510 \times 10^{-7}$ | $1.01922 \times 10^{-6}$ |
| F | $-5.96614 \times 10^{-7}$ | $1.67378 \times 10^{-7}$ | $1.66830 \times 10^{-7}$ | $3.34079 \times 10^{-8}$ |

The following Table 39 shows zooming distance and shifting amount.

TABLE 39

| | Wide-angle end | Standard position | Telephoto end |
|---|---|---|---|
| f | 4.224 | 22.092 | 47.644 |
| F/NO | 1.823 | 2.112 | 2.441 |
| ω | 29.569 | 5.749 | 2.672 |
| d5 | 0.500 | 10.344 | 12.893 |
| d10 | 14.442 | 4.597 | 2.049 |
| d15 | 7.260 | 1.815 | 5.657 |
| d17 | 1.014 | 6.459 | 2.617 |
| Y | 0.030 | 0.150 | 0.332 |
| Expression (2) | 1.016 | 0.974 | 1.000 |

As shown in Table 39, the shifting amount of the third lens group satisfies the expressions (1) and (2), and thus, the optical performance deteriorates less when compared to a stationary state.

As shown in the following Table 40, the focal length f3 of the third lens group satisfies the expression (3), and thus, a small zoom lens is achieved.

TABLE 40

| Fw | f3 | Expression (3) (f3/fw) |
|---|---|---|
| 4.224 | 13.100 | 3.10 |

In this embodiment, a lens of the third group, which is disposed closest to the object, has aspherical surfaces at both sides. Especially, the local radius of curvature R10 in the vicinity of an optical axis at the object-side and the local radius of curvature R11 in an outer peripheral portion have values shown in the following Table 41, and satisfy the expression (4). As a result, the embodiment realizes excellent aberration performance not only in the stationary state but when correcting camera shake, and especially, aspherical aberration is corrected satisfactorily.

TABLE 41

| R10 | R11 | Expression (4) (R11/R10) |
|---|---|---|
| 9.762 | 10.339 | 1.06 |

Furthermore, the object-side surface of a lens included in the fourth lens group is aspherical, a local radius of curvature R20 in the vicinity of an optical axis and a local radius of curvature R21 in an outer peripheral portion have the values shown in Table 42. Moreover, the expression (5) is satisfied, and excellent aberration performance is realized not only in its stationary state but when correcting camera shake. Especially, a satisfactory coma aberration is achieved.

TABLE 42

| R20 | R21 | Expression (5) (R21/R20) |
|---|---|---|
| 15.087 | 16.164 | 1.07 |

Figure 40:
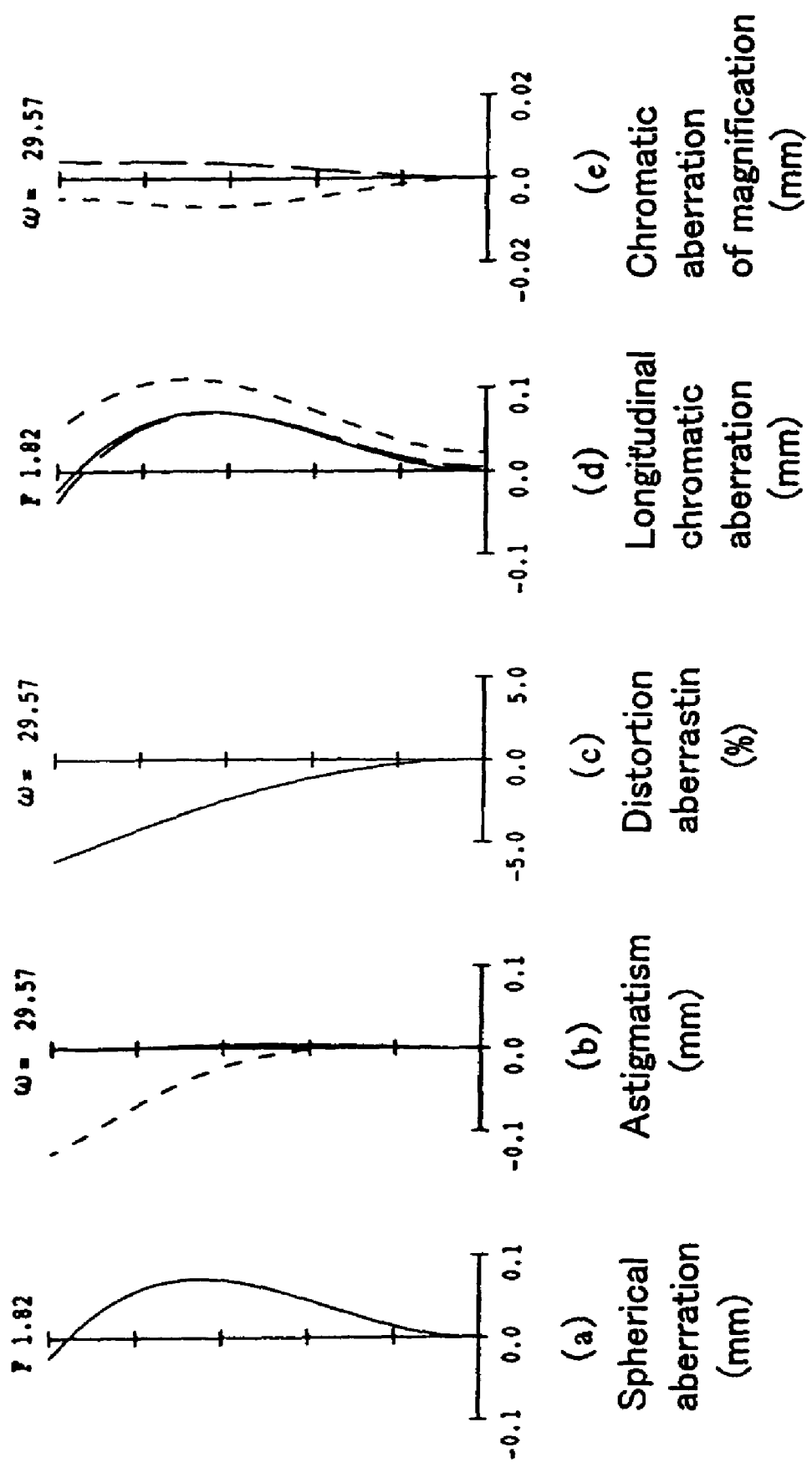
FIG. 40 illustrates various aberrations at a wide-angle end in the ninth embodiment according to the present invention.
Figure 41:
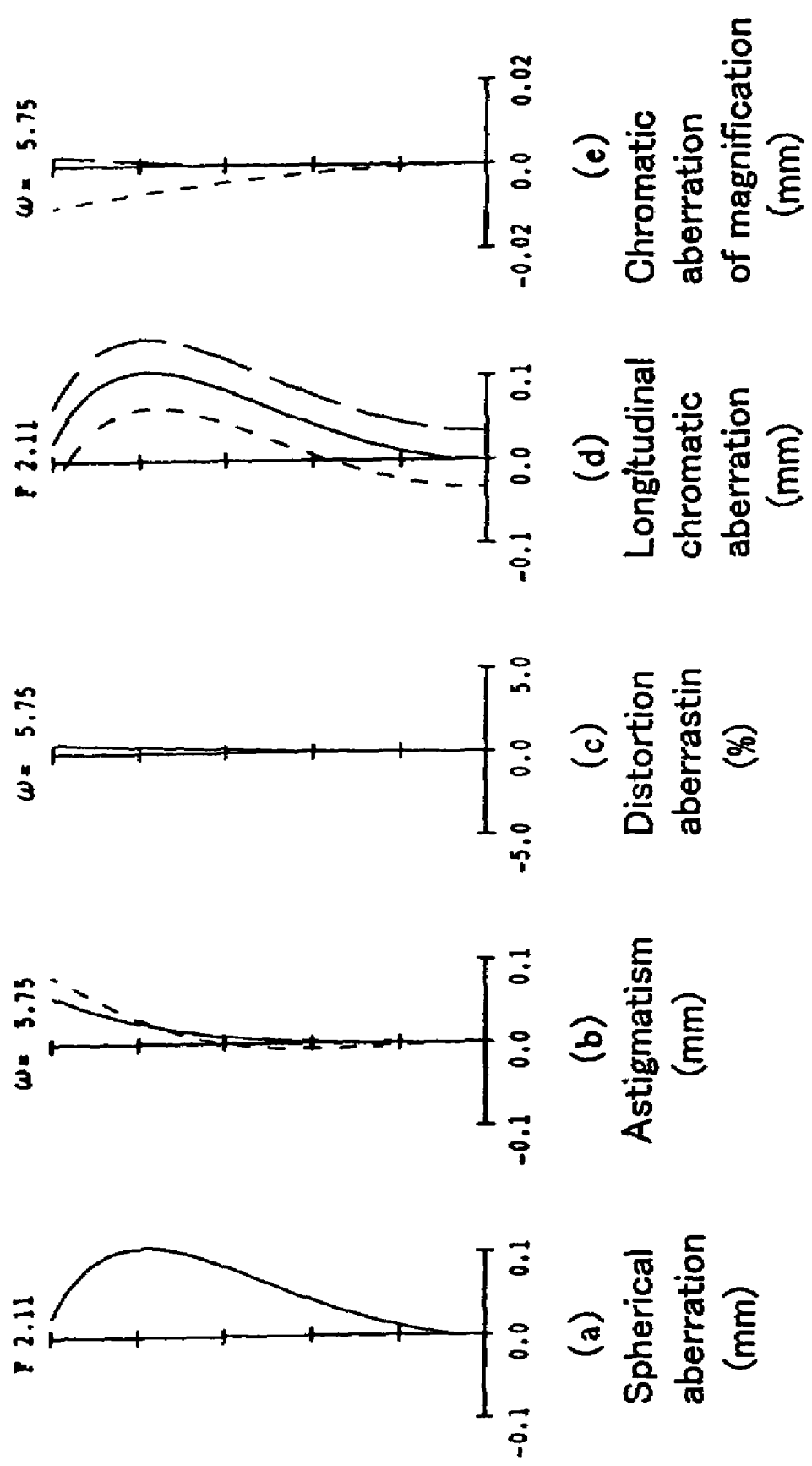
FIG. 41 illustrates various aberrations at a standard position in the ninth embodiment according to the present invention.
Figure 42:
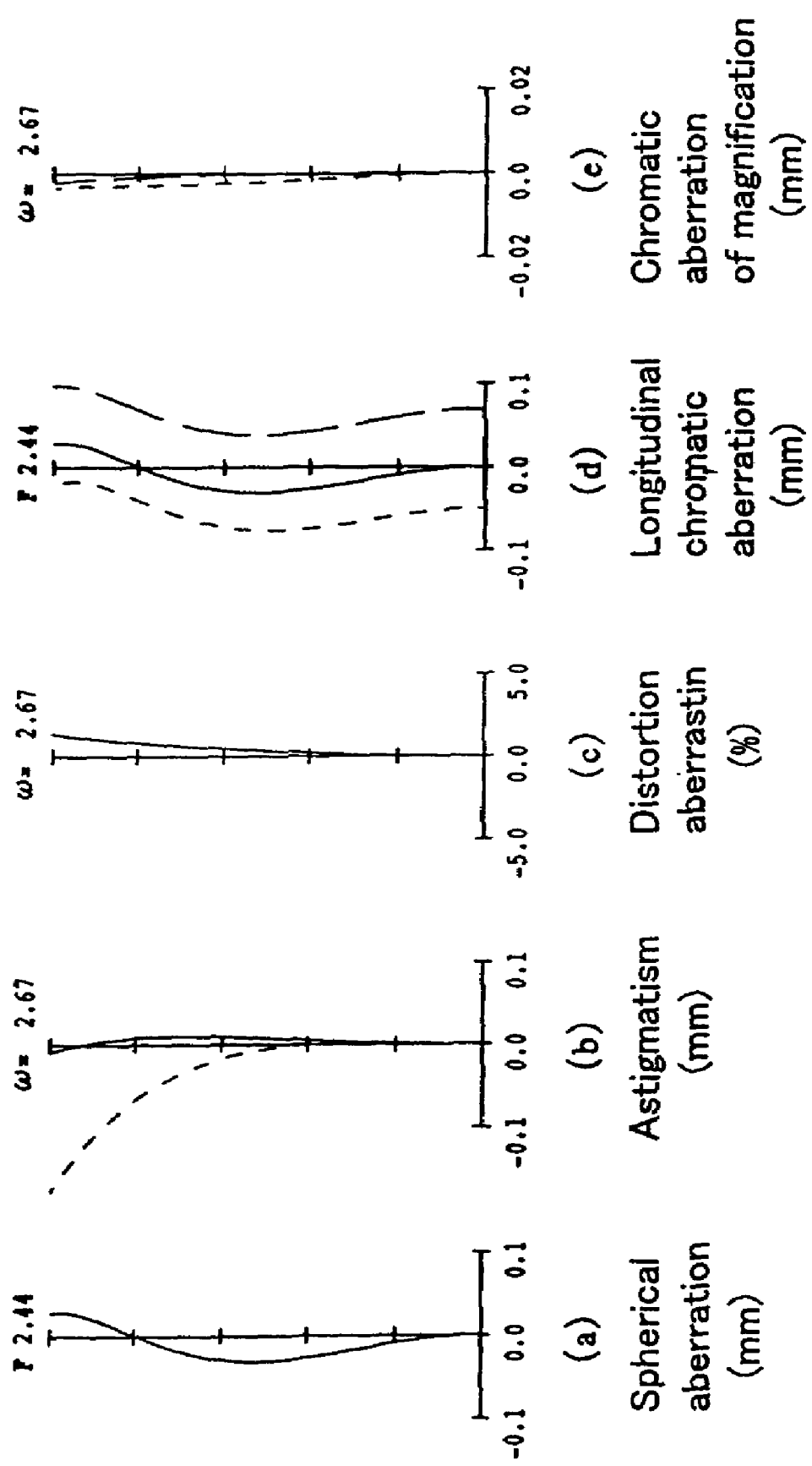
FIG. 42 illustrates various aberrations at a telephoto end in the ninth embodiment according to the present invention.
Figure 43:
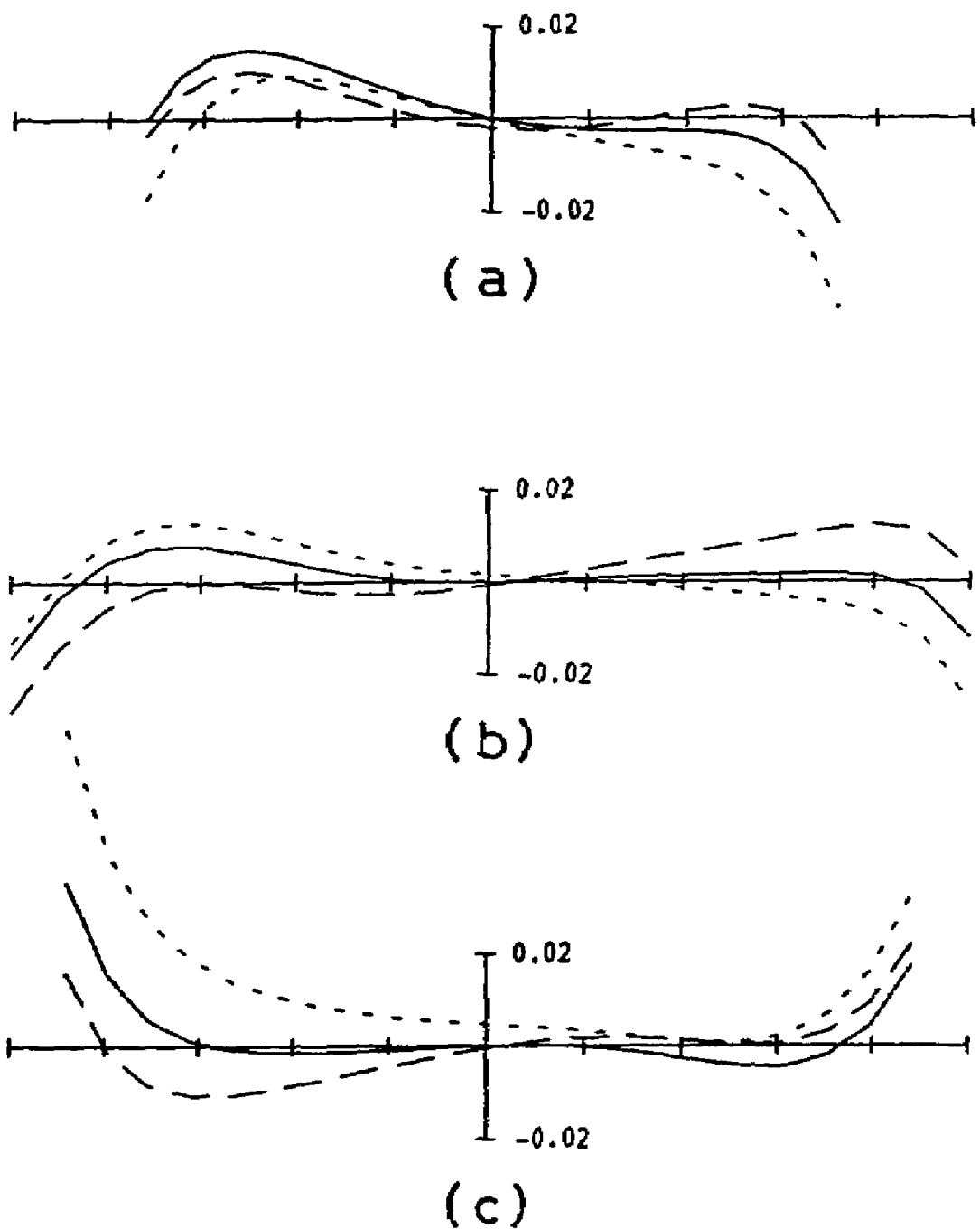
FIG. 43 illustrates various aberrations at a telephoto end in the ninth embodiment according to the present invention at a correction of 0.5 degrees.

FIGS. 40 to 42 show various aberrations at the wide-angle end, the standard position, and the telephoto end of the zoom lens shown in Table 37. FIG. 43 shows an aberration at a telephoto end at a correction of 0.5 degrees. As indicated in FIGS. 40-43, a zoom lens according to this embodiment provides satisfactory aberration performance.

Tenth Embodiment

Figure 44:
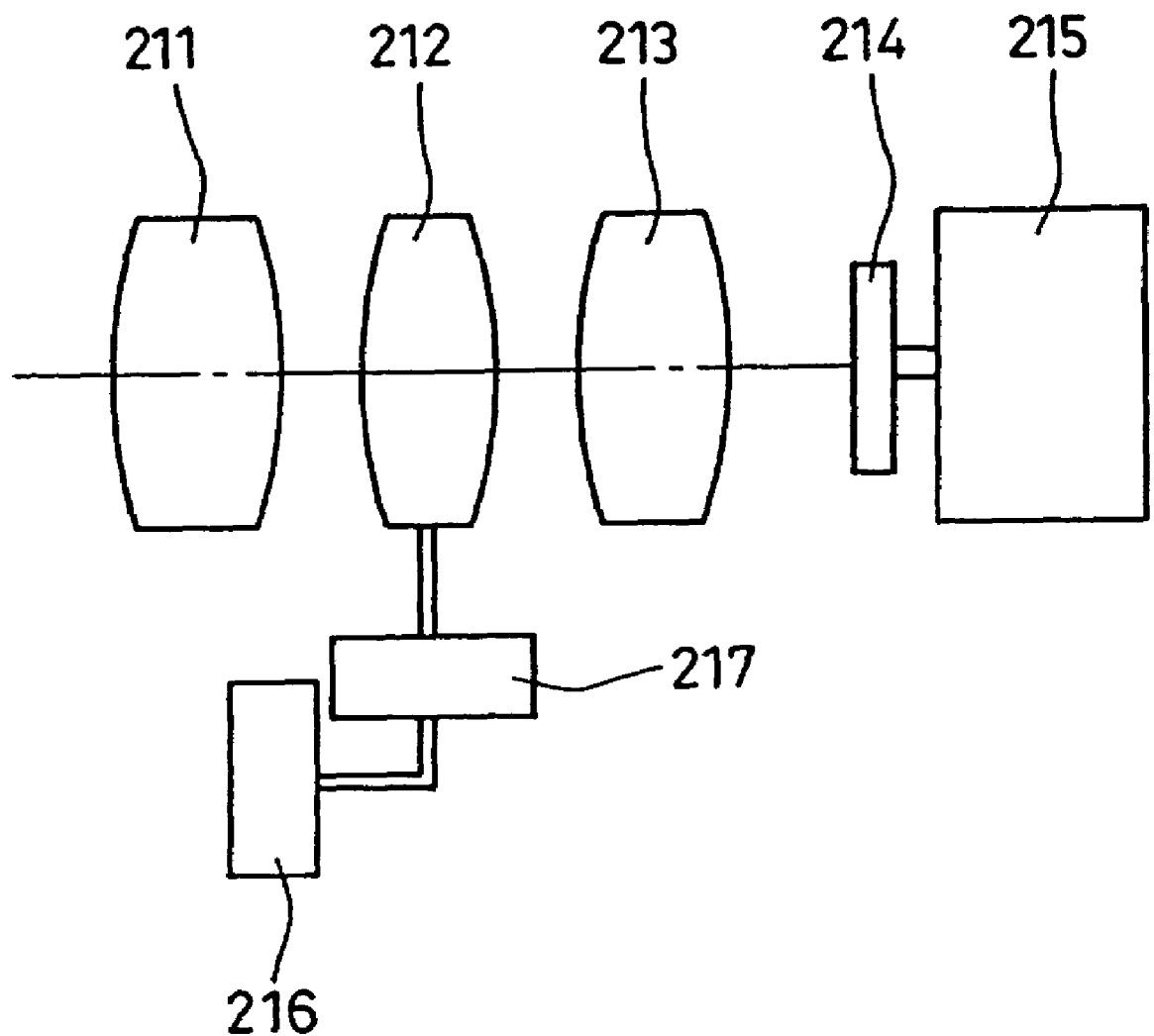
FIG. 44 is a view showing the arrangement of a video camera in a tenth embodiment according to the present invention.

FIG. 44 shows a video camera in one embodiment of the present invention. The video camera is composed of a first lens group of a zoom lens shown in the sixth to ninth embodiments, a second lens group 211, a third lens group 212, a fourth lens group 213, an imager 214, a signal processing circuit 215, a camera-shake detecting system 216, and a driving system 217 for correcting camera shake. As a result, a small video camera having an excellent function for correcting camera shake can be provided.

Eleventh Embodiment

Figure 45:
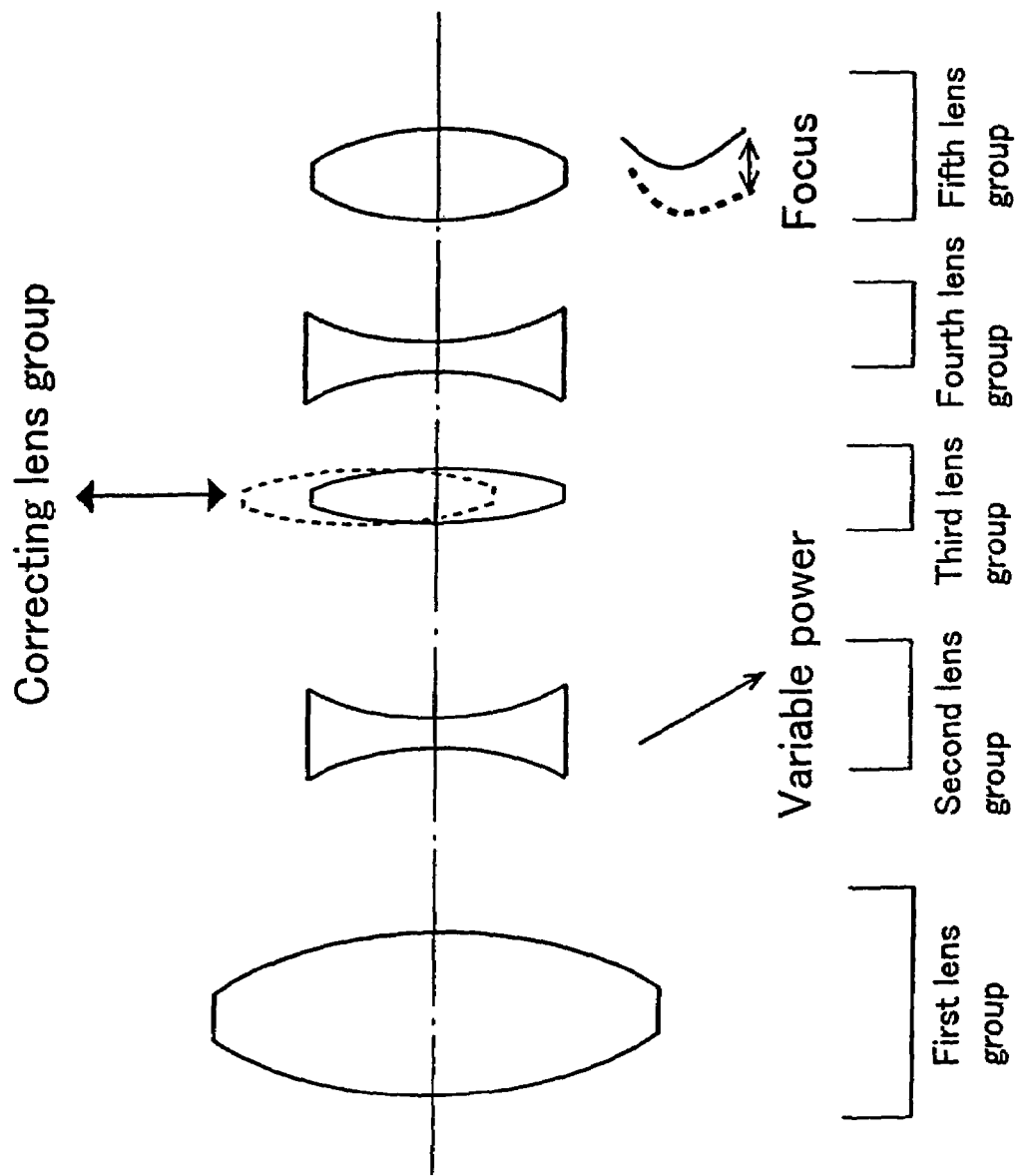
FIG. 45 is a view showing the arrangement of a zoom lens in an eleventh embodiment according to the present invention.

FIG. 45 is a view to show a basic structure of a zoom lens having a function for correcting camera shake in an eleventh embodiment. As shown in FIG. 45, a zoom lens in this embodiment comprises a first lens group having a positive refracting power and being fixed with respect to an image plane; a second lens group having a negative refracting power and varying power by moving along an optical axis; a third lens group having a positive refracting power and being fixed with respect to the image plane; a fourth lens group having a negative refracting power and being fixed with respect to the image plane; and a fifth lens group having a positive refracting power and moving along an optical axis so as to keep the image plane varied by the a shift of the second lens group and an object at a predetermined position from a reference surface, and the elements are disposed from an object side (left side in FIG. 45) to an image plane side (right side in FIG. 45) in this order. When camera shake occurs, shake of an image is corrected by shifting the third lens group having a positive refracting power in a direction vertical to the optical axis.

Figure 46:
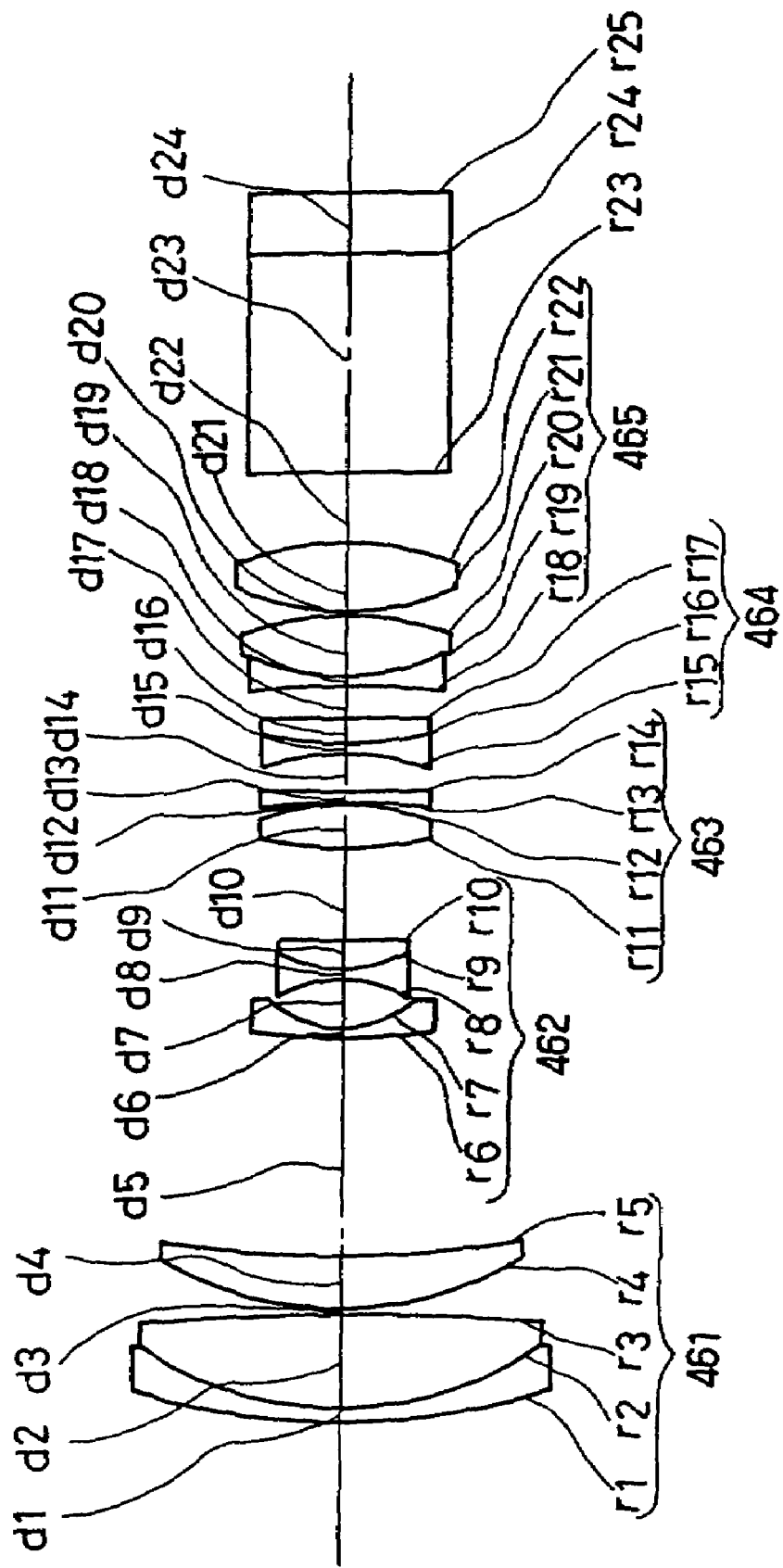
FIG. 46 is a view specifically showing the arrangement of the zoom lens in the eleventh embodiment according to the present invention.

FIG. 46 shows a zoom lens having basic elements as shown in FIG. 45. The zoom lens has a structure in which a first lens group 461, a second lens group 462, a third lens group 463, a fourth lens group 464, and a fifth lens group 465 are disposed from an object side to an image plane side in this order.

The first lens group 461 has a positive refracting power, and is fixed with respect to the image plane in varying power and focusing. The second lens group 462 has a negative refracting power and varies power by moving along an optical axis. The third lens group 463 is composed of a positive lens and a negative lens, and has a positive refracting power as a whole.

The fourth lens group 464 is composed of a negative lens and a positive lens, and has a negative refracting power as a whole. It is fixed with respect to the image plane in varying power and focusing. The fifth lens group 465 has a positive refracting power and moves along an optical axis so as to move an image and adjust the focus thereof at the same time in accordance with variable power. When camera shake occurs, shake of an image is corrected by moving the third lens group 463 vertically with respect to the optical axis.

As described in this embodiment, the third lens group 463 having a positive refracting power and the fourth lens group 464 having a negative refracting power are combined in order to decrease the shifting amount of the shift lens group when correcting camera shake, and to extend the back focus. Especially a long back focus is easy to obtain since a lens group having a negative refracting power is disposed at the image plane side.

Moreover, the performance when shifting the lenses can be improved, and downsizing and high performance are obtainable by applying at least one aspherical surface to any of the lenses of the third group.

It is preferable that the following expressions (6) and (7) are satisfied when ν31 is Abbe's number of one lens of the third lens group, and ν32 is Abbe's number of the remaining lens of the third group; ν41 is Abbe's number of one lens of the fourth lens group, and ν42 is Abbe's number of the remaining lens of the fourth group.

$$|\nu 31 - \nu 32| > 25 \tag{6}$$

$$|\nu 41 - \nu 42| > 25 \tag{7}$$

When the expressions (6) and (7) are satisfied, deterioration in chromatic aberration of magnification when correcting camera shake can be reduced. Chromatic aberration of magnification occurs when correcting camera shake due to lens-shifting, however, deterioration of the chromatic aberration of magnification can be reduced even when shifting a lens since a sufficient effect is obtainable for achromatism by setting differences in the Abbe's number as mentioned above for the respective lens groups.

It is preferable that the following expression (8) is satisfied when the lens for correcting camera shake has an aspherical surface at the object side, and rS1 is a local radius of curvature for a diameter occupying 10% of lens effective diameter, and rS9 is a local radius of curvature for a diameter occupying 90% of lens effective diameter.

$$0.01 < rS1/rS9 < 2.00 \tag{8}$$

The expression (8) is a conditional expression to determine the aspherical amount, and it indicates a condition to obtain sufficient aberration performance to realize high resolution for a zoom lens. When the value exceeds the upper limit in the Expression (8), the correcting amount for the spherical aberration is excessively decreased. Moreover, coma flares will occur easily when moving the lens. When the value fills below the lower limit, correction amount of the spherical aberration is excessively increased, and sufficient aberration performance cannot be obtained. Here, the local radius of curvature C is obtainable through an algebraic calculation based on aspherical coefficients figured out from the sag amount of the plane shape. It is obtainable by the following equations (C) and (D).

$$SAG = \frac{H^2/R}{1+\sqrt{1-(1+K)(H/R)^2}} + D \cdot H^4 + E \cdot H^6 + F \cdot H^8 + G \cdot H^{10} \tag{C}$$

$$C = \frac{\left(1+\left(\frac{dSAG}{dH}\right)^2\right)\sqrt{1+\left(\frac{dSAG}{dH}\right)^2}}{\frac{d^2SAG}{dH^2}} \tag{D}$$

SAG: a distance from the apex on the aspherical surface to a point on the same aspherical surface having a height H from the optical axis
H: a height from an optical axis
R is a radius of curvature at the apex on the aspherical surface
K: a conical constant
D, E, F, G: aspherical coefficients.

It is also preferable that the correcting lens satisfies the following Expression (9), when f3 is a focal length of the correcting lens and f34 is a composite focal length of the third and fourth lens groups.

$$0.40 < |f3/f34| < 0.85 \tag{9}$$

The expression (9) is a conditional expression to define the focal length of a lens used for correcting camera shake. When the value falls below the lower limit in the expression (9), the correcting lens will have excessive power, deterioration in the aberration performance is increased and assembling tolerance in manufacturing will be strict. When the value exceeds the upper limit, the shifting amount of the lens when correcting camera shake is increased, and the lens diameter also is increased. This is not favorable for downsizing.

Preferably, the zoom lens satisfies the following expression (10) when fw is a focal length of the entire system at the wide-angle end, and BF is a distance between the final surface of the lens and the image plane in the air.

$$2.0 < BF/fw < 5.0 \tag{10}$$

The expression (10) is a conditional expression to provide a zoom lens having a long back focus, for example, a zoom lens using three imaging devices. When the value falls below the lower limit, a color separation optical system with sufficient length to conduct a sufficient color separation cannot be inserted. When it exceeds the upper limit, the back focus becomes longer than required, and it will be an obstacle for downsizing.

Preferably, the following expressions (11) to (14) are satisfied when fw is a focal length of the entire system at a wide-angle end, fi (i=1-5) is the focal length of the i-th lens group, and f34 is a composite focal length of the third and fourth focal length.

$$5.0 < f1/fw < 8.0 \tag{11}$$

$$0.5 < |f2|/fw < 1.6 \tag{12}$$

$$4.0 < f34/fw < 9.5 \tag{13}$$

$$2.0 < f5/fw < 5.0 \tag{14}$$

The expression (11) indicates a condition relating to the refracting power of the first lens group. Since the first lens group has excessive refracting power when the value falls below the lower limit, correction of spherical aberration at the long focal point side becomes difficult. When it exceeds the upper limit, the lens will be long and thus, a compact zoom lens cannot be obtained.

The expression (12) indicates a condition relating to the refracting power of the second lens group. The zoom lens can be made compact when the value falls below the lower limit, however, the Petzval's sum of the entire system will be increased negatively and distortion of the image plane cannot be corrected. The aberration can be corrected easily when the value exceeds the upper limit, however, the variable power system becomes long and the entire system cannot be downsized.

The expression (13) indicates a condition relating to the refracting power of the third lens group. When the value falls below the lower limit, the third lens group will have excessive refracting power, and thus, correction of the spherical aberration will be difficult. When the value exceeds the upper limit, the composite system of the first to third lens group becomes a divergent system. In such a zoom lens, the outer diameter of the lenses of the fourth group positioned behind the first to third groups cannot be decreased, and Petzval's sum of the entire system cannot be decreased.

The expression (14) indicates a condition relating to the refracting power of the fourth lens group. When the value falls below the lower limit, the coverage of an image will be decreased. For obtaining a desired coverage, the lens diameter of the first group should be increased, and thus, this will be an obstacle for downsizing and weight reduction. When the value exceeds the upper limit, the aberration can be corrected easily. However, the shifting amount of the fourth lens group is increased at a close-range shooting, and thus, the entire system cannot be downsized. Moreover, it is difficult to correct unbalanced off-axis aberrations between short-range and long-range shootings.

TABLE 43

| Group | Surface | r | d | n | ν |
|---|---|---|---|---|---|
| 1 | 1 | 43.712 | 0.90 | 1.80518 | 25.4 |
|   | 2 | 22.377 | 6.00 | 1.60311 | 60.7 |
|   | 3 | −147.260 | 0.20 |   |   |
|   | 4 | 20.439 | 3.50 | 1.60311 | 60.7 |
|   | 5 | 64.129 | Variable |   |   |
| 2 | 6 | 47.371 | 0.60 | 1.77250 | 49.6 |
|   | 7 | 6.608 | 3.10 |   |   |
|   | 8 | −8.756 | 0.80 | 1.66547 | 55.2 |
|   | 9 | 7.541 | 1.80 | 1.84666 | 23.9 |
|   | 10 | 61.377 | Variable |   |   |
| 3 | 11 | 18.722 | 2.90 | 1.60602 | 57.5 |
|   | 12 | −14.771 | 0.10 |   |   |
|   | 13 | −61.576 | 0.70 | 1.80518 | 25.4 |
|   | 14 | 82.921 | 2.45 |   |   |
| 4 | 15 | −15.486 | 0.70 | 1.51633 | 64.1 |
|   | 16 | 21.635 | 1.65 | 1.80518 | 25.4 |
|   | 17 | 246.689 | Variable |   |   |
| 5 | 18 | −90.847 | 0.60 | 1.84666 | 23.9 |
|   | 19 | 12.912 | 4.10 | 1.51633 | 64.1 |
|   | 20 | −18.441 | 0.10 |   |   |
|   | 21 | 15.386 | 4.50 | 1.60602 | 57.5 |
|   | 22 | −15.967 | Variable |   |   |
| 6 | 23 | ∞ | 14.00 | 1.58913 | 61.2 |
|   | 24 | ∞ | 3.90 | 1.51633 | 64.1 |
|   | 25 | ∞ | — |   |   |

The following Table 44 shows aspherical coefficients.

TABLE 44

| Surface | 8 | 11 | 12 | 21 | 22 |
|---|---|---|---|---|---|
| K | $4.65875 \times 10^{-1}$ | $1.42789 \times 10^{-1}$ | $1.14334 \times 10^{-1}$ | $-1.25651$ | $-6.94184 \times 10^{-1}$ |
| D | $9.66131 \times 10^{-5}$ | $-9.38804 \times 10^{-5}$ | $5.30815 \times 10^{-5}$ | $-1.94414 \times 10^{-5}$ | $2.31291 \times 10^{-5}$ |
| E | $-7.08756 \times 10^{-6}$ | $6.02667 \times 10^{-6}$ | $5.05125 \times 10^{-6}$ | $5.49746 \times 10^{-7}$ | $2.50059 \times 10^{-7}$ |
| F | $1.91335 \times 10^{-7}$ | $-2.97812 \times 10^{-7}$ | $-1.94202 \times 10^{-7}$ | $-8.03971 \times 10^{-9}$ | $-6.03441 \times 10^{-9}$ |
| G | 0.00000 | $2.28611 \times 10^{-9}$ | 0.00000 | 0.00000 | 0.00000 |

It is also preferable that the following expressions (15) and (16) are satisfied when Y is a shifting amount of a correcting lens at a focal length f of the entire system for correcting camera shake, Yt is a shifting amount of the correcting lens at a telephoto end, and ft is a focal length of the telephoto end.

$$Yt > Y \quad (15)$$

$$(Y/Yt)/(f/ft) < 1.5 \quad (16)$$

The expressions (15) and (16) relate to the shifting amount of a correcting lens. For a zoom lens, the shifting amount of the correcting lens is large as the zoom ratio is great, while the same amount is decreased when the zoom ratio is small when the correcting angle is constant within a whole zooming range. When the value exceeds the upper limits of the expressions (15) and (16), overcorrection occurs and the optical performance will deteriorate further.

Specific examples for this embodiment are shown in the following Table 43.

The following Table 45 shows an air distance (mm) that is varied by zooming in the case where an object is positioned 2 m away from the tip end of the lens. At the standard position magnification of the second lens group becomes −1 times.

TABLE 45

|   | Wide-angle end | Standard position | Telephoto end |
|---|---|---|---|
| f | 4.166 | 23.073 | 48.386 |
| F/NO | 1.680 | 1.680 | 1.886 |
| 2ω | 60.226 | 11.023 | 4.354 |
| d5 | 0.700 | 15.560 | 18.886 |
| d10 | 19.216 | 4.356 | 1.030 |
| d14 | 5.331 | 1.967 | 4.258 |
| d19 | 1.099 | 4.463 | 2.172 |

Figure 47:
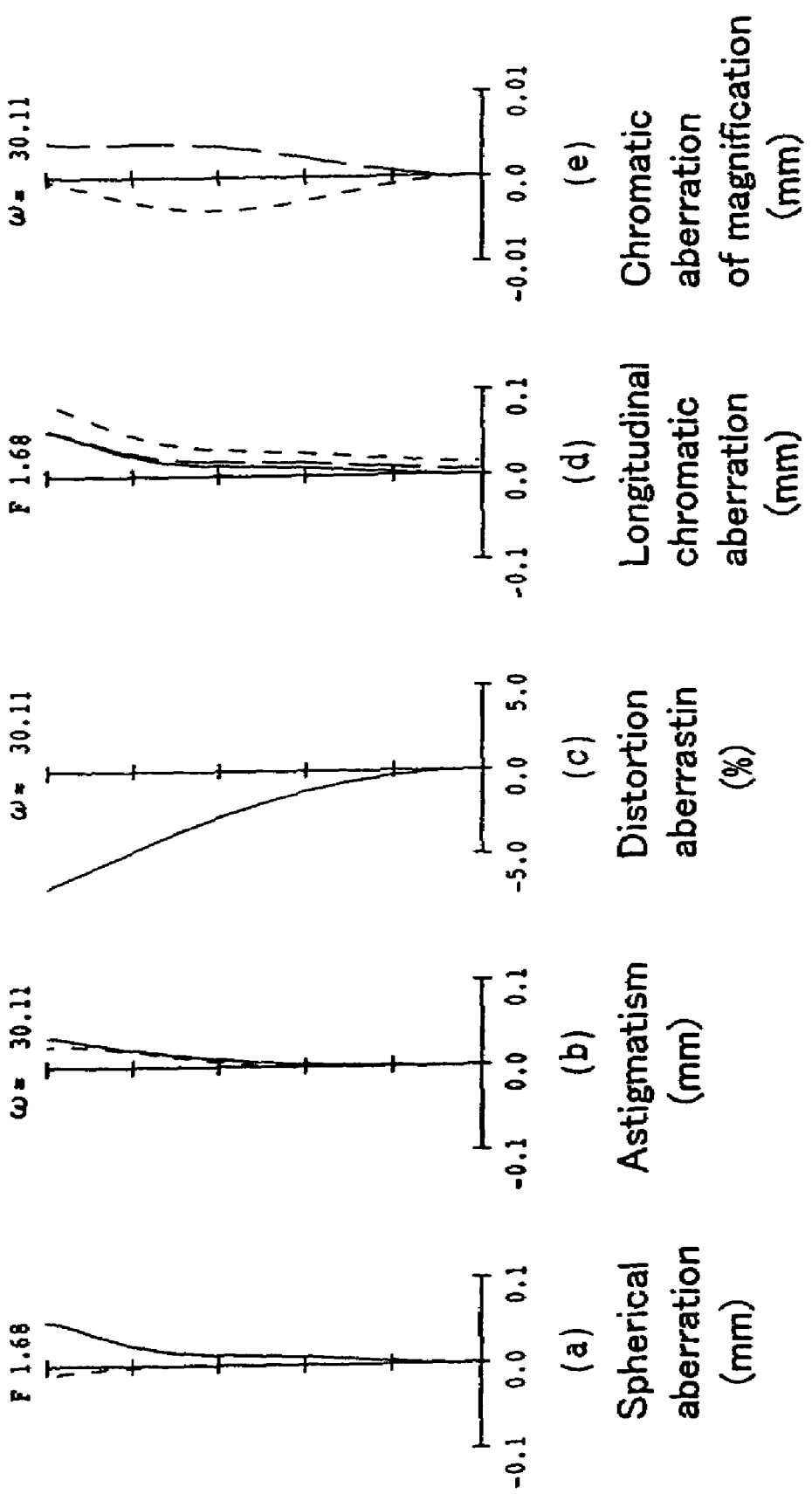
FIG. 47 illustrates various aberrations at a wide-angle end in the eleventh embodiment according to the present invention.
Figure 48:
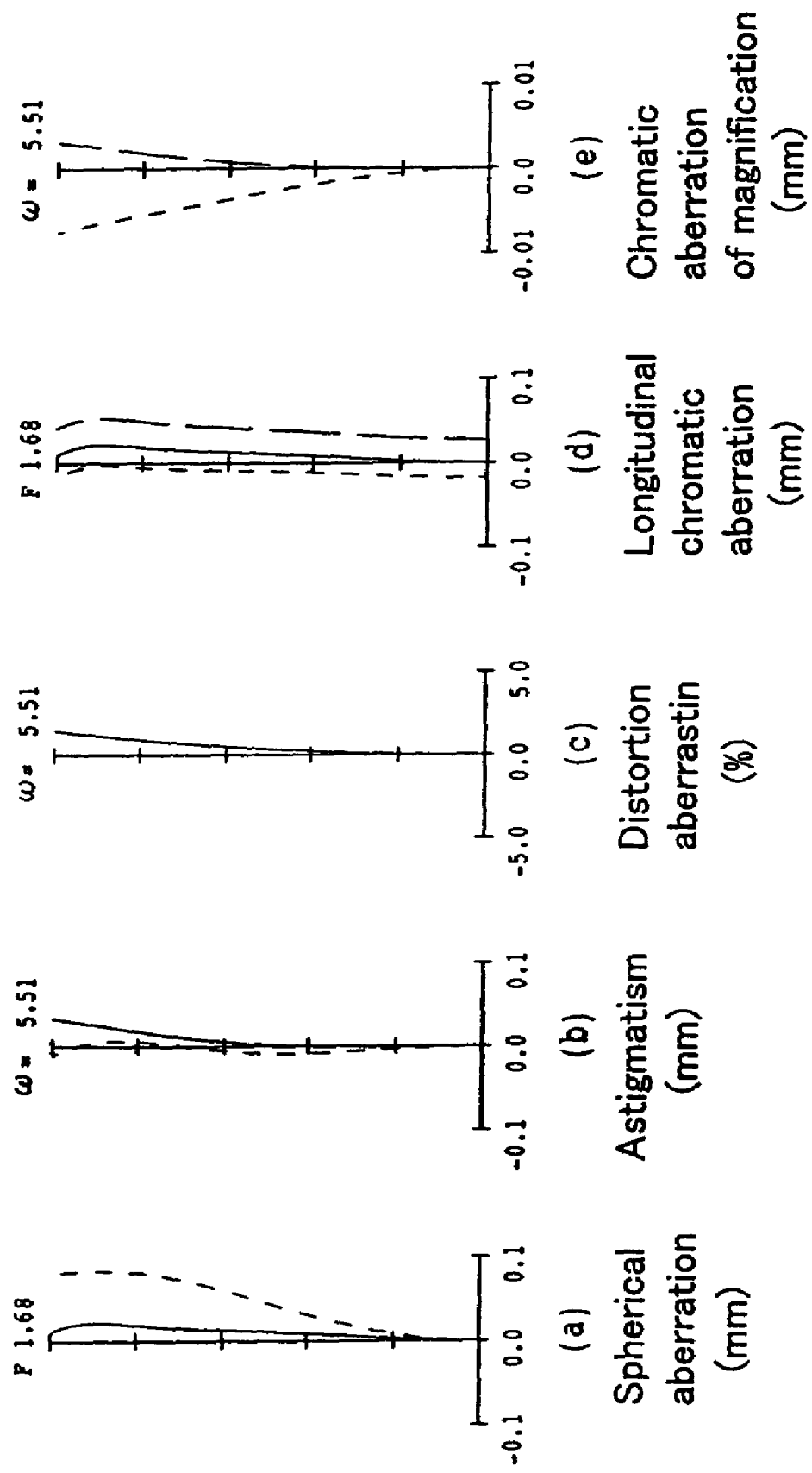
FIG. 48 illustrates various aberrations at a standard position in the eleventh embodiment according to the present invention.
Figure 49:
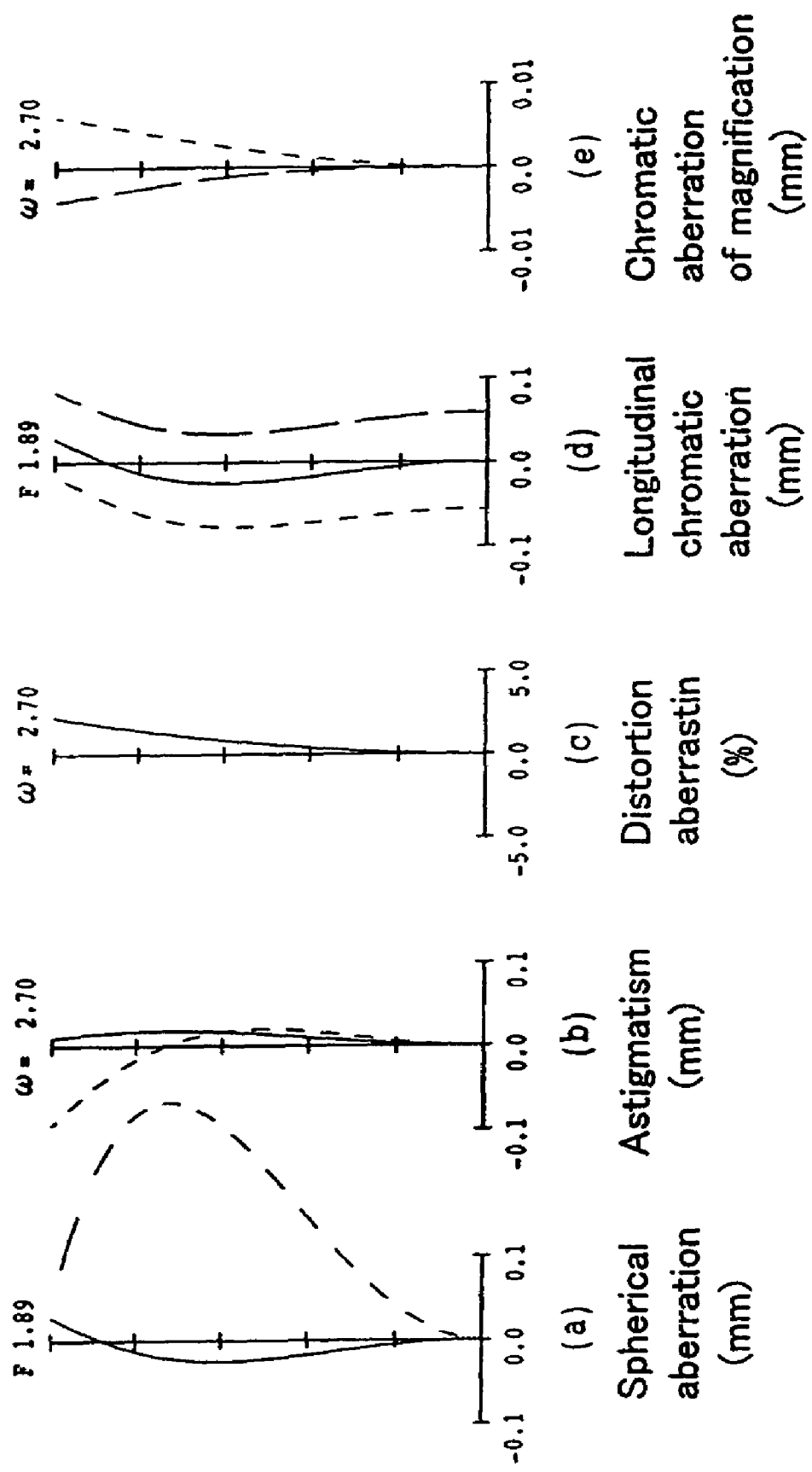
FIG. 49 illustrates various aberrations at a telephoto end in the eleventh embodiment according to the present invention.

FIGS. 47-49 illustrate various aberrations at a wide-angle end, at a standard position and at a telephoto end of the zoom lens. The values of the expressions (6) to (14) are as follows.

|v31−v32|=32.3

|v41−v42|=38.7 rS1/rS9=0.52

|f3/f34|=0.64

BF/fw=3.34

|f1|/fw=7.19

|f2|/fw=1.28 f34/fw 7.61 f5/fw=3.14

As clearly shown in the aberrations of FIGS. 47-49, this example provides sufficient performance to correct aberration for obtaining high resolution of a zoom lens.

Furthermore, this example is useful in preventing deterioration of the optical performance since the expressions (15) and (16) are satisfied.

Other specific examples according to this embodiment are shown in the following Table 46.

TABLE 46

| Group | Surface | r | d | n | v |
|---|---|---|---|---|---|
| 1 | 1 | 45.790 | 0.90 | 1.80518 | 25.4 |
|  | 2 | 22.855 | 5.80 | 1.60311 | 60.7 |
|  | 3 | −137.451 | 0.15 |  |  |
|  | 4 | 20.654 | 3.15 | 1.60311 | 60.7 |
|  | 5 | 66.413 | Variable |  |  |
| 2 | 6 | 49.547 | 0.60 | 1.51633 | 64.1 |
|  | 7 | 5.943 | 3.65 |  |  |
|  | 8 | −8.260 | 0.80 | 1.66547 | 55.2 |
|  | 9 | 7.608 | 2.01 | 1.84666 | 23.9 |
|  | 10 | 31.856 | Variable |  |  |
| 3 | 11 | 20.308 | 2.80 | 1.51450 | 63.1 |
|  | 12 | −11.071 | 0.10 |  |  |
|  | 13 | −32.200 | 0.70 | 1.80518 | 25.4 |
|  | 14 | −179.621 | 2.45 |  |  |
| 4 | 15 | −11.566 | 0.70 | 1.51450 | 63.1 |
|  | 16 | 18.674 | 1.50 | 1.80518 | 25.4 |
|  | 17 | −382.316 | Variable |  |  |
| 5 | 18 | 139.563 | 0.60 | 1.84666 | 23.9 |
|  | 19 | 11.702 | 3.70 | 1.51633 | 64.1 |
|  | 20 | −27.808 | 0.10 |  |  |
|  | 21 | 13.425 | 4.90 | 1.51450 | 63.1 |
|  | 22 | −12.590 | Variable |  |  |
| 6 | 23 | ∞ | 14.00 | 1.58913 | 61.2 |
|  | 24 | ∞ | 3.90 | 1.51633 | 64.1 |
|  | 25 | ∞ | — |  |  |

The following Table 47 shows aspherical coefficients.

TABLE 47

| Surface | 8 | 11 | 12 | 21 | 22 |
|---|---|---|---|---|---|
| K | $2.65508 \times 10^{-1}$ | $3.81101 \times 10^{-1}$ | 0.00000 | $-9.36333 \times 10^{-1}$ | $-8.93853 \times 10^{-1}$ |
| D | $2.27944 \times 10^{-4}$ | $-2.03395 \times 10^{-4}$ | $-2.15420 \times 10^{-5}$ | $-4.92768 \times 10^{-5}$ | $4.67131 \times 10^{-5}$ |
| E | $-4.63825 \times 10^{-6}$ | $3.74881 \times 10^{-6}$ | $2.89479 \times 10^{-6}$ | $7.98657 \times 10^{-7}$ | $1.88913 \times 10^{-7}$ |
| F | $1.53384 \times 10^{-7}$ | $-2.17585 \times 10^{-7}$ | $-1.16142 \times 10^{-7}$ | $-1.25522 \times 10^{-8}$ | $-9.70141 \times 10^{-9}$ |
| G | 0.00000 | $2.28611 \times 10^{-9}$ | 0.00000 | 0.00000 | 0.00000 |

The following Table 48 shows an air distance (mm) that is varied by zooming in the case where an object is positioned 2 m away from the tip end of the lens.

TABLE 48

|  | Wide-angle end | Standard position | Telephoto end |
|---|---|---|---|
| f | 4.196 | 23.529 | 49.156 |
| F/NO | 1.668 | 1.682 | 1.907 |
| 2ω | 59.743 | 10.822 | 5.414 |
| d5 | 0.700 | 14.055 | 17.374 |
| d10 | 19.204 | 5.842 | 2.530 |
| d14 | 5.831 | 2.402 | 4.737 |
| d19 | 0.995 | 4.425 | 2.090 |

Figure 50:
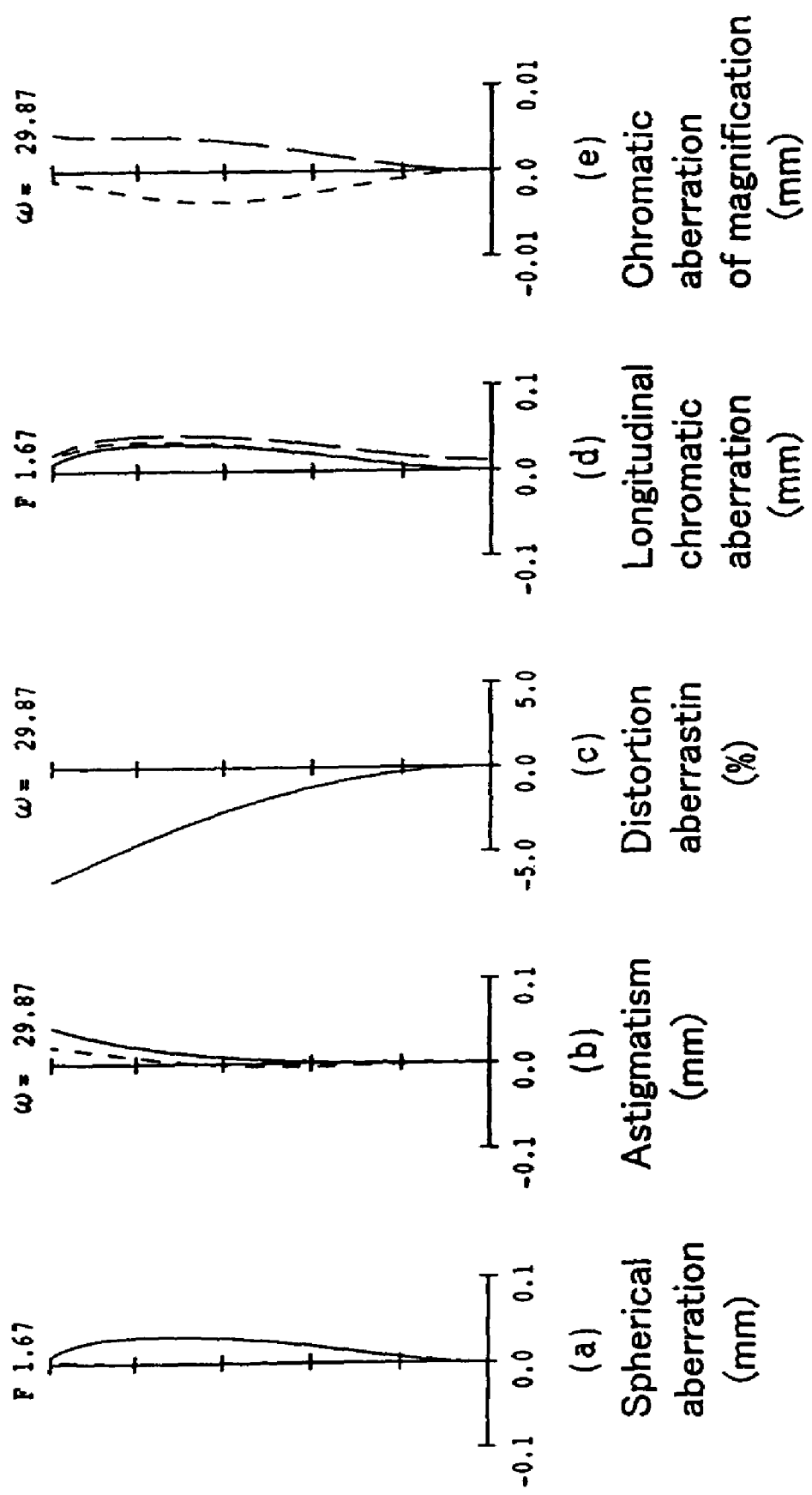
FIG. 50 illustrates various aberrations at a wide-angle end of a second example in the eleventh embodiment according to the present invention.
Figure 51:
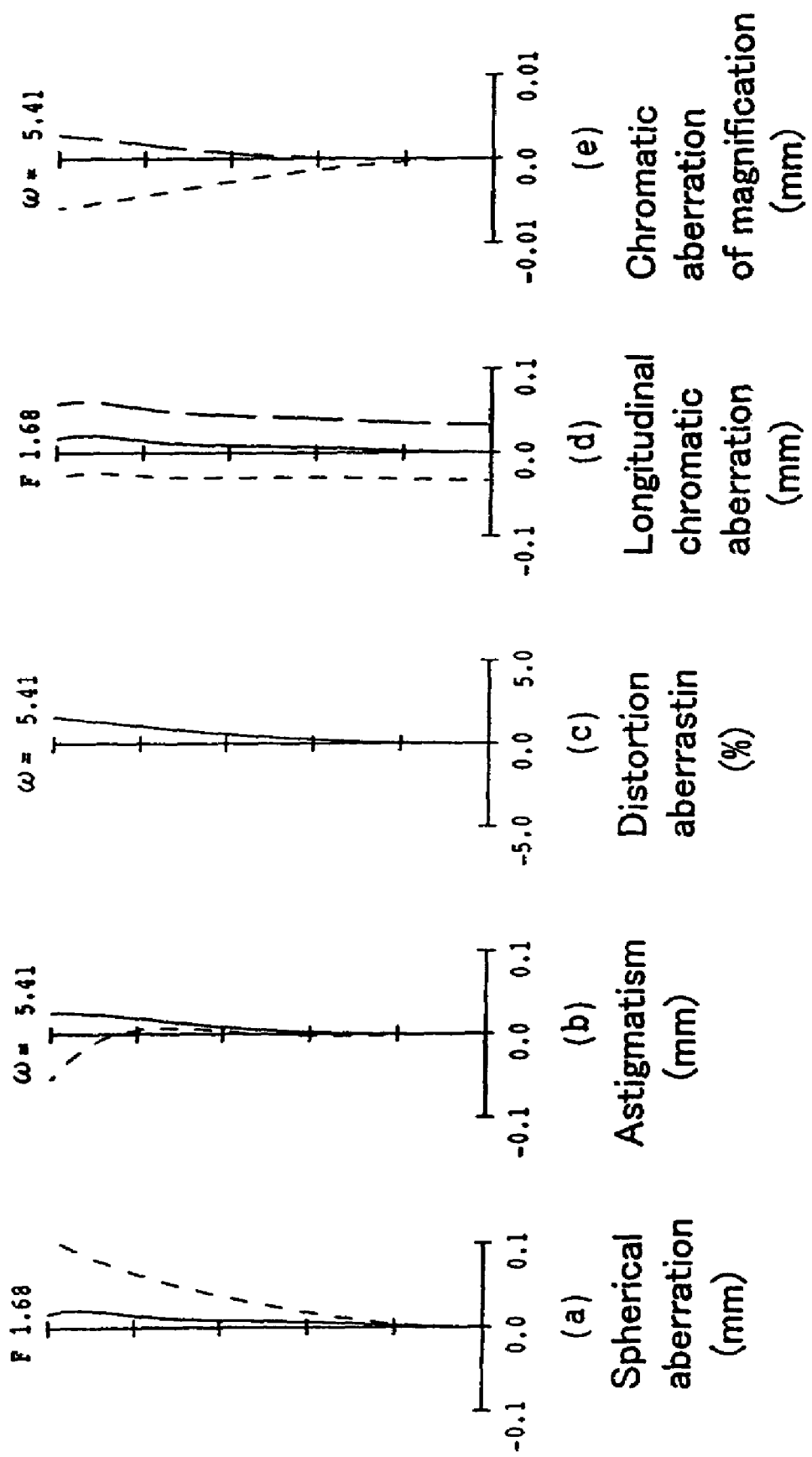
FIG. 51 illustrates various aberrations at a standard position of the second example in the eleventh embodiment according to the present invention.

FIGS. 50-52 illustrate various aberrations at a wide-angle end, at a standard position and at a telephoto end of the zoom lens. The values of the expressions (6) to (14) are as follows.

|v31−v32|=37.7

|v41−v42|=37.7 rS1/rS9=0.07

|f3/f34|=0.57

BF/fw=3.29 f1/fw=7.22

|f2|/fw=1.28 f34/fw=8.40 f5/fw−3.15

As clearly shown in the aberrations of FIGS. 50-52, this example provides sufficient performance to correct aberration to obtain high resolution of a zoom lens. Furthermore, this example is useful in preventing deterioration of the optical performance since the expressions (15) and (16) are satisfied.

Other specific examples according to this embodiment are shown in the following Table 49.

TABLE 49

| Group | Surface | r | d | n | v |
|---|---|---|---|---|---|
| 1 | 1 | 43.258 | 0.90 | 1.80518 | 25.4 |
|  | 2 | 22.067 | 5.80 | 1.60311 | 60.7 |
|  | 3 | −141.493 | 0.15 |  |  |
|  | 4 | 20.338 | 3.15 | 1.60311 | 60.7 |
|  | 5 | 64.306 | Variable |  |  |
| 2 | 6 | 46.991 | 0.60 | 1.77250 | 49.6 |
|  | 7 | 6.645 | 3.10 |  |  |
|  | 8 | −8.848 | 0.80 | 1.66547 | 55.2 |

TABLE 49-continued

| Group | Surface | r | d | n | ν |
|---|---|---|---|---|---|
|  | 9 | 7.368 | 1.60 | 1.84666 | 23.9 |
|  | 10 | 53.923 | Variable |  |  |
| 3 | 11 | 16.972 | 2.61 | 1.60602 | 57.5 |
|  | 12 | −13.177 | 0.09 |  |  |
|  | 13 | −55.938 | 0.70 | 1.80518 | 25.4 |
|  | 14 | 73.946 | 2.45 |  |  |
| 4 | 15 | −17.219 | 0.77 | 1.51633 | 64.1 |
|  | 16 | 22.997 | 1.82 | 1.80518 | 25.4 |
|  | 17 | 288.894 | Variable |  |  |
| 5 | 18 | −88.752 | 0.60 | 1.84666 | 23.9 |
|  | 19 | 12.766 | 4.50 | 1.51633 | 64.1 |
|  | 20 | −18.677 | 0.10 |  |  |
|  | 21 | 15.561 | 5.00 | 1.60602 | 57.6 |
|  | 22 | −16.083 | Variable |  |  |
| 6 | 23 | ∞ | 13.00 | 1.58913 | 61.2 |
|  | 24 | ∞ | 3.00 | 1.51633 | 64.1 |
|  | 25 | ∞ | — |  |  |

The following Table 50 shows aspherical coefficients.

TABLE 50

| Surface | 8 | 11 | 12 | 21 | 22 |
|---|---|---|---|---|---|
| K | $4.747248 \times 10^{-1}$ | $2.101119 \times 10^{-1}$ | $1.007413 \times 10^{-1}$ | $-1.279930$ | $-6.730536 \times 10^{-1}$ |
| D | $4.453156 \times 10^{-5}$ | $-9.582481 \times 10^{-5}$ | $9.286602 \times 10^{-5}$ | $-9.244688 \times 10^{-6}$ | $3.352961 \times 10^{-5}$ |
| E | $-7.953517 \times 10^{-7}$ | $1.260729 \times 10^{-6}$ | $1.333902 \times 10^{-7}$ | $-1.306964 \times 10^{-7}$ | $-3.521187 \times 10^{-7}$ |
| F | $-5.757966 \times 10^{-8}$ | $-2.487044 \times 10^{-7}$ | $-5.579667 \times 10^{-8}$ | $9.358746 \times 10^{-8}$ | $1.832323 \times 10^{-9}$ |
| G | 0.000000 | $5.900849 \times 10^{-9}$ | 0.000000 | 0.000000 | 0.000000 |

The following Table 51 shows an air distance (mm) that is varied by zooming in the case where an object is positioned 2 m away from the tip end of the lens.

TABLE 51

|  | Wide-angle end | Standard position | Telephoto end |
|---|---|---|---|
| f | 4.256 | 22.469 | 49.343 |
| F/NO | 1.697 | 1.695 | 1.902 |
| 2ω | 59.068 | 11.284 | 5.401 |
| d5 | 0.700 | 14.053 | 17.391 |
| d10 | 19.212 | 5.867 | 2.530 |
| d14 | 5.831 | 2.537 | 4.742 |
| d19 | 0.855 | 4.149 | 1.944 |

Figure 54:
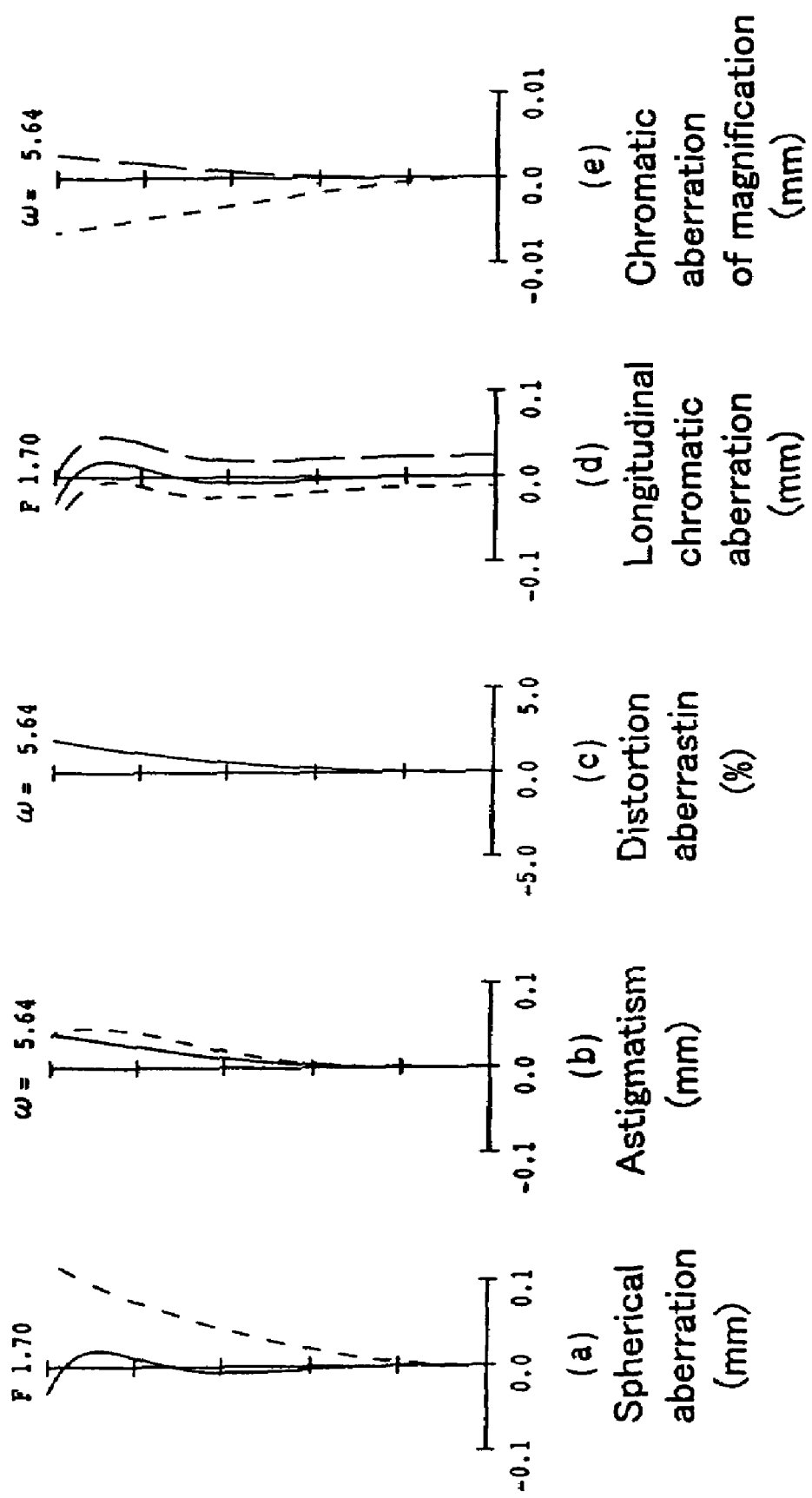
FIG. 54 illustrates various aberrations at a standard position of the third example in the eleventh embodiment according to the present invention.
Figure 55:
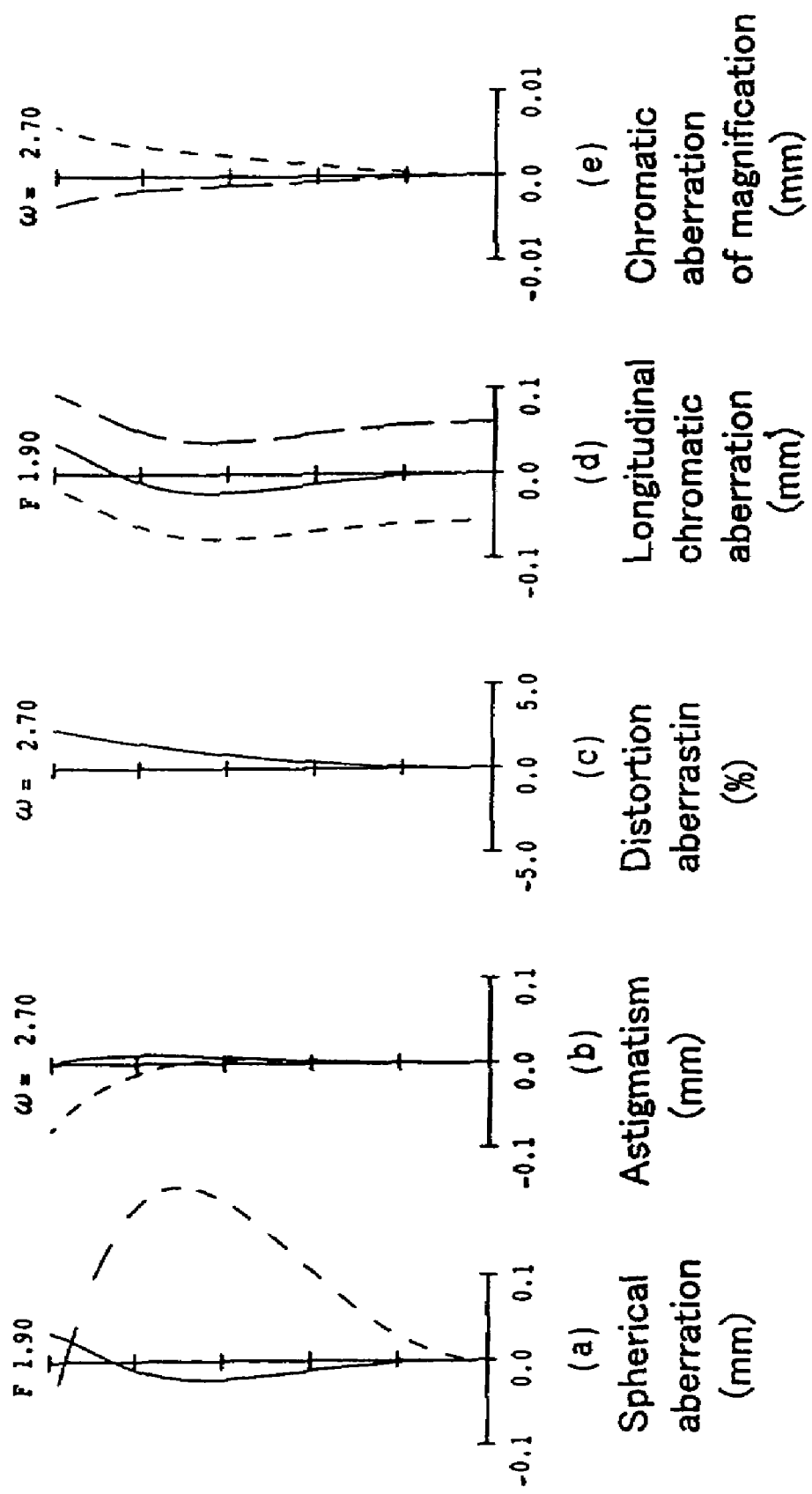
FIG. 55 illustrates various aberrations at a telephoto end of the third example in the eleventh embodiment according to the present invention.

FIGS. 53-55 illustrate various aberrations at a wide-angle end, at a standard position and at a telephoto end of the zoom lens. The values of the expressions (6) to (14) are as follows.

$|v31-v32|=32.3$ $|v41-v42|=38.6$ $rS1/rS9=0.58$ $|f3/f34|=0.72$ $BF/fw=2.93$ $f1/fw=6.97$ $|f2|/fw=1.26$ $f34/fw=5.89$ $f5/fw=3.11$

As clearly shown in the-aberrations of FIGS. 53-55, this example provides sufficient performance to correct aberration to obtain high resolution of a zoom lens. Furthermore, this example is useful in preventing deterioration of the optical performance since the expressions (15) and (16) are satisfied.

Twelfth Embodiment

Figure 56:
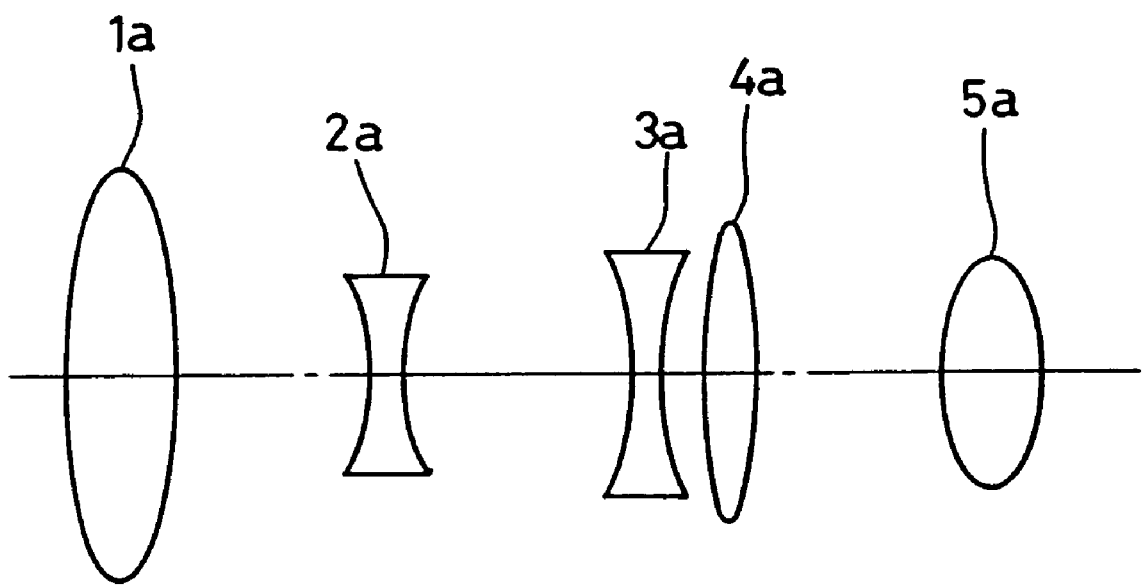
FIG. 56 is a view showing the arrangement of a zoom lens in a twelfth embodiment according to the present invention.

FIG. 56 is a view showing the arrangement of a zoom lens in a twelfth embodiment according to the present invention. As shown in FIG. 56, a zoom lens has a structure in which a first lens group 1a, a second lens group 2a, a third lens group 3a, a fourth lens group 4a and a fifth lens group 5a are disposed from an object side in this order. The first lens group 1a has a positive refracting power and is fixed with respect to the image plane. The second lens group 2a has a negative refracting power and varies power by moving along an optical axis. The third lens group 3a is fixed with respect to the image plane and has a negative refracting power. The fourth lens group 4a is fixed with respect to the image plane and has a positive refracting power. The fifth lens group 5a has a positive refracting power and moves along an optical axis to keep the image plane varied by the shift of the second lens group and the object at a predetermined position from a reference surface. Camera shake is corrected by shifting the fourth lens group having a positive refracting power in a direction vertical to the optical axis.

Figure 57:
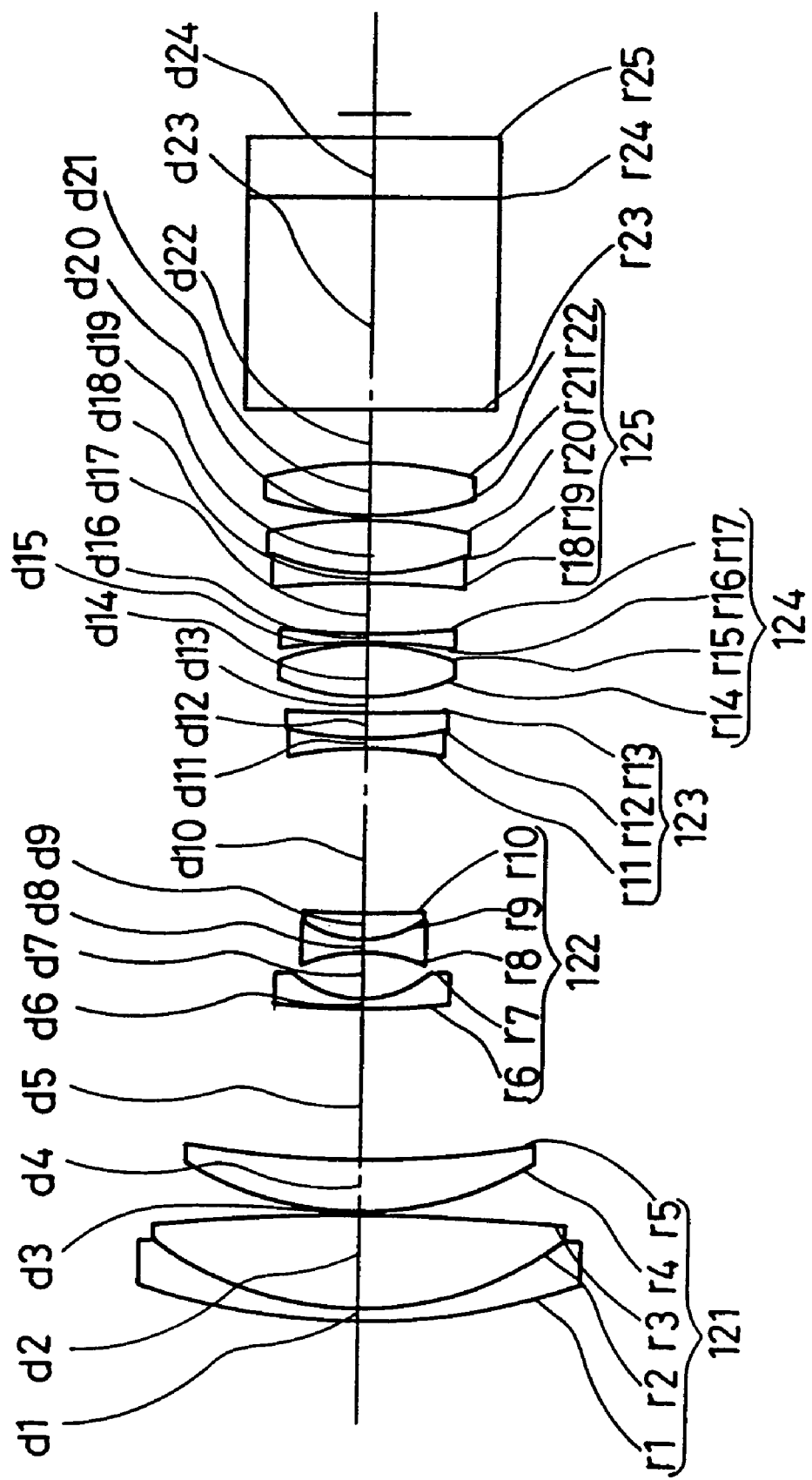
FIG. 57 is a view specifically showing the arrangement of the zoom lens in the twelfth embodiment.

FIG. 57 shows a zoom lens of the basic structure shown in FIG. 56. The zoom lens has a structure in which a first lens group 121, a second lens group 122, a third lens group 123, and a fourth lens group 124 are disposed from the object side to the image plane side in this order. The first lens group 121 has a positive refracting power, and is fixed with respect to the image plane in varying power and focusing. The second lens group 122 has a negative refracting power and varies power by moving along an optical axis.

The third lens group 123 is composed of a negative lens and a positive lens, and has a negative refracting power as a whole. The fourth lens group 124 is composed of a positive lens and a negative lens, and has a positive refracting power as a whole. The group is fixed with respect to the image plane in varying power and focusing. A fifth lens group 125 has a positive refracting power, and moves along an optical axis so as to move an image and adjust the focus thereof at the same time in accordance with variable power. When camera shake occurs, shake of an image is corrected by moving the fourth lens group 124 vertically with respect to the optical axis.

As described above, light beams entering the fifth lens group 125 can be lowered by combining the third lens group 123 having a negative refracting power and a fourth lens group 124 having a positive refracting power. Namely, the lens diameter of the fourth group can be decreased and a load on an actuator will be decreased in focusing.

The performance when shifting the lenses can be improved by applying at least one aspherical surface to any of the lenses of the fourth group. Similar to the eleventh embodiment, it is preferable that the expressions (6)-(16) are satisfied.

Specific examples for this embodiment are shown in the following Table 52.

TABLE 52

| Group | Surface | r | d | n | ν |
|---|---|---|---|---|---|
| 1 | 1 | 43.700 | 0.90 | 1.80518 | 25.4 |
|   | 2 | 22.310 | 6.00 | 1.60311 | 60.7 |
|   | 3 | −147.017 | 0.20 | | |
|   | 4 | 20.415 | 3.50 | 1.60311 | 60.7 |
|   | 5 | 64.027 | Variable | | |
| 2 | 6 | 64.027 | 0.60 | 1.77250 | 49.6 |
|   | 7 | 6.600 | 3.10 | | |
|   | 8 | −8.963 | 0.80 | 1.66547 | 55.2 |
|   | 9 | 6.685 | 1.80 | 1.80518 | 25.4 |
|   | 10 | 65.269 | Variable | | |
| 3 | 11 | −19.604 | 0.70 | 1.51633 | 64.1 |
|   | 12 | 24.259 | 1.65 | 1.84666 | 23.9 |
|   | 13 | 100.263 | 1.00 | | |
| 4 | 14 | 12.130 | 3.51 | 1.60602 | 57.6 |
|   | 15 | −14.418 | 0.10 | | |
|   | 16 | −42.218 | 0.60 | 1.80518 | 25.4 |
|   | 17 | 56.648 | Variable | | |
| 5 | 18 | −106.725 | 0.70 | 1.80518 | 25.4 |
|   | 19 | 16.919 | 3.60 | 1.51633 | 64.1 |
|   | 20 | −23.864 | 0.10 | | |
|   | 21 | 18.527 | 3.60 | 1.60602 | 57.6 |
|   | 22 | −22.813 | Variable | | |
| 6 | 23 | ∞ | 14.00 | 1.58913 | 61.2 |
|   | 24 | ∞ | 3.90 | 1.51633 | 64.1 |
|   | 25 | ∞ | — | | |

The following Table 53 shows aspherical coefficients.

TABLE 53

| Surface | 8 | 11 | 12 | 21 | 22 |
|---|---|---|---|---|---|
| K | $5.37219 \times 10^{-1}$ | $2.97152 \times 10^{-1}$ | $-2.48406$ | $-5.61162$ | $-5.96501$ |
| D | $8.69130 \times 10^{-5}$ | $-1.56550 \times 10^{-4}$ | $2.68507 \times 10^{-5}$ | $5.63851 \times 10^{-5}$ | $-4.80942 \times 10^{-5}$ |
| E | $-5.67323 \times 10^{-6}$ | $6.96463 \times 10^{-8}$ | $3.64998 \times 10^{-7}$ | $-2.49399 \times 10^{-7}$ | $3.72704 \times 10^{-7}$ |

The following Table 54 shows an air distance (mm) that is varied by zooming in the case where an object is positioned 2 m away from the tip end of the lens.

TABLE 54

|  | Wide-angle end | Standard position | Telephoto end |
|---|---|---|---|
| f | 4.029 | 23.328 | 50.226 |
| F/NO | 1.650 | 1.776 | 1.966 |
| 2ω | 62.566 | 10.893 | 5.239 |
| d5 | 0.700 | 14.408 | 17.686 |
| d10 | 20.216 | 6.509 | 3.230 |
| d14 | 5.331 | 1.876 | 4.155 |
| d19 | 1.200 | 4.636 | 2.184 |

Figure 58:
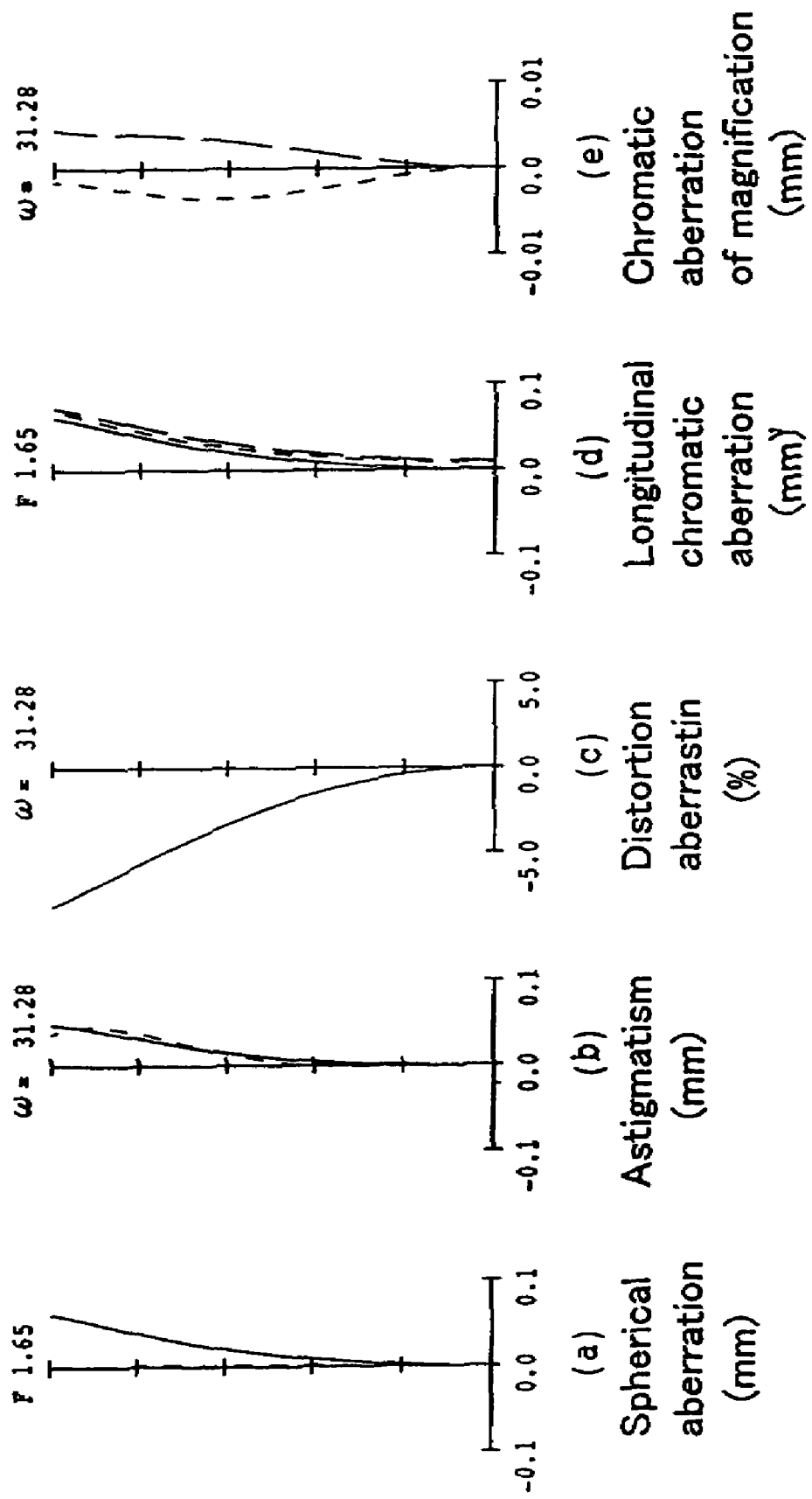
FIG. 58 illustrates various aberrations at a wide-angle end in the twelfth embodiment according to the present invention.
Figure 60:
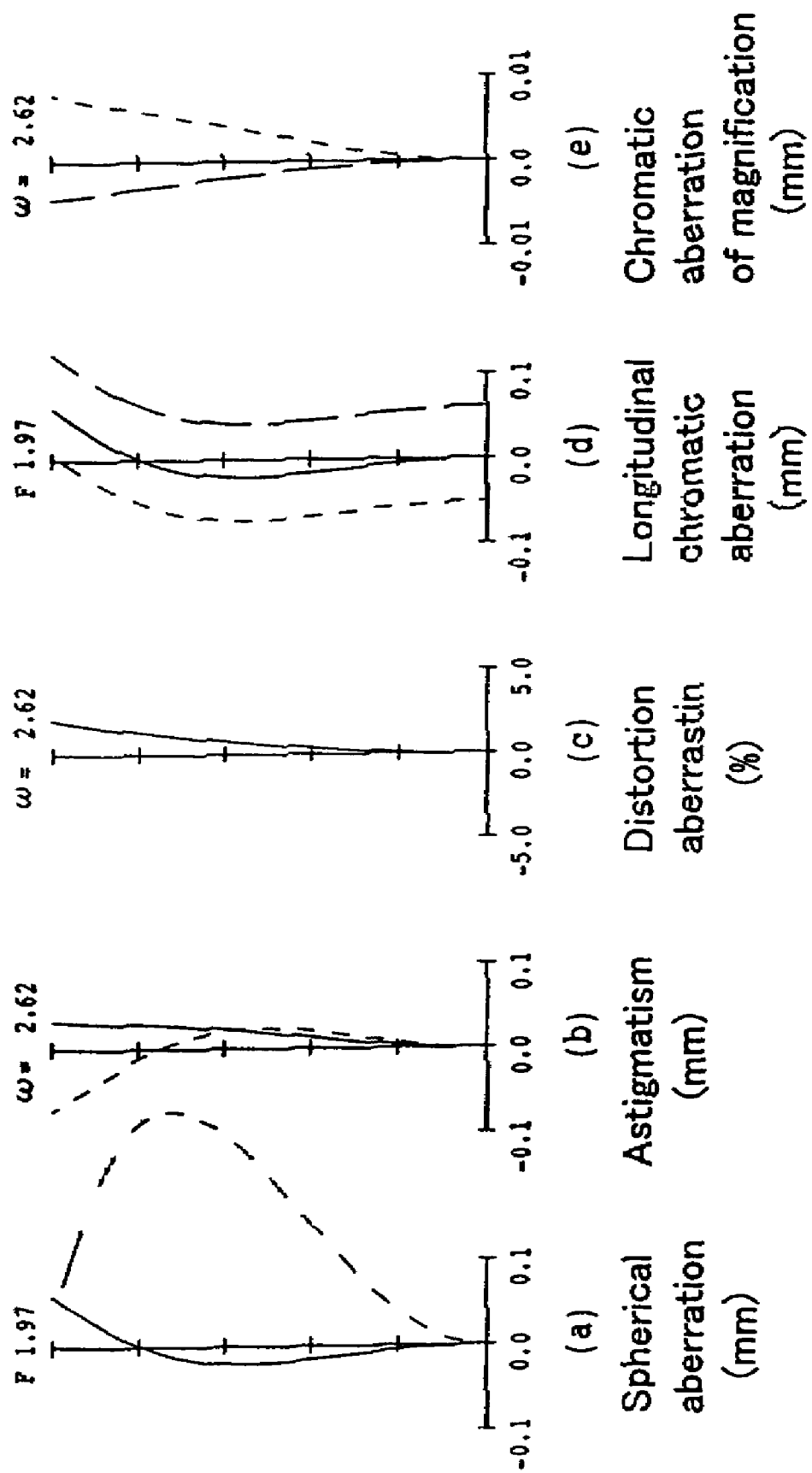
FIG. 60 illustrates various aberrations at a telephoto end in the twelfth embodiment according to the present invention.

FIGS. 58-60 illustrate various aberrations at a wide-angle end, at a standard position and at a telephoto end of the zoom lens. The values of the expressions (6) to (14) are as follows.

|ν31−ν32|=40.2

|ν41−ν42|=32.3 rS1/rS9=0.74

|f3/f34|=0.69

BF/fw=3.45 f1/fw=7.43

|f2|/fw=1.29 f34/fw=6.20 f5/fw=4.19

As clearly shown in the aberrations of FIGS. 58-60, this example provides sufficient performance to correct aberration to obtain high resolution of a zoom lens. Furthermore, this example is useful in preventing deterioration of the optical system since the expressions (15) and (16) are satisfied.

Thirteenth Embodiment

Figure 61:
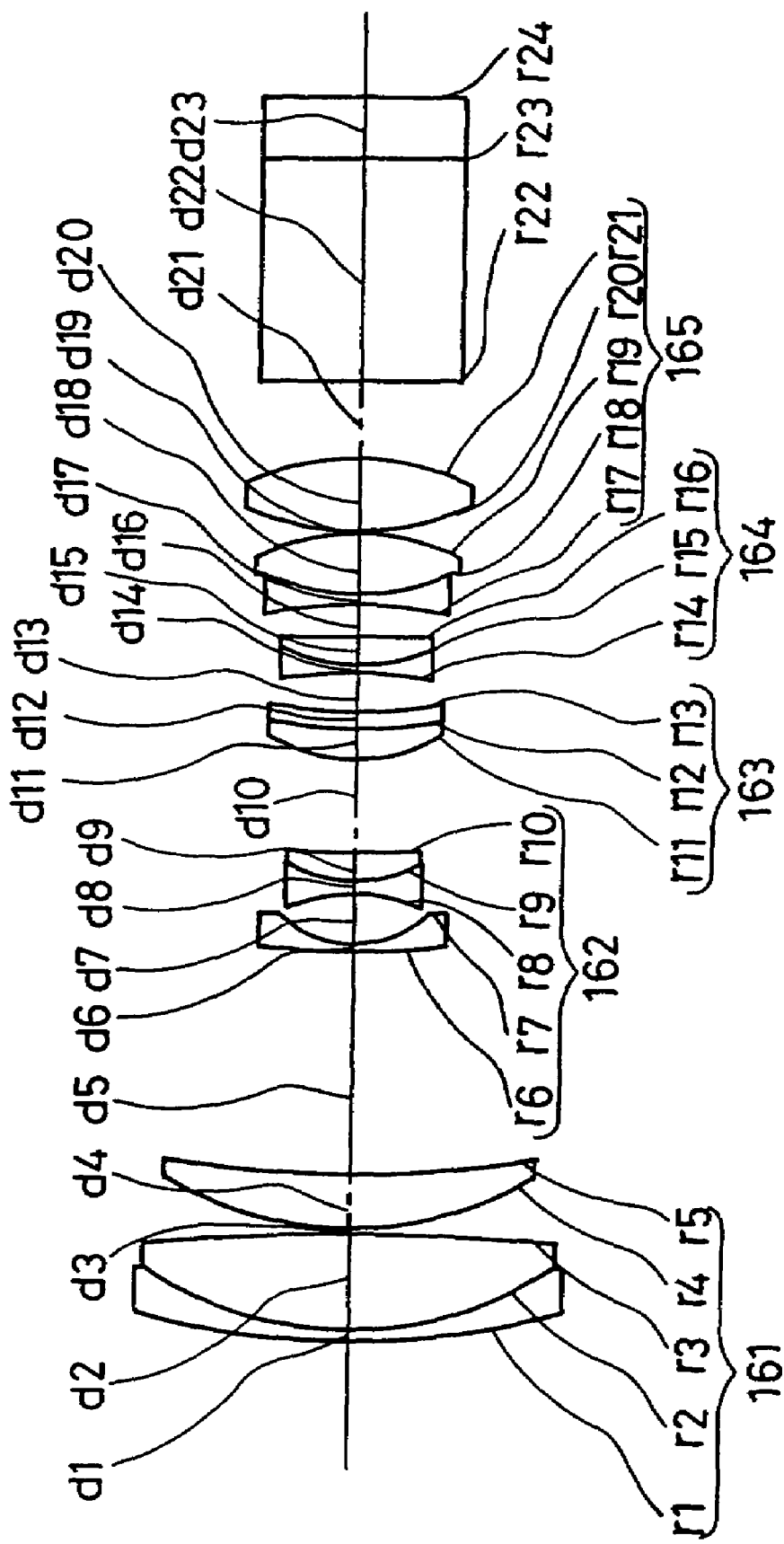
FIG. 61 is a view showing the arrangement of a zoom lens in a thirteenth embodiment according to the present invention.

FIG. 61 is a view showing the arrangement of a zoom lens in a thirteenth embodiment according to the present invention. As shown in FIG. 61, a zoom lens has a structure in which a first lens group 161, a second lens group 162, a third lens group 163, and a fourth lens group 164 are disposed from an object side to an image plane side in this order. The first lens group 161 has a positive refracting power, and is fixed with respect to the image plane in varying power and focusing. The second lens group 162 has a negative refracting power and varies power by moving along an optical axis.

The third lens group 163 is a cemented lens composed of two lenses and it has a positive refracting power. The fourth lens group 164 has a negative refracting power and is fixed with respect to the image plane in varying power and focusing. A fifth lens group 165 has a positive refracting power and moves along an optical axis so as to move an image and adjust the focus thereof at the same time in accordance with variable power. When camera shake occurs, shake of an image is corrected by moving the third lens group 163 vertically with respect to the optical axis. The tolerance can be eased by making the shift lens group 163 a cemented lens.

Performance when shifting the lenses can be improved by applying at least one aspherical surface to any of the lenses of the third group. Similar to the eleventh embodiment, it is preferable that the expressions (6)-(16) are satisfied.

Specific examples for this embodiment are shown in the following Table 55.

TABLE 55

| Group | Surface | r | d | n | ν |
|---|---|---|---|---|---|
| 1 | 1 | 43.712 | 0.90 | 1.80518 | 25.4 |
|   | 2 | 22.377 | 6.00 | 1.60311 | 60.7 |
|   | 3 | −147.260 | 0.20 | | |
|   | 4 | 20.439 | 3.50 | 1.60311 | 60.7 |
|   | 5 | 64.129 | Variable | | |
| 2 | 6 | 47.371 | 0.60 | 1.77250 | 49.6 |
|   | 7 | 6.608 | 3.10 | | |
|   | 8 | −8.756 | 0.80 | 1.66547 | 55.2 |
|   | 9 | 7.541 | 1.80 | 1.84666 | 23.9 |
|   | 10 | 61.377 | Variable | | |

TABLE 55-continued

| Group | Surface | r | d | n | v |
|---|---|---|---|---|---|
| 3 | 11 | 11.304 | 2.00 | 1.60602 | 57.5 |
|  | 12 | 29.656 | 1.00 | 1.80518 | 25.4 |
|  | 13 | 71.482 | 2.45 |  |  |
| 4 | 14 | −45.255 | 0.70 | 1.51633 | 64.1 |
|  | 15 | 13.342 | 1.65 | 1.80518 | 25.4 |
|  | 16 | 23.203 | Variable |  |  |
| 5 | 17 | −88.752 | 0.60 | 1.84666 | 23.9 |
|  | 18 | 12.766 | 4.10 | 1.51633 | 64.1 |
|  | 19 | −18.677 | 0.10 |  |  |
|  | 20 | 15.561 | 4.50 | 1.60602 | 57.6 |
|  | 21 | −16.083 | Variable |  |  |
| 6 | 22 | ∞ | 14.00 | 1.58913 | 61.2 |
|  | 23 | ∞ | 3.90 | 1.51633 | 64.1 |
|  | 24 | ∞ | — |  |  |

The following Table 56 shows aspherical coefficients.

TABLE 56

| Surface | 8 | 11 | 12 | 21 | 22 |
|---|---|---|---|---|---|
| K | $4.65875 \times 10^{-1}$ | $1.42789 \times 10^{-1}$ | $1.14334 \times 10^{-1}$ | $-1.256510$ | $-6.94184 \times 10^{-1}$ |
| D | $9.66131 \times 10^{-5}$ | $2.50260 \times 10^{-4}$ | $3.81894 \times 10^{-4}$ | $-2.86326 \times 10^{-5}$ | $-1.87081 \times 10^{-5}$ |
| E | $-7.08756 \times 10^{-7}$ | $9.98537 \times 10^{-6}$ | $1.14292 \times 10^{-5}$ | $4.11743 \times 10^{-7}$ | $1.01992 \times 10^{-7}$ |
| F | $1.91335 \times 10^{-7}$ | $-2.16512 \times 10^{-7}$ | $-1.11482 \times 10^{-7}$ | $-9.63753 \times 10^{-9}$ | $-5.68100 \times 10^{-9}$ |
| G | 0.00000 | $2.28611 \times 10^{-9}$ | 0.00000 | 0.00000 | 0.00000 |

The following Table 57 shows an air distance (mm) that is varied by zooming in the case where an object is positioned 2 m away from the tip end of the lens.

TABLE 57

|  | Wide-angle end | Standard position | Telephoto end |
|---|---|---|---|
| f | 4.153 | 23.052 | 48.765 |
| F/NO | 1.853 | 1.952 | 1.877 |
| 2ω | 60.636 | 11.025 | 5.426 |
| d5 | 0.700 | 14.060 | 17.386 |
| d10 | 19.216 | 5.856 | 2.530 |
| d14 | 5.331 | 1.967 | 4.261 |
| d19 | 1.200 | 4.846 | 2.532 |

Figure 62:
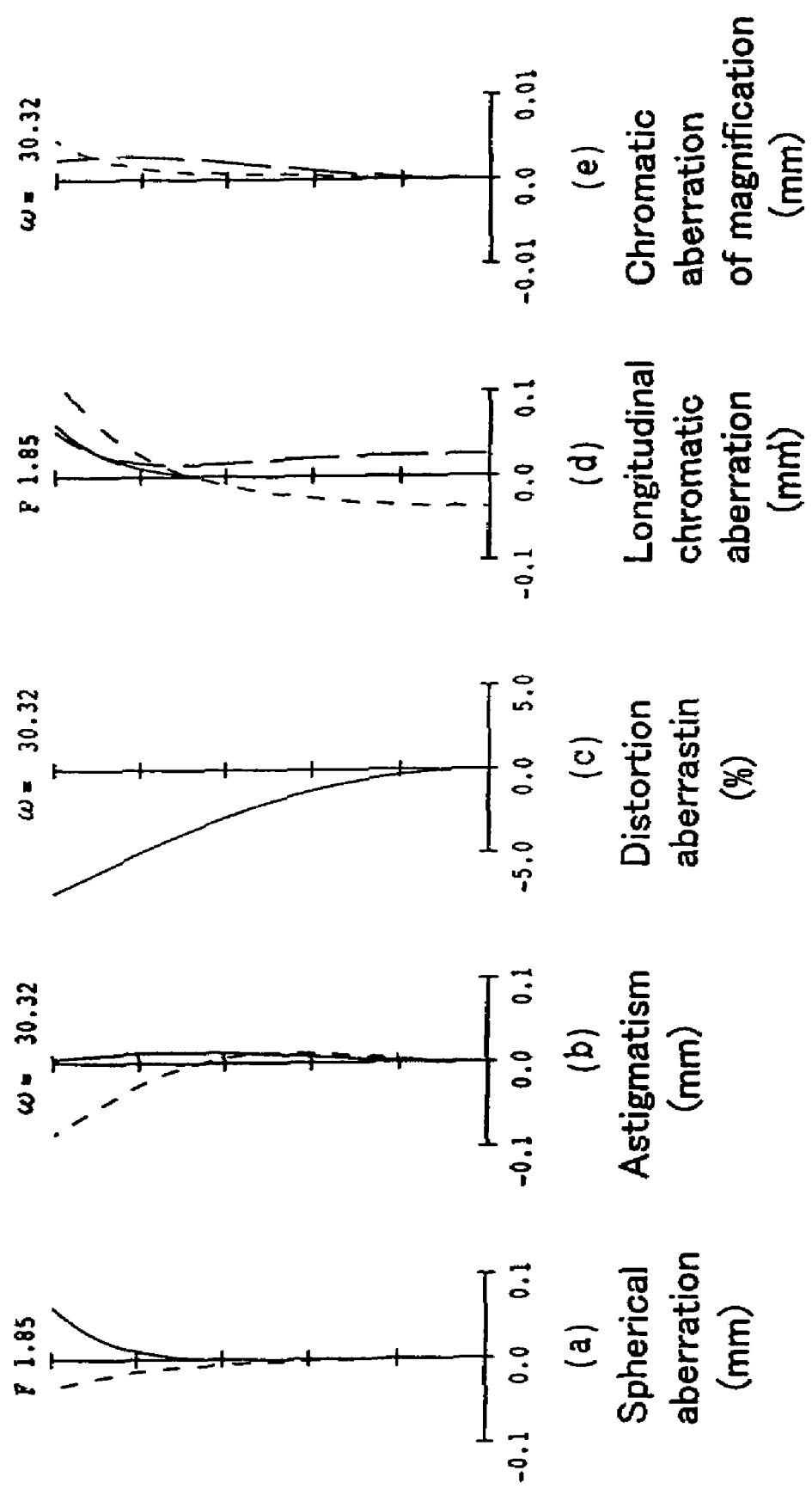
FIG. 62 illustrates various aberrations at a wide-angle end in the thirteenth embodiment according to the present invention.
Figure 63:
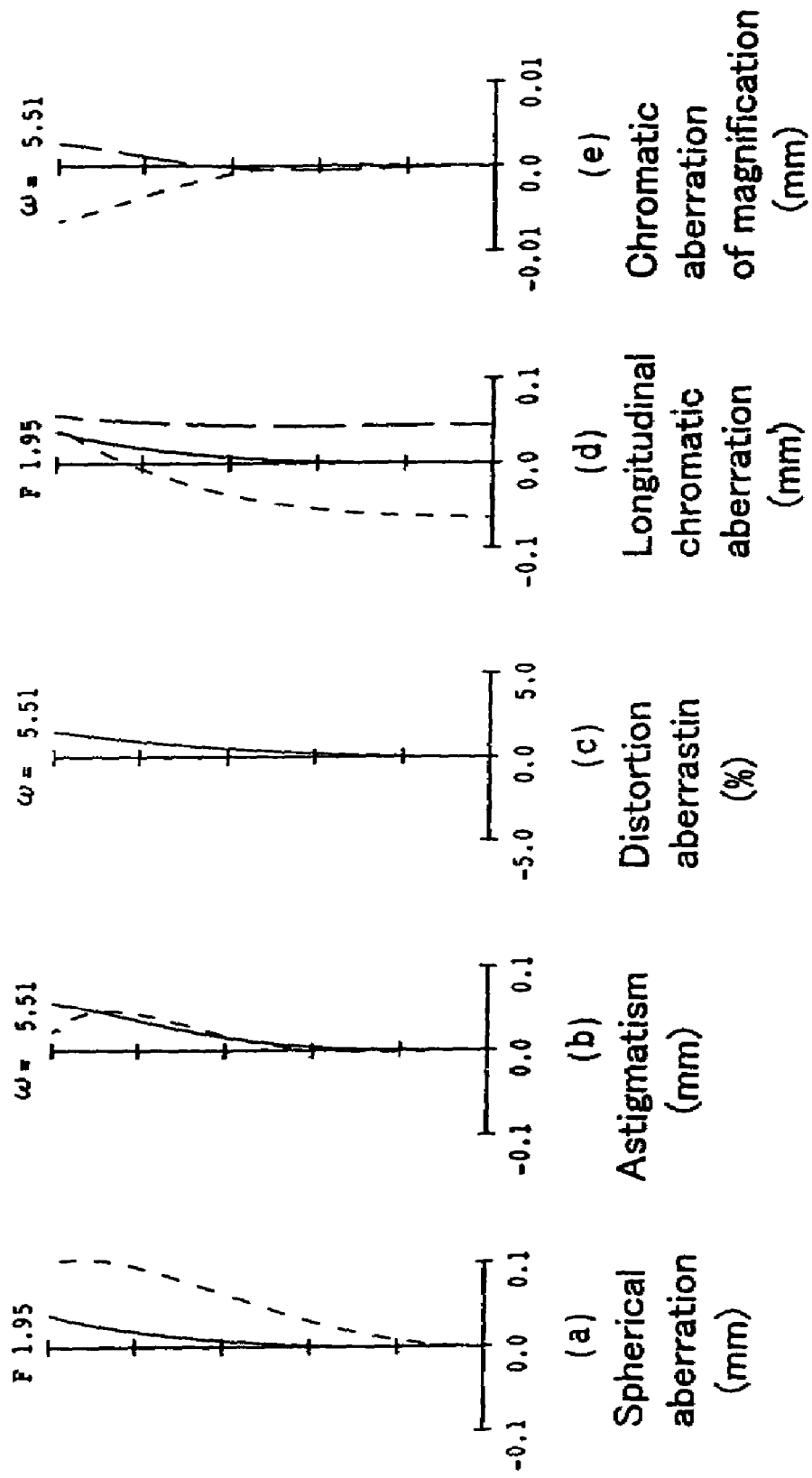
FIG. 63 illustrates various aberrations at a standard position in the thirteenth embodiment according to the present invention.
Figure 64:
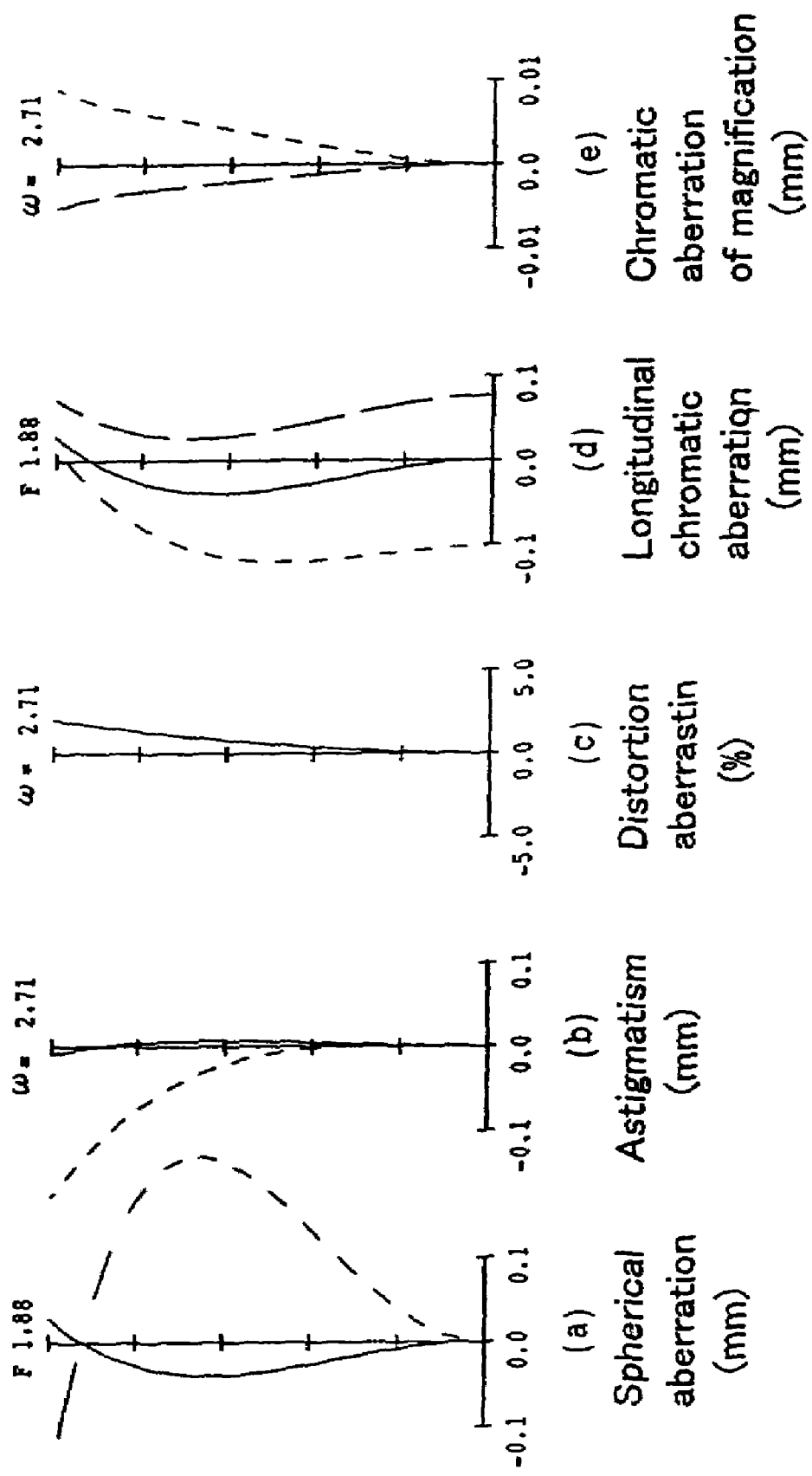
FIG. 64 illustrates various aberrations at a telephoto end in the thirteenth embodiment according to the present invention.

FIGS. 62-64 illustrate various aberrations at a wide-angle end, at a standard position and at a telephoto end of the zoom lens. The values of the expressions (6) to (14) are as follows.

$|v31-v32|=32.3$ $|v41-v42|=38.6$ $rS1/rS9=1.49$ $|f3/f34|=0.66$ $BF/fw=3.36$ $f1/fw=7.21$ $|f2|/fw=1.29$ $f34/fw=7.35$ $f5/fw=2.96$

As clearly shown in the aberrations of FIGS. 62-64, this example provides sufficient performance to correct aberration to obtain high resolution of a zoom lens. Furthermore, this example is useful in preventing deterioration of the optical performance since the expressions (15) and (16) are satisfied.

Fourteenth Embodiment

Figure 65:
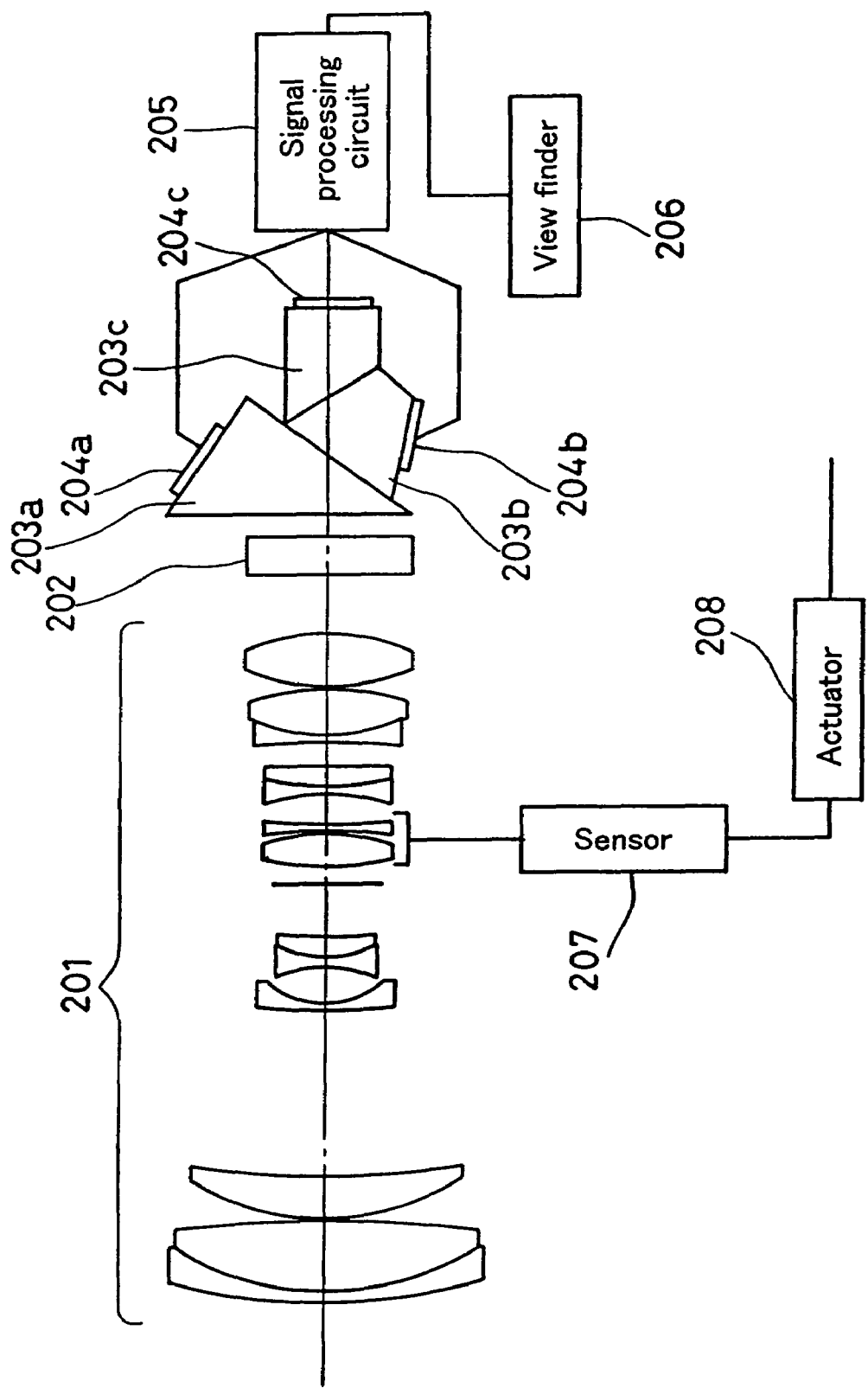
FIG. 65 is a view showing the arrangement of a video camera in a fourteenth embodiment according to the present invention.

This embodiment relates to a video camera using three imaging devices where the video camera has a function to correct camera shake by using a zoom lens in any of the eleventh to thirteenth embodiments, and the structure is shown in FIG. 65.

A video camera according to this embodiment comprises a zoom lens 201 of the eleventh embodiment, a low-pass filter 202, prisms 203a-203c for color separation, imagers 204a-204c, a signal processing circuit 205, a view finder 206, a sensor 207 for detecting camera shake, and an actuator 208 for driving the lens.

The zoom lens is not limited to what is shown in the eleventh embodiment, but zoom lenses described in the twelfth and thirteenth embodiments also can be used, though they are not shown specifically in any figures.

Although the shift lens group is composed of two single lenses in the eleventh to thirteenth embodiments, the lenses can be a cemented lens to ease the tolerance.

Although camera shake is corrected by shifting a lens group having a positive refracting power in the eleventh to thirteenth embodiments, similar effects can be obtained by shifting a lens group having a negative refracting power.

Fifteenth Embodiment

Figure 66:
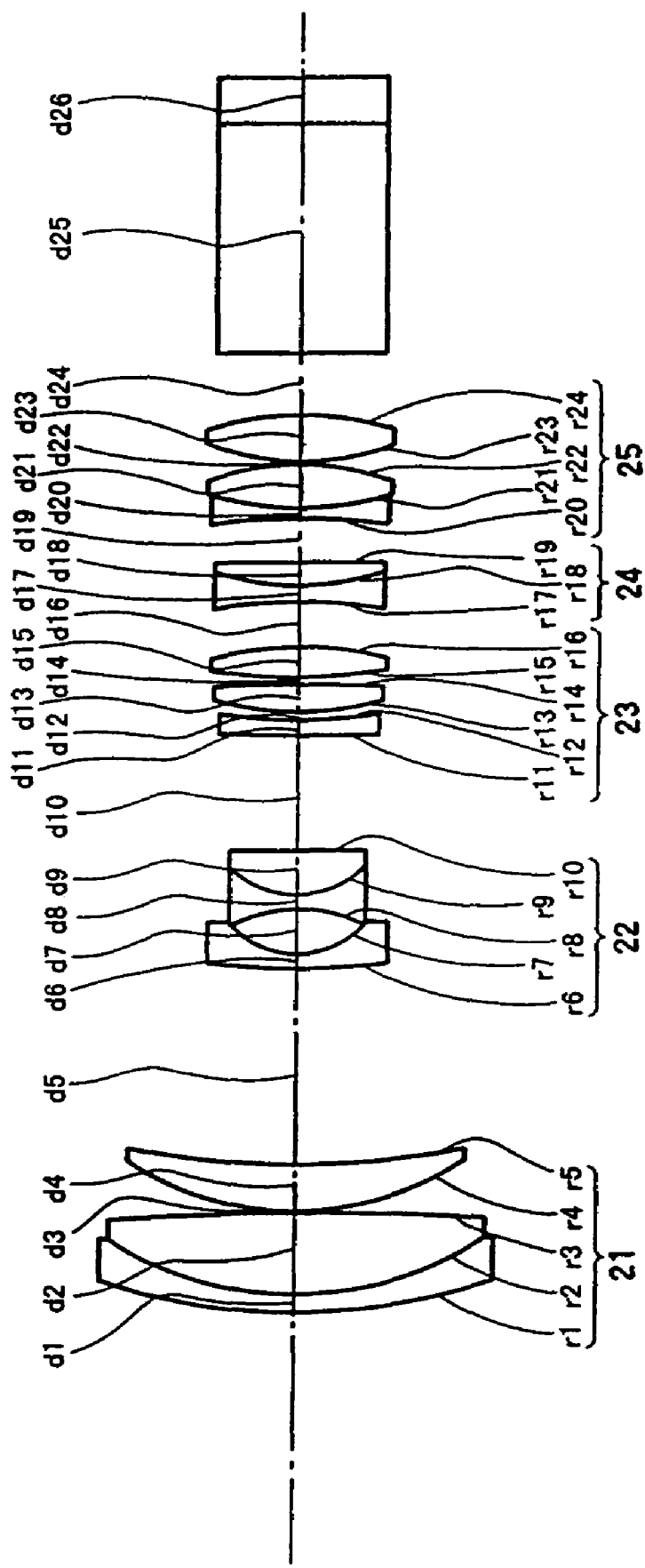
FIG. 66 is a view showing the arrangement of a zoom lens in a fifteenth embodiment according to the present invention.

FIG. 66 is a view showing the arrangement of a zoom lens in a fifteenth embodiment according to the present invention. As shown in FIG. 66, a zoom lens has a structure in which a first lens group 21, a second lens group 22, a third lens group 23, a fourth lens group 24, and a fifth lens group 25 are disposed from an object side (left side in FIG. 66) to an image plane side (right side in FIG. 66) in this order.

The first lens group 21 has a positive refracting power and is fixed with respect to the image plane in varying power and focusing. The second lens group 22 has a negative refracting power and varies power by moving along an optical axis. The third lens group 23 is composed of three lenses: a negative lens, a positive lens and a positive lens disposed from the object side in this order. This group includes at least one aspherical surface and has a positive refracting power as a whole.

The fourth lens group 24 is composed of two lenses as a cemented lens of a negative lens and a positive lens disposed from the object side in this order and it has a negative refracting power as a whole, and is fixed with respect to the image plane in varying power and focusing. The fifth lens group 25 has a positive refracting power and moves along an optical axis so as to move an image and adjust the focus thereof at the same time in accordance with the variable power. When camera shake occurs, shake of an image is corrected by moving the third lens group 23 vertically with respect to the optical axis.

The performance when shifting the lenses can be improved by applying at least one aspherical surface to any of the lenses of the third group 23.

It is preferable that the above-described expression (8) about aspherical surface amount is satisfied for the third lens group 23 when rS1 represents a local radius of curvature for a diameter occupying 10% of the lens effective diameter, and rS9 is a local radius of curvature for a diameter occupying 90% of lens effective diameter.

Here, the local radius of curvature C is obtainable through an algebraic calculation based on aspherical coefficients figured out from the sag amount of the plane shape. It is obtainable by the following equations (E) and (F).

$$SAG = \frac{H^2/R}{1+\sqrt{1-(1+K)(H/R)^2}} + D \cdot H^4 + E \cdot H^6 \quad (E)$$

$$C = \frac{\left(1+\left(\frac{dSAG}{dH}\right)^2\right)\sqrt{1+\left(\frac{dSAG}{dH}\right)^2}}{\frac{d^2 SAG}{dH^2}} \quad (F)$$

SAG: a distance from the apex on the aspherical surface to a point on the same aspherical surface having a height H from the optical axis
H: a height from an optical axis
R is a radius of curvature at the apex on the aspherical surface
K: a conical constant
D, E: aspherical coefficients
C: local radius of curvature It is also preferable that the correcting lens satisfies the expression (9), when f3 is the focal length of the third lens group 23 (a correcting lens group) and f34 is a composite focal length of the third and fourth lens groups.

Preferably, the expression (10) is satisfied when fw is a focal length of the entire system at the wide-angle end, and BF is a distance between the final surface of the lens and the image plane in the air.

Preferably, the expressions (11) to (14) are satisfied when fw is a focal length of the entire system at a wide-angle end, fi (i=1-5) is the focal length of the i-th lens group, and f34 is a composite focal length of the third and fourth lens group 23, 24.

It is also preferable that the expressions (15) and (16) are satisfied when Y is a shifting amount of the third lens group 23 at a focal length f of the entire system when correcting camera shake, Yt is a shifting amount of the third lens group 23 at the telephoto end, and ft is a focal length of the telephoto end.

Specific examples of zoom lenses according to this embodiment are shown in the following Table 58.

TABLE 58

| Group | Surface | r | d | n | ν |
|---|---|---|---|---|---|
| 1 | 1 | 35.243 | 0.90 | 1.80518 | 25.4 |
|  | 2 | 18.353 | 5.25 | 1.60311 | 60.7 |
|  | 3 | −154.339 | 0.15 |  |  |

TABLE 58-continued

| Group | Surface | r | d | n | ν |
|---|---|---|---|---|---|
|  | 4 | 17.449 | 3.00 | 1.60311 | 60.7 |
|  | 5 | 53.989 | Variable |  |  |
| 2 | 6 | 53.989 | 0.70 | 1.78500 | 43.7 |
|  | 7 | 5.142 | 2.97 |  |  |
|  | 8 | −7.948 | 0.80 | 1.66547 | 55.2 |
|  | 9 | 5.519 | 2.70 | 1.80518 | 25.4 |
|  | 10 | 1291.253 | Variable |  |  |
| 3 | 11 | 136.351 | 1.00 | 1.84666 | 23.9 |
|  | 12 | 24.057 | 0.50 |  |  |
|  | 13 | 16.099 | 1.70 | 1.51450 | 63.1 |
|  | 14 | −199.059 | 0.50 |  |  |
|  | 15 | 48.853 | 1.90 | 1.58913 | 61.2 |
|  | 16 | −18.181 | 2.70 |  |  |
| 4 | 17 | −22.167 | 0.80 | 1.58913 | 61.2 |
|  | 18 | 12.517 | 1.60 | 1.80518 | 25.4 |
|  | 19 | 52.330 | Variable |  |  |
| 5 | 20 | −42.760 | 0.60 | 1.84666 | 23.9 |
|  | 21 | 15.607 | 2.80 | 1.51633 | 64.1 |
|  | 22 | −14.704 | 0.10 |  |  |
|  | 23 | 12.767 | 3.00 | 1.51450 | 63.1 |
|  | 24 | −16.499 | Variable |  |  |
| 6 | 25 | ∞ | 14.00 | 1.58913 | 61.2 |
|  | 26 | ∞ | 2.80 | 1.51633 | 64.1 |
|  | 27 | ∞ | — |  |  |

The following Table 59 shows aspherical coefficients of the zoom lens in the present example.

TABLE 59

| Surface | 8 | 13 | 22 |
|---|---|---|---|
| K | −4.89985 | −8.46317 | −1.14637 |
| D | $-1.08175 \times 10^{-3}$ | $1.00945 \times 10^{-4}$ | $-6.03706 \times 10^{-5}$ |
| E | $-1.06040 \times 10^{-5}$ | $-1.63114 \times 10^{-6}$ | $-8.33884 \times 10^{-8}$ |

The following Table 60 shows an air distance (mm) that is varied by zooming in the case where an object is positioned 2 m away from the tip end of the lens. At the standard position, magnification of the second lens group 22 becomes −1 times in Table 60.

TABLE 60

|  | Wide-angle end | Standard position | Telephoto end |
|---|---|---|---|
| f | 3.680 | 17.737 | 42.686 |
| F/NO | 1.658 | 1.914 | 2.072 |
| 2ω | 58.508 | 12.362 | 5.106 |
| d5 | 0.600 | 11.675 | 14.927 |
| d10 | 17.903 | 6.827 | 3.575 |
| d14 | 5.200 | 2.519 | 5.200 |
| d19 | 1.000 | 3.682 | 1.000 |

The values of the expressions (8) to (14) are as follows.

$rS1/rS9=0.64$ $|f3/f34|=0.59$ $BF/fw=4.09$ $f1/fw=7.00$ $|f2|/fw=1.25$ $f34/fw=9.14$ $f5/fw=3.79$

In this example, the above-described expression (8) is satisfied, and a sufficient aberration performance is provided to realize high resolution. Since the expression (9) is satisfied, deterioration in the aberration performance can be decreased and assembly tolerance in manufacturing can be eased. Moreover, since the shifting amount of the lenses is decreased when correcting camera shake, the lens diameter can be reduced for downsizing. Furthermore, since the expression (10) is satisfied, a color separation optical system having a length for a sufficient color separation- can be inserted.

Furthermore, the back focus does not need to have extra length, and a small zoom lens can be provided. Since the expressions (11) to (14) are satisfied, the aberration can be corrected easily and the zoom lens can be downsized.

Figure 68:
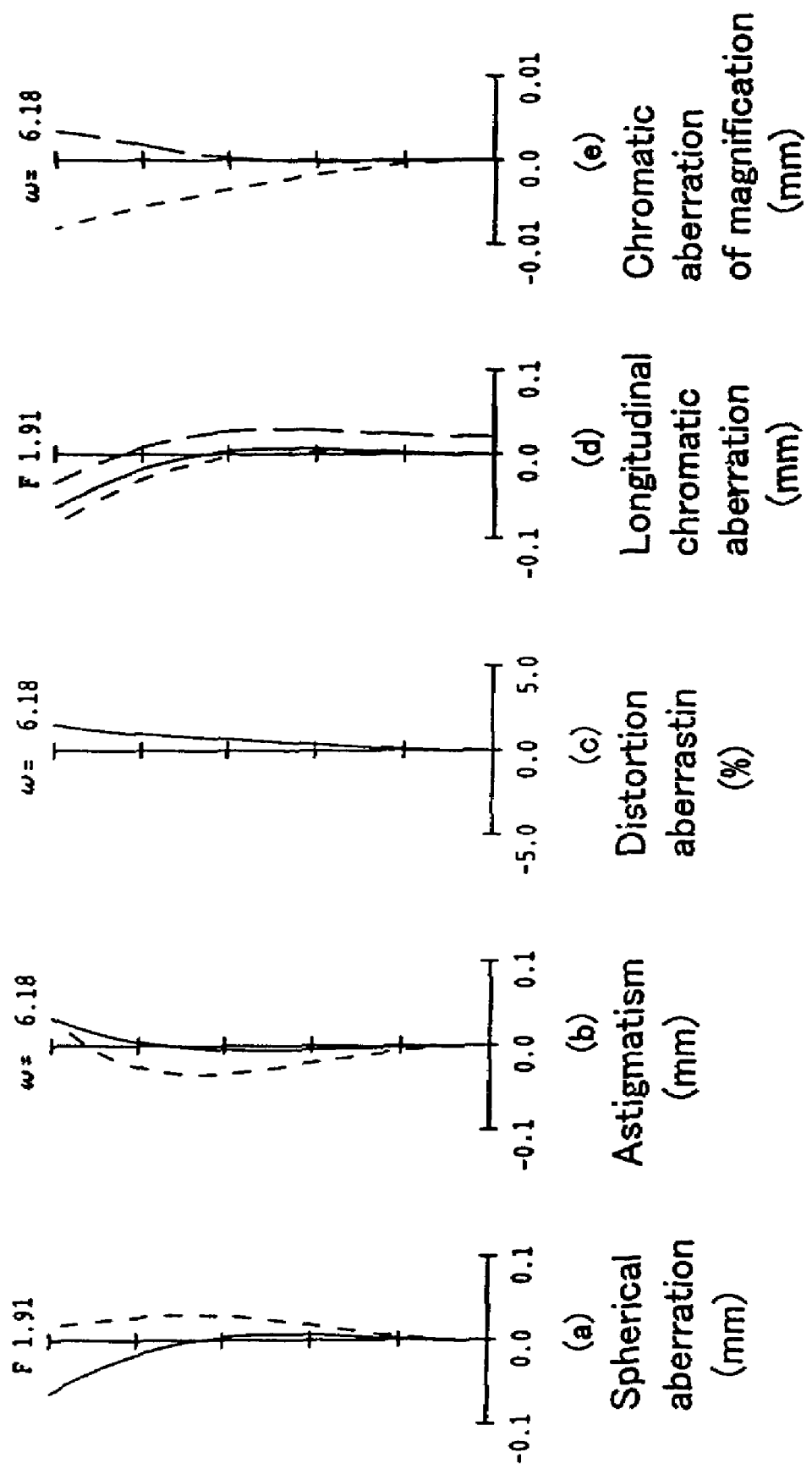
FIG. 68 is illustrates various aberrations at a standard position in the fifteenth embodiment according to the present invention.
Figure 69:
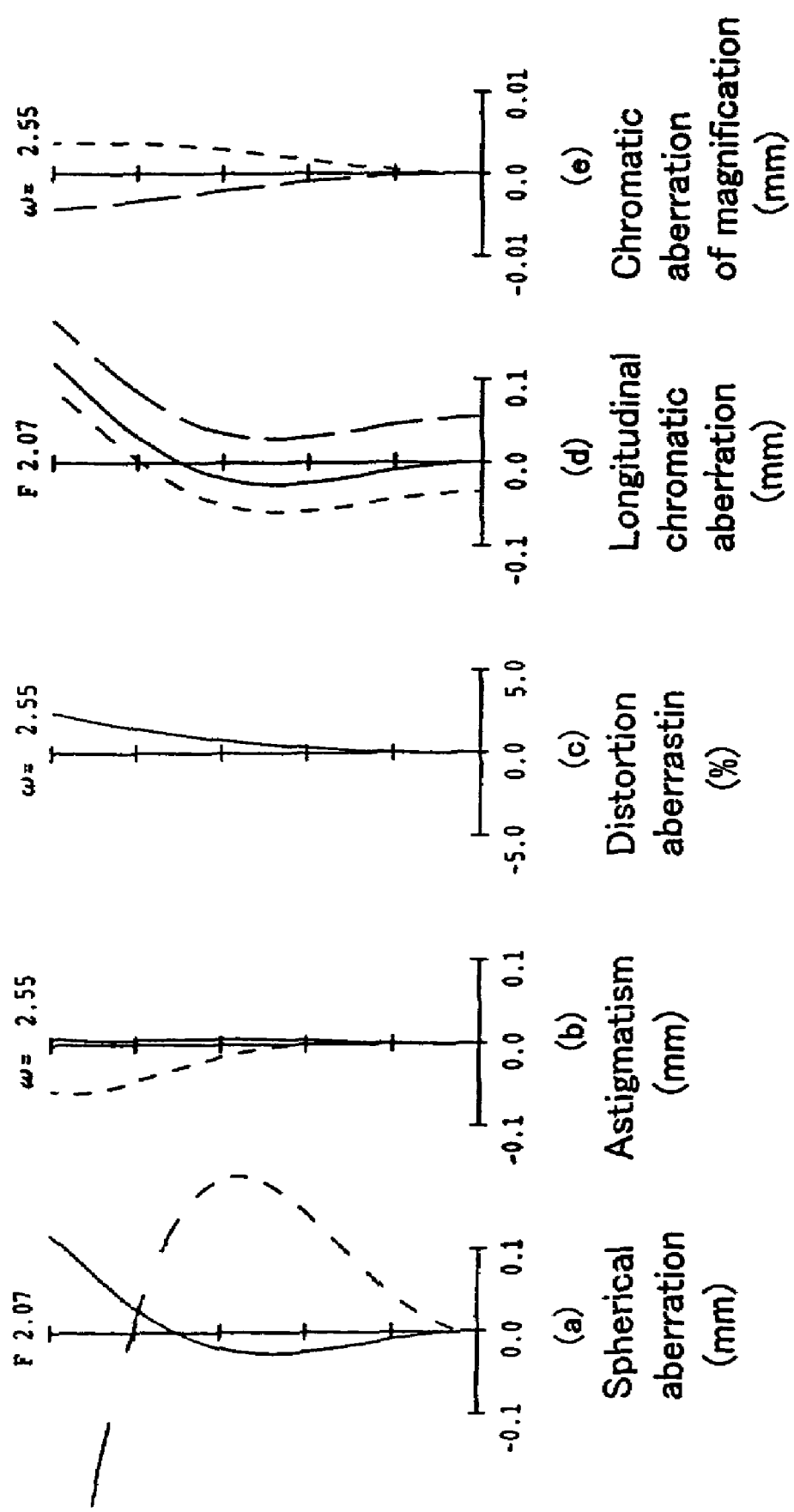
FIG. 69 illustrates various aberrations at a telephoto end in the fifteenth embodiment according to the present invention.

FIGS. 67-69 illustrate various aberrations at a wide-angle end, at a standard position and at a telephoto end of the zoom lens. As clearly shown in the aberrations of FIGS. 67-69, this example provides sufficient performance to correct aberration to obtain high resolution of a zoom lens.

Sixteenth Embodiment

Figure 70:
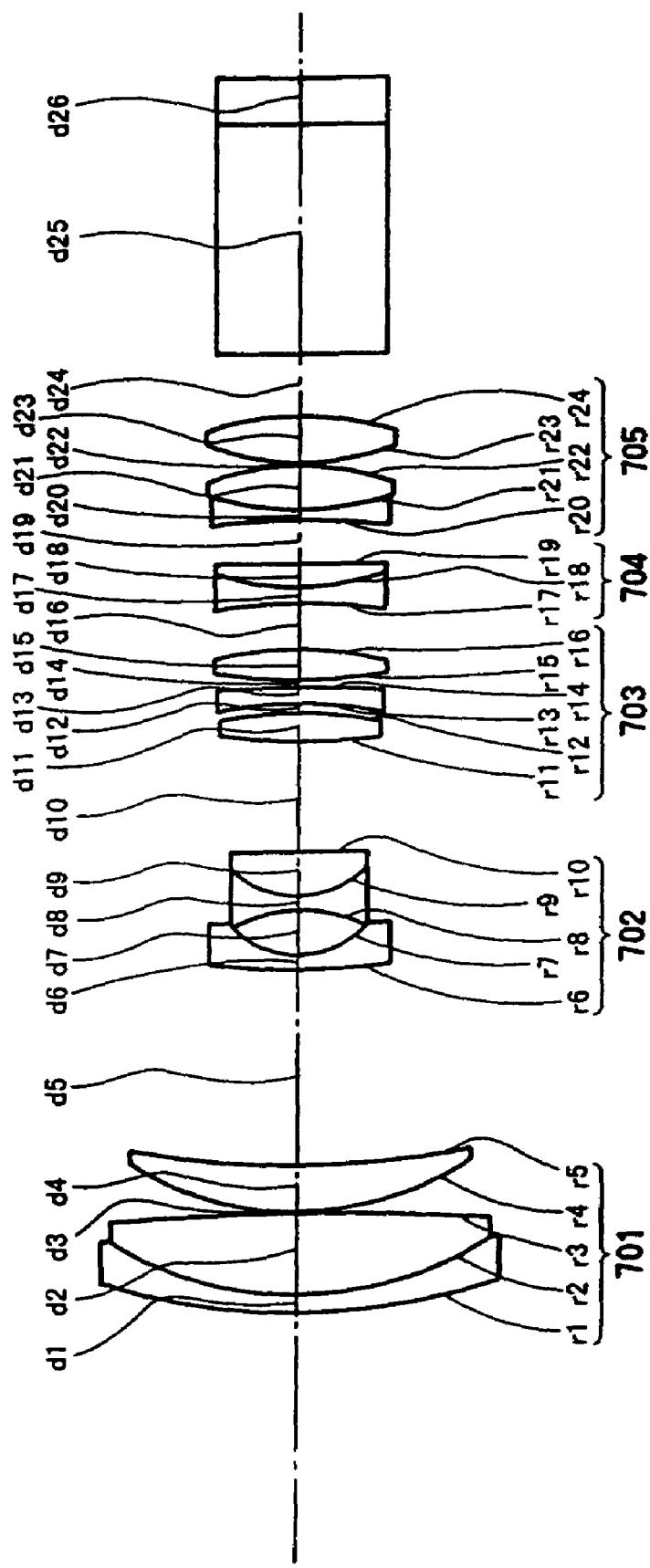
FIG. 70 is a view showing the arrangement of a zoom lens in a sixteenth embodiment according to the present invention.

FIG. 70 is a view showing the arrangement of a zoom lens in a sixteenth embodiment according to the present invention. As shown in FIG. 70, a zoom lens has a structure in which a first lens group 701, a second lens group 702, a third lens group 703, a fourth lens group 704, and a fifth lens group 705 are disposed from an object side (left side in FIG. 70) to an image plane side (right side in FIG. 70) in this order.

The first lens group 701 has a positive refracting power and is fixed with respect to the image plane in varying power and focusing. The second lens group 702 has a negative refracting power and varies power by moving along an optical axis.

The third lens group 703 is composed of three lenses: a negative lens, a positive lens and a positive lens disposed from the object side in this order. This group includes at least one aspherical surface and has a positive refracting power as a whole.

The fourth lens group 704 is composed of two lenses as a cemented lens of a negative lens and a positive lens disposed from the object side in this order and this group has a negative refracting power as a whole, and is fixed with respect to the image plane in varying power and focusing. The fifth lens group 705 has a positive refracting power and moves along an optical axis so as to move an image and adjust the focus thereof at the same time in accordance with variable power. When camera shake occurs, shake of an image is corrected by moving the third lens group 703 vertically with respect to the optical axis.

The performance at shifting the lenses can be improved by applying at least one aspherical surface to any of the lenses of the third group 703.

Similar to the fifteenth embodiment, it is preferable for the zoom lens of this embodiment that the conditional expressions (8)-(16) are satisfied.

Specific examples of zoom lenses according to this embodiment are shown in the following Table 61.

TABLE 61

| Group | Surface | r | d | n | ν |
|---|---|---|---|---|---|
| 1 | 1 | 35.243 | 0.90 | 1.80518 | 25.4 |
|   | 2 | 18.353 | 5.25 | 1.60311 | 60.7 |
|   | 3 | −154.339 | 0.15 | | |

TABLE 61-continued

| Group | Surface | r | d | n | ν |
|---|---|---|---|---|---|
|   | 4 | 17.449 | 3.00 | 1.60311 | 60.7 |
|   | 5 | 53.989 | Variable | | |
| 2 | 6 | 53.989 | 0.70 | 1.78500 | 43.7 |
|   | 7 | 5.142 | 2.97 | | |
|   | 8 | −7.948 | 0.80 | 1.66547 | 55.2 |
|   | 9 | 5.519 | 2.70 | 1.80518 | 25.4 |
|   | 10 | 1291.253 | Variable | | |
| 3 | 11 | 58.041 | 1.00 | 1.51450 | 63.1 |
|   | 12 | −19.193 | 0.50 | | |
|   | 13 | −18.810 | 1.70 | 1.84666 | 23.9 |
|   | 14 | −59.301 | 0.50 | | |
|   | 15 | 43.566 | 1.90 | 1.58913 | 61.2 |
|   | 16 | −17.985 | 2.70 | | |
| 4 | 17 | −20.041 | 0.80 | 1.58913 | 61.2 |
|   | 18 | 12.918 | 1.60 | 1.80518 | 25.4 |
|   | 19 | 63.402 | Variable | | |
| 5 | 20 | −51.268 | 0.60 | 1.84666 | 23.9 |
|   | 21 | 15.447 | 2.80 | 1.51633 | 64.1 |
|   | 22 | −14.704 | 0.10 | | |
|   | 23 | 12.767 | 3.00 | 1.51450 | 63.1 |
|   | 24 | −16.499 | Variable | | |
| 6 | 25 | ∞ | 14.00 | 1.58913 | 61.2 |
|   | 26 | ∞ | 2.80 | 1.51633 | 64.1 |
|   | 27 | ∞ | — | | |

The following Table 62 shows aspherical coefficients of the zoom lens in the present example.

TABLE 62

| Surface | 8 | 13 | 22 |
|---|---|---|---|
| K | −4.89985 | −8.44752 | $-9.50310 \times 10^{-1}$ |
| D | $-1.08175 \times 10^{-3}$ | $-4.24504 \times 10^{-5}$ | $-4.89670 \times 10^{-5}$ |
| E | $-1.06040 \times 10^{-5}$ | $7.84853 \times 10^{-7}$ | $-6.72180 \times 10^{-8}$ |

The following Table 63 shows an air distance (mm) that is varied by zooming in the case where an object is positioned 2 m away from the tip end of the lens. At the standard position, magnification of the second lens group 702 becomes −1 times in Table 63.

TABLE 63

|   | Wide-angle end | Standard position | Telephoto end |
|---|---|---|---|
| f | 3.691 | 17.802 | 42.813 |
| F/NO | 1.657 | 1.925 | 2.078 |
| 2ω | 58.349 | 12.321 | 42.813 |
| d5 | 0.600 | 11.675 | 14.927 |
| d10 | 17.903 | 6.827 | 3.575 |
| d14 | 5.200 | 2.485 | 5.200 |
| d19 | 1.000 | 3.715 | 1.000 |

The values of the expressions (8) to (14) are as follows.

$rS1/rS9=0.63$ $|f3/f34|=0.59$ $BF/fw=4.01$ $f1/fw=6.98$ $|f2|/fw=1.25$ $f34/fw=9.17$ $f5/fw=3.70$

Figure 72:
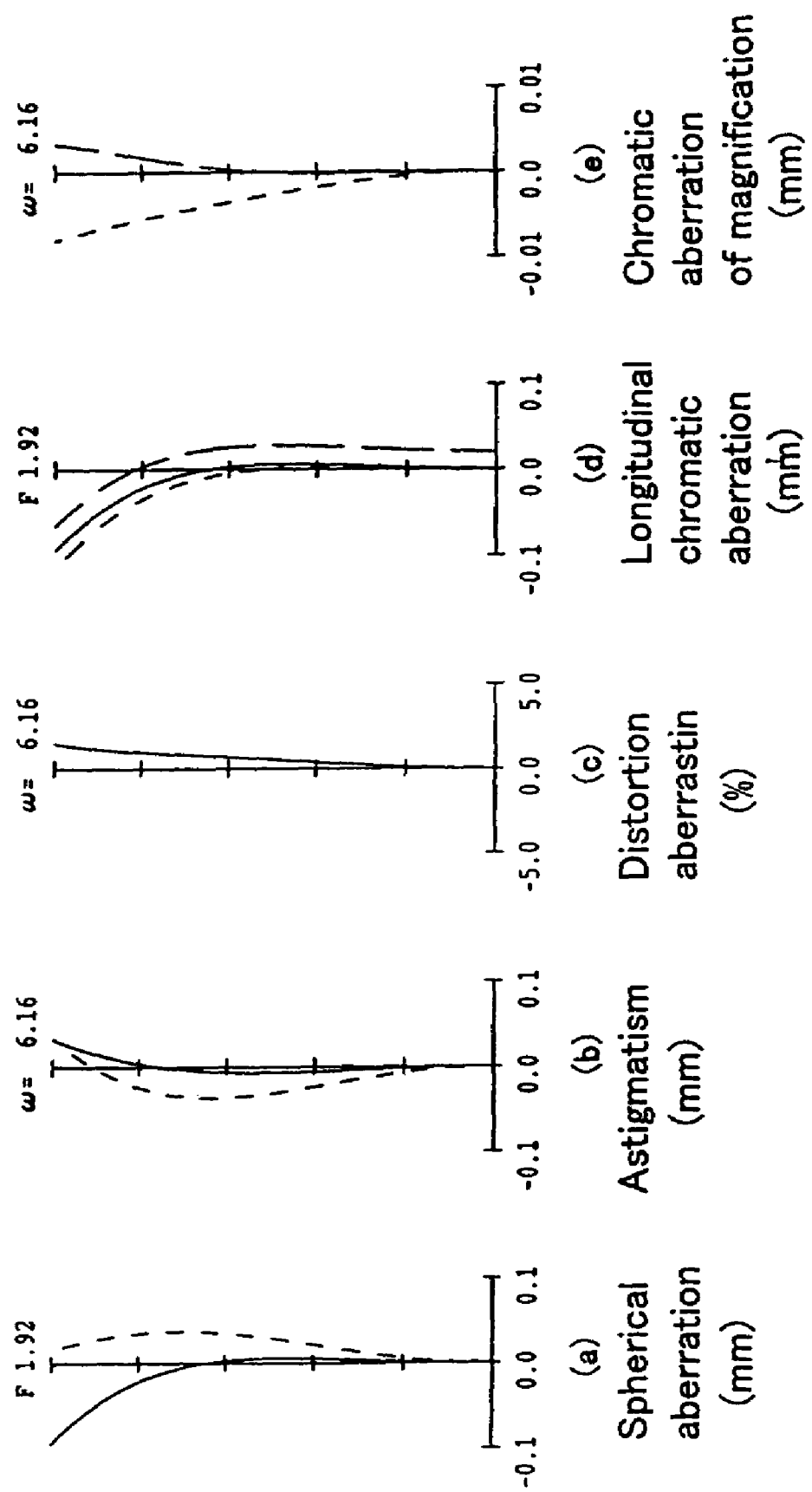
FIG. 72 illustrates various aberrations at a standard position in the sixteenth embodiment according to the present invention.
Figure 73:
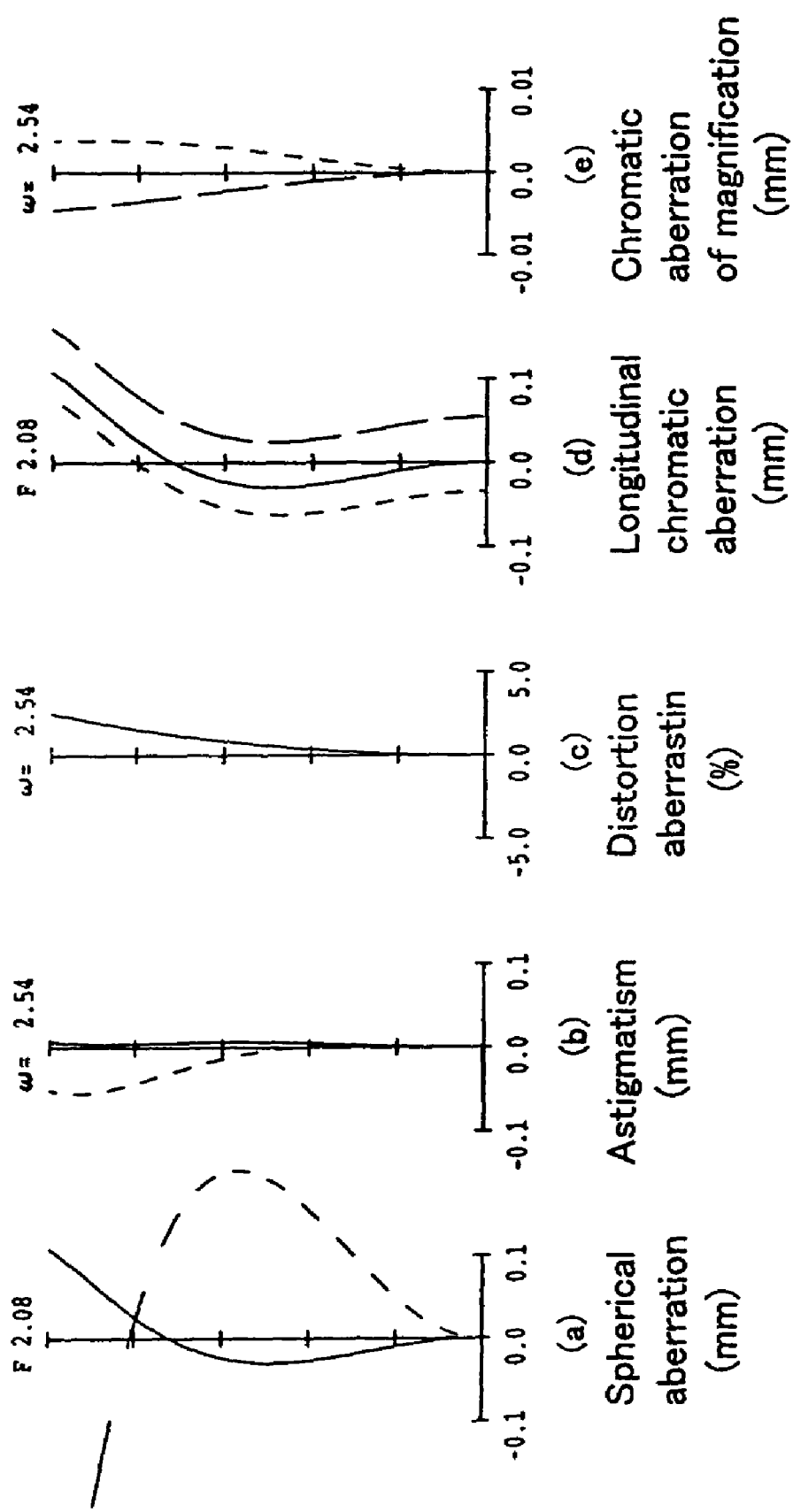
FIG. 73 illustrates various aberrations at a telephoto end in the sixteenth embodiment according to the present invention.

FIGS. 71-73 illustrate various aberrations at a wide-angle end, at a standard position and at a telephoto end of the zoom lens. As clearly shown in the aberrations of FIGS. 71-73, a zoom lens according to this embodiment has sufficient performance to correct aberration to realize high resolution.

Seventeenth Embodiment

Figure 74:
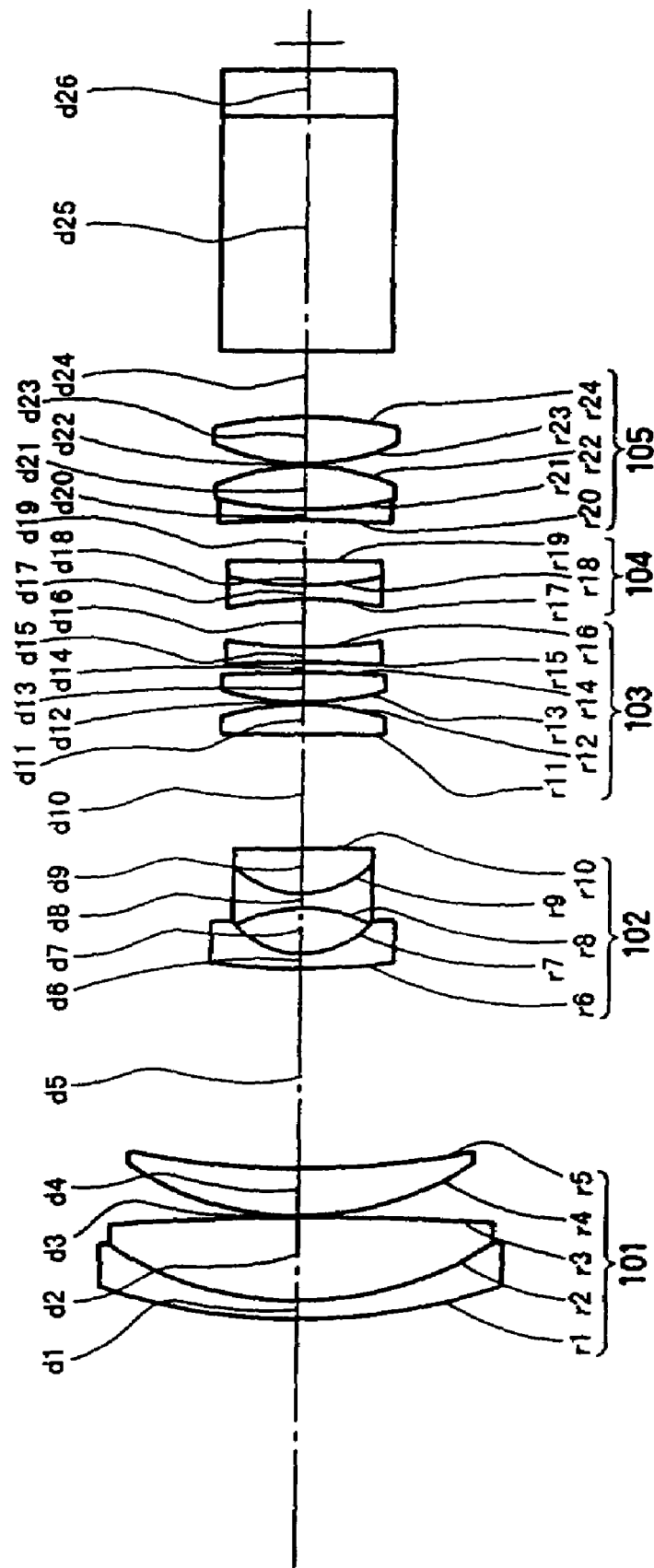
FIG. 74 is a view showing the arrangement of a zoom lens in a seventeenth embodiment according to the present invention.

FIG. 74 is a view showing the arrangement of a zoom lens in a seventeenth embodiment according to the present invention. As shown in FIG. 74, a zoom lens has a structure in which a first lens group 101, a second lens group 102, a third lens group 103, a fourth lens group 104, and a fifth lens group 105 are disposed from an object side (left side in FIG. 74) to an image plane side (right side in FIG. 74) in this order.

The first lens group 101 has a positive refracting power and is fixed with respect to the image plane in varying power and focusing. The second lens group 102 has a negative refracting power and varies power by moving along an optical axis. The third lens group 103 is composed of three lenses: a positive lens, a positive lens and a negative lens disposed from the object side in this order. The third lens group includes at least one aspherical surface and has a positive refracting power as a whole. The fourth lens group 104 is composed of two lenses as a cemented lens of a negative lens and a positive lens disposed from the object side in this order, and this group has a negative refracting power as a whole, and is fixed with respect to the image plane in varying power and focusing. The fifth lens group 105 has a positive refracting power and moves along an optical axis so as to move an image and adjust the focus thereof at the same time in accordance with variable power. When camera shake occurs, shake of an image is corrected by moving the third lens group 103 vertically with respect to the optical axis.

As mentioned above, the performance when shifting the lenses can be improved by applying at least one aspherical surface to any of the lenses of the third lens group 103.

Similar to the first embodiment, it is preferable for the zoom lens of this embodiment that the conditional expressions (8)-(16) are satisfied.

Specific examples of zoom lenses according to this embodiment are shown in the following Table 64.

TABLE 64

| Group | Surface | r | d | n | ν |
|---|---|---|---|---|---|
| 1 | 1 | 35.243 | 0.90 | 1.80518 | 25.4 |
|  | 2 | 18.353 | 5.25 | 1.60311 | 60.7 |
|  | 3 | −154.339 | 0.15 |  |  |
|  | 4 | 17.449 | 3.00 | 1.60311 | 60.7 |
|  | 5 | 53.989 | Variable |  |  |
| 2 | 6 | 53.989 | 0.70 | 1.78500 | 43.7 |
|  | 7 | 5.142 | 2.97 |  |  |
|  | 8 | −7.948 | 0.80 | 1.66547 | 55.2 |
|  | 9 | 5.519 | 2.70 | 1.80518 | 25.4 |
|  | 10 | 1291.253 | Variable |  |  |
| 3 | 11 | 1044.254 | 1.70 | 1.51450 | 63.1 |
|  | 12 | −16.361 | 0.10 |  |  |
|  | 13 | 15.774 | 1.90 | 1.58913 | 61.2 |
|  | 14 | −45.969 | 0.50 |  |  |
|  | 15 | −46.430 | 1.90 | 1.80518 | 25.4 |
|  | 16 | 42.087 | 2.70 |  |  |
| 4 | 17 | −20.461 | 0.80 | 1.58913 | 61.2 |
|  | 18 | 16.458 | 1.60 | 1.80518 | 25.4 |
|  | 19 | 63.911 | Variable |  |  |
| 5 | 20 | −54.786 | 0.60 | 1.84666 | 23.9 |
|  | 21 | 18.645 | 2.80 | 1.51633 | 64.1 |
|  | 22 | −12.273 | 0.10 |  |  |
|  | 23 | 11.361 | 3.00 | 1.51450 | 63.1 |
|  | 24 | −19.962 | Variable |  |  |

TABLE 64-continued

| Group | Surface | r | d | n | ν |
|---|---|---|---|---|---|
| 6 | 25 | ∞ | 14.00 | 1.58913 | 61.2 |
|  | 26 | ∞ | 2.80 | 1.51633 | 64.1 |
|  | 27 | ∞ | — |  |  |

The following Table 65 shows aspherical coefficients of the zoom lens in the present example.

TABLE 65

| Surface | 8 | 13 | 22. |
|---|---|---|---|
| K | −4.89985 | −4.53315 | $-8.12542 \times 10^{-1}$ |
| D | $-1.08175 \times 10^{-3}$ | $-6.30517 \times 10^{-5}$ | $-5.78738 \times 10^{-5}$ |
| E | $-1.06040 \times 10^{-5}$ | $2.50225 \times 10^{-7}$ | $-1.83558 \times 10^{-7}$ |

The following Table 66 shows an air distance (mm) that is varied by zooming in the case where an object is positioned 2 m away from the tip end of the lens. At the standard position magnification of the second lens group 102 becomes −1 times in Table 66.

TABLE 66

|  | Wide-angle end | Standard position | Telephoto end |
|---|---|---|---|
| f | 3.685 | 18.123 | 42.738 |
| F/NO | 1.657 | 1.879 | 2.074 |
| 2ω | 58.363 | 12.121 | 5.093 |
| d5 | 0.600 | 11.675 | 14.927 |
| d10 | 17.902 | 6.827 | 3.575 |
| d14 | 5.200 | 2.329 | 5.200 |
| d19 | 1.000 | 3.871 | 1.000 |

Figure 75:
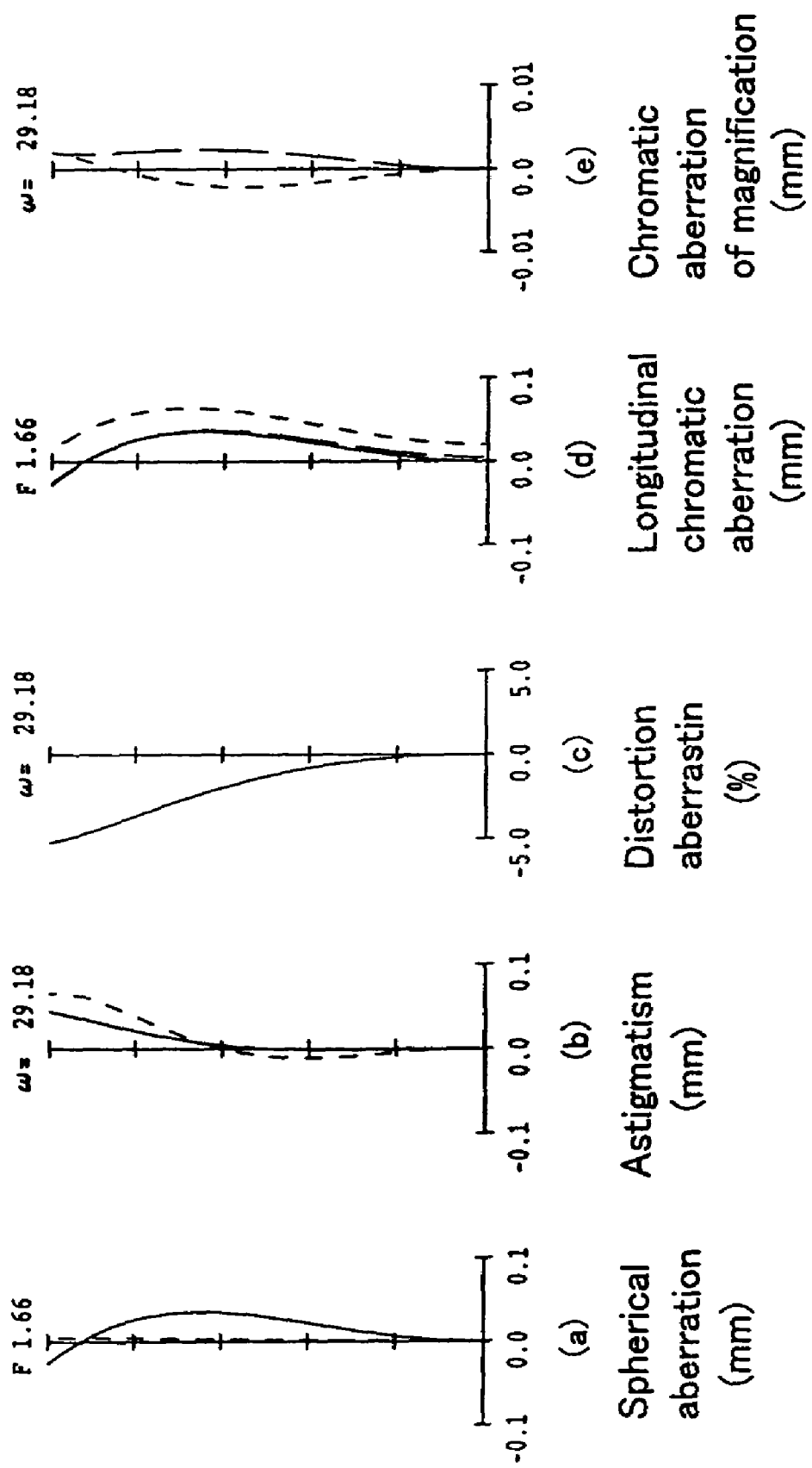
FIG. 75 illustrates various aberrations at a wide-angle end in the seventeenth embodiment according to the present invention.
Figure 76:
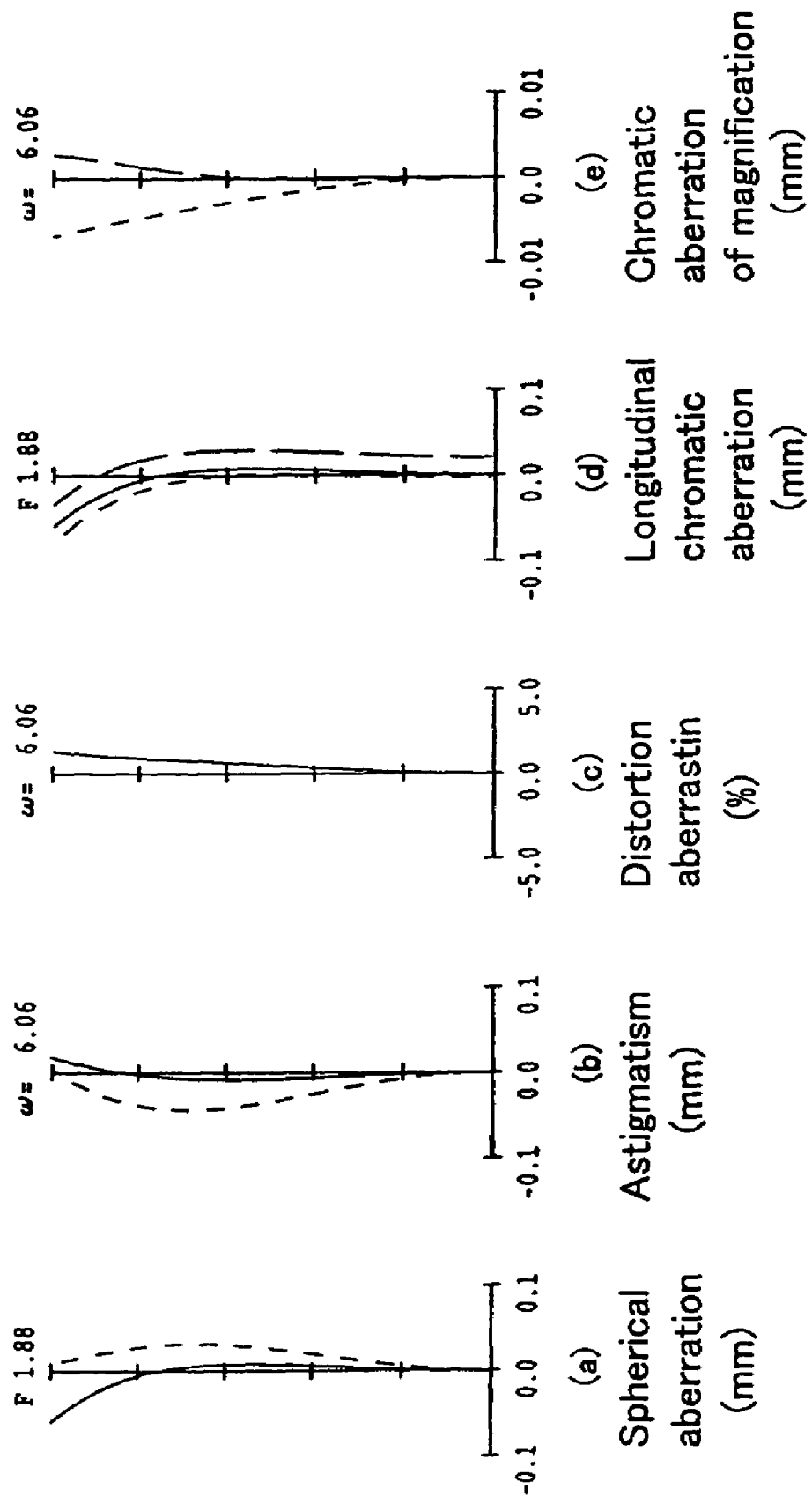
FIG. 76 illustrates various aberrations at a standard position in the seventeenth embodiment according to the present invention.
Figure 77:
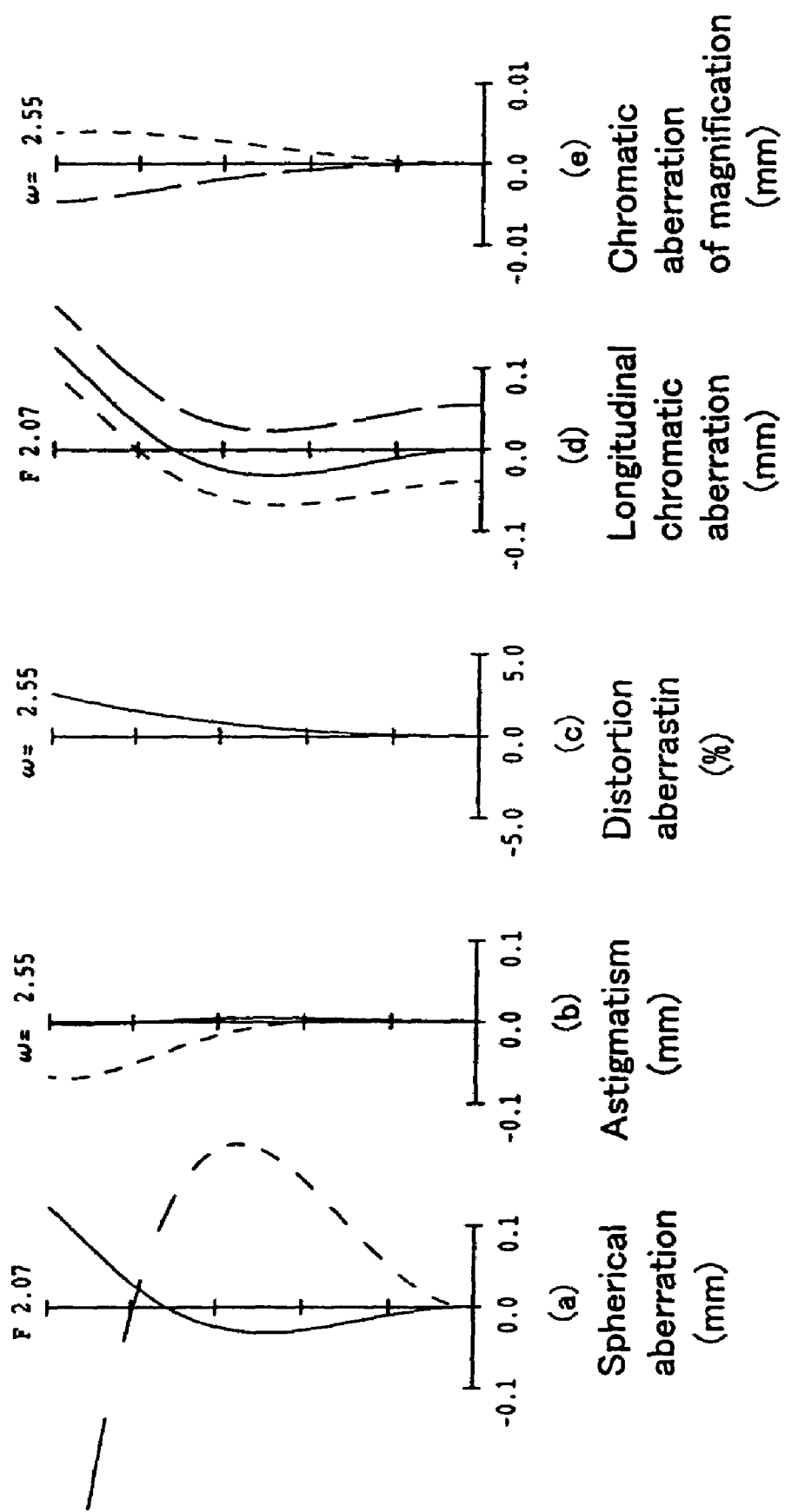
FIG. 77 illustrates various aberrations at a telephoto end in the seventeenth embodiment according to the present invention.

FIGS. 75-77 illustrate various aberrations at a wide-angle end, at a standard position and at a telephoto end of the zoom lens. As clearly shown in the aberrations of FIGS. 75-77, a zoom lens according to this embodiment has sufficient performance to correct aberration to realize high resolution.

Eighteenth Embodiment

Figure 78:
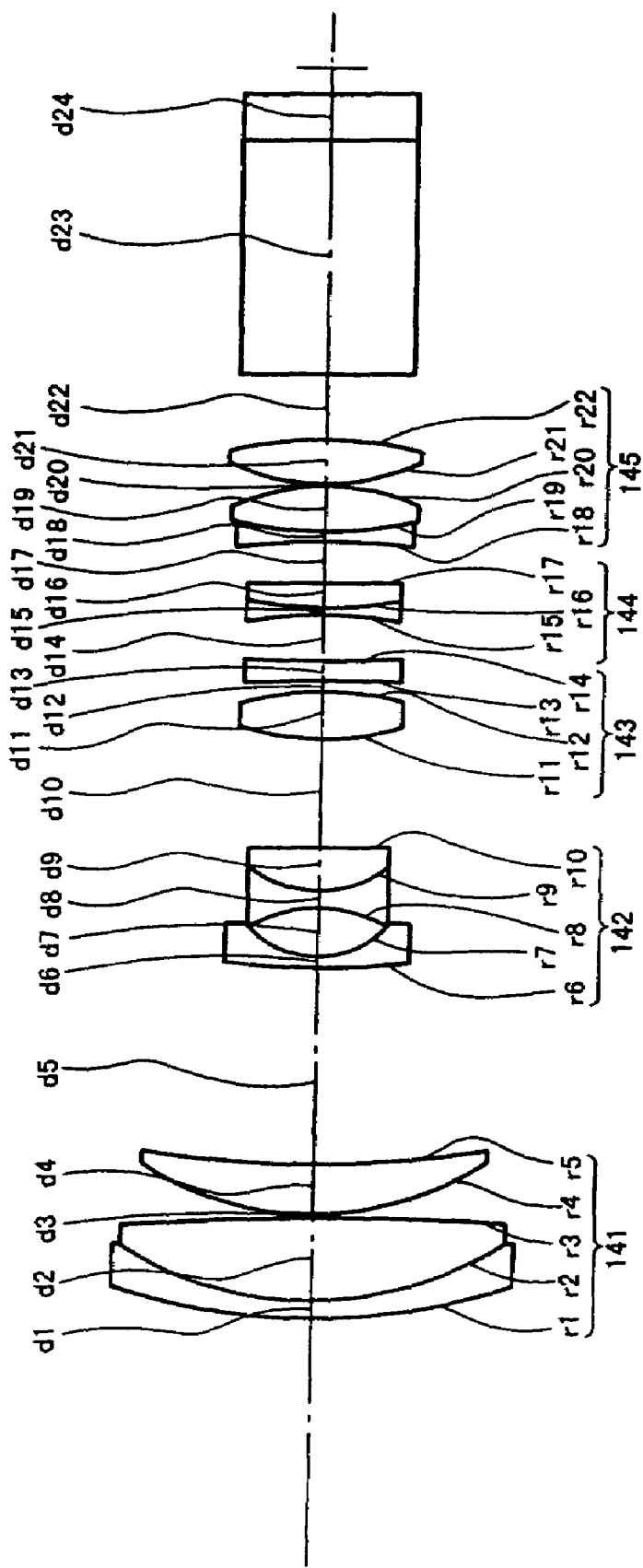
FIG. 78 is a view showing the arrangement of a zoom lens in a eighteenth embodiment according to the present invention.

FIG. 78 is a view showing the arrangement of a zoom lens in an eighteenth embodiment according to the present invention. As shown in FIG. 78, a zoom lens has a structure in which a first lens group 141, a second lens group 142, a third lens group 143, a fourth lens group 144, and a fifth lens group 145 are disposed from an object side (left side in FIG. 78) to an image plane side (right side in FIG. 78) in this order.

The first lens group 141 has a positive refracting power and is fixed with respect to the image plane in varying power and focusing. The second lens group 142 has a negative refracting power and varies power by moving along an optical axis. The third lens group 143 is composed of two lenses: a positive lens and a negative lens disposed from the object side in this order. The lenses of the third group have surfaces equal to each other in the sag amount, and this group has a positive refracting power as a whole.

The fourth lens group 144 is composed of two lenses as a cemented lens of a negative lens and a positive lens disposed from the object side in this order, and this group has a negative refracting power as a whole, and is fixed with respect to the image plane in varying power and focusing. The fifth lens group 145 has a positive refracting power and moves along an optical axis so as to move an image and adjust the focus thereof at the same time in accordance with variable power. When camera shake occurs, shake of an image is corrected by moving the third lens group 143 vertically with respect to the optical axis.

As described above, light beams entering the fifth lens group 145 can be lowered by combining the third lens group 143 having a positive refracting power as a whole and the fourth lens group 144 having a negative refracting power as a whole. Namely, since the lens diameter of the fourth group 144 can be decreased, a load on an actuator will be lighter in focusing.

The performance at shifting the lenses can be improved by applying at least one aspherical surface to any of the lenses of the third group 143.

Similar to the fourteenth embodiment, it is preferable for the zoom lens of this embodiment that the conditional expressions (8)-(16) are satisfied.

Specific examples of zoom lenses according to this embodiment are shown in the following Table 67.

TABLE 67

| Group | Surface | r | d | n | ν |
|---|---|---|---|---|---|
| 1 | 1 | 35.171 | 0.90 | 1.80518 | 25.4 |
|   | 2 | 18.474 | 5.25 | 1.60311 | 60.7 |
|   | 3 | −153.872 | 0.15 |   |   |
|   | 4 | 17.397 | 3.00 | 1.60311 | 60.7 |
|   | 5 | 52.501 | Variable |   |   |
| 2 | 6 | 52.501 | 0.60 | 1.78500 | 43.7 |
|   | 7 | 5.178 | 2.97 | 1.66547 | 55.2 |
|   | 8 | −7.914 | 1.00 |   |   |
|   | 9 | 5.841 | 2.70 | 1.80518 | 25.4 |
|   | 10 | ∞ | Variable |   |   |
| 3 | 11 | 13.430 | 3.00 | 1.51450 | 63.1 |
|   | 12 | −13.430 | 0.60 |   |   |
|   | 13 | −45.224 | 1.20 | 1.80518 | 25.4 |
|   | 14 | 84.188 | 2.60 |   |   |
| 4 | 15 | −23.195 | 0.60 | 1.58913 | 61.2 |
|   | 16 | 23.195 | 1.50 | 1.80518 | 25.4 |
|   | 17 | 70.085 | Variable |   |   |
| 5 | 18 | −56.351 | 0.60 | 1.84666 | 23.9 |
|   | 19 | 18.833 | 2.80 | 1.51633 | 64.1 |
|   | 20 | −13.089 | 0.10 |   |   |
|   | 21 | 11.081 | 2.85 | 1.51450 | 63.1 |
|   | 22 | −19.280 | Variable |   |   |
| 6 | 23 | ∞ | 14.00 | 1.58913 | 61.2 |
|   | 24 | ∞ | 2.80 | 1.51633 | 64.1 |
|   | 25 | ∞ | — |   |   |

The following Table 68 shows aspherical coefficients of the zoom lens in the present example.

TABLE 68

| Surface | 8 | 11 | 12 | 20 |
|---|---|---|---|---|
| K | −8.93826 × $10^{-1}$ | −1.54989 | −1.54989 | −5.29341 × $10^{-1}$ |
| D | −1.30720 × $10^{-4}$ | −3.86132 × $10^{-5}$ | 3.86132 × $10^{-5}$ | −8.85522 × $10^{-5}$ |
| E | −2.38410 × $10^{-5}$ | 2.40598 × $10^{-7}$ | −2.40598 × $10^{-7}$ | −2.60439 × $10^{-7}$ |

The following Table 69 shows an air distance (mm) that is varied by zooming in the case where an object is positioned 2 m away from the tip end of the lens. At the standard position, magnification of the second lens group 142 becomes −1 times in Table 69.

TABLE 69

|   | Wide-angle end | Standard position | Telephoto end |
|---|---|---|---|
| f | 3.681 | 18.240 | 42.656 |
| F/NO | 1.655 | 1.874 | 2.067 |
| 2ω | 58.529 | 12.076 | 5.120 |
| d5 | 0.600 | 11.710 | 14.974 |
| d10 | 17.503 | 6.393 | 3.129 |
| d14 | 5.200 | 2.321 | 5.200 |
| d19 | 1.000 | 3.879 | 1.000 |

The values of the expressions (8) to (14) are as follows.

$rS1/rS9 = 0.79$ $|f3/f34| = 0.62$ $BF/fw = 3.58$ $f1/fw = 7.00$ $|f2|/fw = 1.26$ $f34/fw = 8.83$ $f5/fw = 3.23$

Figure 79:
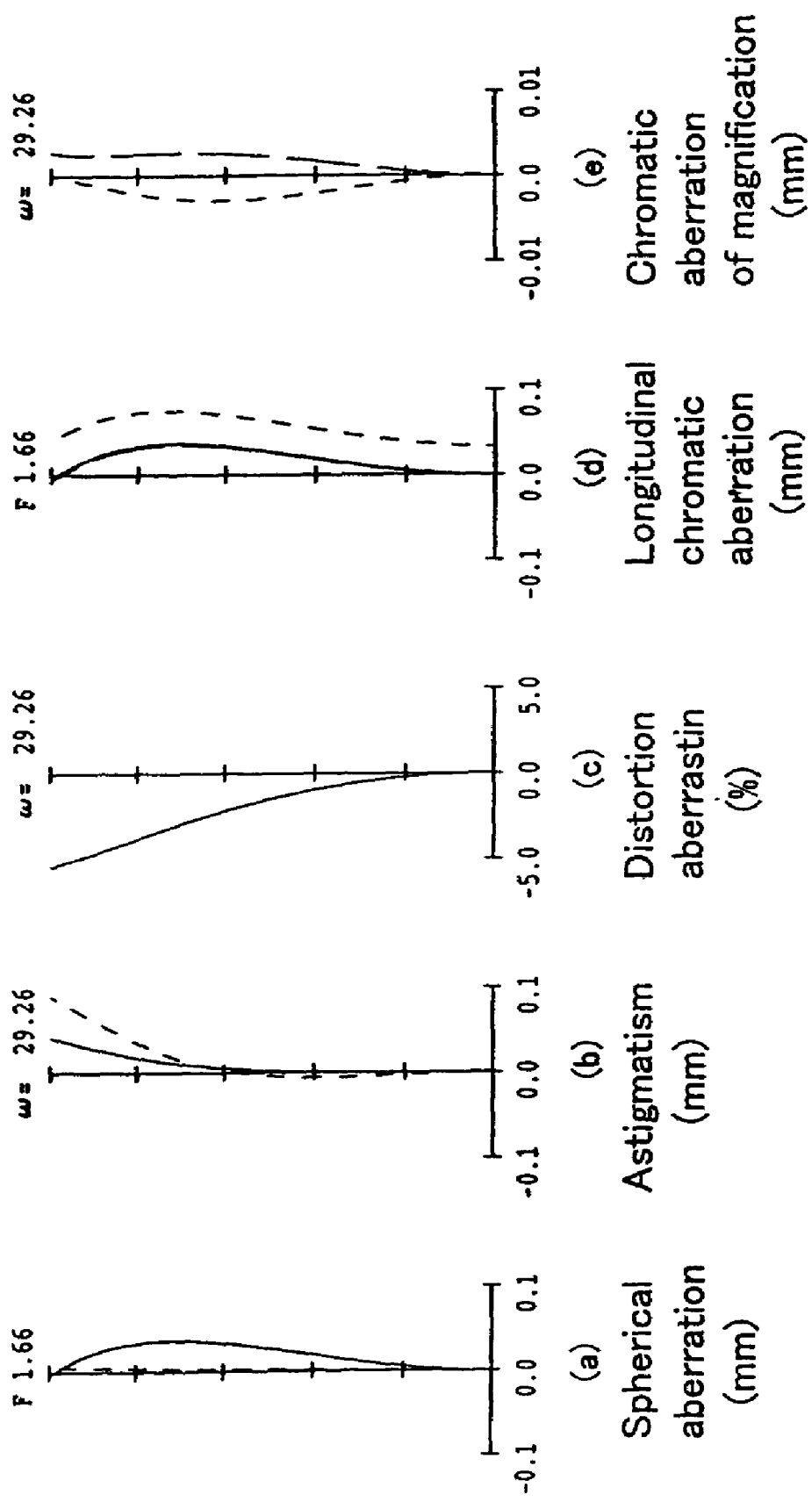
FIG. 79 illustrates various aberrations at a wide-angle end in the eighteenth embodiment according to the present invention.
Figure 80:
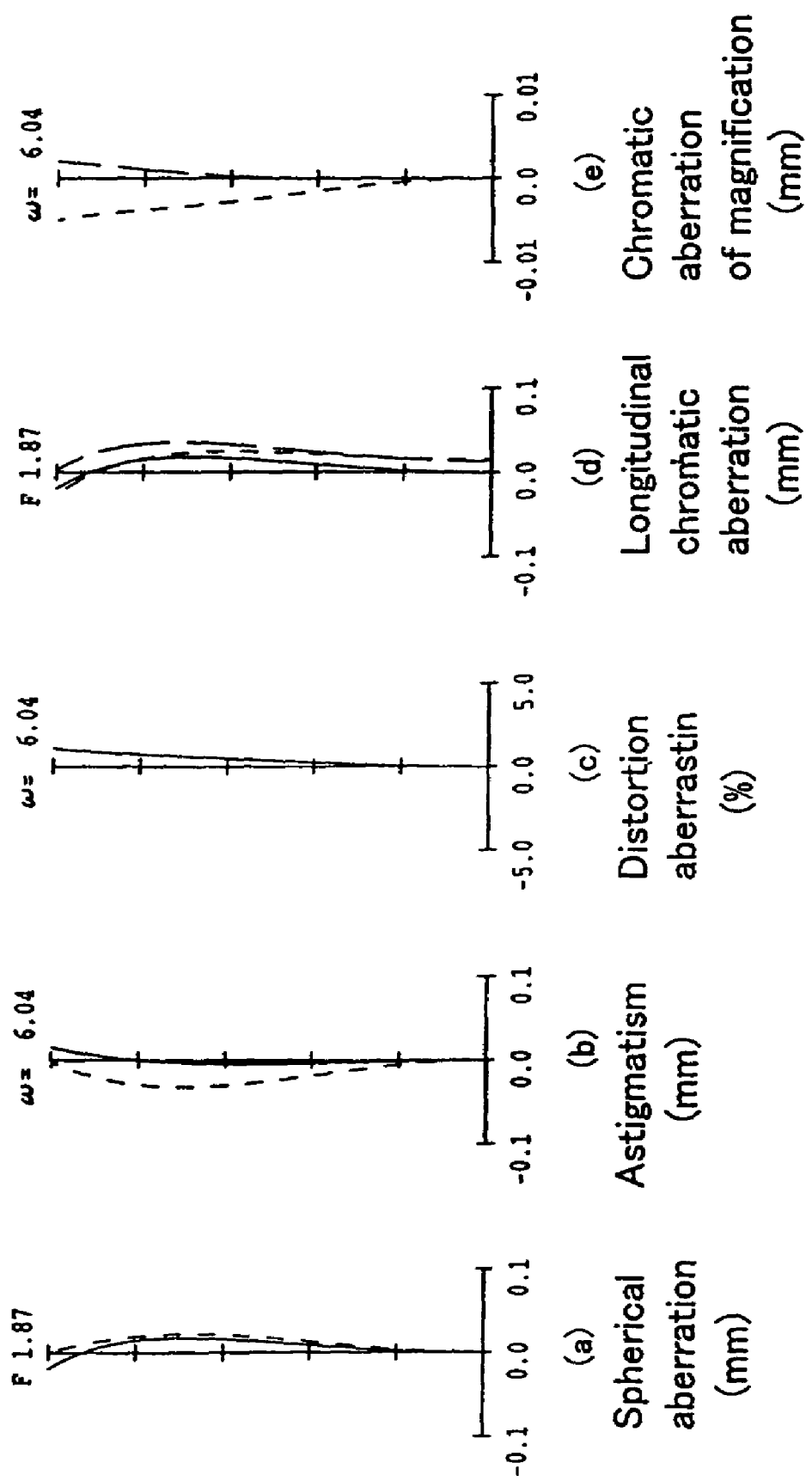
FIG. 80 illustrates various aberrations at a standard position in the eighteenth embodiment according to the present invention.

FIGS. 79-81 illustrate various aberrations at a wide-angle end, at a standard position and at a telephoto end of the zoom lens. As clearly shown in the aberrations of FIGS. 79-81, a zoom lens according to this embodiment has sufficient performance to correct aberration to realize high resolution.

Nineteenth Embodiment

Figure 82:
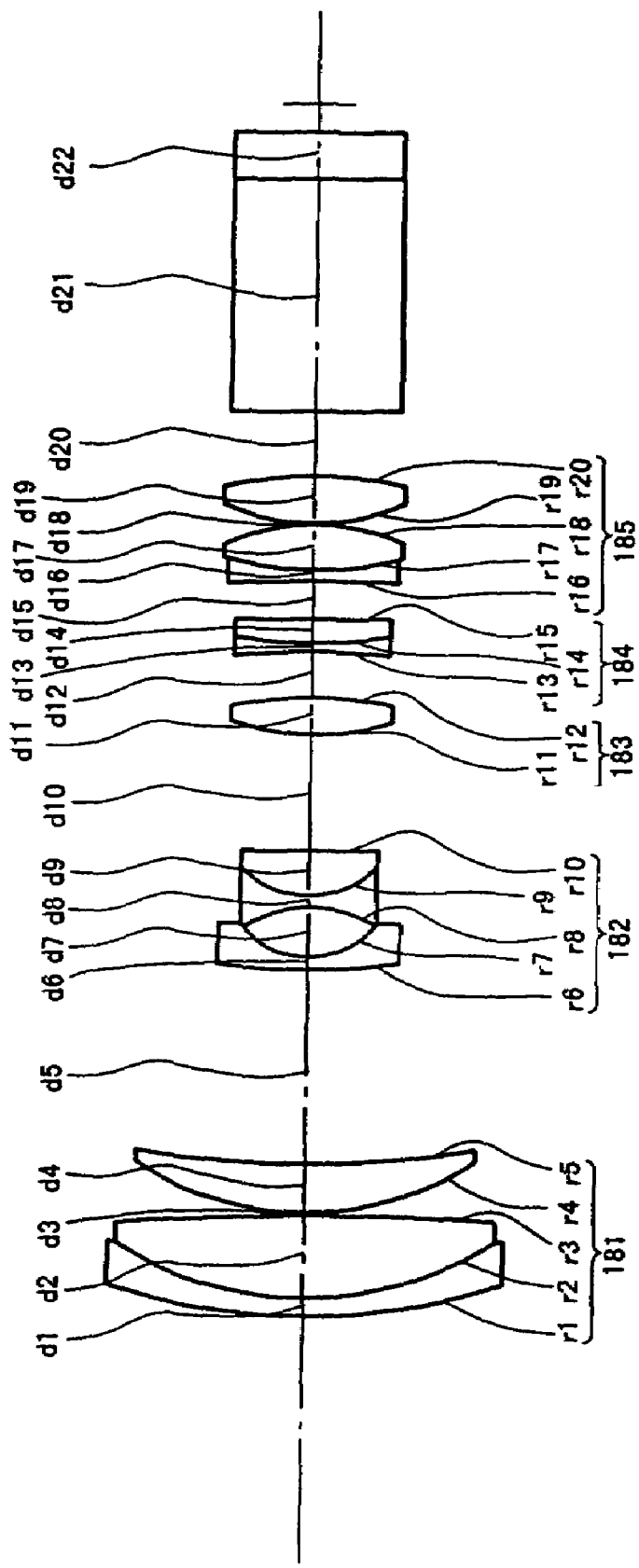
FIG. 82 is a view showing the arrangement of a zoom lens in a nineteenth embodiment according to the present invention.

FIG. 82 is a view showing the arrangement of a zoom lens in a nineteenth embodiment according to the present invention. As shown in FIG. 82, a zoom lens has a structure in which a first lens group 181, a second lens group 182, a third lens group 183, a fourth lens group 184, and a fifth lens group 185 are disposed from an object side (left side in FIG. 82) to an image plane side (right side in FIG. 82) in this order.

The first lens group 181 has a positive refracting power and is fixed with respect to the image plane in varying power and focusing. The second lens group 182 has a negative refracting power and varies power by moving along an optical axis. The third lens group 183 is composed of one lens having a positive refracting power.

The fourth lens group 184 is composed of two lenses as a cemented lens of a negative lens and a positive lens disposed from the object side in this order and this group has a negative refracting power as a whole, and is fixed with respect to the image plane varying power and focusing. The fifth lens group 185 has a positive refracting power and moves along an optical axis so as to move an image and adjust the focus thereof at the same time in accordance with variable power. When camera shake occurs, shake of an image is corrected by moving the third lens group 183 vertically with respect to the optical axis.

As a result, the tolerance can be eased by forming a shift lens group (the third lens group 183) with one lens.

The performance when shifting the lens can be improved by applying at least one aspherical surface to the lens of the third group 183.

Similar to the fourteenth embodiment, it is preferable for the zoom lens of this embodiment that the conditional expressions (8)-(16) are satisfied.

Specific examples of zoom lenses according to this embodiment are shown in the following Table 70.

TABLE 70

| Group | Surface | r | d | n | ν |
|---|---|---|---|---|---|
| 1 | 1 | 35.243 | 0.90 | 1.80518 | 25.4 |
|   | 2 | 18.353 | 5.25 | 1.60311 | 60.7 |
|   | 3 | −154.339 | 0.15 |   |   |
|   | 4 | 17.449 | 3.00 | 1.60311 | 60.7 |
|   | 5 | 53.989 | Variable |   |   |
| 2 | 6 | 53.989 | 0.70 | 1.78500 | 43.7 |
|   | 7 | 5.142 | 2.97 | 1.66547 | 55.2 |
|   | 8 | −7.948 | 0.80 |   |   |
|   | 9 | 5.519 | 2.70 | 1.80518 | 25.4 |
|   | 10 | 1291.253 | Variable |   |   |
| 3 | 11 | 13.124 | 2.40 | 1.43425 | 95.0 |
|   | 12 | −23.353 | 2.70 |   |   |
| 4 | 13 | −45.406 | 0.60 | 1.58913 | 61.2 |
|   | 14 | 24.428 | 1.50 | 1.80518 | 25.4 |
|   | 15 | 36.015 | Variable |   |   |
| 5 | 16 | −69.769 | 0.60 | 1.84666 | 23.9 |
|   | 17 | 18.397 | 2.70 | 1.51633 | 64.1 |
|   | 18 | −13.178 | 0.10 |   |   |
|   | 19 | 11.587 | 2.95 | 1.51450 | 63.1 |
|   | 20 | −21.551 | Variable |   |   |
| 6 | 21 | ∞ | 14.00 | 1.58913 | 61.2 |
|   | 22 | ∞ | 2.80 | 1.51633 | 64.1 |
|   | 23 | ∞ | — |   |   |

The following Table 71 shows aspherical coefficients of the zoom lens in the present example.

TABLE 71

| Surface | 8 | 11 | 12 | 19 |
|---|---|---|---|---|
| K | −4.89985 | −6.72168 | $-1.37149 \times 10^{+1}$ | $-6.00589 \times 10^{-1}$ |
| D | $-1.08175 \times 10^{-3}$ | $3.03174 \times 10^{-4}$ | $8.68352 \times 10^{-6}$ | $-5.27645 \times 10^{-5}$ |
| E | $-1.06040 \times 10^{-5}$ | $-9.85138 \times 10^{-7}$ | $2.15192 \times 10^{-6}$ | $-3.20955 \times 10^{-7}$ |

The following Table 72 shows an air distance (mm) that is varied by zooming in the case where an object is positioned 2 m away from the tip end of the lens. At the standard position, magnification of the second lens group 182 becomes −1 times in Table 72.

TABLE 72

|   | Wide-angle end | Standard position | Telephoto end |
|---|---|---|---|
| f | 3.690 | 18.643 | 42.802 |
| F/NO | 1.661 | 1.872 | 2.077 |
| 2ω | 58.504 | 11.814 | 5.116 |
| d5 | 0.600 | 11.675 | 14.927 |
| d10 | 17.903 | 6.827 | 3.575 |
| d14 | 5.200 | 2.299 | 5.200 |
| d19 | 1.000 | 3.901 | 1.000 |

The values of the expressions (8) to (14) are as follows.

$rS1/rS9=1.02$ (eleventh plane)

$rS1/rS9=0.26$ (twelfth plane)

$|f3/f34|=0.60$ $BF/fw=3.60$ $f1/fw=6.98$ $|f2|/fw=1.25$ $f34/fw=8.93$ $f5/fw=3.36$

Figure 83:
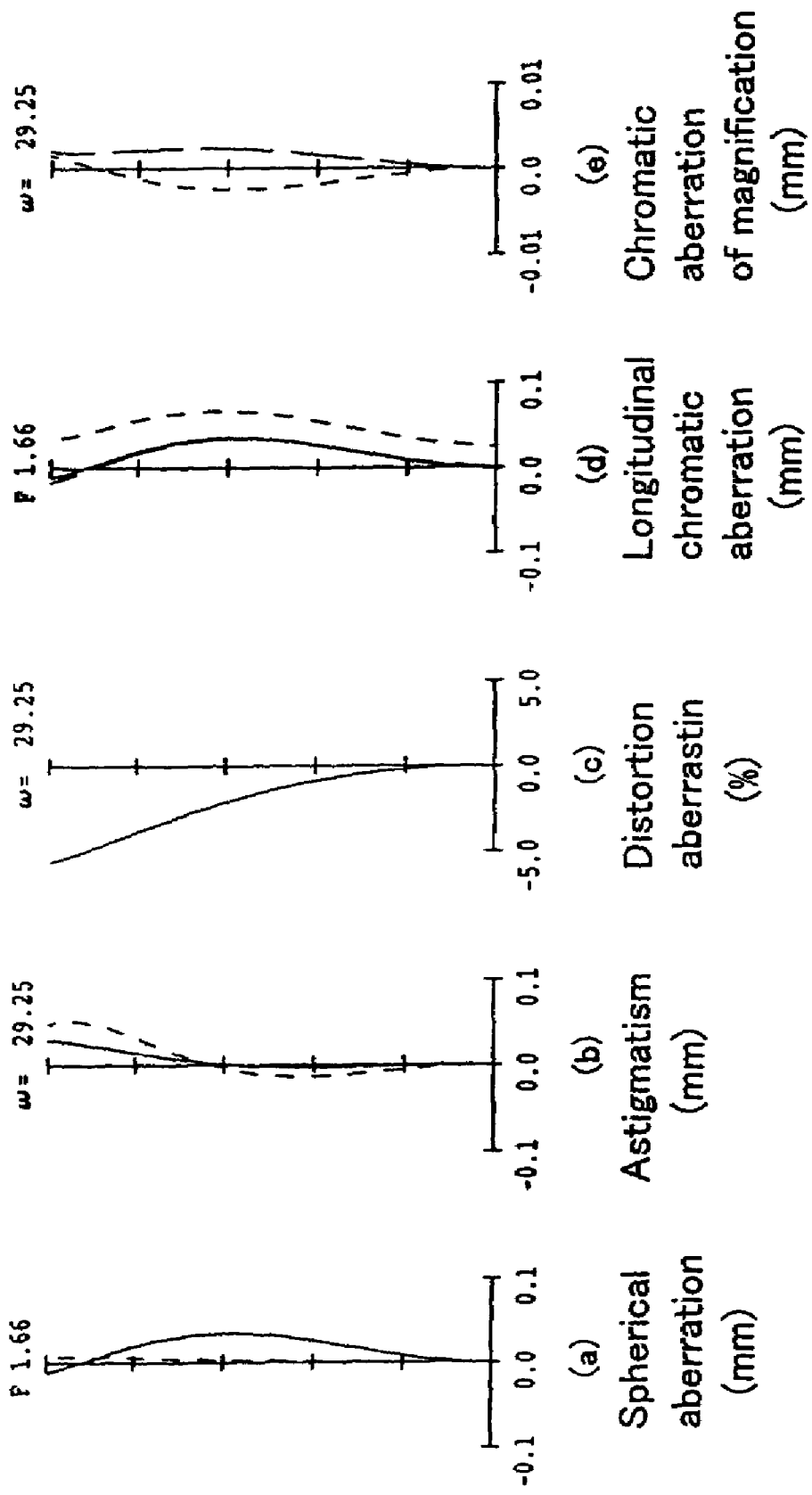
FIG. 83 illustrates various aberrations at a wide-angle end in the nineteenth embodiment according to the present invention.
Figure 84:
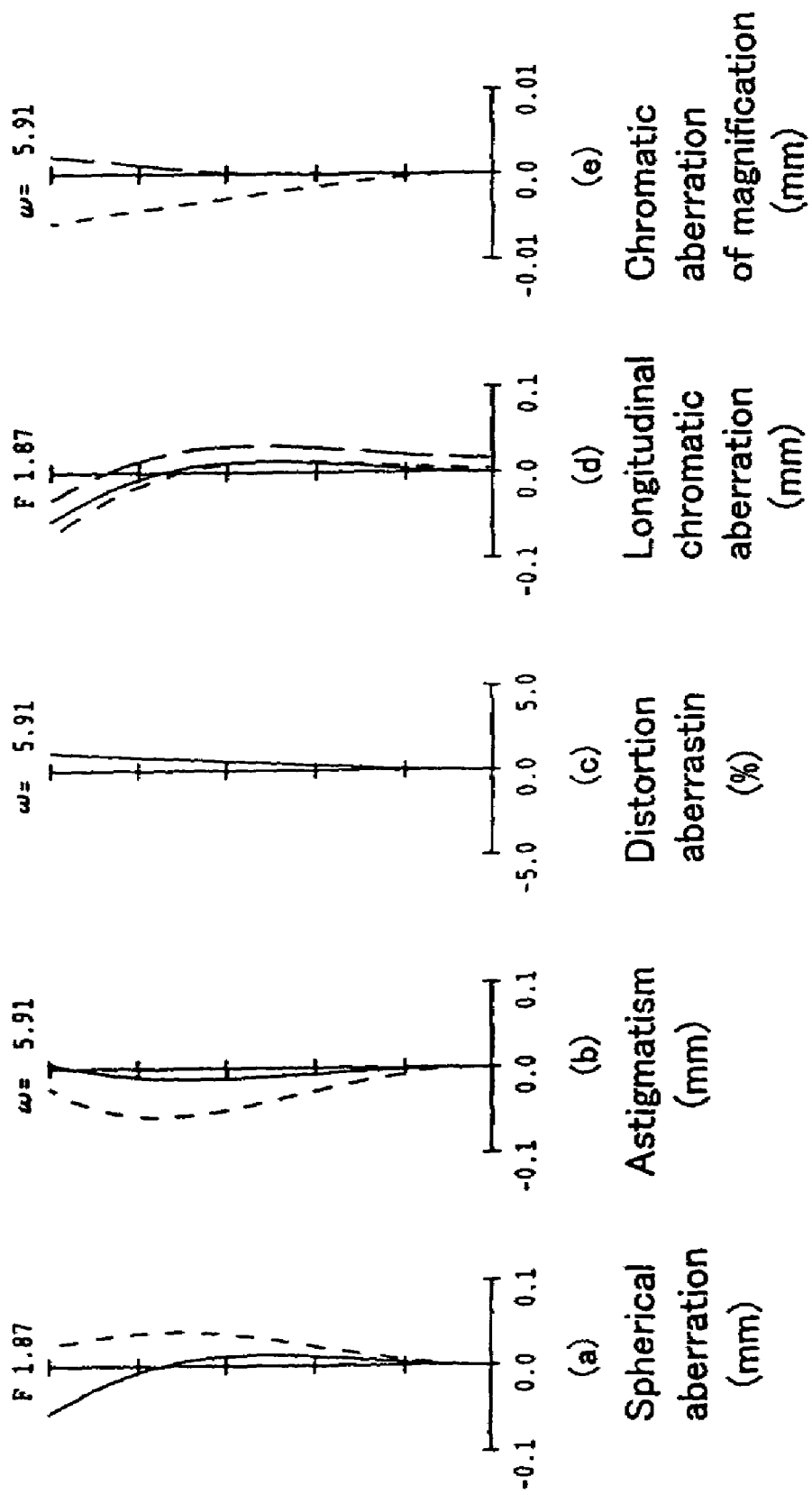
FIG. 84 illustrates various aberrations at a standard position in the nineteenth embodiment according to the present invention.
Figure 85:
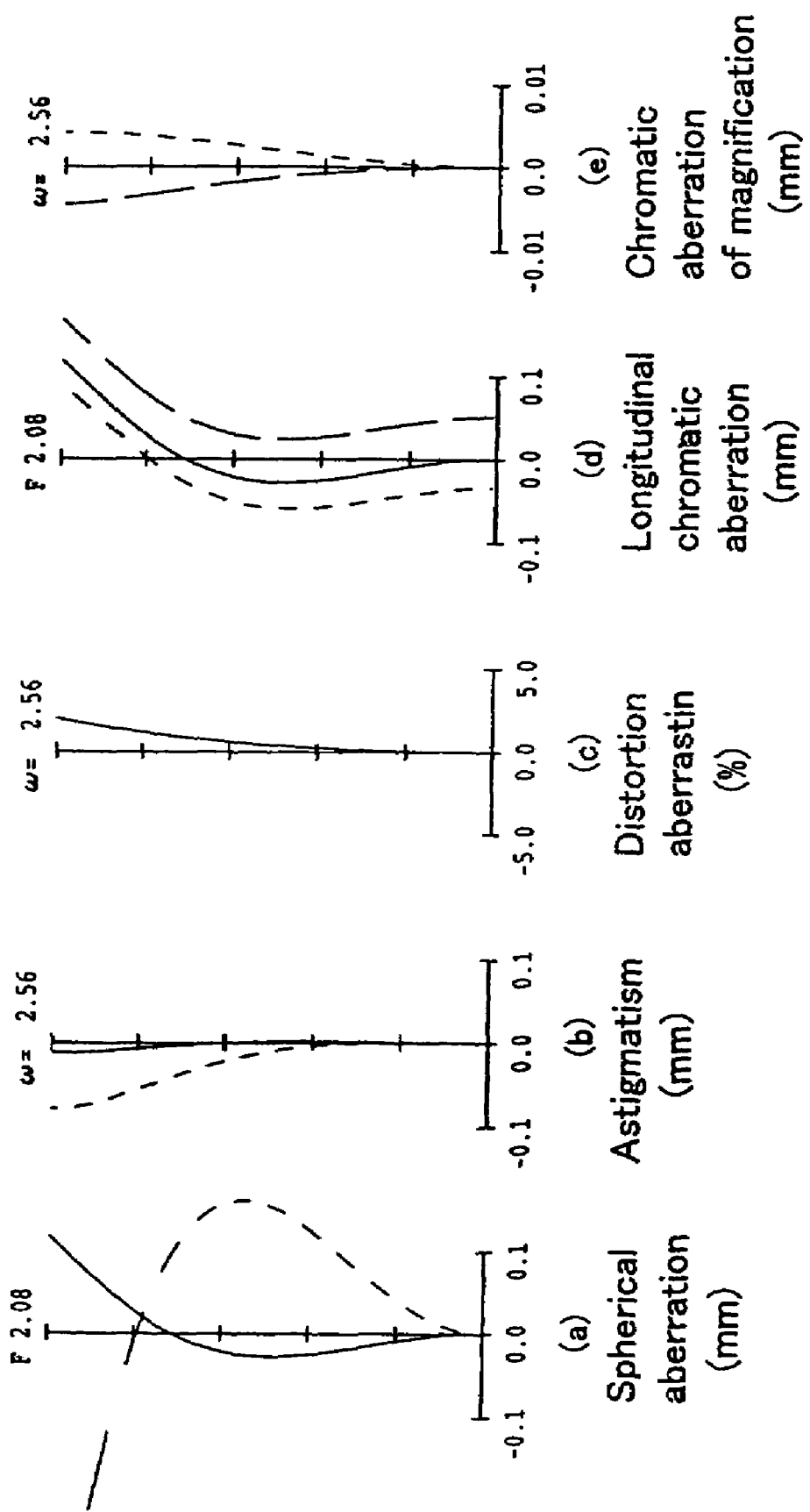
FIG. 85 illustrates various aberrations at a telephoto end in the nineteenth embodiment according to the present invention.

FIGS. 83-85 illustrate various aberrations at a wide-angle end, at a standard position and at a telephoto end of the zoom lens. As clearly shown in the aberrations of FIGS. 83-85, a zoom lens according to this embodiment has sufficient performance to correct aberration to obtain high resolution of a zoom lens.

Twentieth Embodiment

Figure 86:
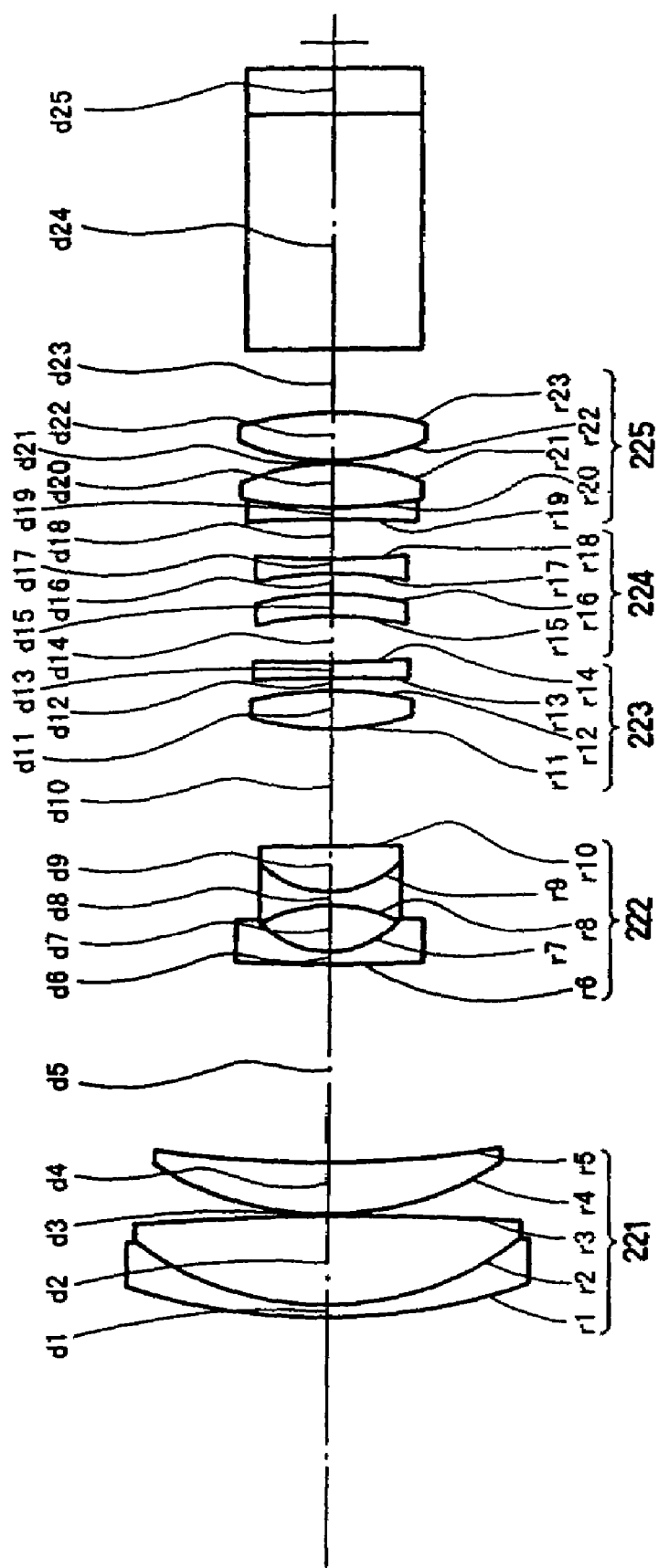
FIG. 86 is a view showing the arrangement of a zoom lens in a twentieth embodiment according to the present invention.

FIG. 86 is a view showing the arrangement of a zoom lens in a twentieth embodiment according to the present invention. As shown in FIG. 86, a zoom lens has a structure in which a first lens group 221, a second lens group 222, a third lens group 223, a fourth lens group 224, and a fifth lens group 225 are disposed from an object side (left side in FIG. 86) to an image plane side (right side in FIG. 86) in this order.

The first lens group 221 has a positive refracting power and is fixed with respect to the image plane in varying power and at focusing. The second lens group 222 has a negative refracting power and varies power by moving along the optical axis. The third lens group 223 is composed of two lenses: a positive lens and a negative lens disposed from the object side in this order, and this group has a positive refracting power as a whole.

The fourth lens group 224 is composed of two lenses: a positive lens and a negative lens disposed from the object side in this order and this group has a negative refracting power as a whole, and is fixed with respect to the image plane in varying power and focusing.

The fifth lens group 225 has a positive refracting power and moves along an optical axis so as to move an image and adjust the focus thereof at the same time in accordance with variable power. When camera shake occurs, shake of an image is corrected by moving the third lens group 223 vertically with respect to the optical axis.

The performance when shifting the lenses can be improved by applying at least one aspherical surface to any of the lenses of the third group 223.

Similar to the fourteenth embodiment, it is preferable for the zoom lens of this embodiment that the conditional expressions (8)-(16) are satisfied.

Specific examples of zoom lenses according to this embodiment are shown in the following Table 73.

TABLE 73

| Group | Surface | r | d | n | ν |
|---|---|---|---|---|---|
| 1 | 1 | 35.243 | 0.90 | 1.80518 | 25.4 |
|  | 2 | 18.353 | 5.25 | 1.60311 | 60.7 |
|  | 3 | −154.339 | 0.15 |  |  |
|  | 4 | 17.449 | 3.00 | 1.60311 | 60.7 |
|  | 5 | 53.989 | Variable |  |  |
| 2 | 6 | 53.989 | 0.70 | 1.78500 | 43.7 |
|  | 7 | 5.142 | 2.97 | 1.66547 | 55.2 |
|  | 8 | −7.948 | 0.80 |  |  |
|  | 9 | 5.519 | 2.70 | 1.80518 | 25.4 |
|  | 10 | 1291.253 | Variable |  |  |
| 3 | 11 | 13.385 | 2.45 | 1.51450 | 63.1 |
|  | 12 | −17.352 | 0.60 |  |  |
|  | 13 | −120.265 | 1.00 | 1.84666 | 25.4 |
|  | 14 | 68.318 | 2.70 |  |  |
| 4 | 15 | −18.144 | 1.50 | 1.58913 | 61.2 |
|  | 16 | −15.906 | 1.00 |  |  |
|  | 17 | −22.792 | 1.00 | 1.80518 | 25.4 |
|  | 19 | 39.750 | Variable |  |  |
| 5 | 20 | −47.899 | 0.60 | 1.84666 | 23.9 |
|  | 21 | 23.192 | 2.70 | 1.51633 | 64.1 |
|  | 22 | −12.941 | 0.10 |  |  |
|  | 23 | 10.762 | 2.95 | 1.51450 | 63.1 |
|  | 24 | −21.804 | Variable |  |  |
| 6 | 25 | ∞ | 14.00 | 1.58913 | 61.2 |
|  | 26 | ∞ | 2.80 | 1.51633 | 64.1 |
|  | 27 | ∞ | — |  |  |

The following Table 74 shows aspherical coefficients of the zoom lens in the present example.

TABLE 74

| Surface | 8 | 11 | 12 | 23 |
|---|---|---|---|---|
| K | −4.89985 | −5.91060 | −5.50770 | −7.58012 × $10^{-1}$ |
| D | −1.08175 × $10^{-3}$ | 1.96402 × $10^{-4}$ | −2.82483 × $10^{-5}$ | −5.38373 × $10^{-5}$ |
| E | −1.06040 × $10^{-5}$ | −1.63114 × $10^{-6}$ | 3.84825 × $10^{-6}$ | −2.44675 × $10^{-7}$ |

The following Table 75 shows an air distance (mm) that is varied by zooming in the case where an object is positioned 2 m away from the tip end of the lens. At the standard position, magnification of the second lens group 222 becomes −1 times in Table 75.

TABLE 75

|  | Wide-angle end | Standard position | Telephoto end |
|---|---|---|---|
| f | 3.685 | 17.981 | 42.743 |
| F/NO | 1.728 | 1.936 | 2.074 |
| 2ω | 58.590 | 12.248 | 5.113 |
| d5 | 0.600 | 11.675 | 14.927 |
| d10 | 17.903 | 6.827 | 3.575 |
| d14 | 5.200 | 2.360 | 5.200 |
| d19 | 1.000 | 3.840 | 1.000 |

The values of the expressions (8) to (14) are as follows.

$rS1/rS9$=1.05

$rS1/rS9$=0.46

$|f3/f34|$=0.62

$BF/fw$=3.58

$f1/fw$=6.99

$|f2|/fw$=1.25

$f34/fw$=8.79

$f5/fw$=3.25

Figure 87:
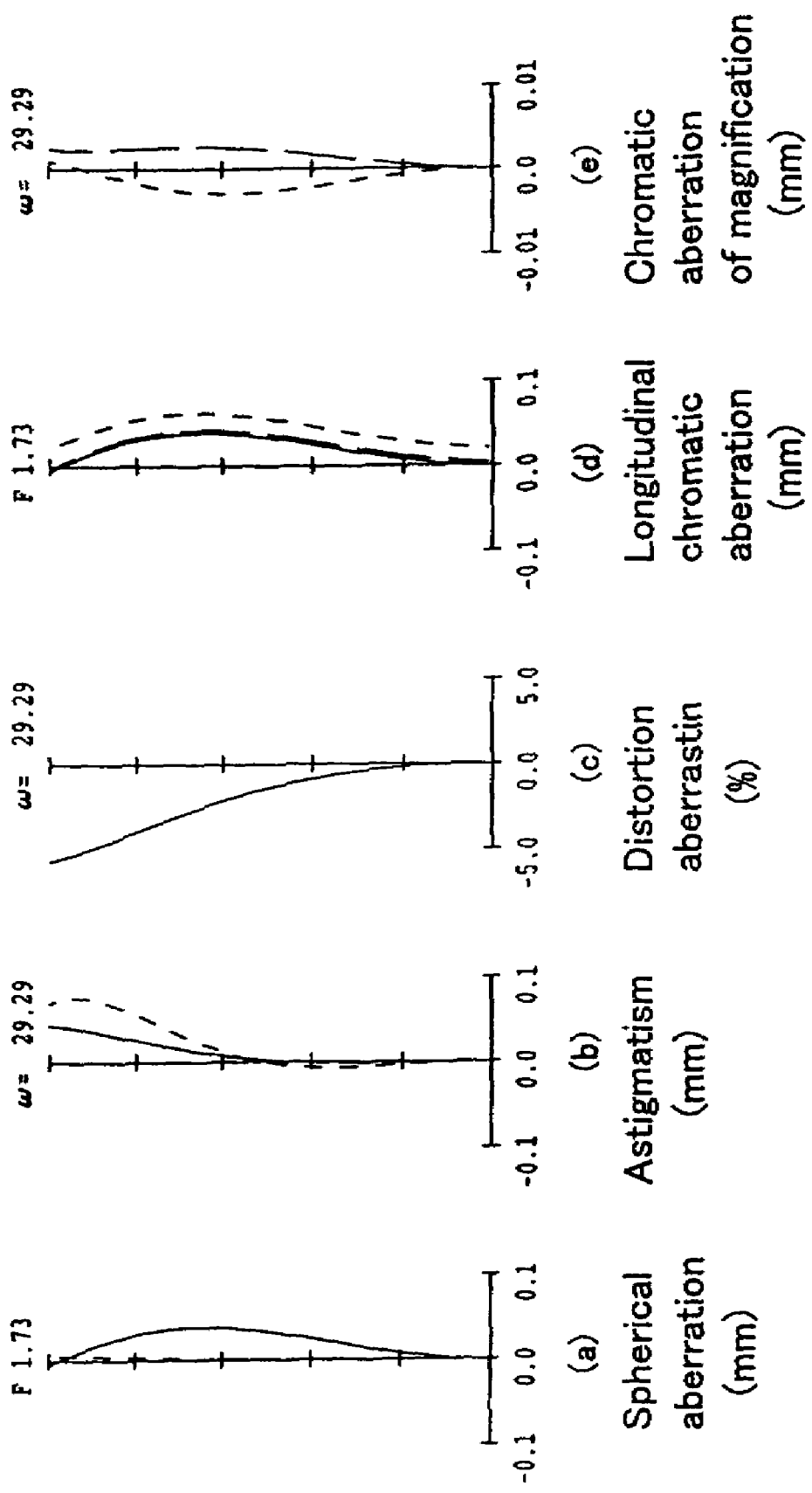
FIG. 87 illustrates various aberrations at a wide-angle end in the twentieth embodiment according to the present invention.
Figure 88:
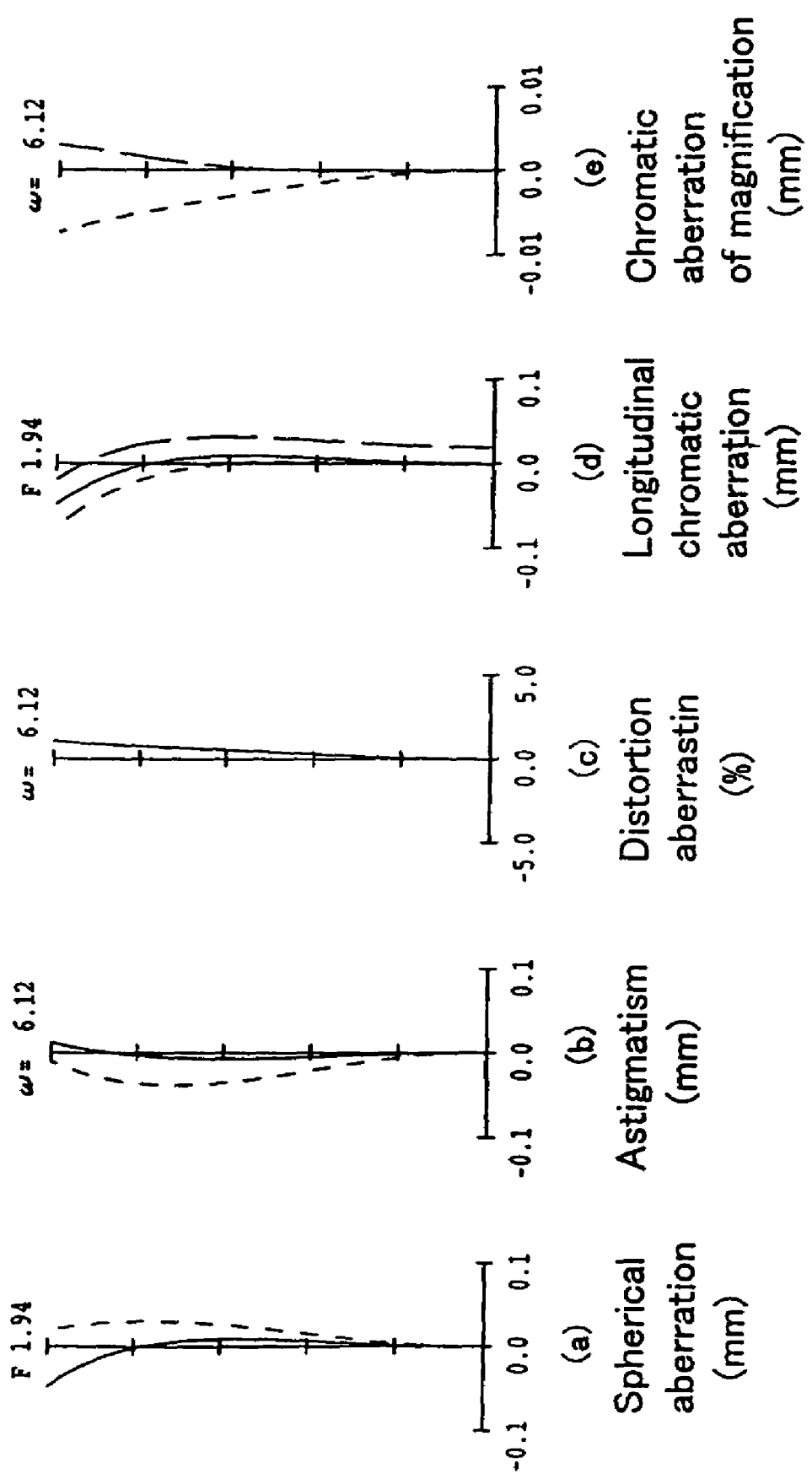
FIG. 88 illustrates various aberrations at a standard position in the twentieth embodiment according to the present invention.
Figure 89:
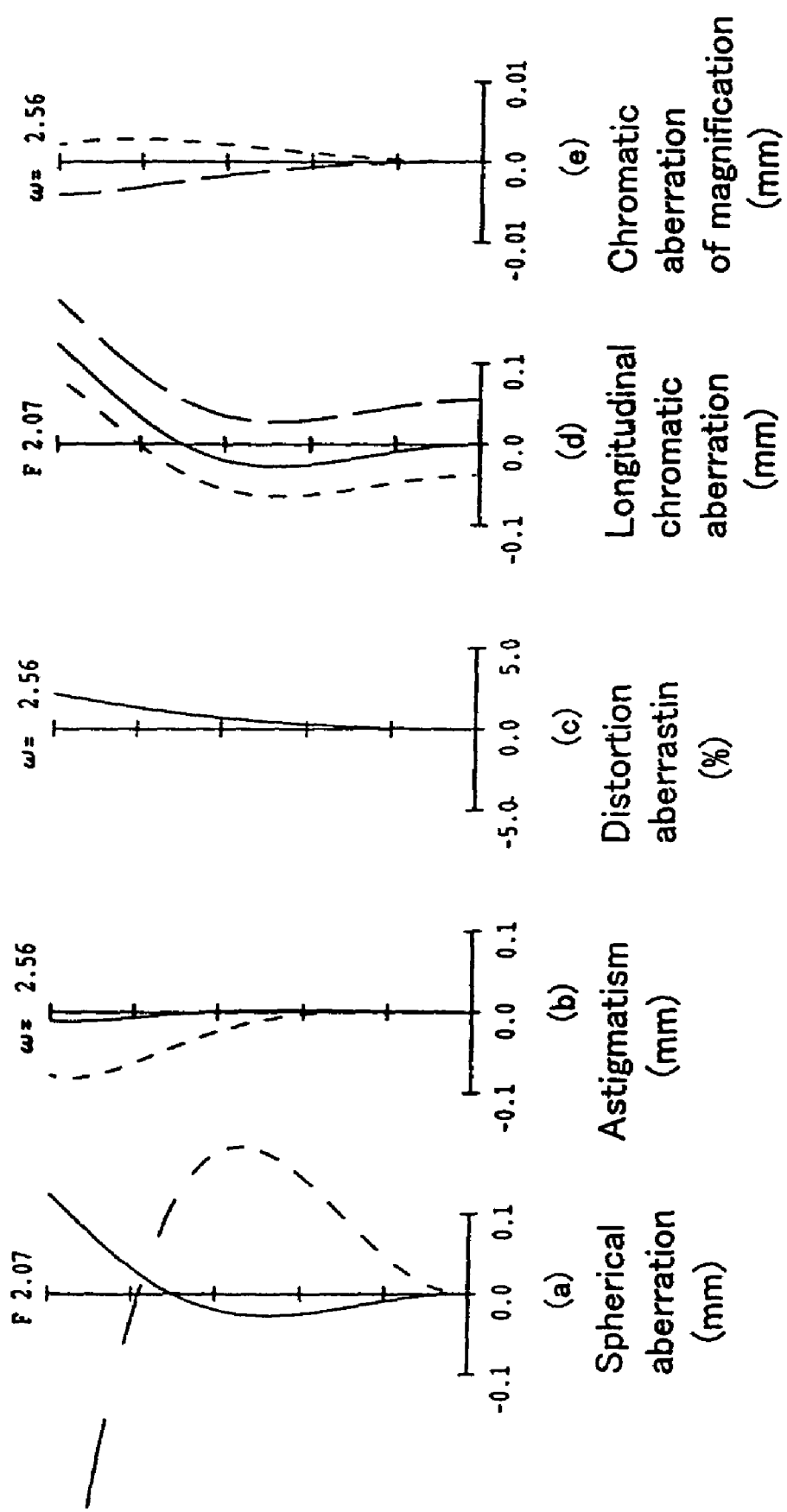
FIG. 89 illustrates various aberrations at a telephoto end in the twentieth embodiment according to the present invention.

FIGS. 87-89 illustrate various aberrations at a wide-angle end, at a standard position and at a telephoto end of the zoom lens. As clearly shown in the aberrations of FIGS. 87-89, a zoom lens according to this embodiment has sufficient performance to correct aberration to realize high resolution.

Twenty-first Embodiment

Figure 90:
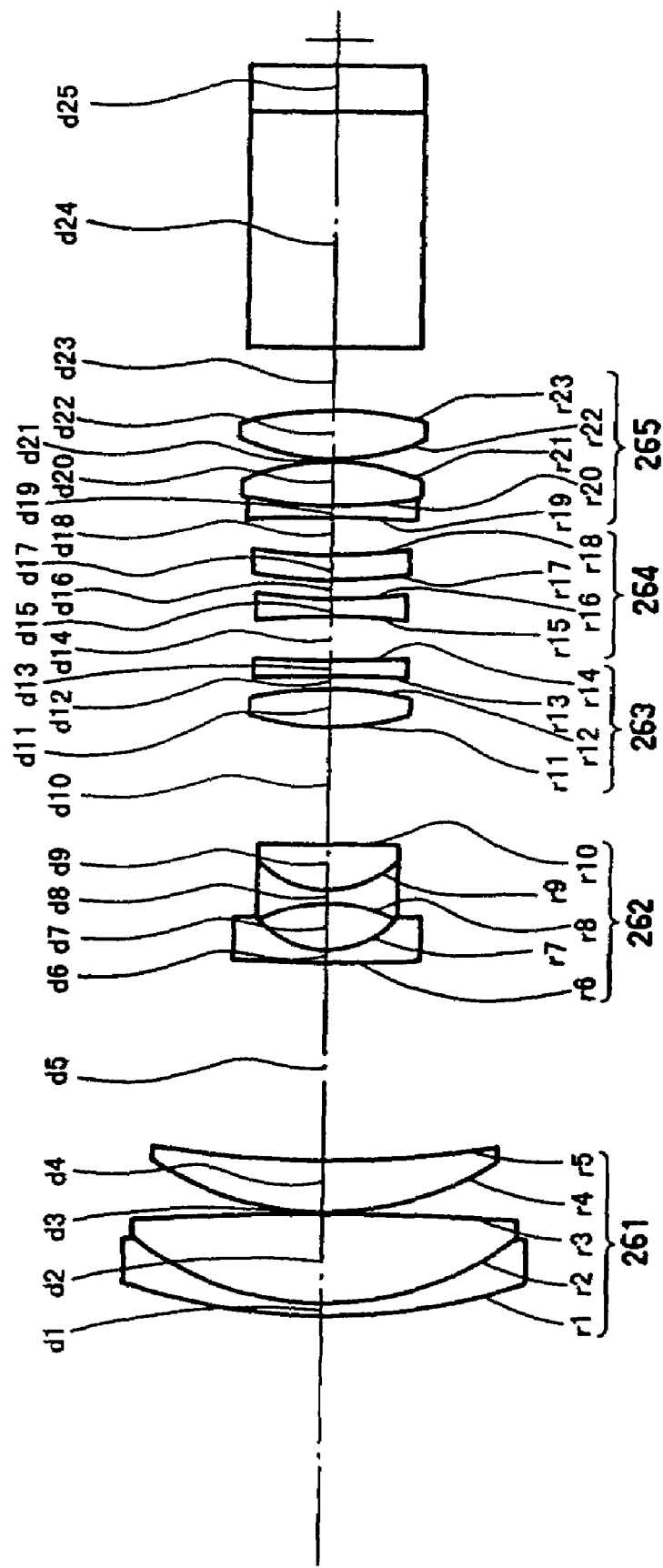
FIG. 90 is a view showing the arrangement of a zoom lens in a twenty-first embodiment according to the present invention.

FIG. 90 is a view showing the arrangement of a zoom lens in a twenty-first embodiment according to the present invention. As shown in FIG. 90, a zoom lens has a structure in which a first lens group 261, a second lens group 262, a third lens group 263, a fourth lens group 264, and a fifth lens group 265 are disposed from an object side (left side in FIG. 90) to an image plane side (right side in FIG. 90) in this order.

The first lens group 261 has a positive refracting power and is fixed with respect to the image plane in varying power and focusing. The second lens group 262 has a negative refracting power and varies power by moving along an optical axis. The third lens group 263 is composed of two lenses: a positive lens and a negative lens disposed from the object side in this order, and this group has a positive refracting power as a whole.

The fourth lens group 264 is composed of two lenses: a negative lens and a positive lens disposed from the object side in this order and this group has a negative refracting power as a whole, and is fixed with respect to the image plane in varying power and focusing. The fifth lens group 265 has a positive refracting power and moves along an optical axis so as to move an image and adjust the focus thereof at the same time in accordance with variable power. When camera shake occurs, shake of an image is corrected by moving the third lens group 263 vertically with respect to the optical axis.

The performance when shifting the lenses can be improved by applying at least one aspherical surface to any of the lenses of the third group 263.

Similar to the fourteenth embodiment, it is preferable for the zoom lens of this embodiment that the conditional expressions (8)-(16) are satisfied.

Specific examples of zoom lenses according to this embodiment are shown in the following Table 76.

TABLE 76

| Group | Surface | r | d | n | ν |
|---|---|---|---|---|---|
| 1 | 1 | 35.243 | 0.90 | 1.80518 | 25.4 |
|  | 2 | 18.353 | 5.25 | 1.60311 | 60.7 |
|  | 3 | −154.339 | 0.15 |  |  |

TABLE 76-continued

| Group | Surface | r | d | n | v |
|---|---|---|---|---|---|
|  | 4 | 17.449 | 3.00 | 1.60311 | 60.7 |
|  | 5 | 53.989 | Variable |  |  |
| 2 | 6 | 53.989 | 0.70 | 1.78500 | 43.7 |
|  | 7 | 5.142 | 2.97 | 1.66547 | 55.2 |
|  | 8 | −7.948 | 0.80 |  |  |
|  | 9 | 5.519 | 2.70 | 1.80518 | 25.4 |
|  | 10 | 1291.253 | Variable |  |  |
| 3 | 11 | 13.379 | 2.45 | 1.51450 | 63.1 |
|  | 12 | −14.156 | 0.60 |  |  |
|  | 13 | −61.508 | 1.00 | 1.80518 | 25.4 |
|  | 14 | 64.122 | 2.70 |  |  |
| 4 | 15 | −28.305 | 1.00 | 1.51633 | 61.2 |
|  | 16 | 24.977 | 1.60 |  |  |
|  | 17 | 19.641 | 1.50 | 1.80518 | 25.4 |
|  | 18 | 25.463 | Variable |  |  |
| 5 | 19 | −54.314 | 0.60 | 1.84666 | 23.9 |
|  | 20 | 24.366 | 2.70 | 1.51633 | 64.1 |
|  | 21 | −13.009 | 0.10 |  |  |
|  | 22 | 11.183 | 2.95 | 1.51450 | 63.1 |
|  | 23 | −21.825 | Variable |  |  |
| 6 | 24 | ∞ | 14.00 | 1.58913 | 61.2 |
|  | 25 | ∞ | 2.80 | 1.51633 | 64.1 |
|  | 26 | ∞ | — |  |  |

The following Table 77 shows aspherical coefficients of the zoom lens in the present embodiment.

TABLE 77

| Surface | 8 | 13 | 22 |
|---|---|---|---|
| K | −4.89985 | −8.46317 | −1.14637 |
| D | $-1.08175 \times 10^{-3}$ | $1.00945 \times 10^{-4}$ | $-6.03706 \times 10^{-5}$ |
| E | $-1.06040 \times 10^{-5}$ | $-1.63114 \times 10^{-6}$ | $-8.33884 \times 10^{-8}$ |

The following Table 78 shows an air distance (mm) that is varied by zooming in the case where an object is positioned 2 m away from the tip end of the lens. At the standard position, magnification of the second lens group 262 becomes −1 times in Table 78.

TABLE 78

|  | Wide-angle end | Standard position | Telephoto end |
|---|---|---|---|
| f | 3.684 | 18.016 | 42.724 |
| F/NO | 1.676 | 1.898 | 2.073 |
| 2ω | 58.536 | 12.215 | 5.106 |
| d5 | 0.600 | 11.675 | 14.927 |
| d10 | 17.903 | 6.827 | 3.575 |
| d14 | 5.200 | 2.343 | 5.200 |
| d19 | 1.000 | 3.857 | 1.000 |

The values of the Expressions (8) to (14) are as follows.

$rS1/rS9=0.93$ $rS1/rS9=0.63$ $|f3/f34|=0.61$ $BF/fw=3.59$ $f1/fw=6.99$ $|f2|/fw=1.25$ $f34/fw=8.94$ $f5/fw=3.26$

Figure 91:
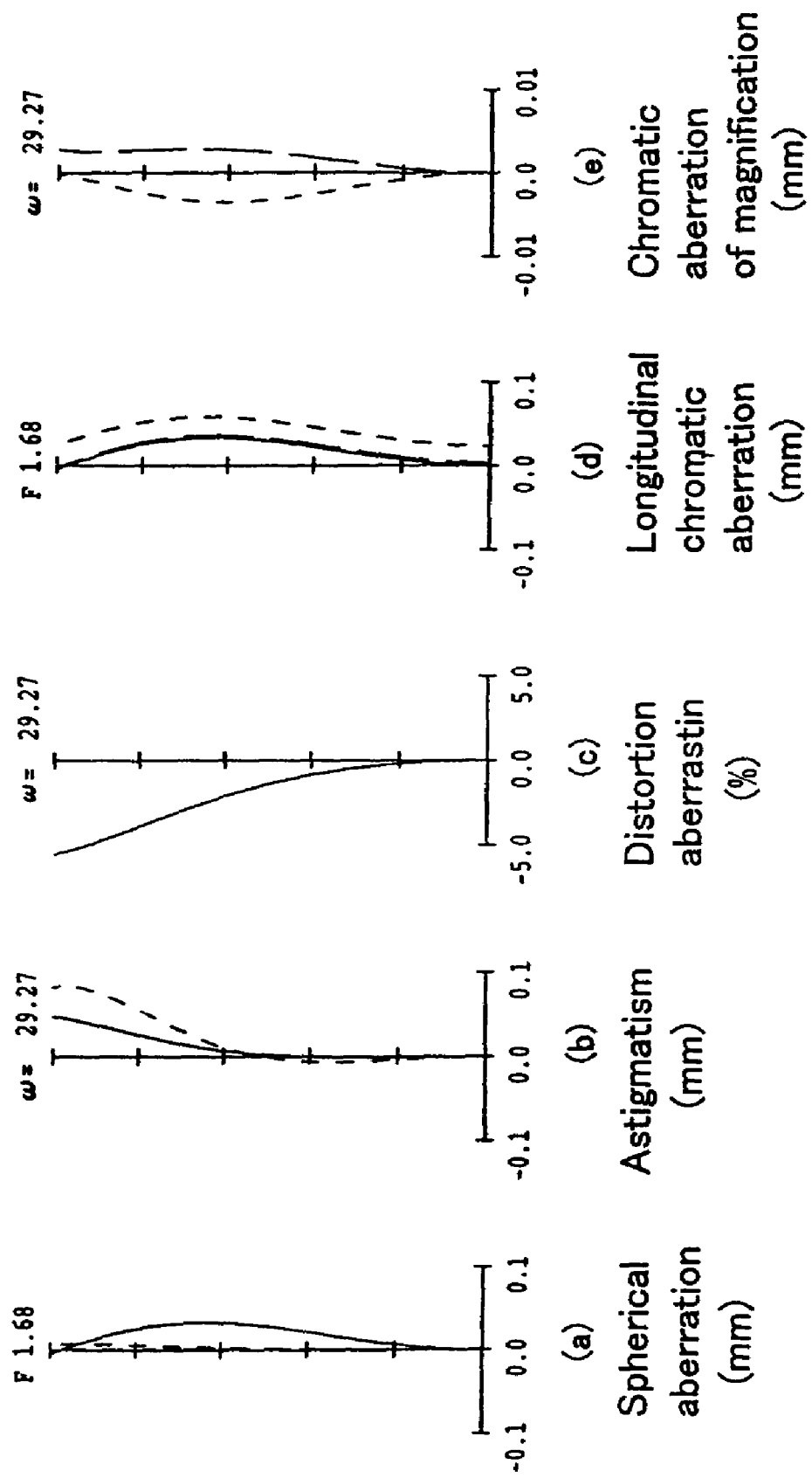
FIG. 91 illustrates various aberrations at a wide-angle end in the twenty-first embodiment according to the present invention.
Figure 92:
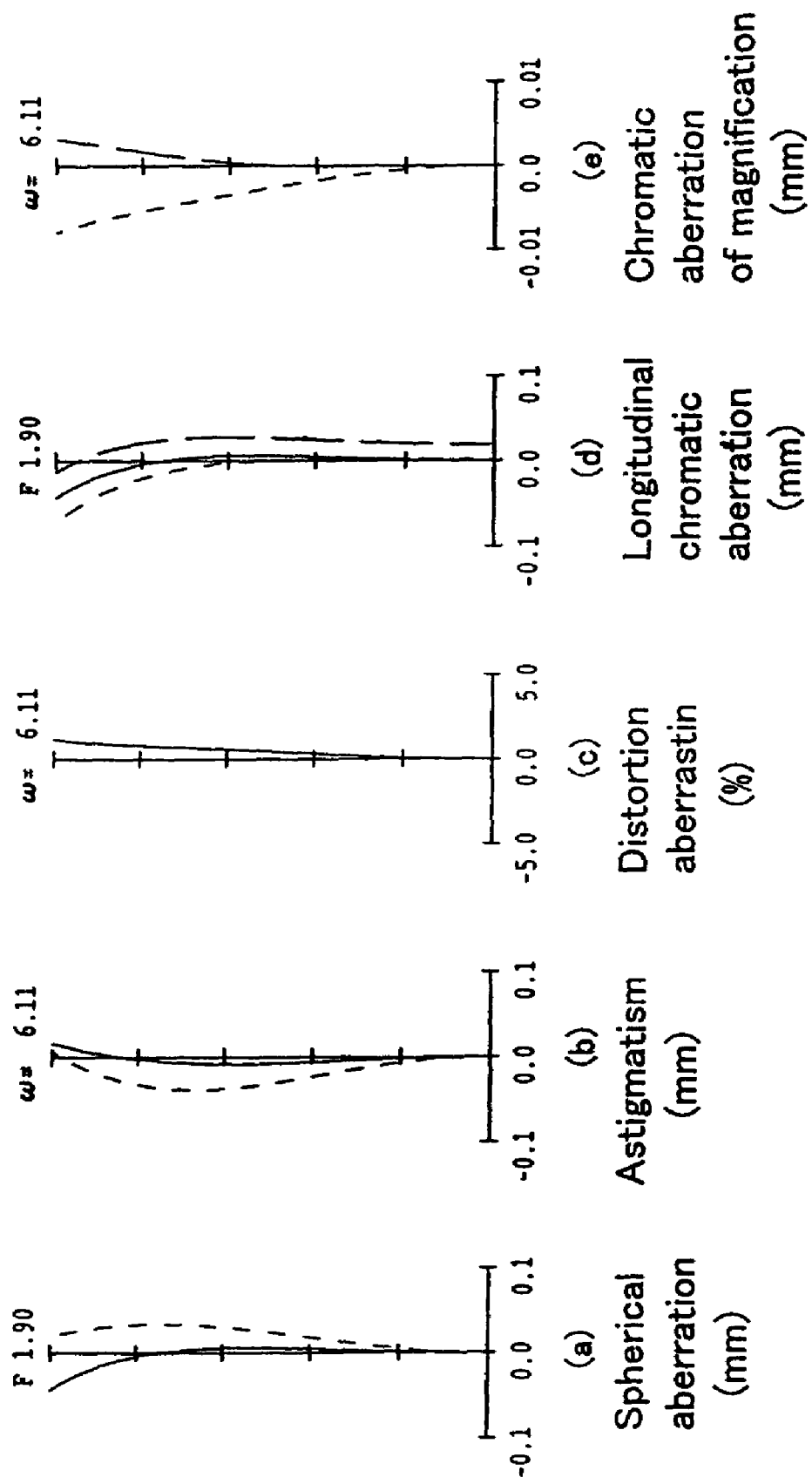
FIG. 92 illustrates various aberrations at a standard position in the twenty-first embodiment according to the present invention.
Figure 93:
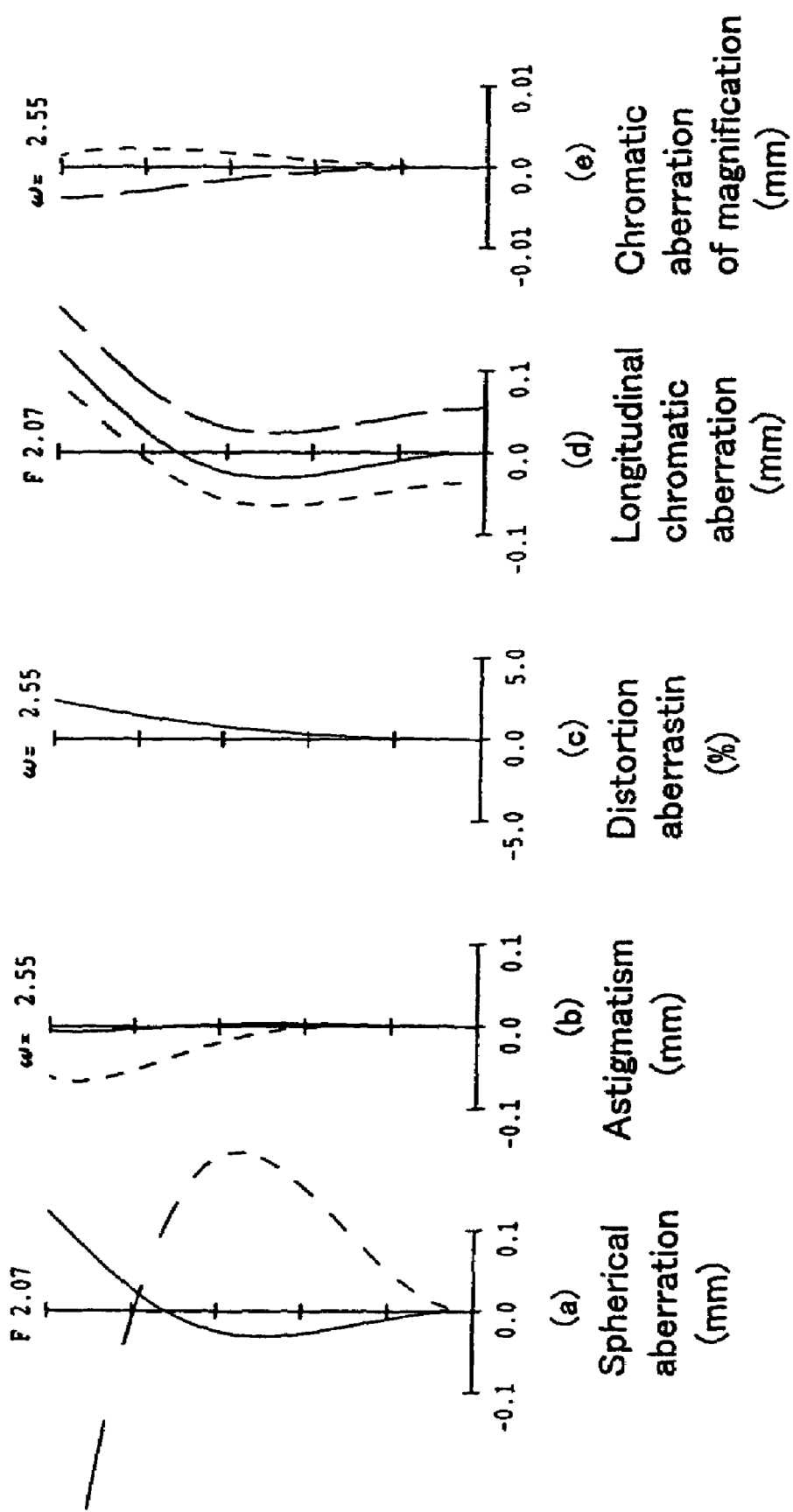
FIG. 93 illustrates various aberrations at a telephoto end in the twenty-first embodiment according to the present invention.

FIGS. 91-93 illustrate various aberrations at a wide-angle end, at a standard position and at a telephoto end of the zoom lens. As clearly shown in the aberrations of FIGS. 91-93, a zoom lens according to this embodiment has sufficient performance to correct aberration to realize high resolution.

Twenty-second Embodiment

Figure 94:
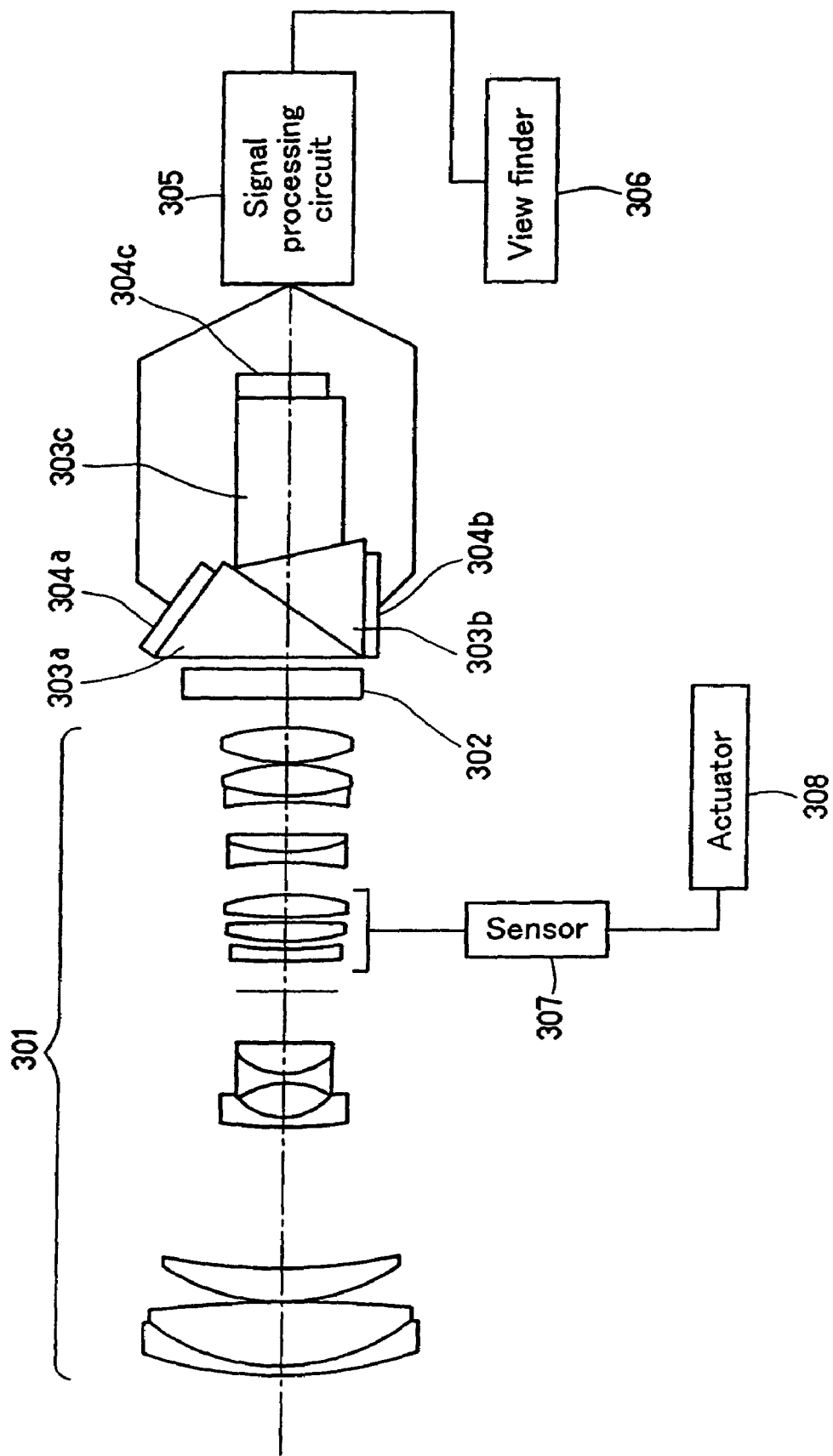
FIG. 94 is a view showing the arrangement of a video camera in a twenty-second embodiment according to the present invention.

FIG. 94 is a view showing the arrangement of a video camera (three-plate-type video camera) in a twenty-second embodiment according to the present invention As shown in FIG. 94, a video camera according to this embodiment comprises a zoom lens 301, a low-pass filter 302, prisms 303a-303c for color separation, imagers 304a-304c, a signal processing circuit 305, a view finder 306, a sensor 307 for detecting camera shake, and an actuator 308 for driving the lens. The zoom lens of the fifteenth embodiment (see FIG. 66) is used for the zoom lens 301, and thus, a small and highly-qualified video camera having a function for correcting camera shake is realized.

In this embodiment, the zoom lens of FIG. 66 in the fifteenth embodiment is used. This zoom lens can be replaced by any of the zoom lenses shown in the sixteenth to twenty-first embodiments.

Although camera shake is corrected by shifting a lens group having a positive refracting power, similar effects can be obtained by shifting a lens group having a negative refracting power.

INDUSTRIAL APPLICABILITY

As mentioned above, the present invention provides a zoom lens having a function to correct camera shake, i.e., a function to optically correct shake of an image caused by camera shake, vibration etc. The zoom lens can be made small and compact with less deterioration in the aberration performance. Such a zoom lens can be used as a zoom lens for a video camera or for an electronic still camera.

What is claimed is:

1. A zoom lens comprising:
   a first lens group having a positive refracting power and being fixed with respect to an image plane;
   a second lens group having a negative refracting power and being movable along an optical axis to vary a power;
   a third lens group having a positive refracting power and being fixed with respect to the image plane; and
   a fourth lens group having a positive refracting power and being movable along an optical axis;
   wherein said first, second, third and fourth lens groups are disposed in this order from an object side; and
   wherein said third lens group is vertically movable with respect to the optical axis,
   wherein a shifting amount Y of said third lens group at a focal length f of an entire system when correcting a movement of an image during a shaking of said zoom lens, a shifting amount Yt of said third lens group at a telephoto end, and a focal length ft of the telephoto end satisfy the following conditional expressions Yt>Y; and $(Y/Yt)/(f/ft)<1.5$.

2. A zoom tens according to claim 1, wherein said third lens group is composed of one lens.

3. A zoom lens according to claim 1, wherein said third lens group is composed of two lenses comprising one positive lens and one negative lens.

4. A zoom lens according to claim 1, wherein said third lens group is composed of three lenses comprising at least one positive lens and at least one negative lens.

5. A zoom lens according to claim 1, wherein said third lens group comprises a positive lens, and a cemented lens of a positive lens and a negative lens.

6. A zoom lens according to claim 1, wherein said third lens group comprises at least one aspherical surface.

7. A zoom lens according to claim 1, wherein said fourth lens group comprises at least one aspherical surface.

8. A zoom lens according to claim 1, wherein a focal length f3 of said third lens group and a focal length fw of an entire system at a wide-angle end satisfy the following conditional expression $2.0 < f3/fw < 4.0.$ 9. A zoom lens according to claim 1 wherein a surface on the object side of a lens disposed closest to the object side in said fourth lens group is aspherical, and a local radius of curvature R20 in a vicinity of the optical axis and a local radius of curvature R21 in an outer peripheral portion satisfy the following conditional expression $1.05 < R21/R20\ 2.0.$ 10. A video camera provided with a zoom lens according to claim 1.

11. A still image camera provided with a zoom lens according to claim 1.

12. A video camera provided with a zoom lens according to claim 1.

13. A zoom lens according to claim 1, wherein a surface on the object side of a lens disposed closest to the object side in said third lens group is aspherical and a local radius of curvature R10 in a vicinity of an optical axis and a local radius of curvature R11 in an outer peripheral portion satisfy the following conditional expression $1.05 < R11/R10 < 2.5.$ 14. A zoom lens comprising:
a first lens group having a positive refracting power and being fixed with respect to an image plane;
a second lens group having a negative refracting power and being movable along an optical axis to vary a power;
a third lens group having a positive refracting power and being fixed with respect to the image plane; and
a fourth lens group having a positive refracting power and being movable along an optical axis;
wherein said first, second, third and fourth lens groups are disposed in this order from an object side; and
wherein said third lens group is vertically movable with respect to the optical axis
wherein a surface on the object side of a lens disposed closest to the object side in said third lens group is aspherical and a local radius of curvature R10 in a vicinity of an optical axis and a local radius of curvature R11 in an outer peripheral portion satisfy the following conditional expression $1.05 < R11/R10 < 2.5.$ 15. A zoom lens according to claim 14, wherein said third lens group is composed of one lens.

16. A zoom lens according to claim 14, wherein said third lens group is composed of two lenses comprising one positive lens and one negative lens.

17. A zoom lens according to claim 14, wherein said third lens group is composed of three lenses comprising at least one positive lens and at least one negative lens.

18. A zoom lens according to claim 14, wherein said third lens group comprises a positive lens, and a cemented lens of a positive lens and a negative lens.

19. A zoom lens according to claim 14, wherein said third lens group comprises at least one aspherical surface.

20. A zoom lens according to claim 14, wherein said fourth lens group comprises at least one aspherical surface.

21. A zoom lens according to claim 14, wherein a shifting amount Y of said third lens group at a focal length f of an entire system when correcting a movement of an image during a shaking of said zoom lens, a shifting amount Yt of said third lens group at a telephoto end, and a focal length ft of the telephoto end satisfy the following conditional expressions $Yt < Y;$ and $(Y/Yt)/(f/ft) < 1.5.$ 22. A zoom lens according to claim 14, wherein a focal length f3 of said third lens group and a focal length fw of an entire system at a wide-angle end satisfy the following conditional expression $2.0 < f3/fw < 4.0.$ 23. A zoom lens according to claim 14, wherein a surface on the object side of a lens disposed closest to the object side in said fourth lens group is aspherical, and a local radius of curvature R20 in a vicinity of the optical axis and a local radius of curvature R21 in an outer peripheral portion satisfy the following conditional expression $1.05 < R21/R20 < 2.0.$ 24. A video camera provided with a zoom lens according to claim 14.

25. A still image camera provided with a zoom lens according to claim 14.

26. A video camera provided with a zoom lens according to claim 14.

* * * * *